US008596604B2

(12) United States Patent
Kubach

(10) Patent No.: US 8,596,604 B2
(45) Date of Patent: Dec. 3, 2013

(54) APPARATUS, SYSTEM AND METHOD FOR AN ENTERTAINMENT AND GAMING MACHINE BASE

(76) Inventor: Arthur Kubach, Lumberton, NJ (US)

( * ) Notice: Subject to any disclaimer, the term of this patent is extended or adjusted under 35 U.S.C. 154(b) by 92 days.

(21) Appl. No.: 12/456,653

(22) Filed: Jun. 18, 2009

(65) Prior Publication Data

US 2011/0315850 A1 Dec. 29, 2011

Related U.S. Application Data

(60) Provisional application No. 61/132,511, filed on Jun. 18, 2008.

(51) Int. Cl.
*F16M 1/00* (2006.01)

(52) U.S. Cl.
USPC ........... 248/678; 248/121; 248/127; 248/136; 248/677; 312/265.6; 463/46

(58) Field of Classification Search
USPC ......... 248/678, 676, 677, 121, 126, 127, 135, 248/136, 146, 149, 917, 924; 312/223.3, 312/7.2, 223.1, 114, 117, 257.1, 265.6, 284, 312/290; 273/143 R, 309, 138.1, 138.2, 273/148 R; 463/46, 20, 29
See application file for complete search history.

(56) References Cited

U.S. PATENT DOCUMENTS 4,345,758 A * 8/1982 Kempf .......................... 473/475
5,090,785 A * 2/1992 Stamp ........................ 312/319.9
5,826,882 A * 10/1998 Ward ............................ 273/309
5,876,285 A * 3/1999 Salour et al. .................... 463/29
6,042,115 A * 3/2000 Ward ........................ 273/143 R
6,067,902 A * 5/2000 Takahashi ..................... 101/118
6,092,867 A * 7/2000 Miller ....................... 297/188.14
6,146,274 A * 11/2000 Salour et al. .................... 463/29
6,880,825 B2 * 4/2005 Seelig et al. ............. 273/143 R
6,913,331 B1 * 7/2005 Luciano et al. ............ 312/223.1
7,040,626 B2 * 5/2006 Seelig et al. .................. 273/309
7,896,746 B2 * 3/2011 Borissov .......................... 463/46
2002/0060124 A1 * 5/2002 Thompson .................... 194/350
2006/0252553 A1 * 11/2006 Goode ............................ 463/47
2007/0057607 A1 * 3/2007 Caissie ....................... 312/265.6
2007/0221817 A1 * 9/2007 Chen ............................. 248/676
2008/0203863 A1 * 8/2008 Beirne et al. ............... 312/223.1
2008/0303209 A1 * 12/2008 Engel, Jr. .................. 273/148 B

* cited by examiner

*Primary Examiner* — Terrell McKinnon
*Assistant Examiner* — Monica Millner
(74) *Attorney, Agent, or Firm* — Blank Rome LLP

(57) ABSTRACT

The invention disclosed herein is directed to a system, method and apparatus for a base used in connection with a device. In one embodiment of the invention, the base is used in connection with entertainment and gaming devices such as slot machines, video poker and blackjack, video games, and other entertainment and gaming devices. The base may support the entertainment or gaming device, and may comprise a top surface on which said device may be positioned, a first side panel positioned substantially perpendicularly to the top surface, a second side panel positioned substantially perpendicularly to the top surface and opposed to the first side panel, and a front panel positioned substantially perpendicularly to the top surface and the first and second side panels. In one embodiment of the invention, the base is modular and may be easily and repeatedly assembled and disassembled for servicing, maintenance, reconfiguration, shipping and/or relocation. The modular aspect of the bases of the instant invention also permit multiple bases to be arranged in numerous configurations.

14 Claims, 161 Drawing Sheets

FIG. 39A
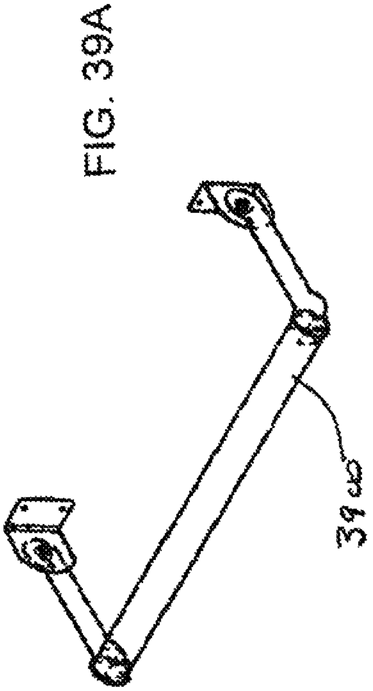
FIG. 39D
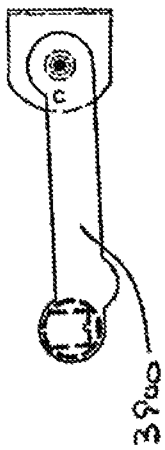
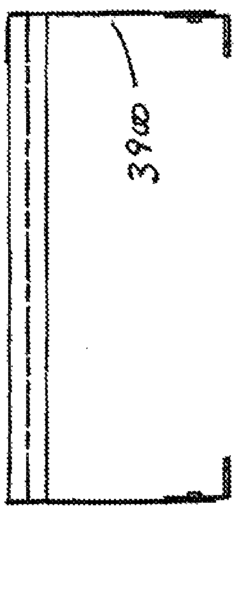
FIG. 39B
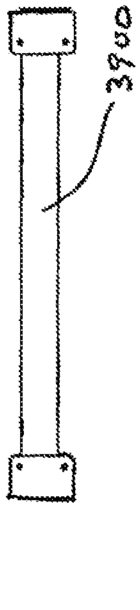
FIG. 39C

FIG. 41A
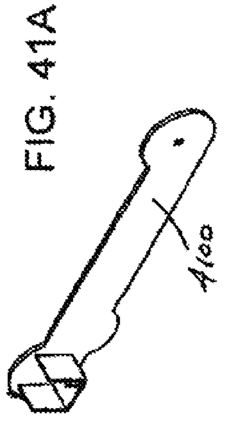
FIG. 41B
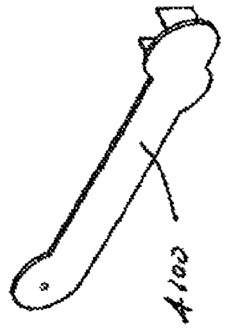
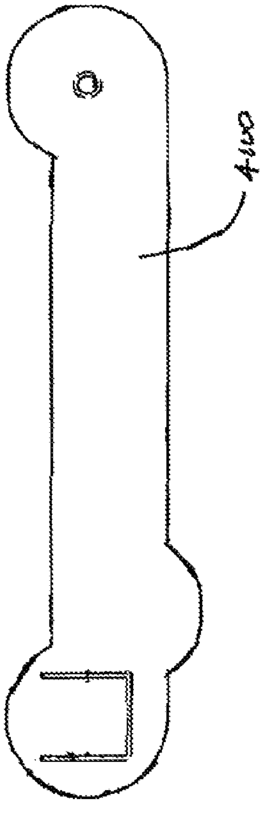
FIG. 41C
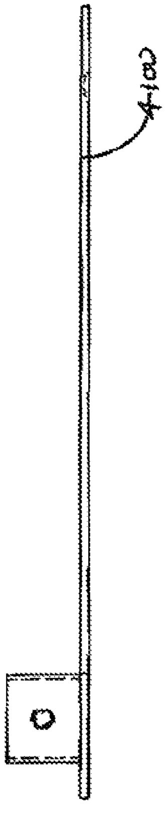
FIG. 41D

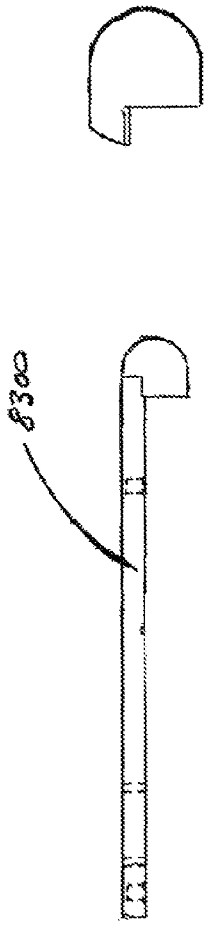
FIG. 86
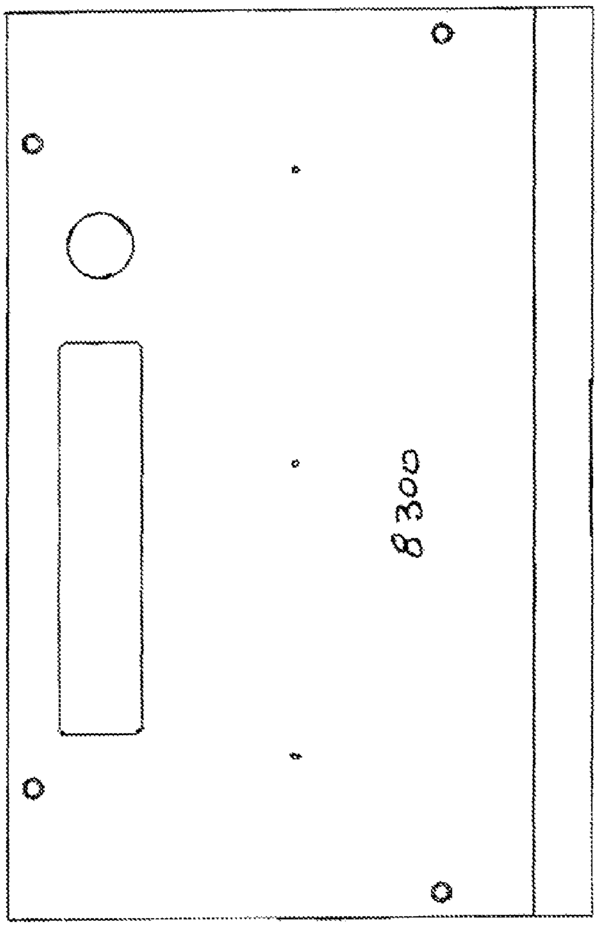
FIG. 85
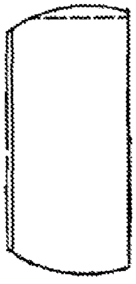

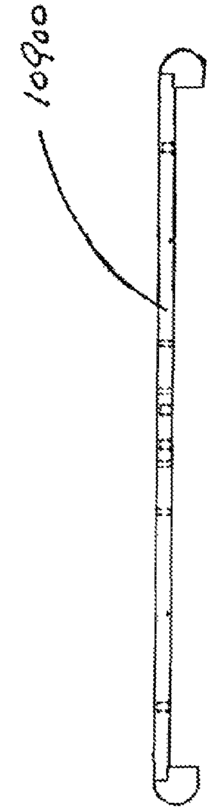
FIG. 110
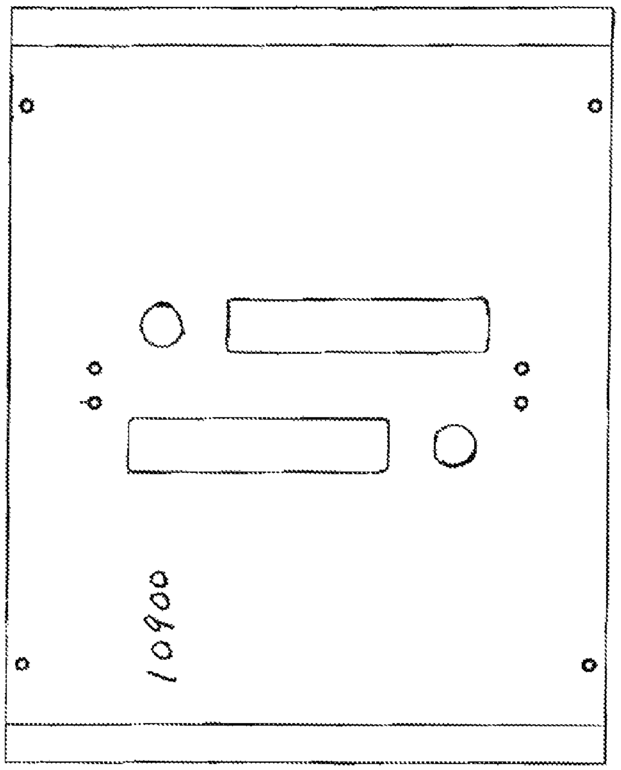
FIG. 109
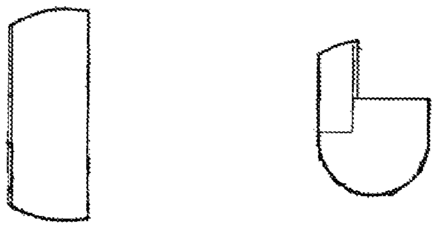

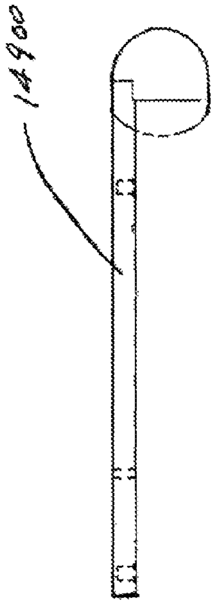
FIG. 152
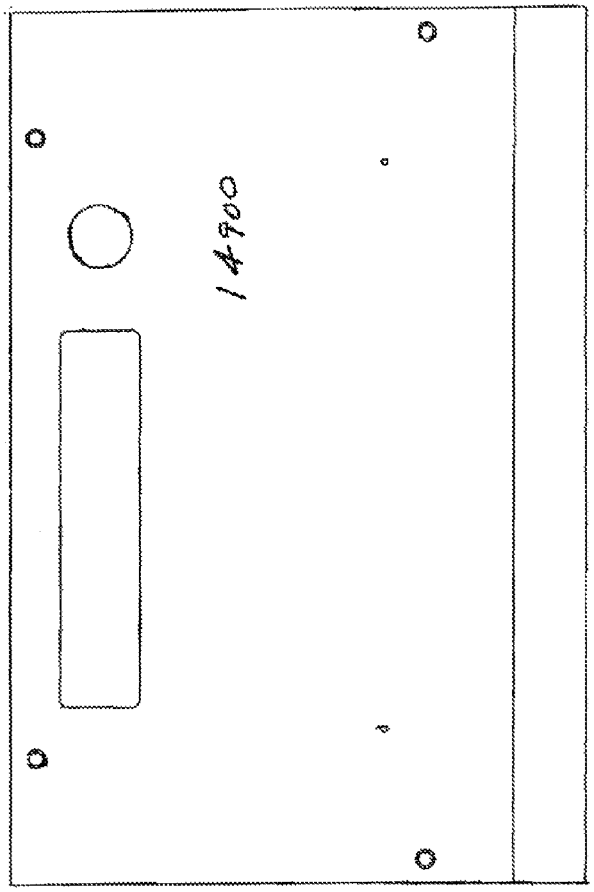
FIG. 151
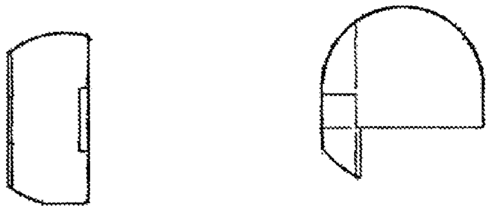

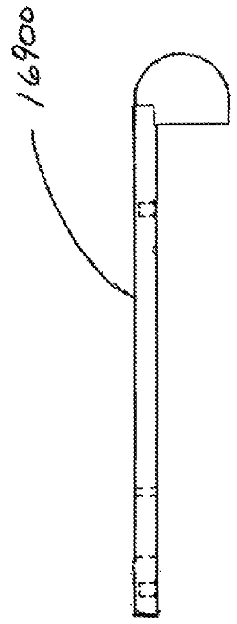
FIG. 172
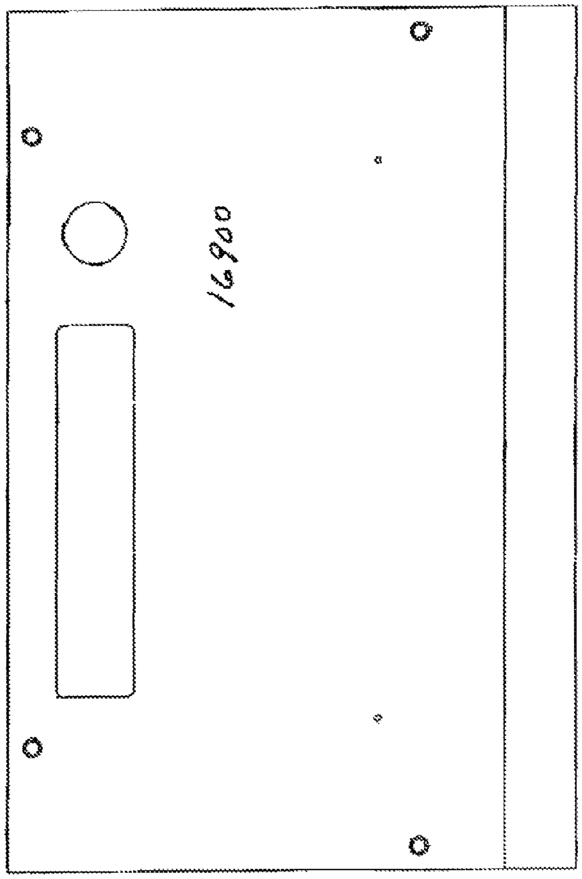
FIG. 171
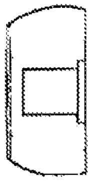
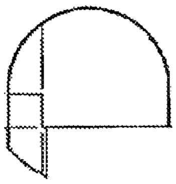

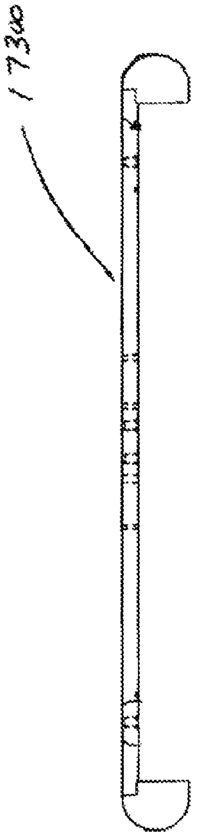
FIG. 174
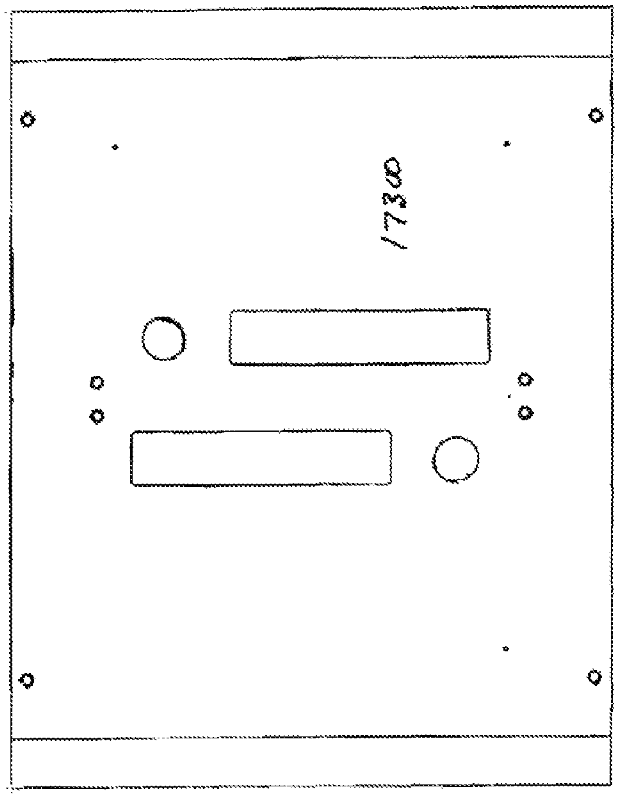
FIG. 173
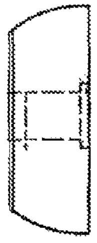
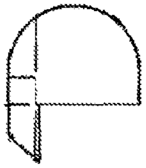

FIG. 182 A
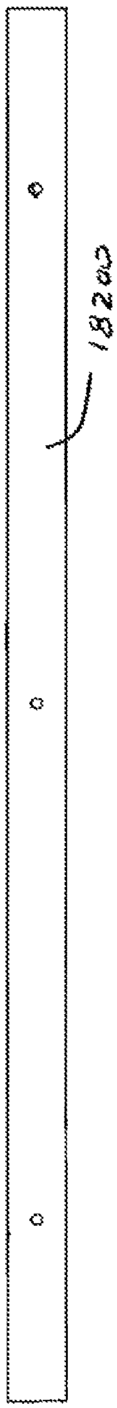
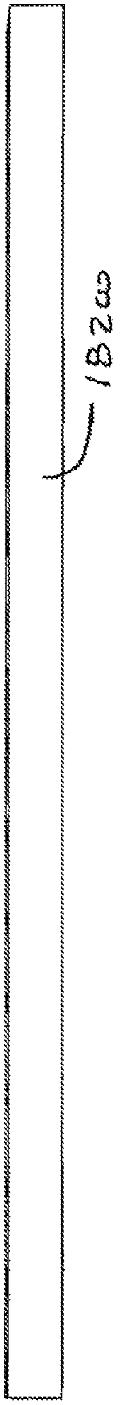
FIG. 182 B
FIG. 182 C

APPARATUS, SYSTEM AND METHOD FOR AN ENTERTAINMENT AND GAMING MACHINE BASE

CROSS REFERENCE TO RELATED APPLICATION

This application claims the benefit of U.S. Provisional Patent Application Ser. No. 61/132,511, filed Jun. 18, 2008, which is entitled "Apparatus, System and Method for an Entertainment and Gaming Machine Base," the entirety of which is incorporated herein by reference.

FIELD OF THE INVENTION

The present invention is directed to an apparatus, system and method for a base. More particularly, the present invention is directed to an apparatus, system and method for an entertainment and gaming machine base for use with slot machines, video machines and devices, and other entertainment and gaming machines.

BACKGROUND OF THE INVENTION

Gaming and other entertainment machines and devices such as slot machines, video poker and blackjack, video games and other entertainment devices are highly profitable sources of revenue for casinos, slot parlors, video game arcades, and other gaming, gambling and entertainment operators. Such devices often require a base upon which the device may be seated. Such bases typically provide a support structure which places the device at a height and orientation which is suitable for a user to operate the device. Bases of this type may also provide a housing for utilities necessary to support the device such as electrical wiring, computer cables, and the like.

Bases which are currently available are generally custom built, fixed in size, and not easily scalable to accommodate the various sizes of devices which such bases support. Such bases are fabricated prior to shipping and are therefore bulky, expensive, and difficult to transport. Prefabricated bases are also difficult to install and do not permit modification to accommodate particular size and floor space issues which are often not realized until after the base has been delivered to the installation site. In addition, current bases do not promote ease in the maintenance of the device and the device's supporting utilities, such as electrical and computer lines. For example, one such base provides a service access panel on the side of the base facing the user of the machine. This access panel is at floor level, making it difficult to fish electrical and computer data leads from the device to a desired source and/or between devices.

In addition, for safety, structural and operational issues, it is important that each base be properly leveled to the surface which it is installed. In order to level such bases, it is necessary to employ crude and time consuming methods of leveling each base to ensure that the device is secure and does not shift on or fall off the base, and that the base itself is not subjected to stresses in the base due to lack of proper support therein causing the device to become unstable from a failure in a member of the base. Such crude and time consuming leveling methods include locating the point on the base where the base is not properly supported, and preparing and installing properly sized metal or wooden shim at the point of deficient support. Failure to install properly sized shim may lead to instability of the base and malfunctioning of the device, and/or injury to the user due to such instability.

Accordingly, there exists a need for an improved method and apparatus for leveling entertainment and gaming machine bases.

Moreover, dramatic increases in the number of establishments such as casinos, slot parlors, video game arcades, and other gaming, gambling and entertainment establishments, as well as the always present desire to maximize the number of revenue producing devices per square foot of establishment floor space, has created an increased need for an improved apparatus, system and method for configuring and supporting such devices. Also, there exists a need for an improved system for the assembly and configuration of such bases, as well as a base which facilitates the servicing and maintenance of the devices which such bases support, therein reducing the time a revenue producing device is out of service. Additionally, with skyrocketing fuel costs and the premium being placed on efficient transportation logistics, there exists a need for an improved entertainment and gaming device base, system and method which is easily, efficiently and inexpensively scaled, transported, assembled, and configured to the establishment floor.

SUMMARY OF THE INVENTION

The invention disclosed herein is directed to a system, method and apparatus for a base used in connection with a device. In one embodiment of the invention, the base is used in connection with entertainment and gaming devices such as slot machines, video poker and blackjack, video games, and other entertainment and gaming devices.

The base may support the entertainment or gaming device, and may comprise a top surface on which said device may be positioned, a first side panel positioned substantially perpendicularly to the top surface, a second side panel positioned substantially perpendicularly to the top surface and opposed to the first side panel, and a front panel positioned substantially perpendicularly to the top surface and the first and second side panels.

In one embodiment of the invention, the base is modular and may be easily and repeatedly assembled and disassembled for servicing, maintenance, reconfiguration, shipping and/or relocation. Such modularity allows the base to be transported in a disassembled or partially disassembled state, thereby dramatically reducing the amount of space required to transport each base. It is estimated that current embodiments of this invention in an unassembled state may reduce the amount of space required to transport the base by approximately 90% over a fully assembled base. Thus, significant savings in the cost of transporting such unassembled bases is likely to be realized.

The base may also comprise a utility area which may house electrical and computer wiring as well as other utilities and devices associated with the device and/or base. In this regard, the utility area may be at least partially defined by the first and second side panels, the front panel and the top surface.

In addition, the base may be constructed so that the top surface may be easily and temporarily removed allowing access to the utility area.

The modular aspect of the bases of the instant invention also permit multiple bases to be arranged in many different configurations depending on various factors. Such factors may include, but not be limited to, the number of bases to be configured, the amount of floor space available in the establishment in which the bases are installed, and the configuration of the devices which are placed on the bases. Also, when configuring multiple bases, side panels of adjacent bases may be shared between bases thereby reducing the amount of material used for the construction of each base.

For example, when constructing a single base, one embodiment of the invention utilizes two side panels on either side of the base. However, when configuring two or more such bases, the side panel which is directly adjacent to another base may be shared by adjacent bases. Thus, when configuring two bases side-by-side or in series, the adjoining bases may share the side panel which adjoins the two bases, thereby utilizing only three total side panels instead of four side panels which would be utilized by two bases configured separately. Likewise, three bases configured in series would utilize four instead of six side panels, four bases in series would utilize five side panels instead of eight, and so on.

Similarly, the number of side panels utilized in multiple base configurations may be reduced if the bases are arranged in a circular or partially circular fashion. For example, six bases may be configured in a circle and utilize six side panels instead of the twelve which would be required if each base was independently constructed. Likewise, eight bases may be configured in a circle and utilize eight side panels instead of the sixteen which would be required if each base was independently constructed.

In addition, bases may be arranged in a back-to-back configuration, and also in a side-to-side and back-to-back configuration.

BRIEF DESCRIPTION OF THE DRAWINGS

Understanding of the present invention will be facilitated by consideration of the following detailed description of the embodiments of the present invention taken in conjunction with the accompanying drawings, in which like numerals refer to like parts, and wherein:

FIGS. 39A, 39B, 39C, and 39D, depict perspective, plan, rear and side views, respectively, of the foot rest of the base of FIG. 26.

FIGS. 41A, 41B, 41C, and 41D depict inner side perspective, outer side perspective, elevation and bottom views, respectively, of the right hand arm of the foot rest of the base of FIG. 26.

FIG. 85 depicts a bottom view of the countertop of the base of FIG. 77.

FIG. 86 depicts an end view of the countertop of the base of FIG. 77.

FIG. 109 depicts a bottom view of the countertop of two bases of FIG. 99 arranged in a back-to-back configuration.

FIG. 110 depicts an end view of the countertop of two bases of FIG. 99 arranged in a back-to-back configuration.

Figure 99:
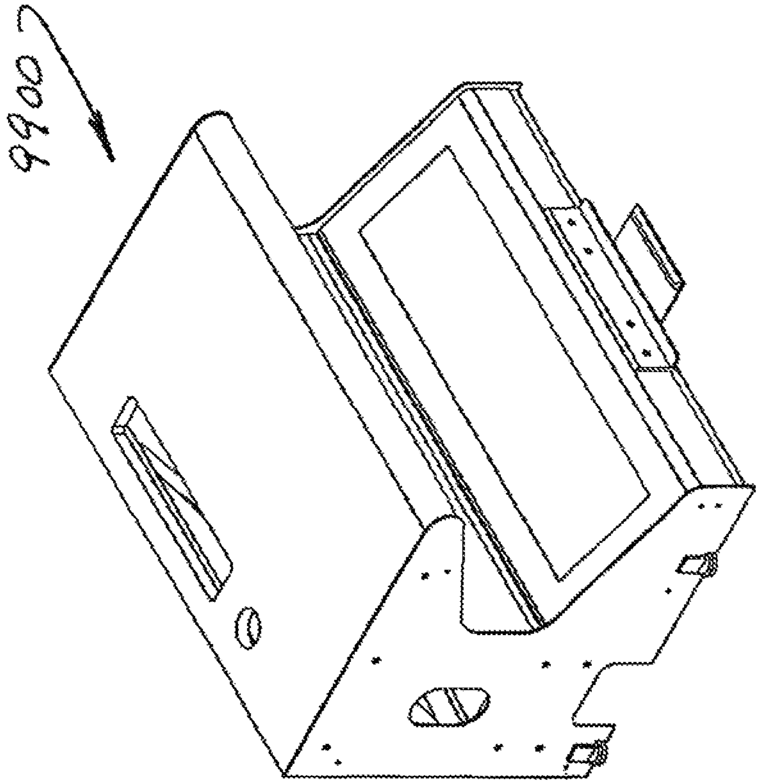
FIG. 99 depicts a front perspective view of another embodiment of the base of the instant invention.
Figure 101:
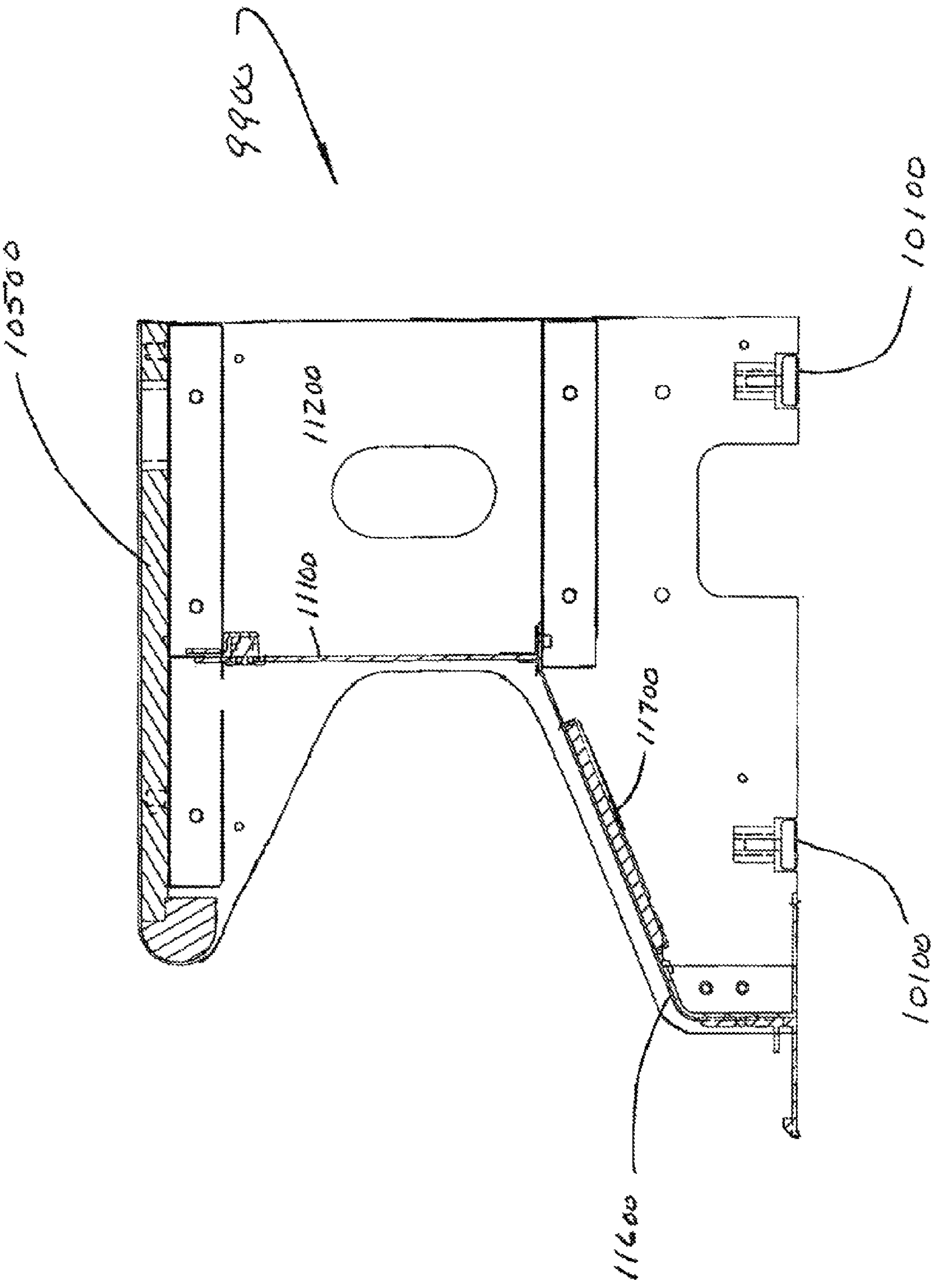
FIG. 101 depicts a cross-sectional end view of the base of FIG. 99.
Figure 115B:
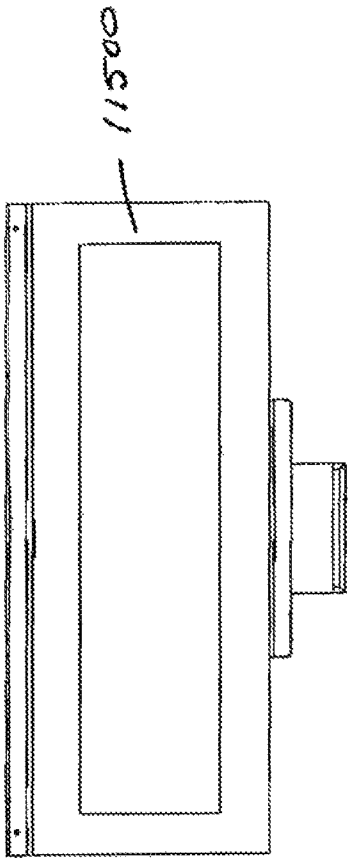
Figure 115C:
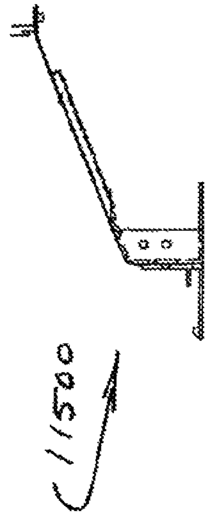
Figure 115A:
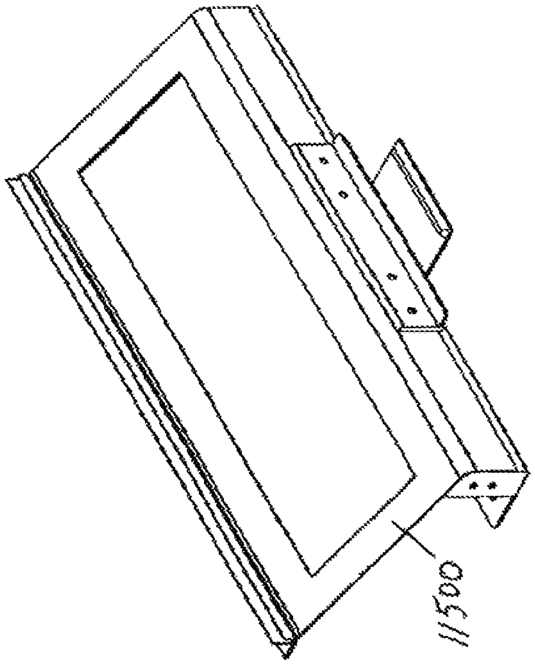

FIGS. 115A, 115B, and 115C depict front perspective, top, and end views, respectively, of the foot rest and sled mount of the base of FIG. 99.

Figure 116A:
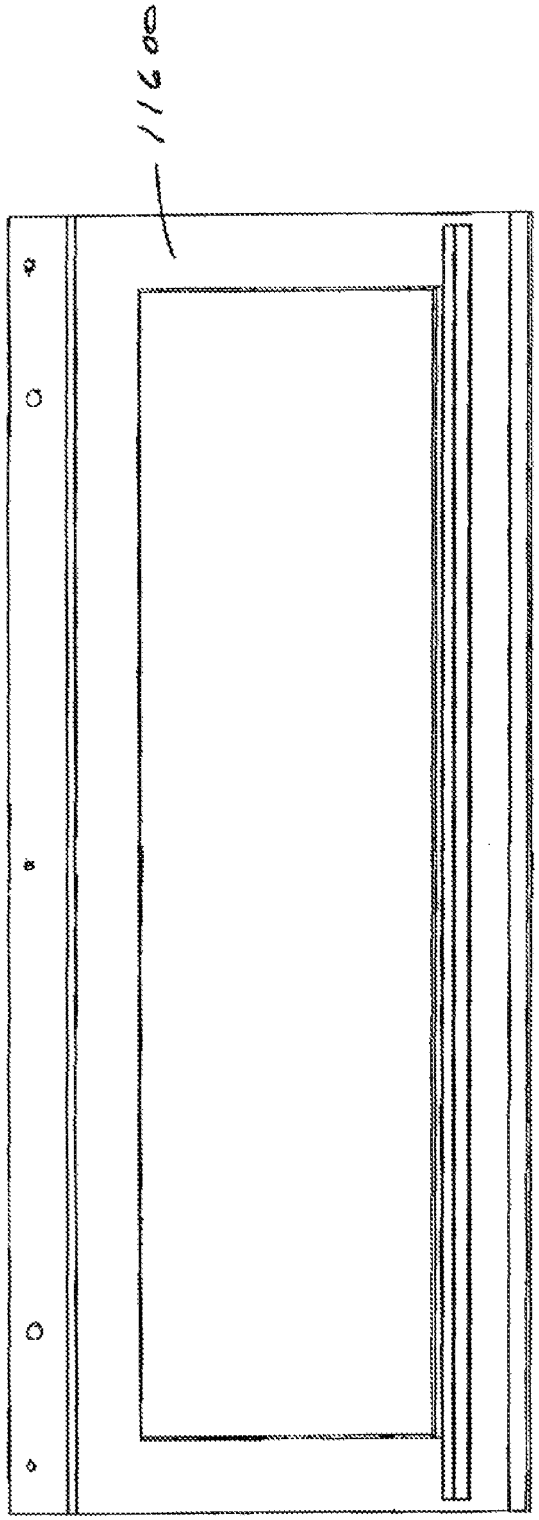
Figure 116B:
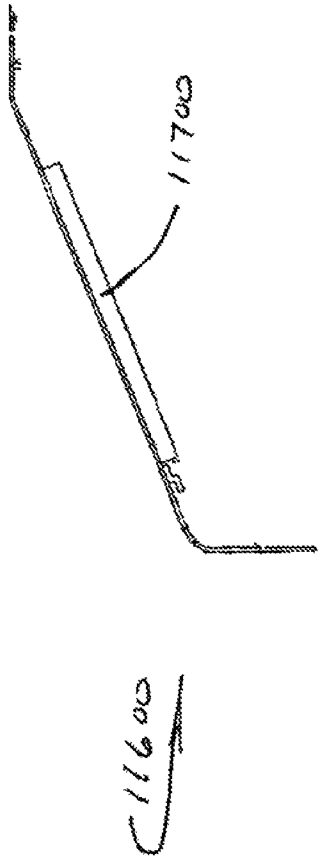

FIGS. 116A and 116B depict bottom and end views, respectively, of the foot rest cover, without the sled mount, of the base of FIG. 99.

Figure 117A:
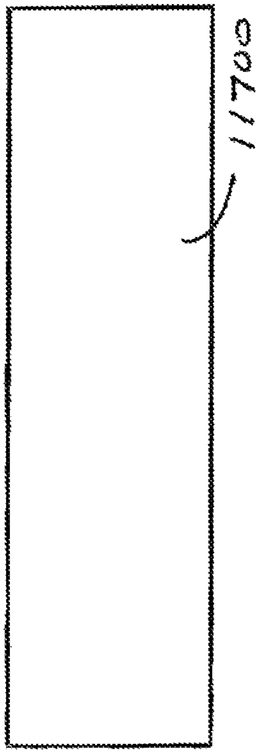
Figure 117B:
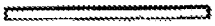
Figure 117C:
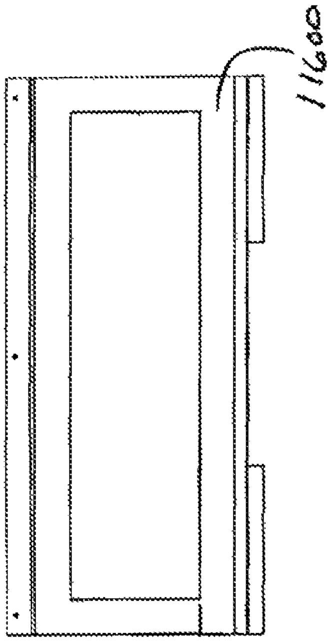
Figure 117D:
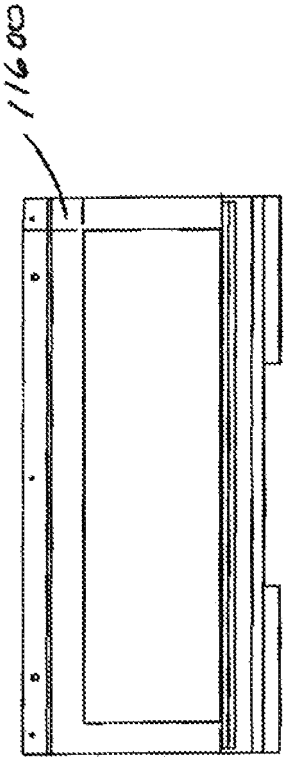
Figure 118A:
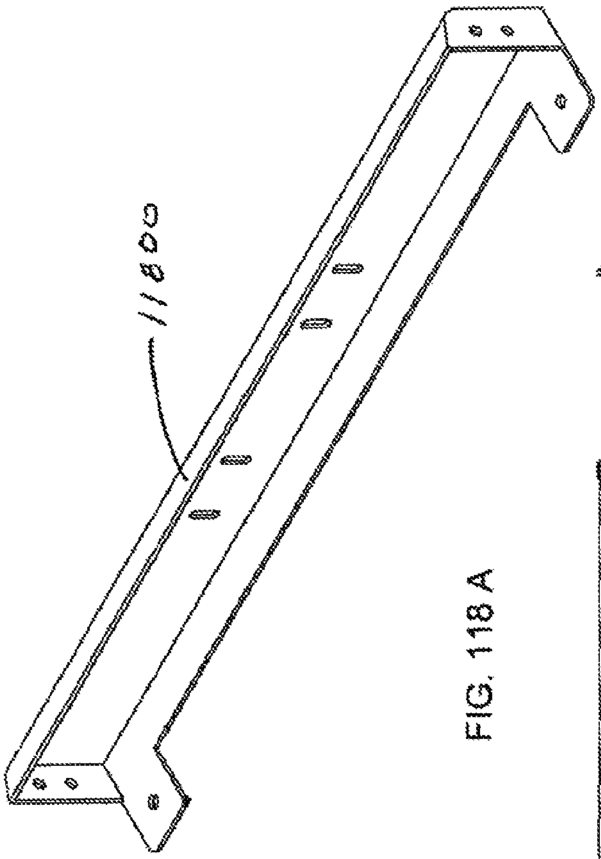
Figure 118D:
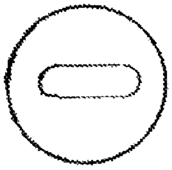
Figure 118D:
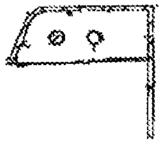
Figure 118B:
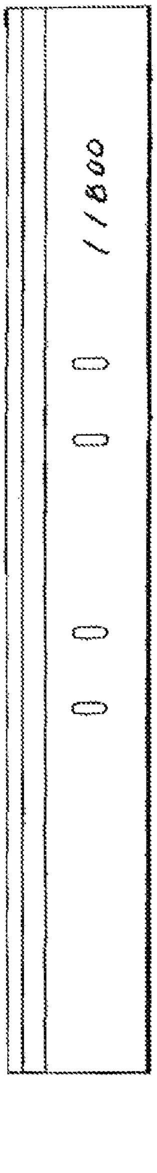
Figure 118C:
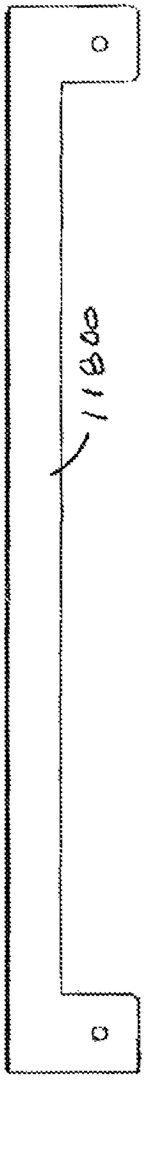

FIGS. 117A and 117B depict top and end views, respectively, of the foot rest carpet holder of the base of FIG. 99; and FIGS. 117C and 117D depict top and bottom views, respectfully, of the foot rest cover (with foot rest carpet holder therein) of the base of FIG. 99.

FIGS. 118A, 118B, 118C, and 118D depict rear perspective, front, bottom, and Section 1-1 views, respectively, of the sled mount of the base of FIG. 99.

Figure 119A:
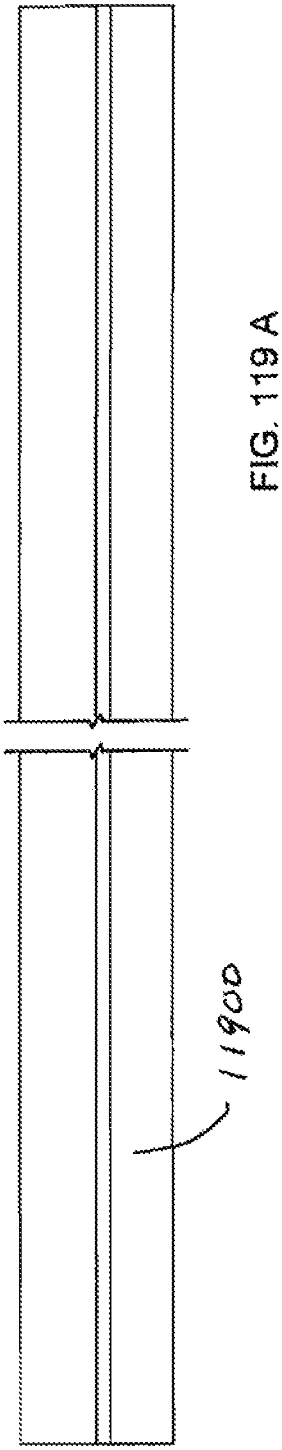
Figure 119B:
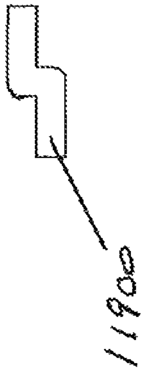
Figure 120A:
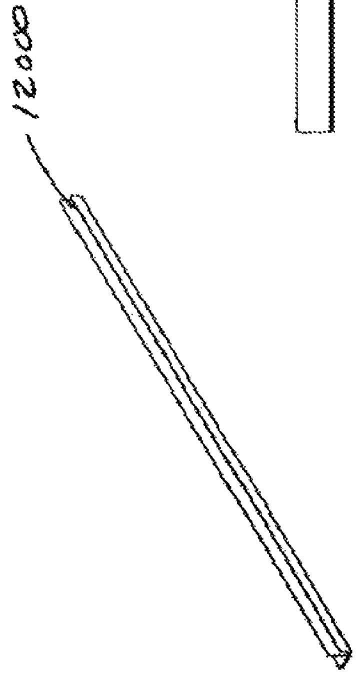
Figure 120B:
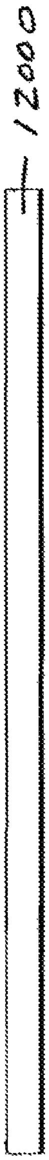
Figure 120C:
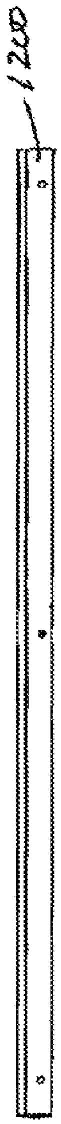
Figure 120D:
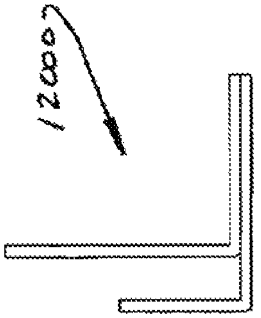

FIGS. 119A and 119B depict top, and end views, respectively, of the foot rest Z-Bracket of the base of FIG. 99.

FIGS. 120A, 120B, 120C, and 120D depict front perspective, rear, top, and end views, respectively, of the metal channel of the foot rest of the base of FIG. 99.

Figure 121A:
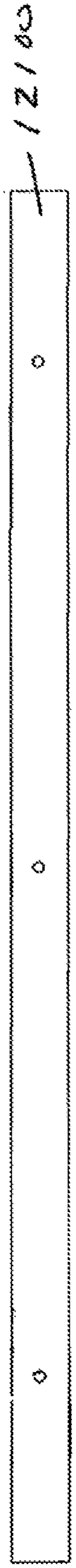
Figure 121B:
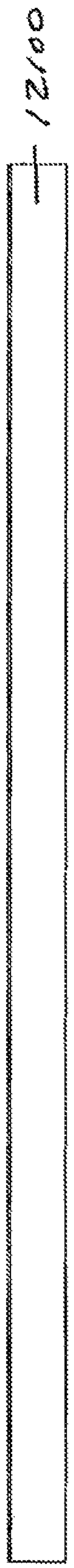
Figure 121C:

FIGS. 121A, 121B, and 121C depict top, front, and side views, respectively, of the door bracket of the base of FIG. 99.

Figure 122:
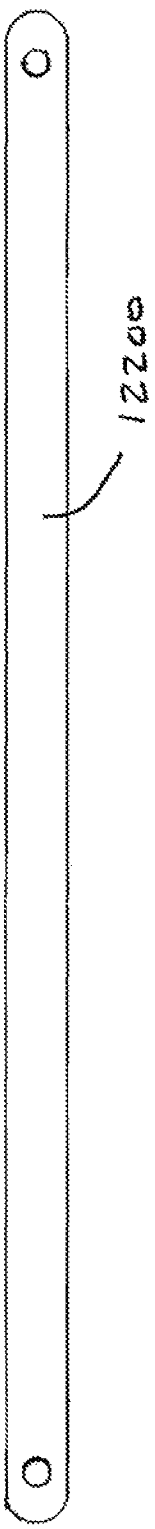

FIG. 122 depicts a front view of the support brace of the base of FIG. 99.

Figure 123:
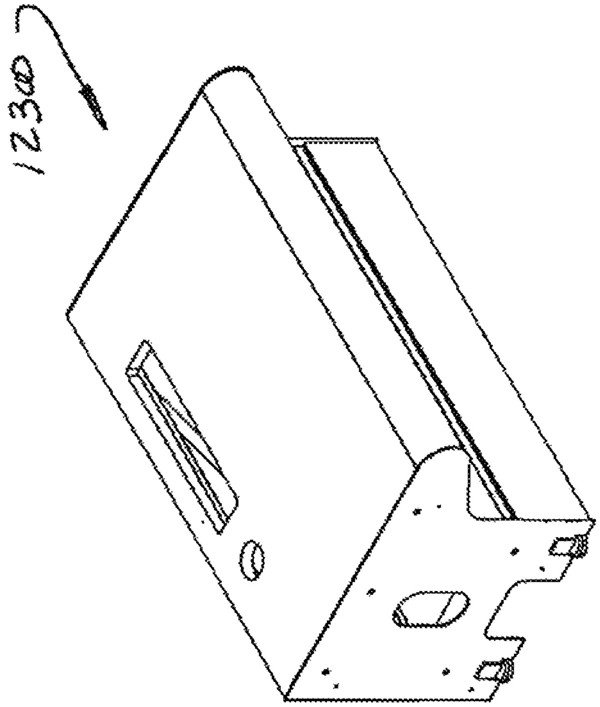

FIG. 123 depicts a front perspective view of another embodiment of the base of the instant invention.

Figure 124:
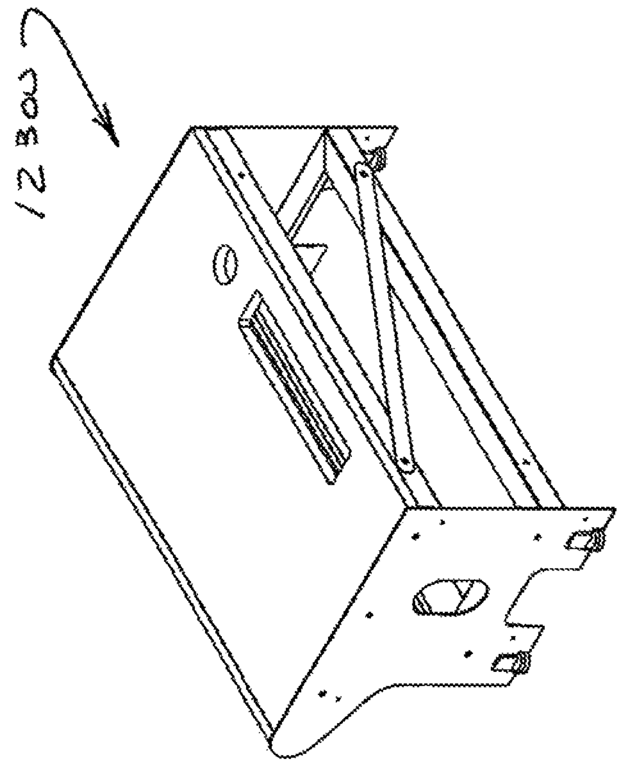

FIG. 124 depicts a rear perspective view of the base of FIG. 123.

Figure 125:
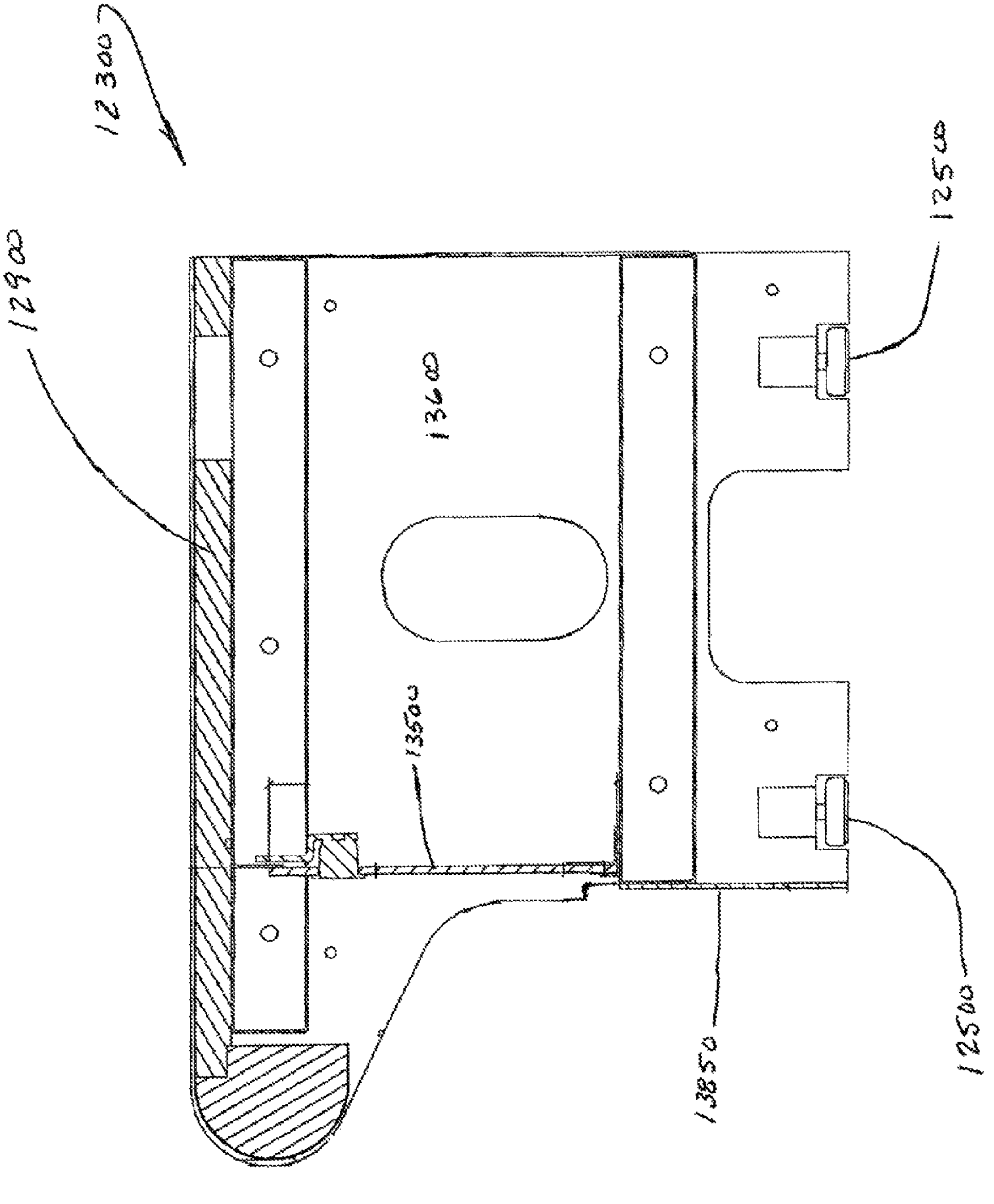

FIG. 125 depicts a cross-sectional end view of the base of FIG. 123.

Figure 126:
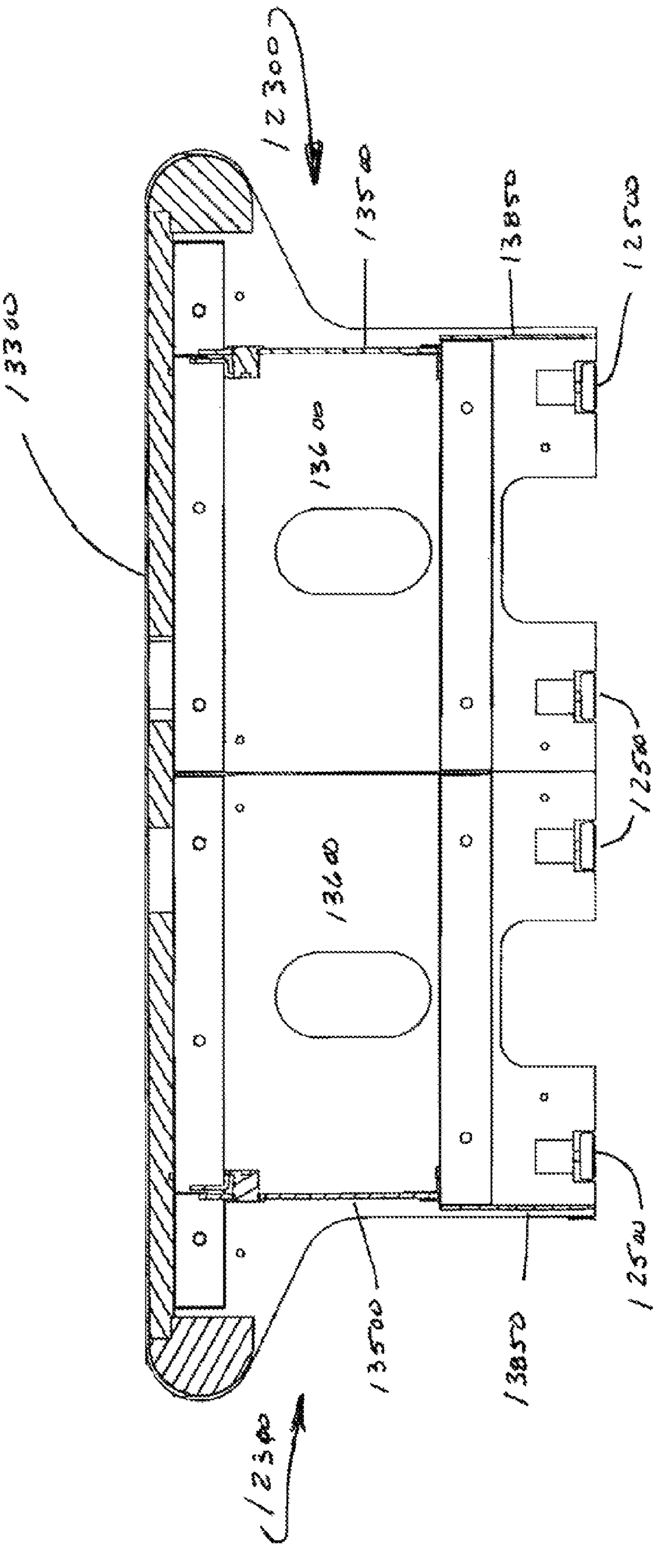

FIG. 126 depicts a cross-sectional end view of two bases of FIG. 123 arranged in a back-to-back configuration.

Figure 127:
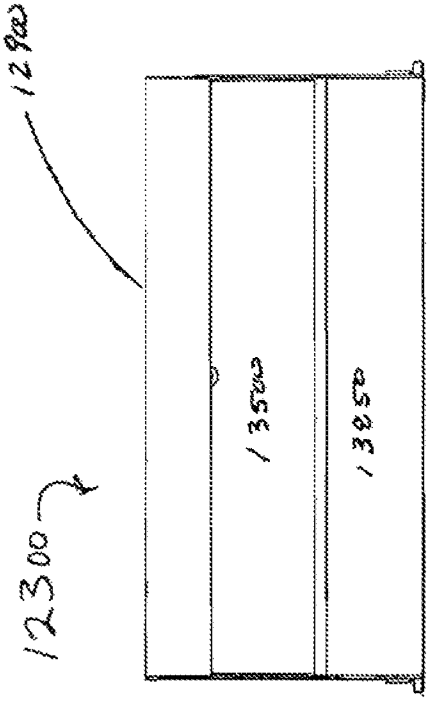

FIG. 127 depicts a front elevation view of the base of FIG. 123.

Figure 128:
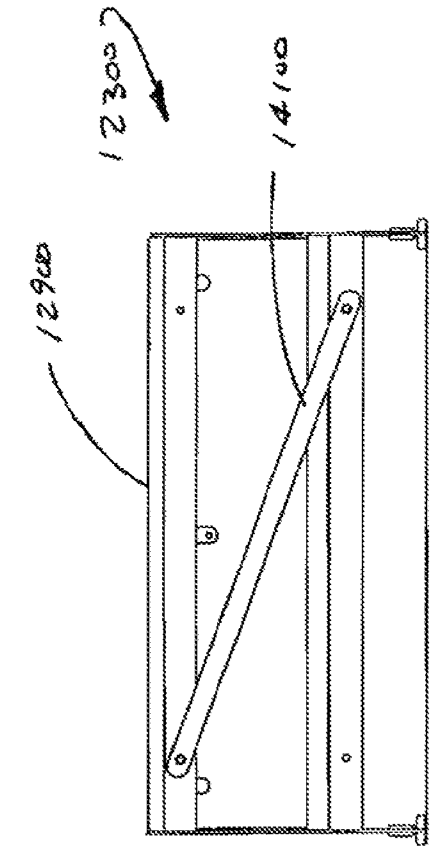

FIG. 128 depicts a rear elevation view of the base of FIG. 123.

Figure 129:
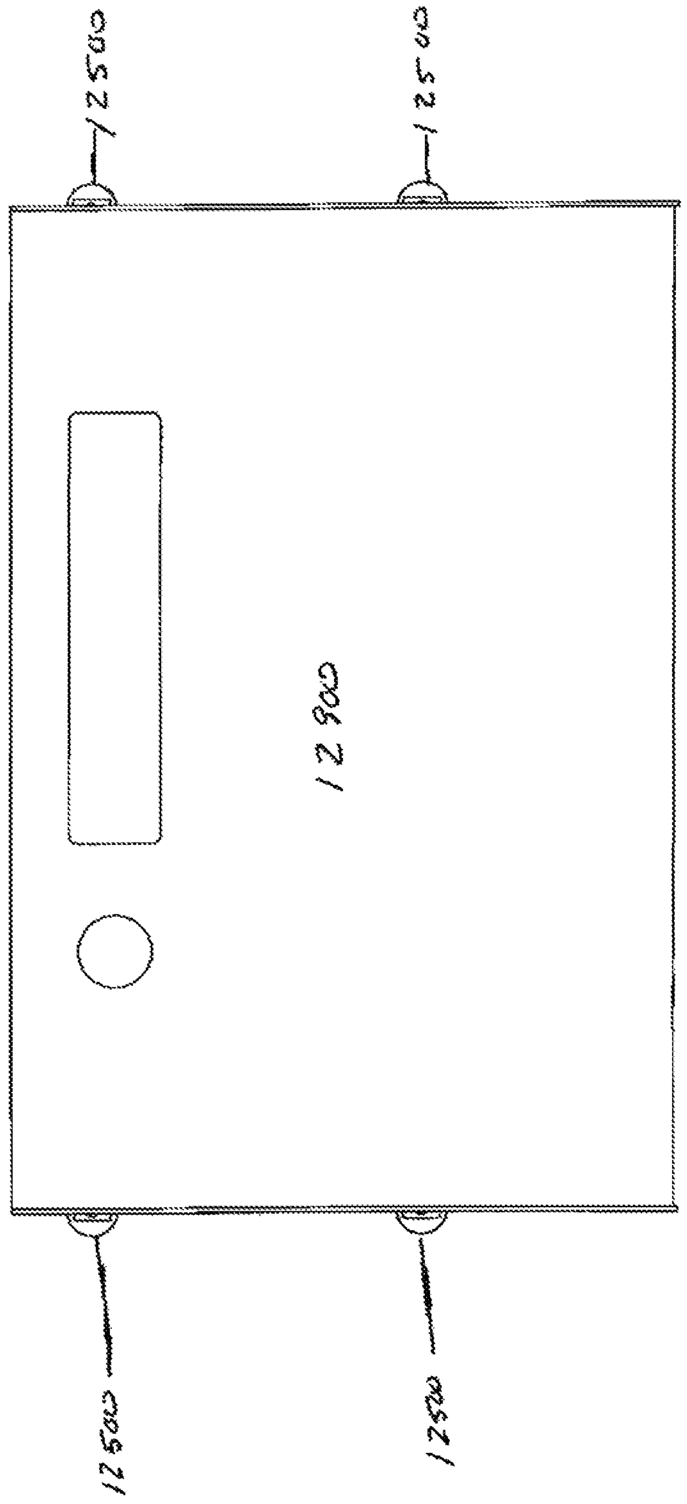

FIG. 129 depicts a plan view of the base of FIG. 123.

Figure 130:
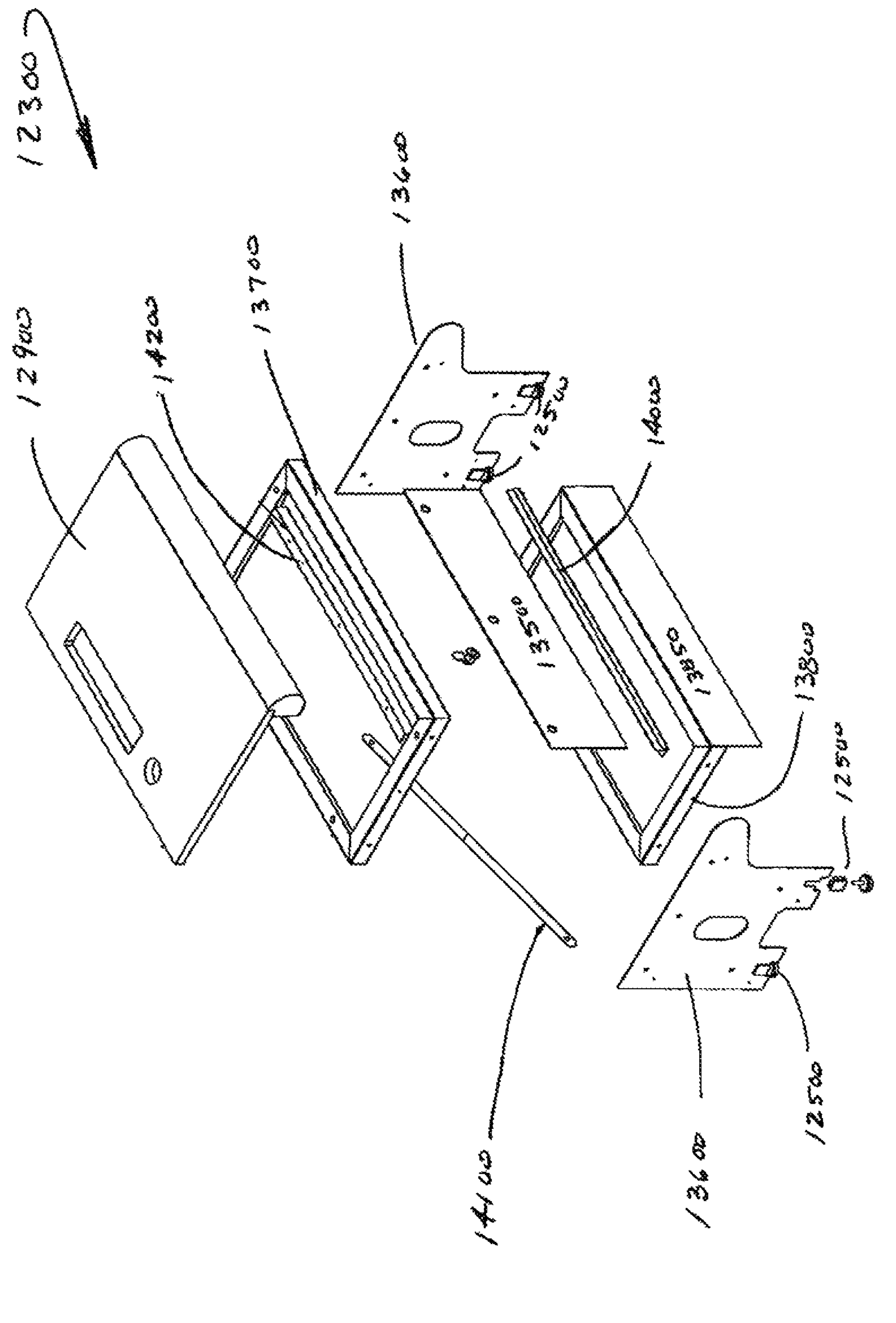

FIG. 130 depicts an exploded view of the base of FIG. 123.

Figure 131:
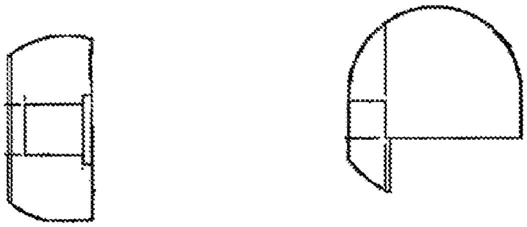

FIG. 131 depicts a bottom view of the countertop of the base of FIG. 123.

Figure 132:
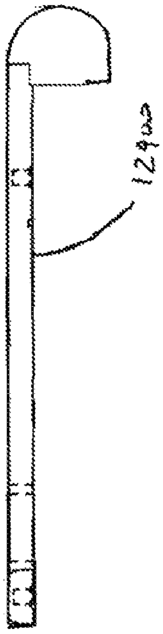
Figure 132:
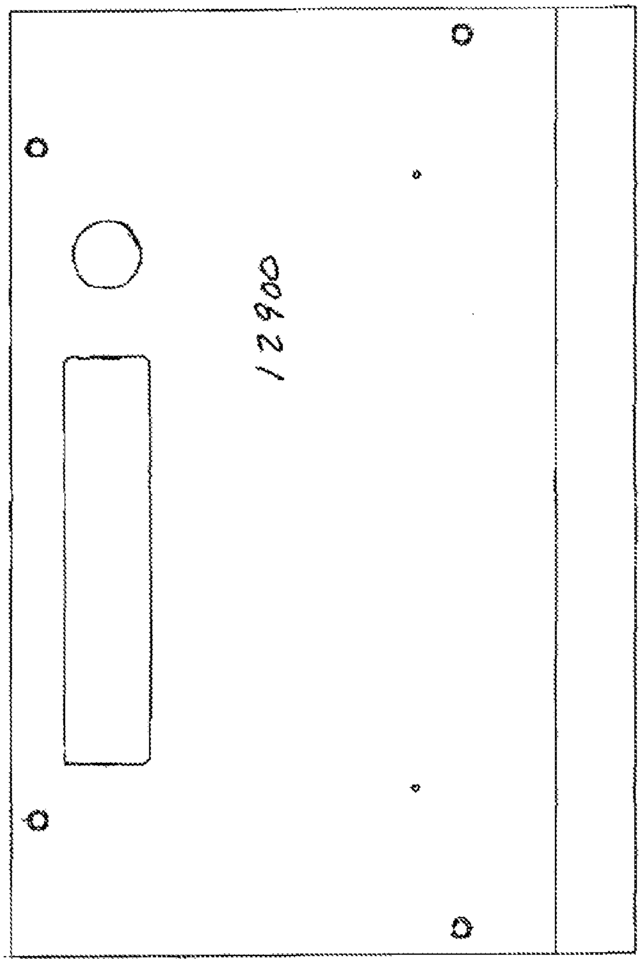

FIG. 132 depicts a side view of the countertop of the base of FIG. 123.

Figure 133:
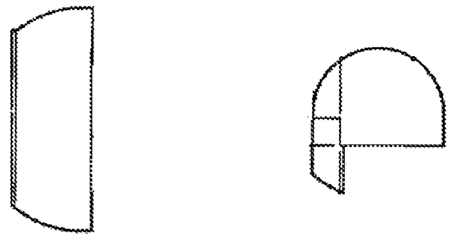

FIG. 133 depicts a bottom view of the countertop of two bases of FIG. 123 arranged in a back-to-back configuration.

Figure 134:
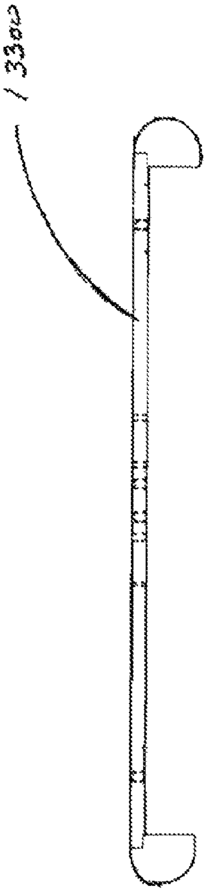
Figure 134:
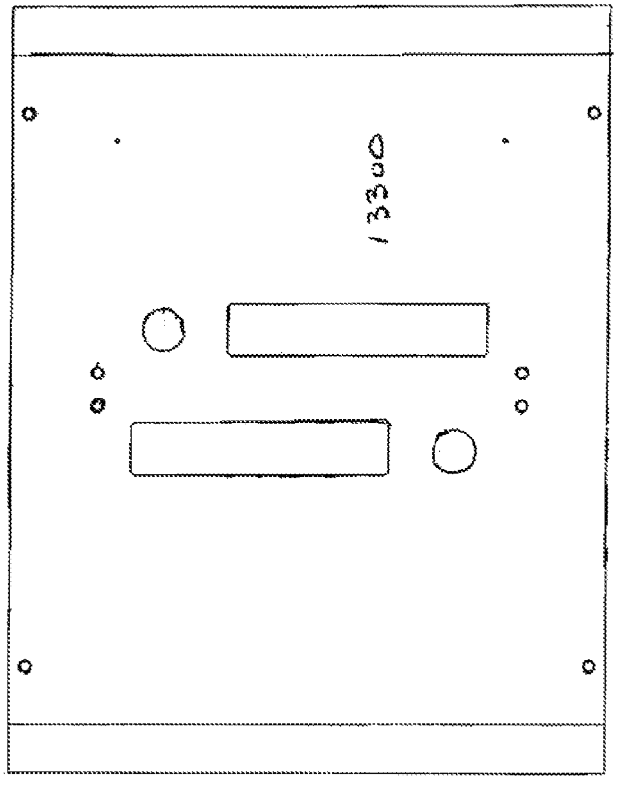

FIG. 134 depicts an end view of the countertop of two bases of FIG. 123 arranged in a back-to-back configuration.

Figure 135:
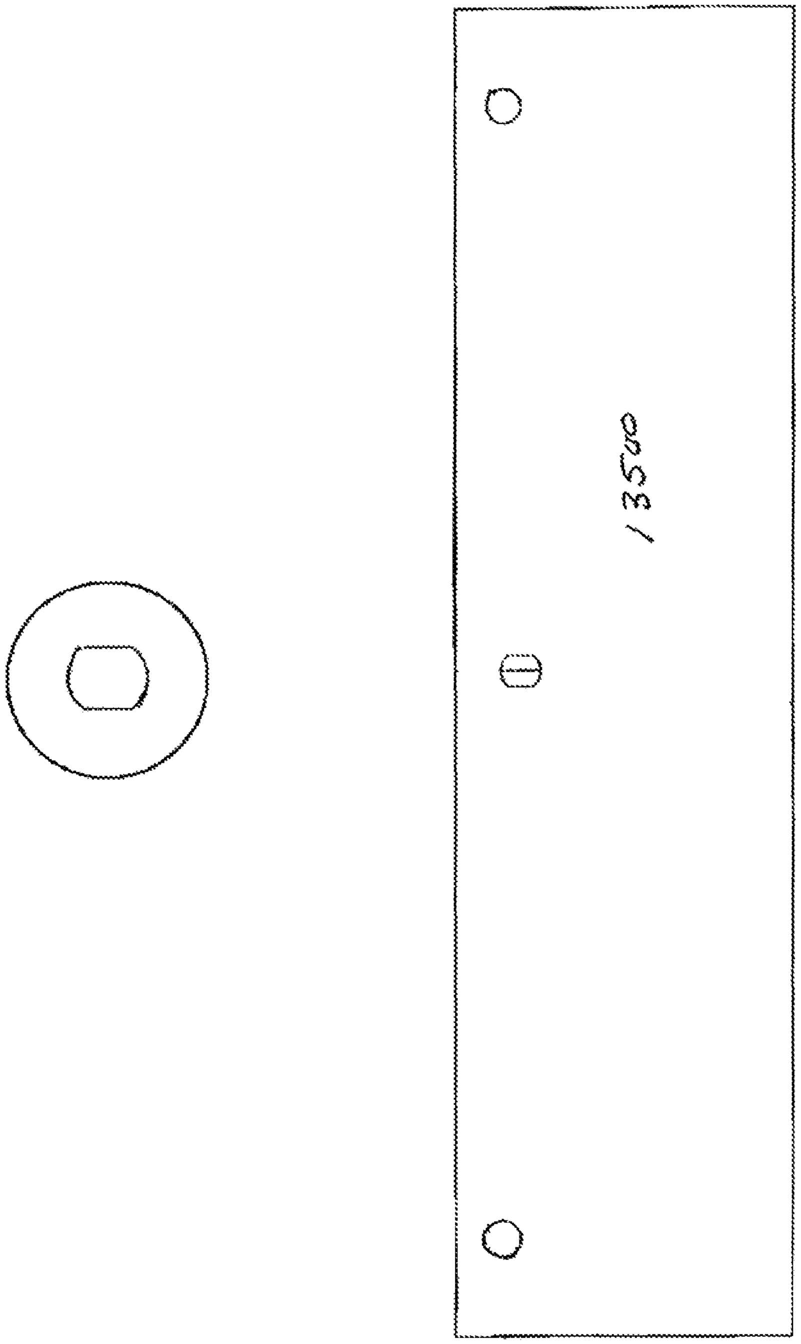

FIG. 135 depicts a front elevation view of the access door of the base of FIG. 123.

Figure 136:
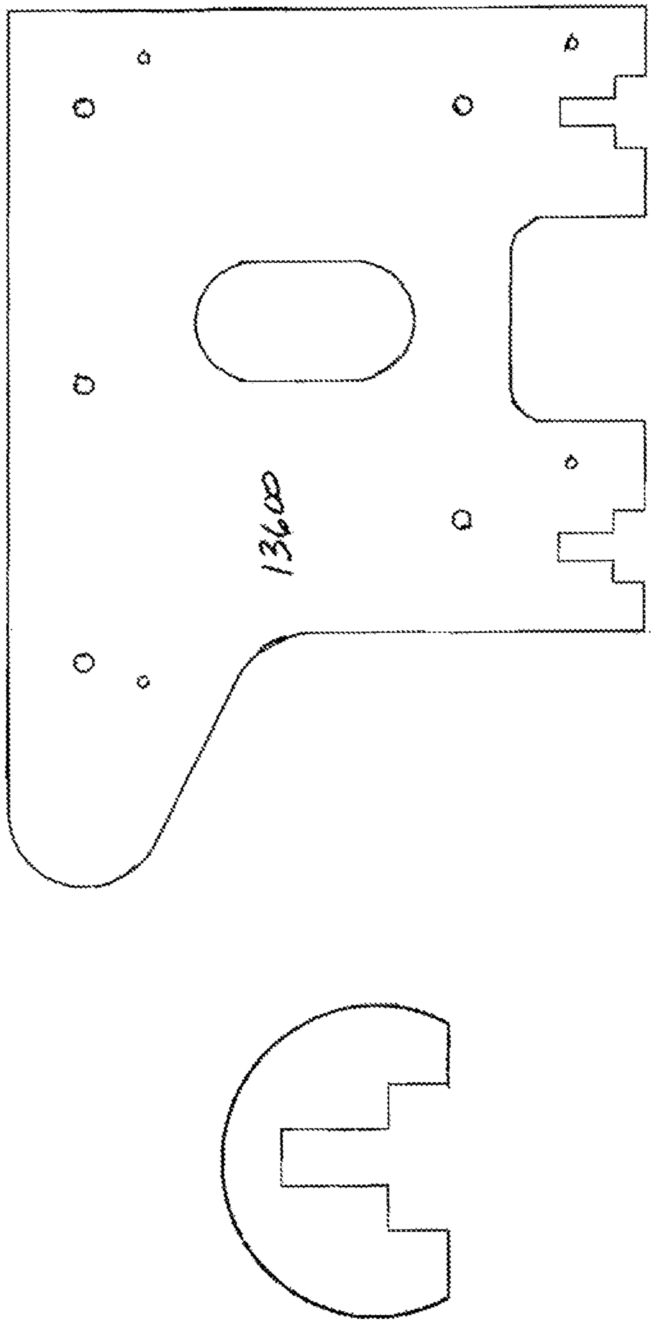
Figure 137B:
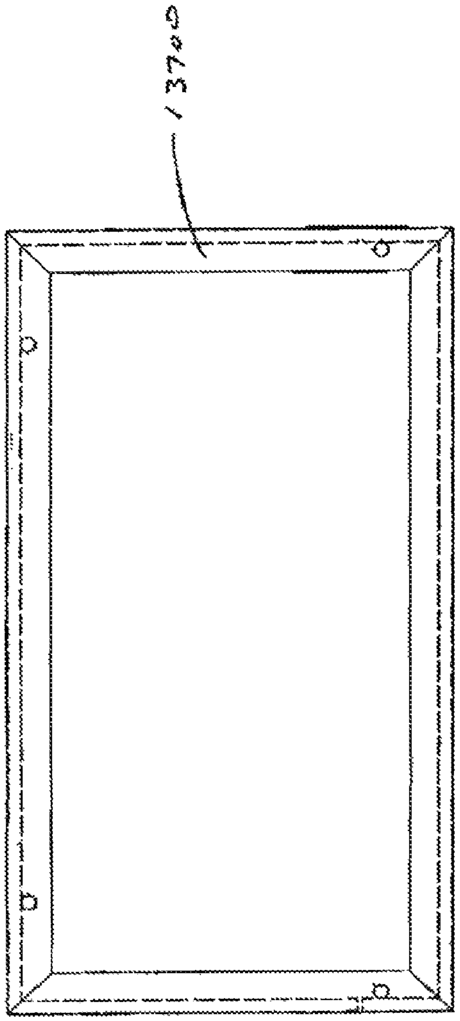
Figure 137C:
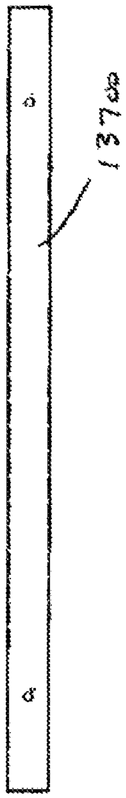
Figure 137A:
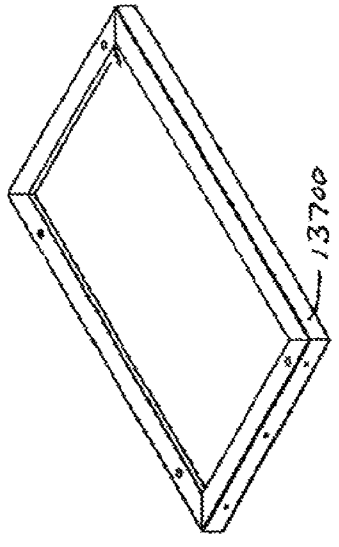
Figure 137D:
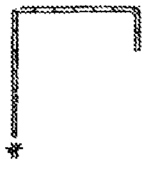
Figure 137E:
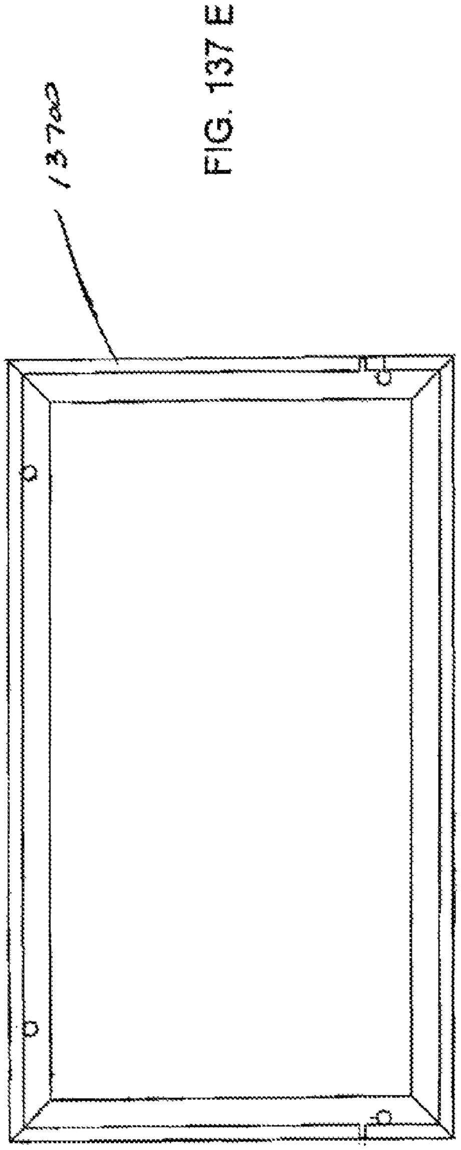
Figure 137F:
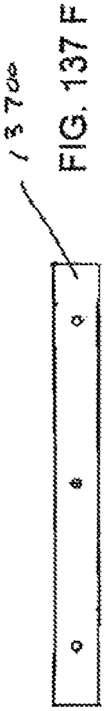
Figure 137G:
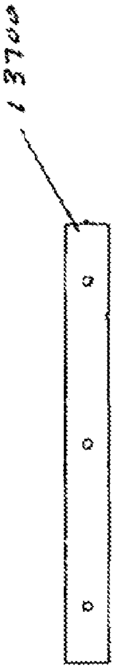
Figure 138B:
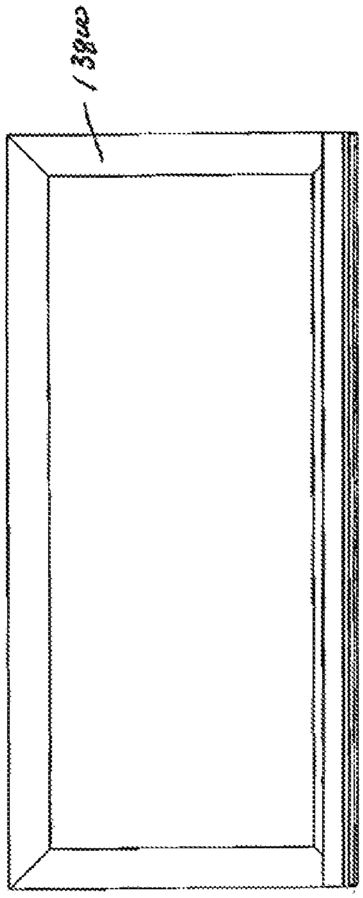
Figure 138C:
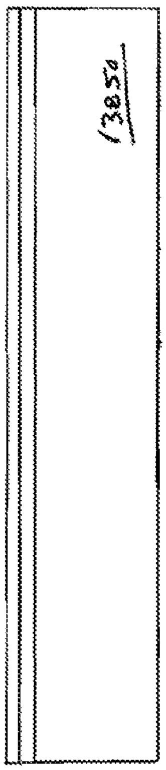
Figure 138A:
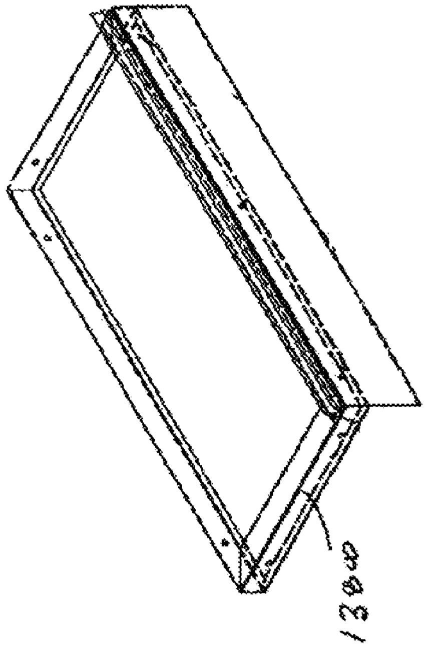
Figure 138D:
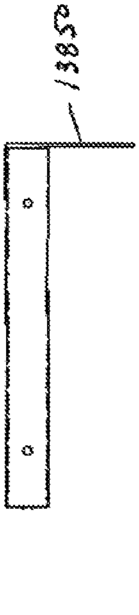
Figure 139B:
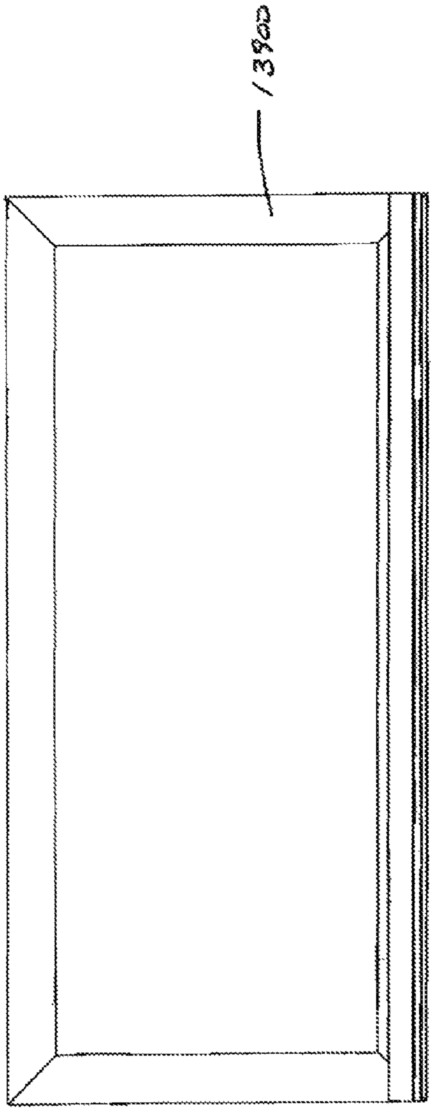
Figure 139C:
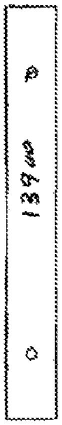
Figure 139D:
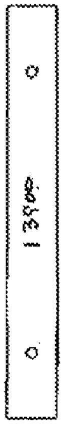
Figure 139E:
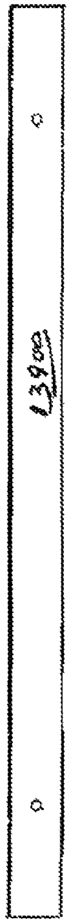
Figure 139A:
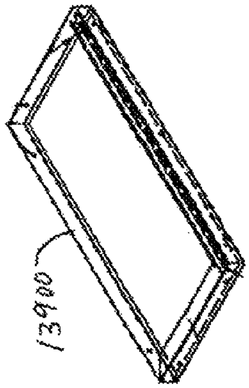
Figure 139F:
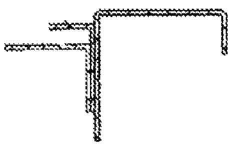
Figure 140B:
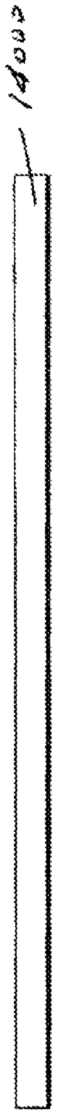
Figure 140C:
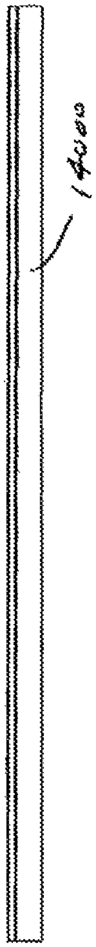
Figure 140A:
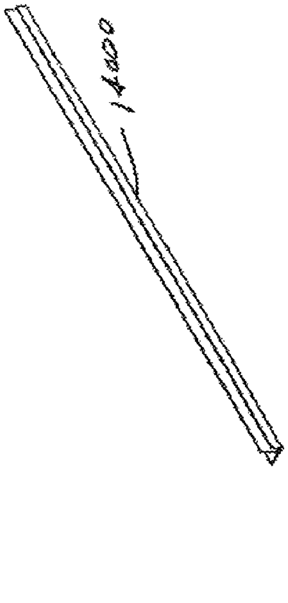
Figure 140D:
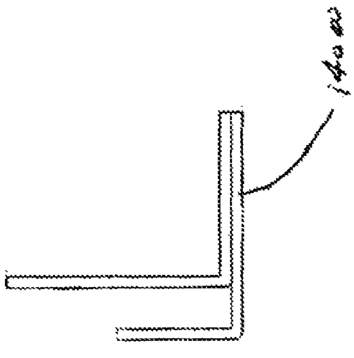

FIG. 136 depicts an elevation view of a side panel of the base of FIG. 123.

FIGS. 137A, 137B, 137C, 137D, 137E, 137F, and 137G depict front perspective, top, rear, Section 1-1, bottom, and side views, respectively, of the top web frame of the base of FIG. 123.

FIGS. 138A, 138B, 138C, and 138D depict front perspective, top, front, and end views, respectively, of the welded kick assembly of the base of FIG. 123.

FIGS. 139A, 139B, 139C, 139D, 139E, and 139F depict front perspective, top, sides, rear, and Section 1-1 views, respectively, of the bottom frame welded kick assembly of the base of FIG. 123.

FIGS. 140A, 140B, 140C, and 140D depict front perspective, rear, top, and end views, respectively, of the metal channel of the base of FIG. 123.

Figure 141:
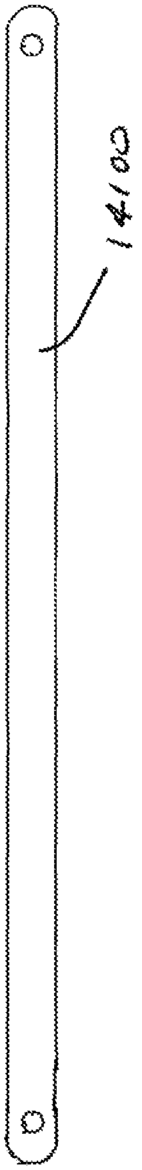

FIG. 141 depicts a front view of the support brace of the base of FIG. 123.

Figure 142A:
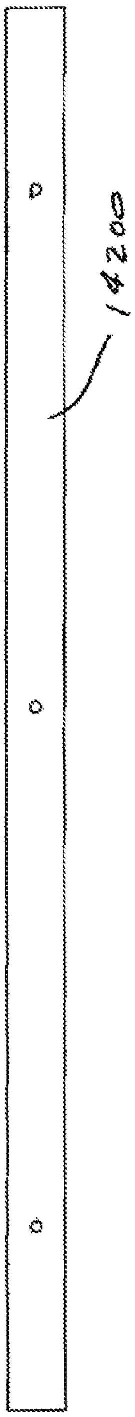
Figure 142B:
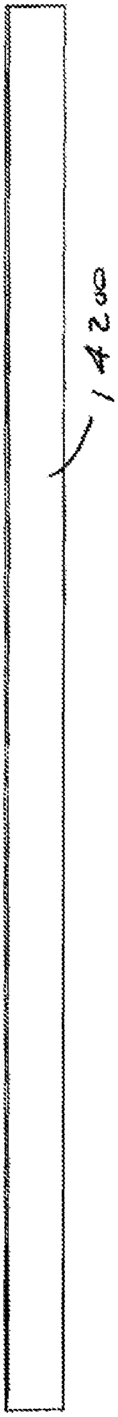
Figure 142C:

FIGS. 142A, 142B, and 142C depict top, front, and side views, respectively, of the door bracket of the base of FIG. 123.

Figure 143:
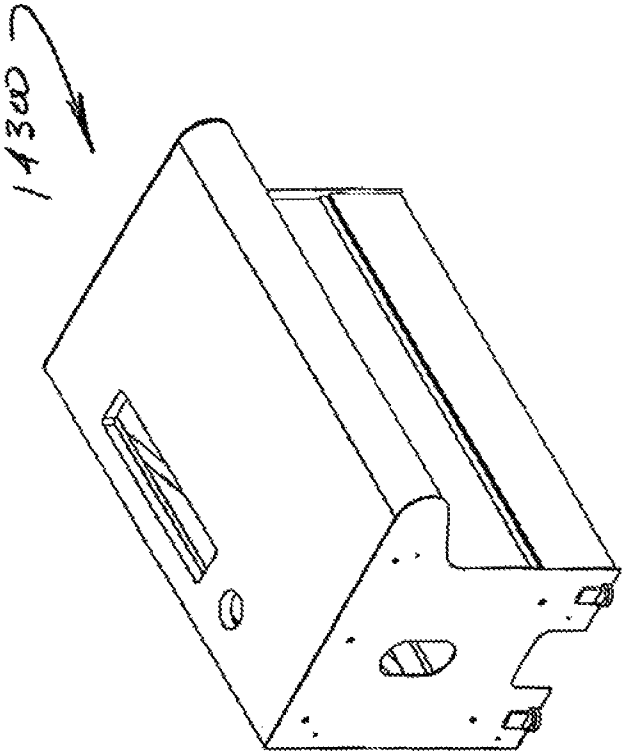

FIG. 143 depicts a front perspective view of another embodiment of the base of the instant invention.

Figure 144:
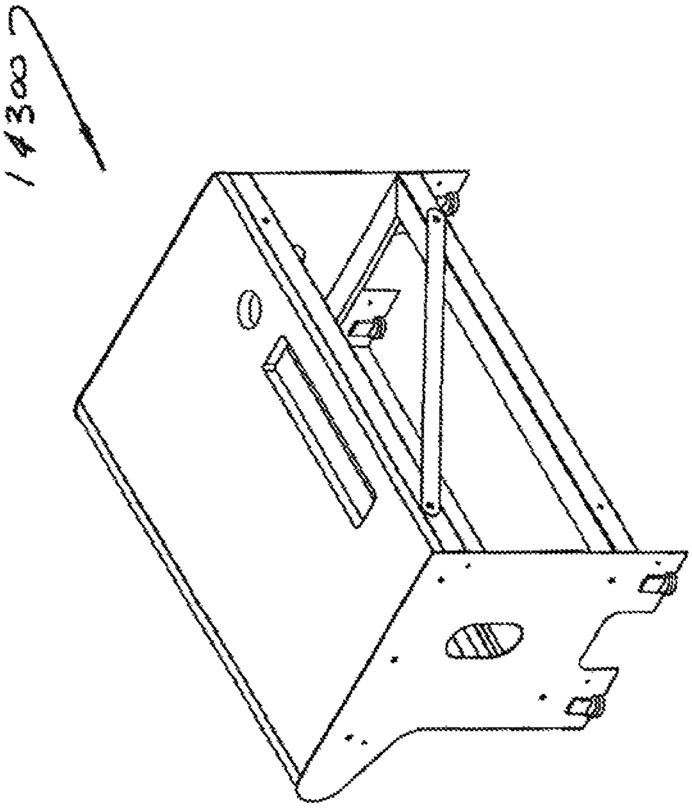

FIG. 144 depicts a rear perspective view of the base of FIG. 143.

Figure 145:
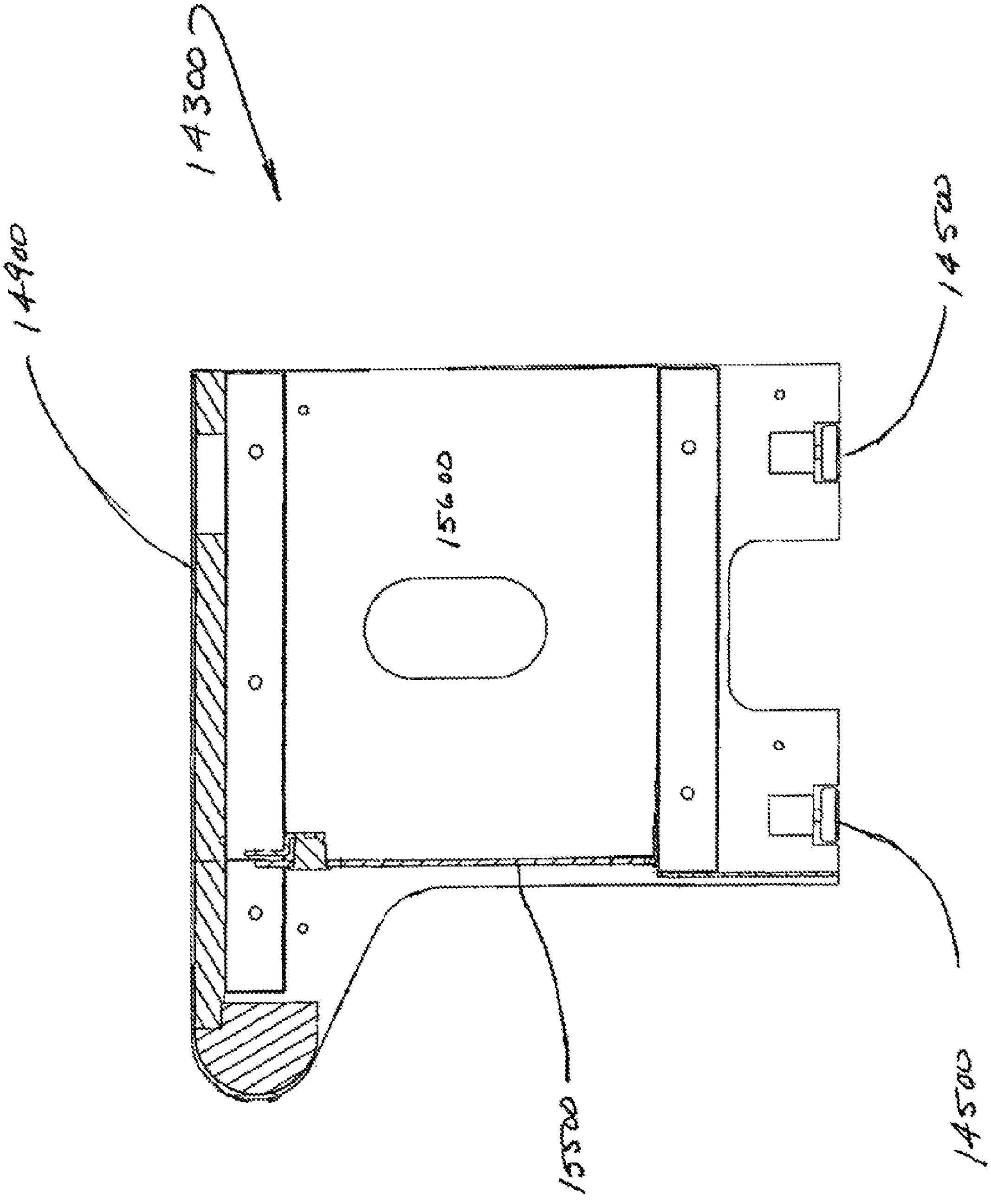

FIG. 145 depicts a cross-sectional end view of the base of FIG. 143.

Figure 146:
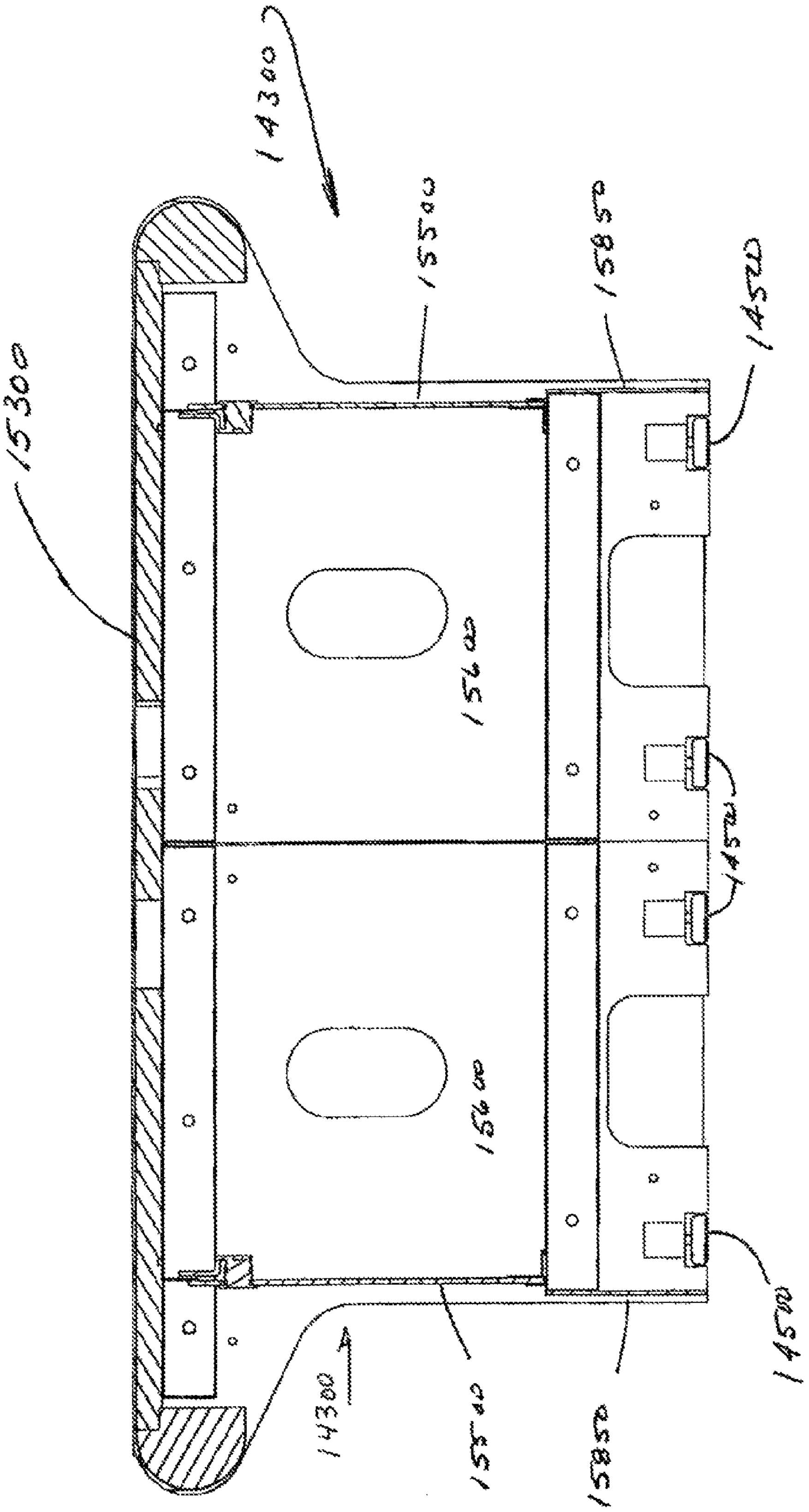

FIG. 146 depicts a cross-sectional end view of two bases of FIG. 143 arranged in a back-to-back configuration.

Figure 147:
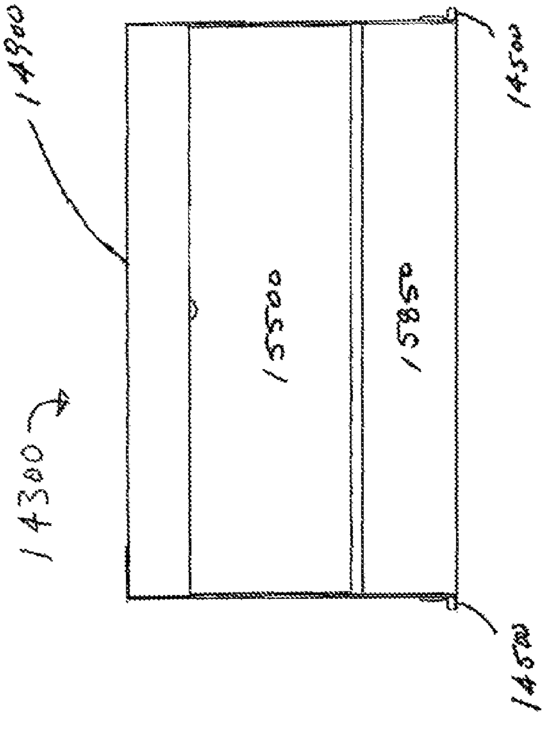

FIG. 147 depicts a front elevation view of the base of FIG. 143.

Figure 148:
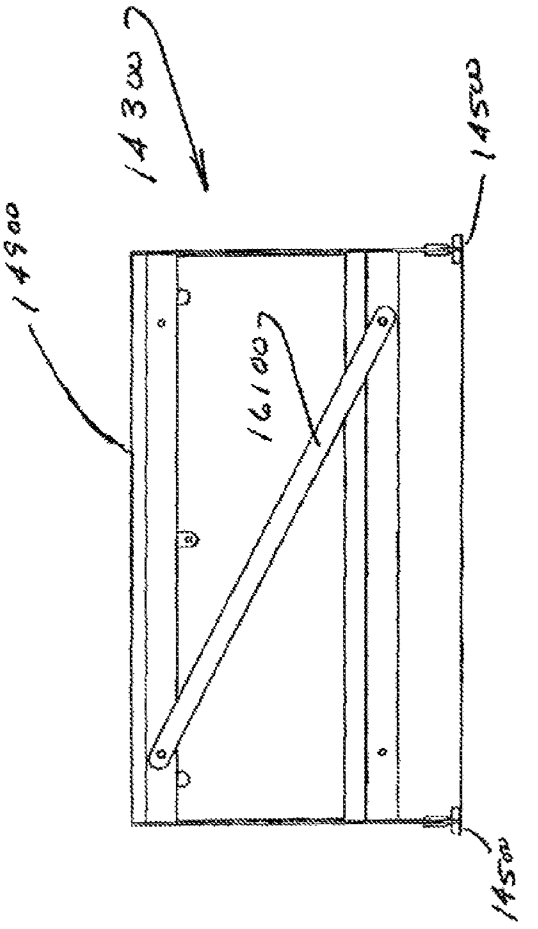

FIG. 148 depicts a rear elevation view of the base of FIG. 143.

Figure 149:
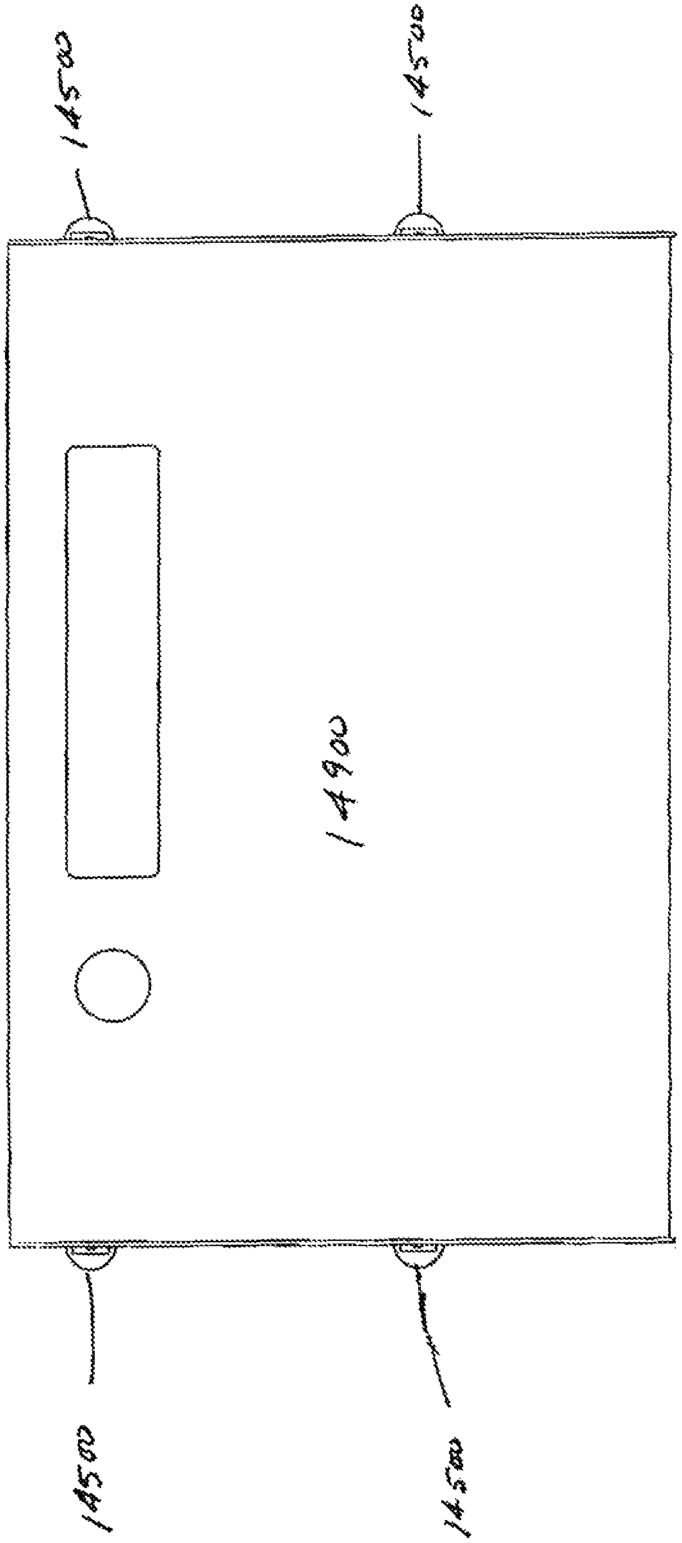

FIG. 149 depicts a plan view of the base of FIG. 143.

Figure 150:
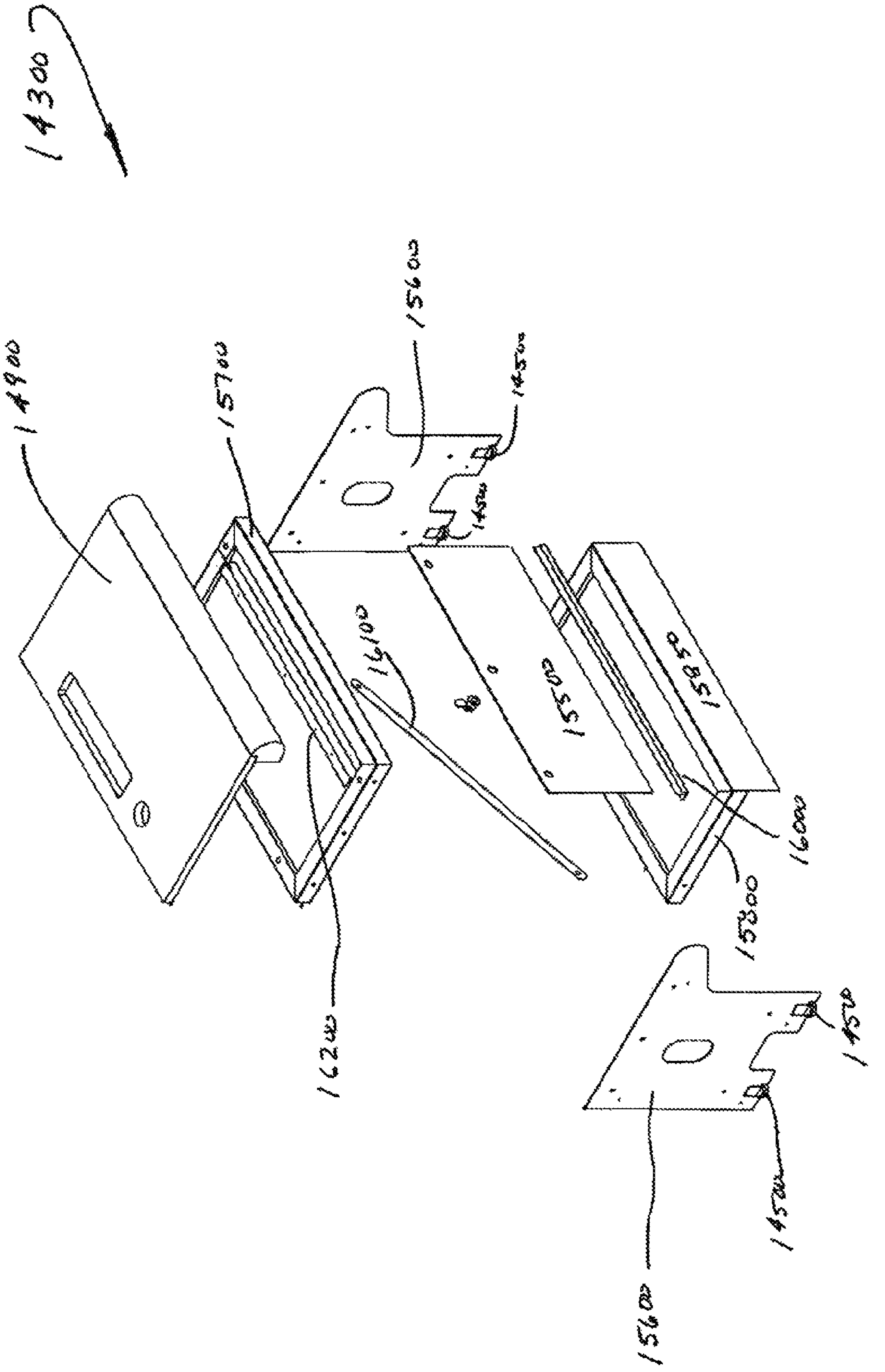

FIG. 150 depicts an exploded view of the base of FIG. 143.

FIG. 151 depicts a bottom view of the countertop of the base of FIG. 143.

FIG. 152 depicts a side view of the countertop of the base of FIG. 143.

Figure 153:
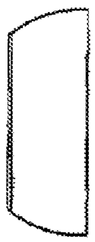
Figure 153:
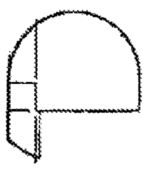

FIG. 153 depicts a bottom view of the countertop of two bases of FIG. 143 arranged in a back-to-back configuration.

Figure 154:
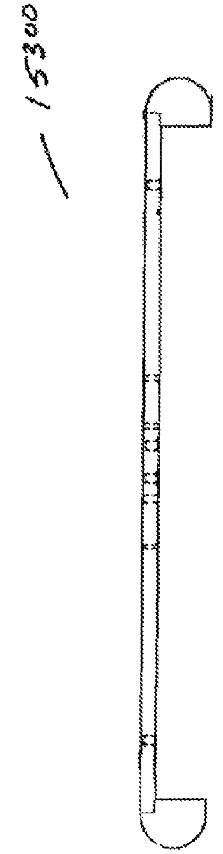
Figure 154:
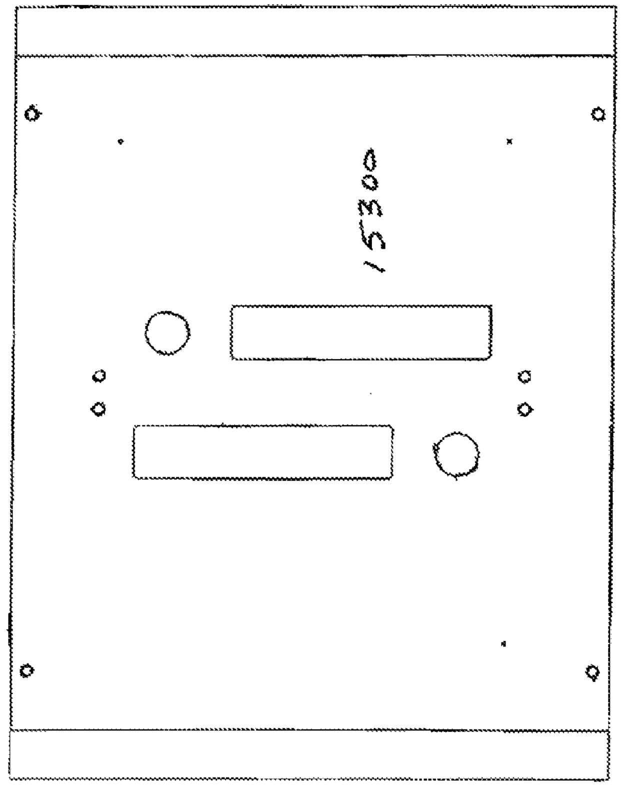

FIG. 154 depicts an end view of the countertop of two bases of FIG. 143 arranged in a back-to-back configuration.

Figure 155:
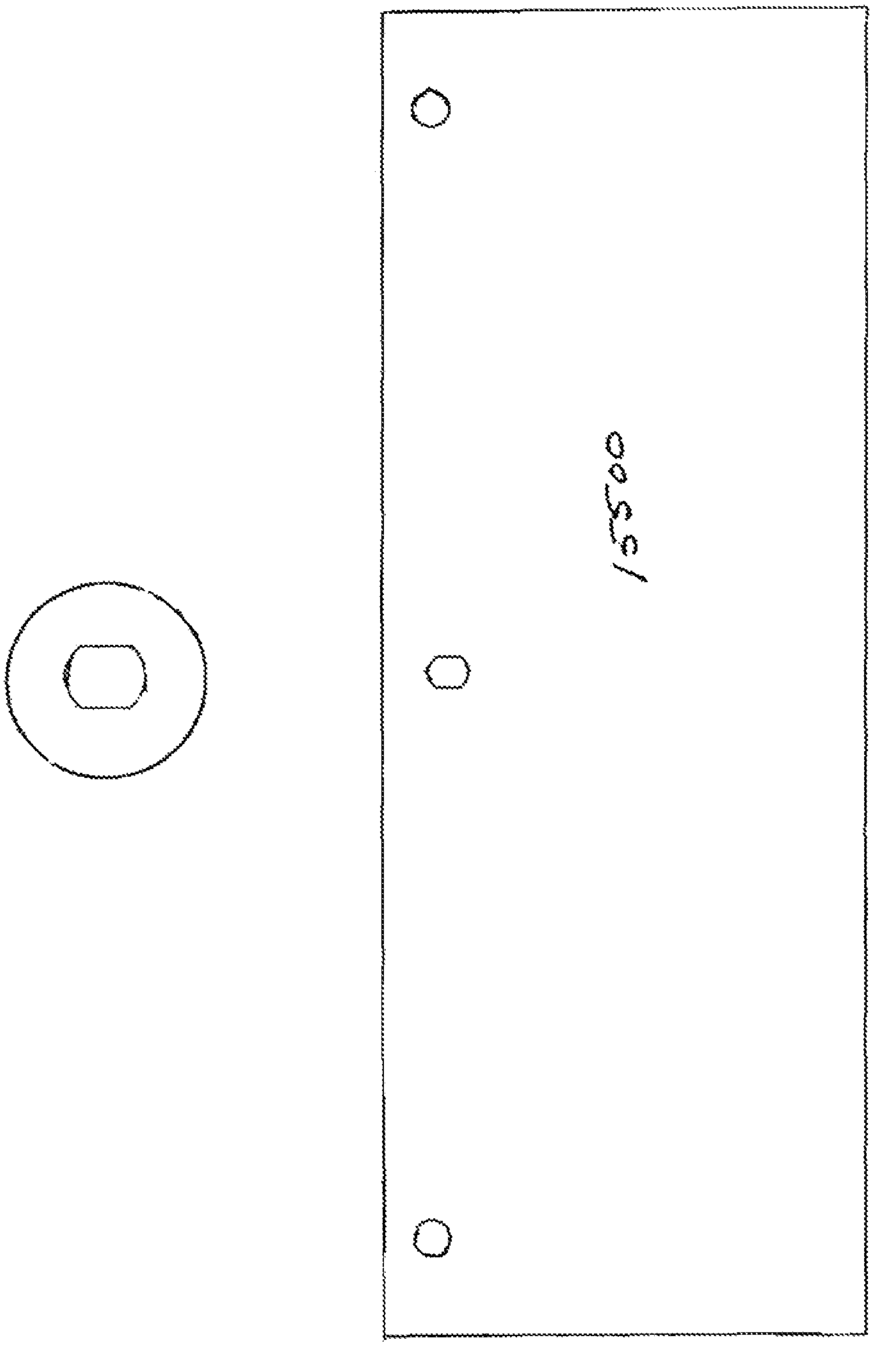

FIG. 155 depicts a front elevation view of the access door of the base of FIG. 143.

Figure 156:
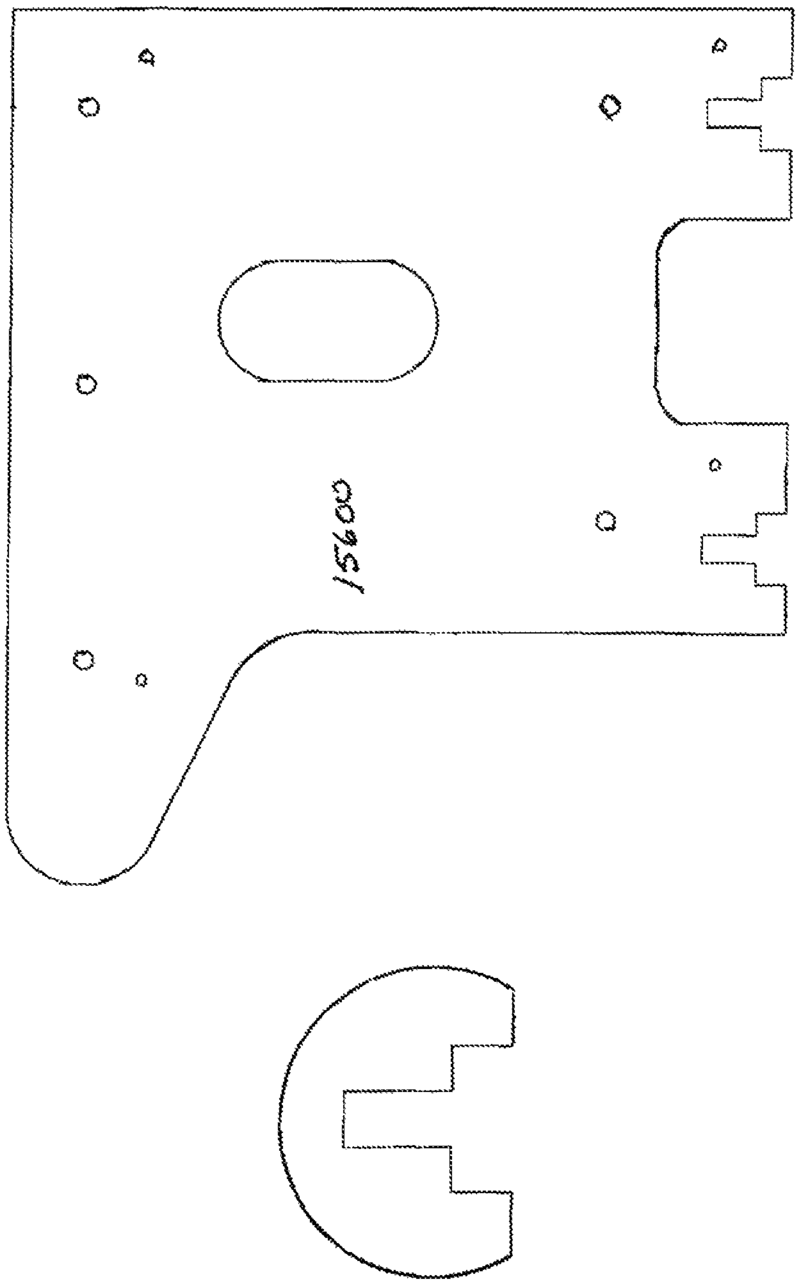
Figure 157B:
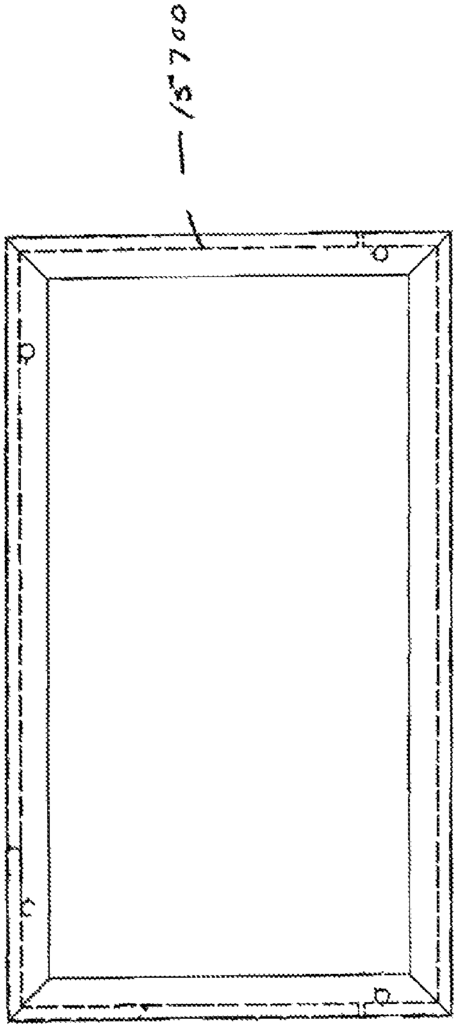
Figure 157C:
Figure 157A:
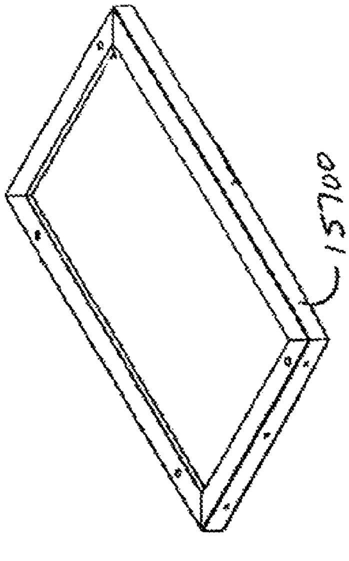
Figure 157D:
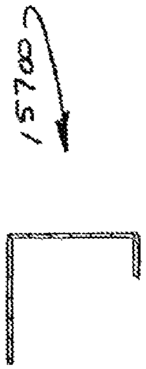
Figure 157E:
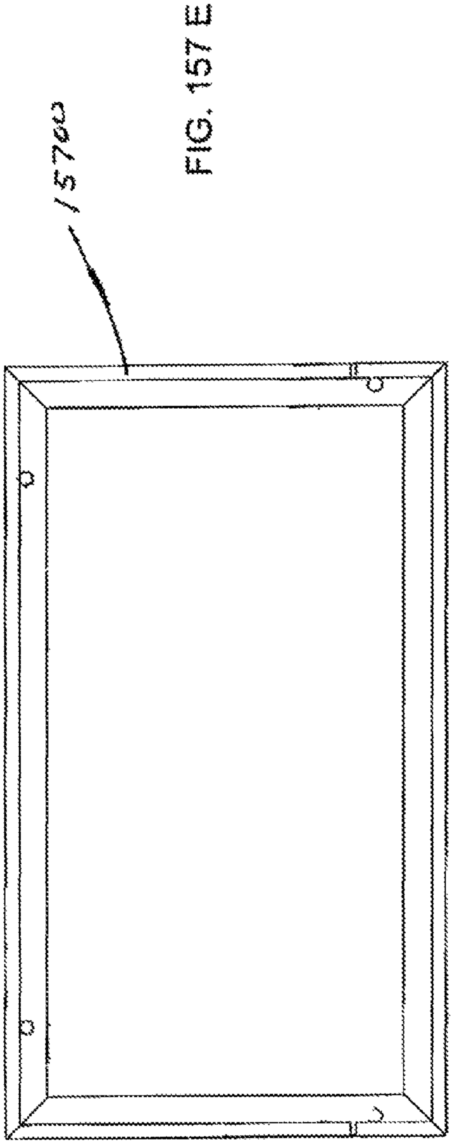
Figure 157F:
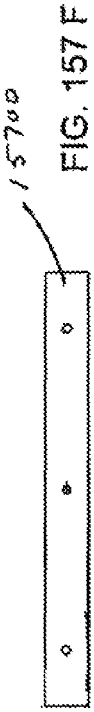
Figure 157G:
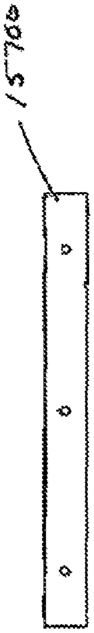
Figure 158B:
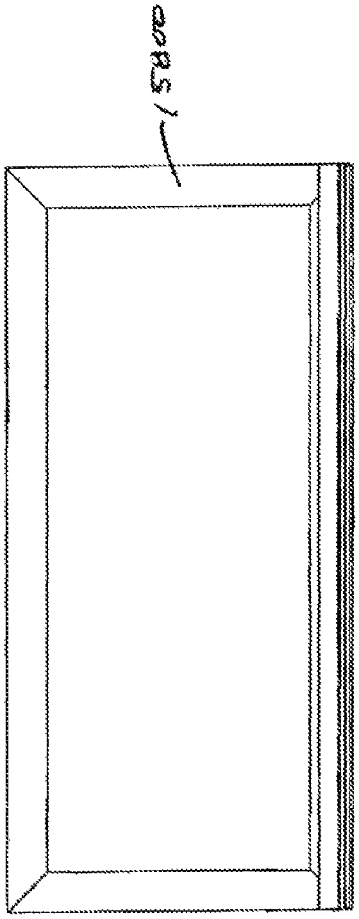
Figure 158D:
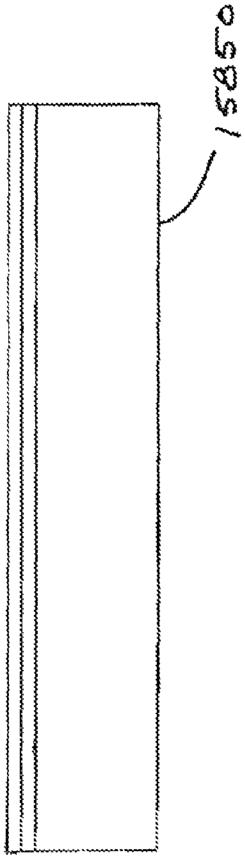
Figure 158A:
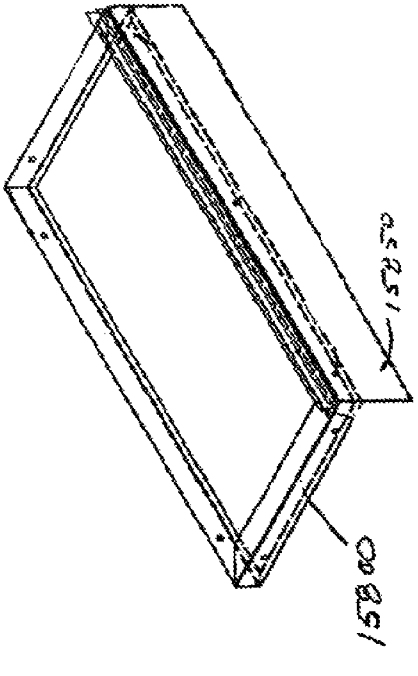
Figure 158C:
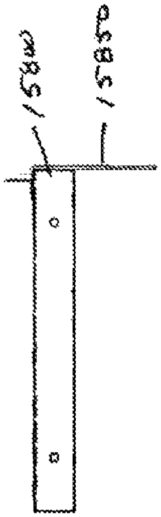
Figure 159B:
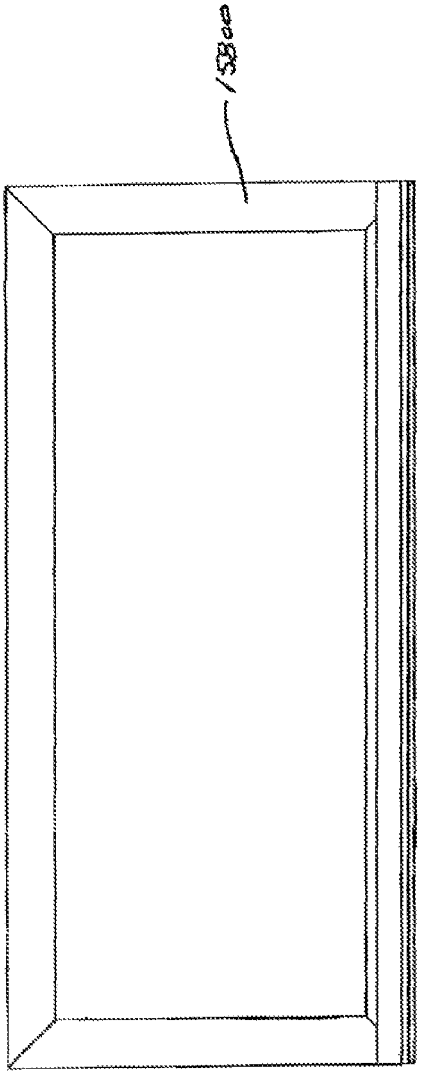
Figure 159C:
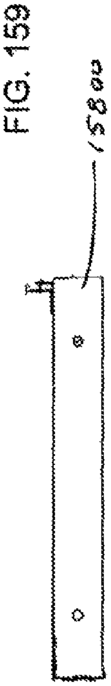
Figure 159D:
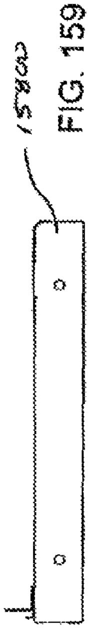
Figure 159E:
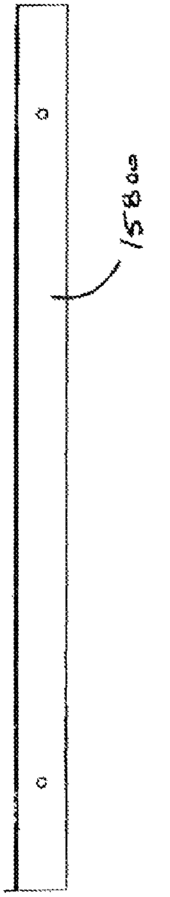
Figure 159A:
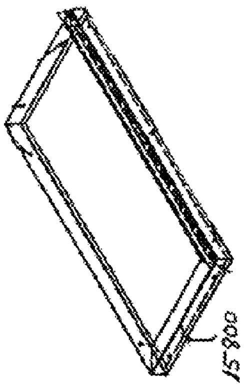
Figure 159F:
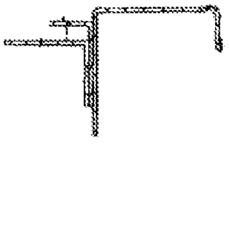
Figure 160A:
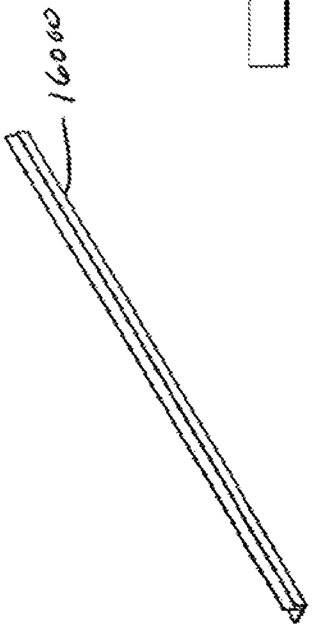
Figure 160B:
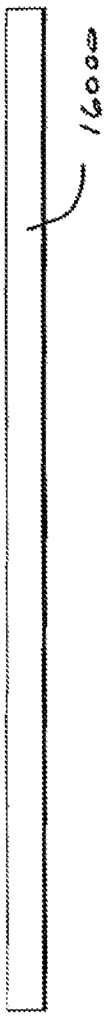
Figure 160C:
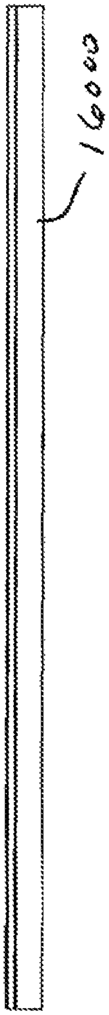
Figure 160D:
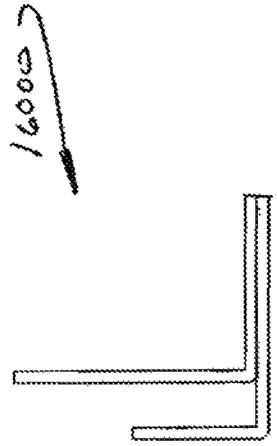

FIG. 156 depicts an elevation view of a side panel of the base of FIG. 143.

FIGS. 157A, 157B, 157C, 157D, 157E, 157F, and 157G depict front perspective, top, rear, Section 1-1, bottom, and side views, respectively, of the top web frame of the base of FIG. 143.

FIGS. 158A, 158B, 158C, and 158D depict front perspective, top, front, and end views, respectively, of the welded kick assembly of the base of FIG. 143.

FIGS. 159A, 159B, 159C, 159D, 159E, and 159F depict front perspective, top, sides, rear, and Section 1-1 views, respectively, of the bottom frame welded kick assembly of the base of FIG. 143.

FIGS. 160A, 160B, 160C, and 160D depict front perspective, rear, top, and end views, respectively, of the metal channel of the base of FIG. 143.

Figure 161:
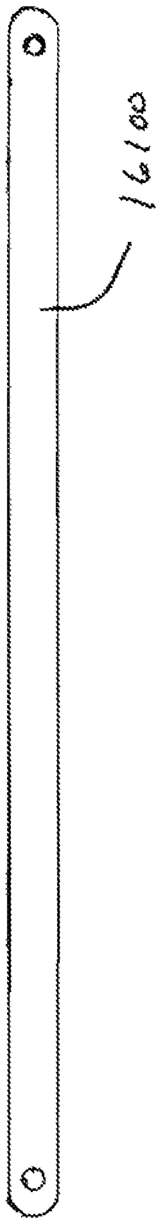

FIG. 161 depicts a front view of the support brace of the base of FIG. 143.

Figure 162A:
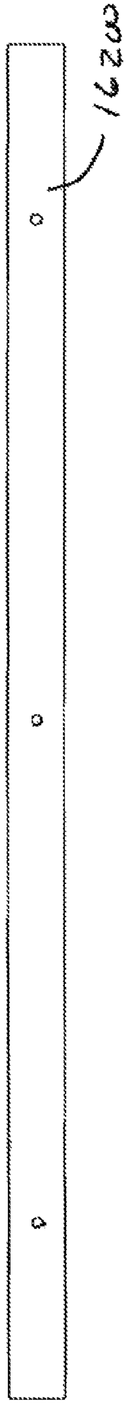
Figure 162B:
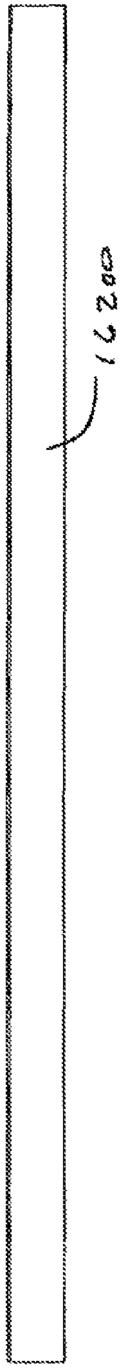
Figure 162C:

FIGS. 162A, 162B, and 162C depict top, front, and side views, respectively, of the door bracket of the base of FIG. 143.

Figure 163:
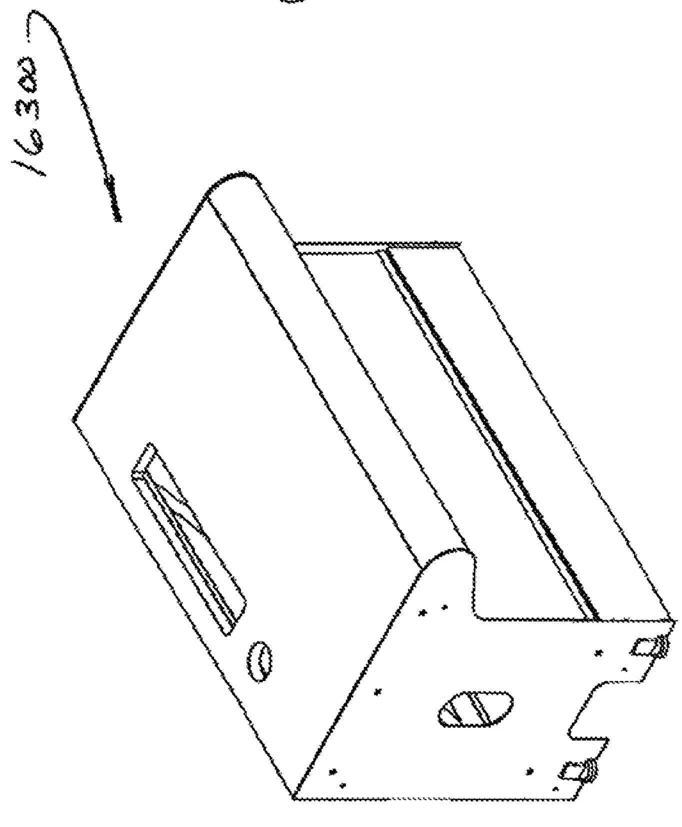

FIG. 163 depicts a front perspective view of another embodiment of the base of the instant invention.

Figure 164:
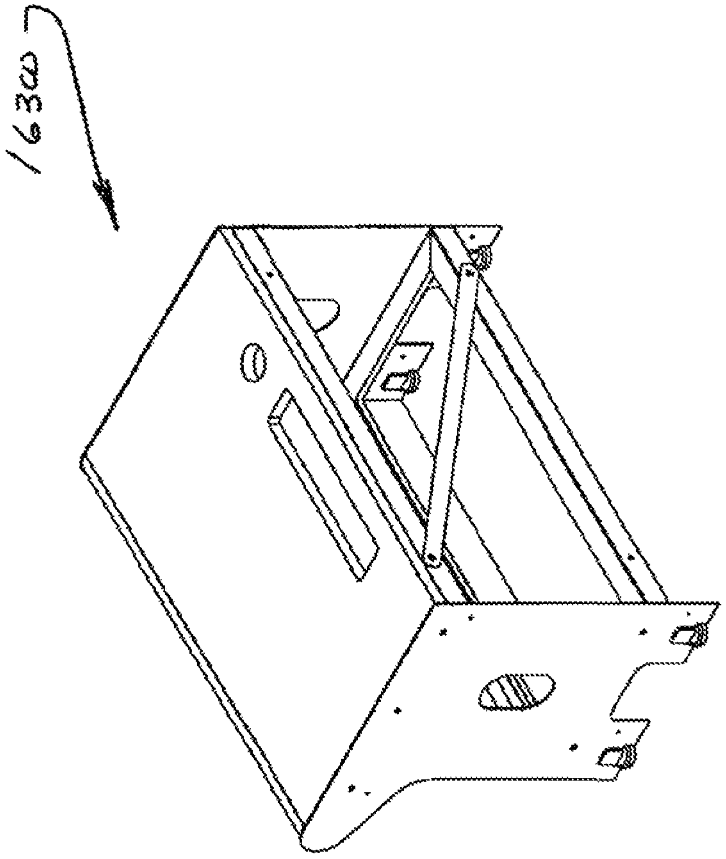

FIG. 164 depicts a rear perspective view of the base of FIG. 163.

Figure 165:
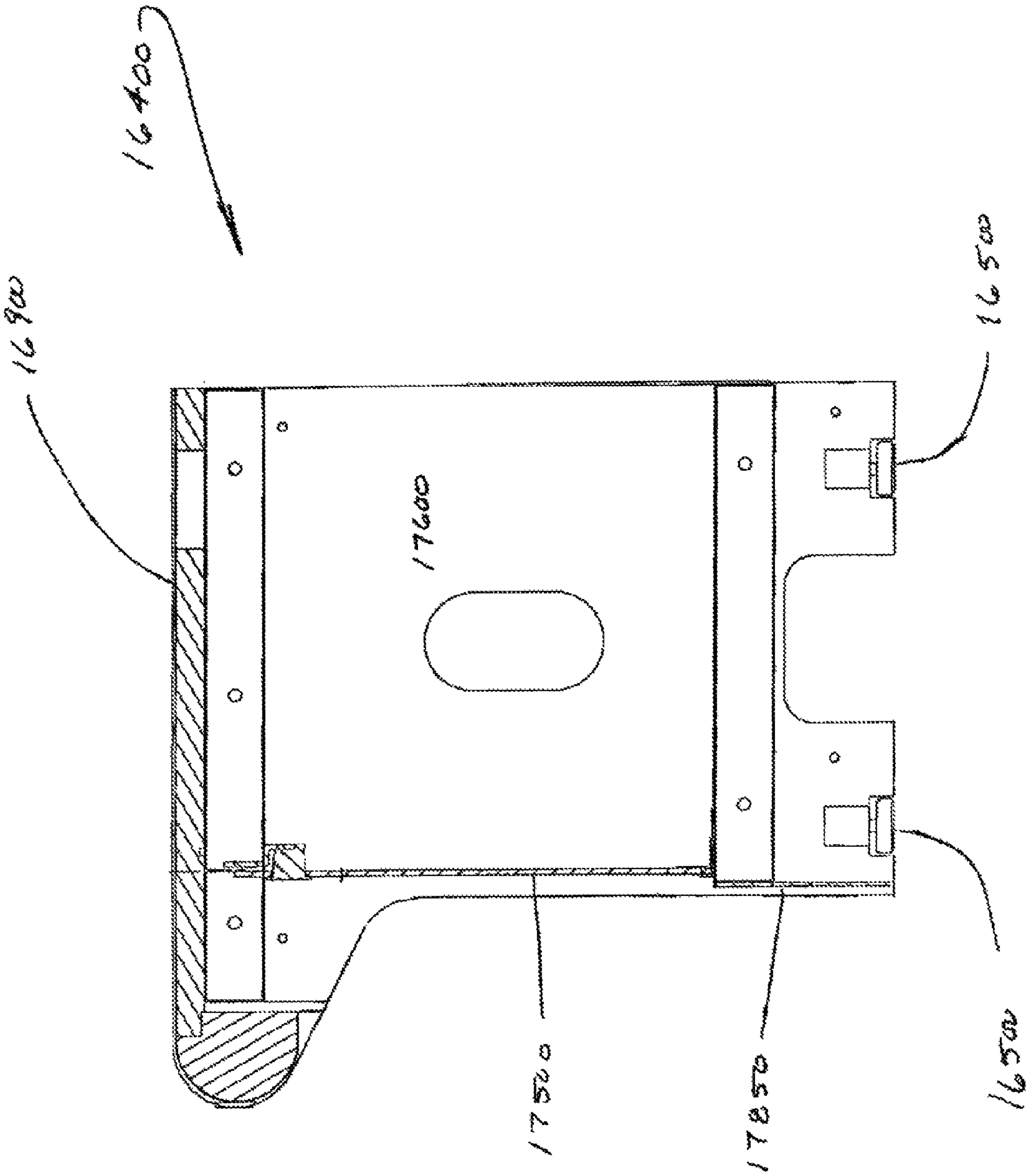

FIG. 165 depicts a cross-sectional end view of the base of FIG. 163.

Figure 166:
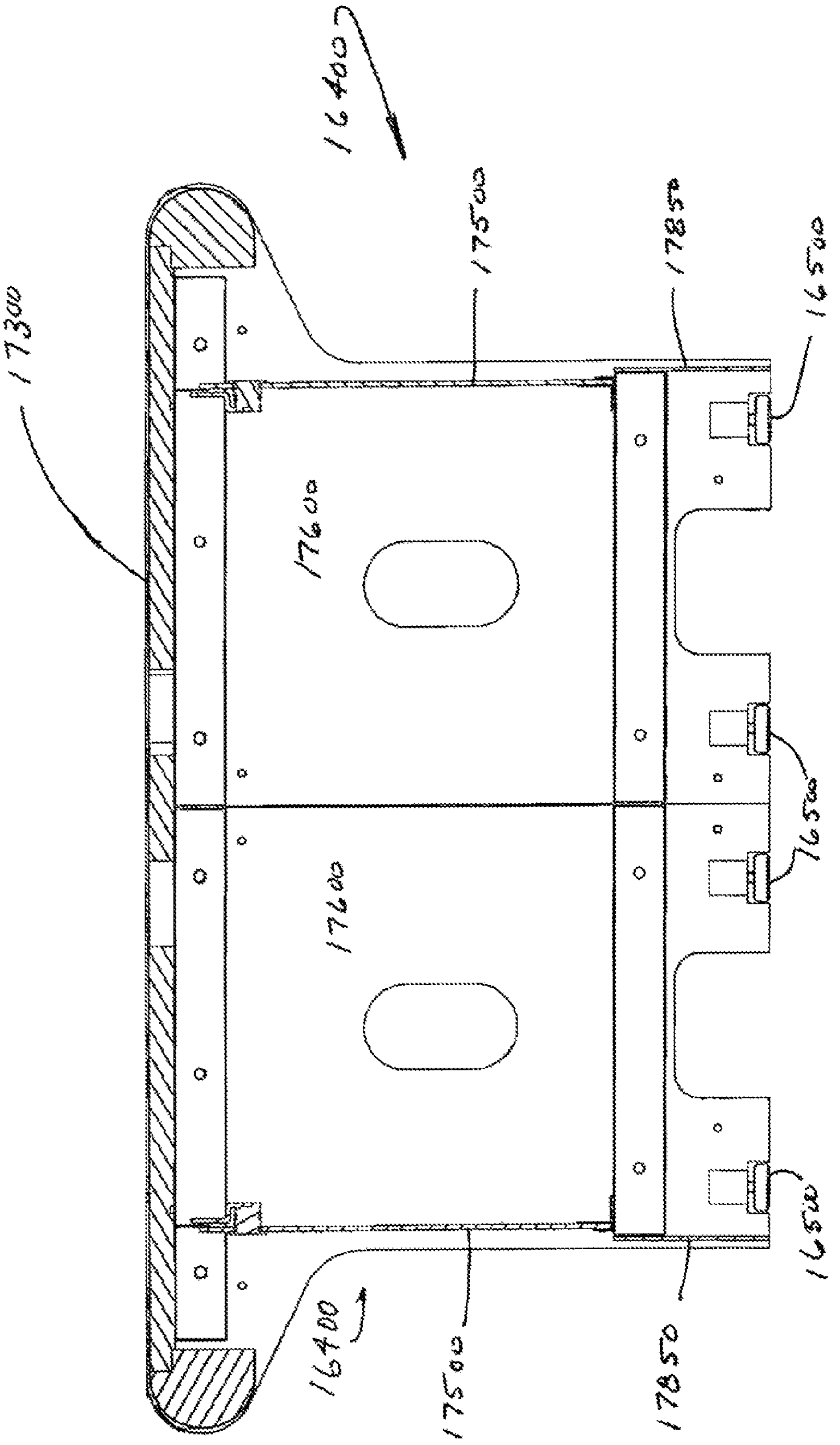

FIG. 166 depicts a cross-sectional end view of two bases of FIG. 163 arranged in a back-to-back configuration.

Figure 167:
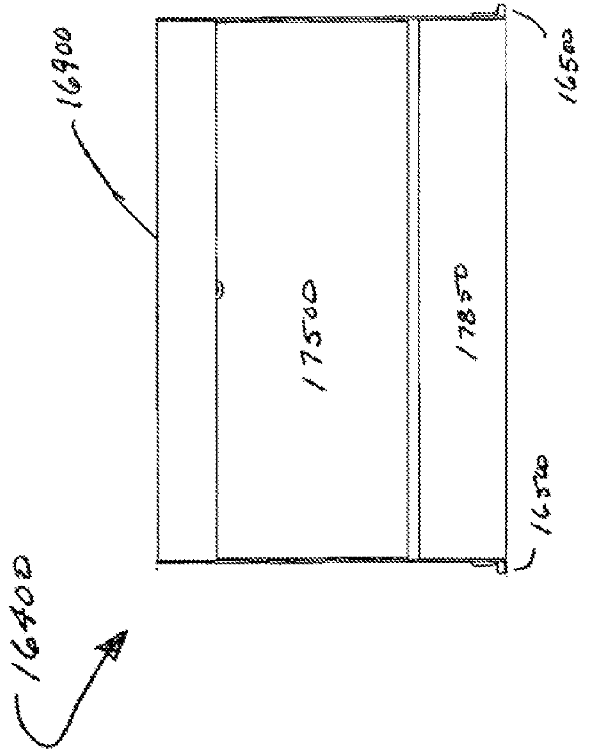

FIG. 167 depicts a front elevation view of the base of FIG. 163.

Figure 168:
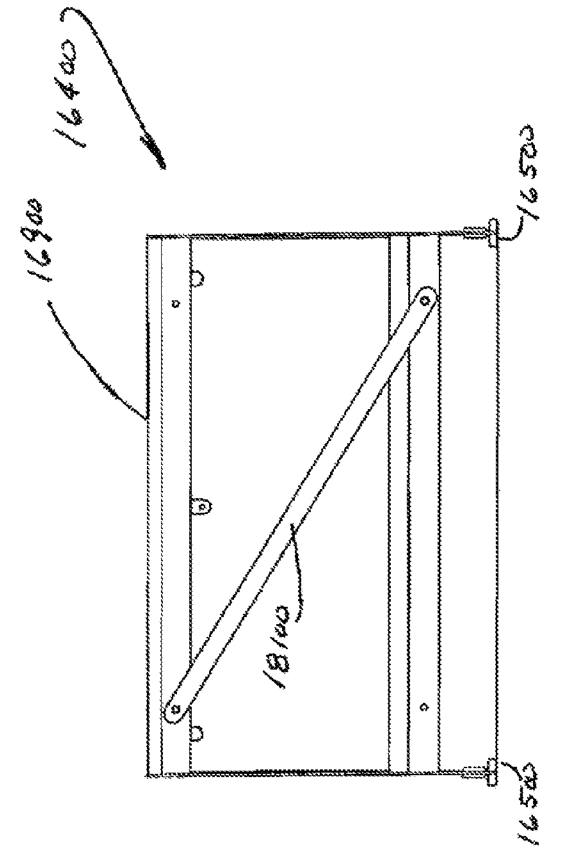

FIG. 168 depicts a rear elevation view of the base of FIG. 163.

Figure 169:
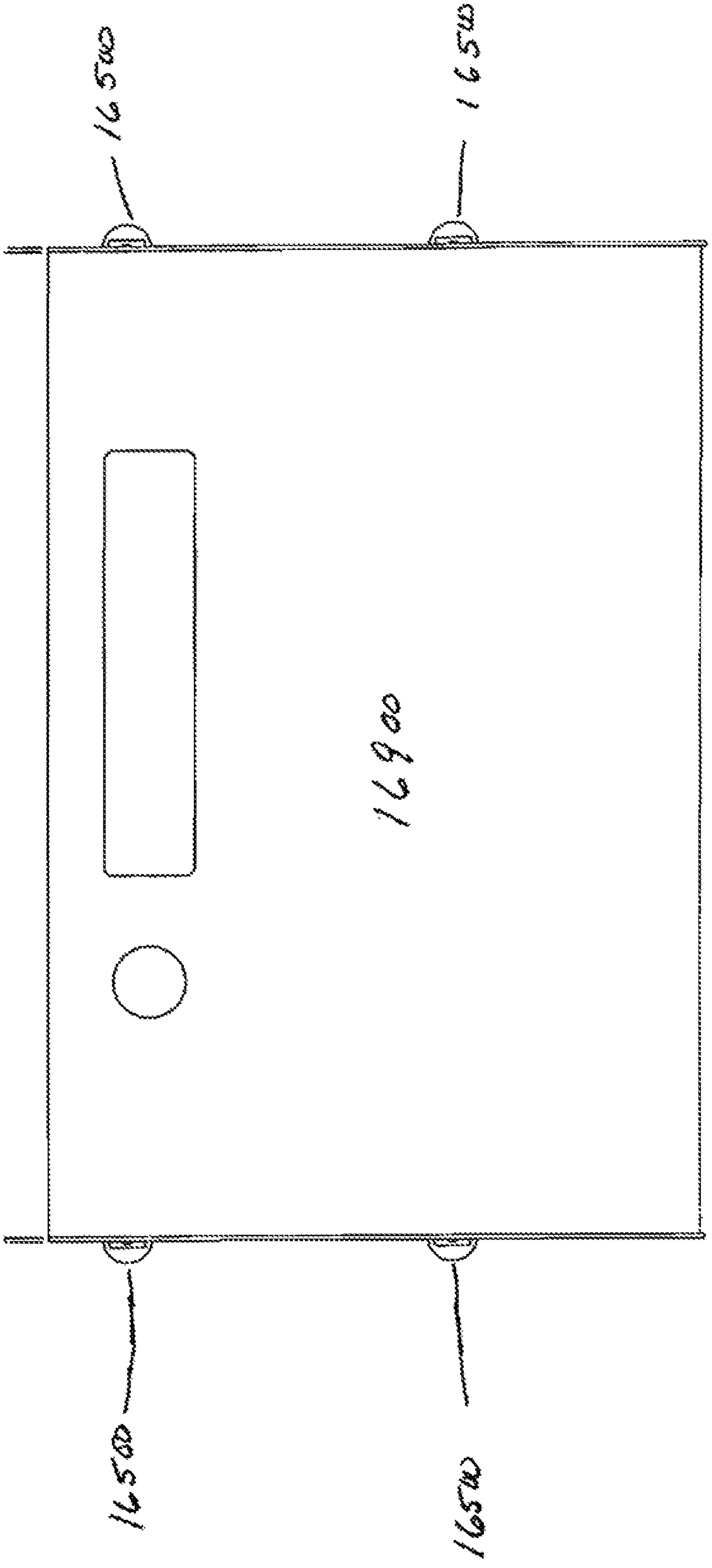

FIG. 169 depicts a plan view of the base of FIG. 163.

Figure 170:
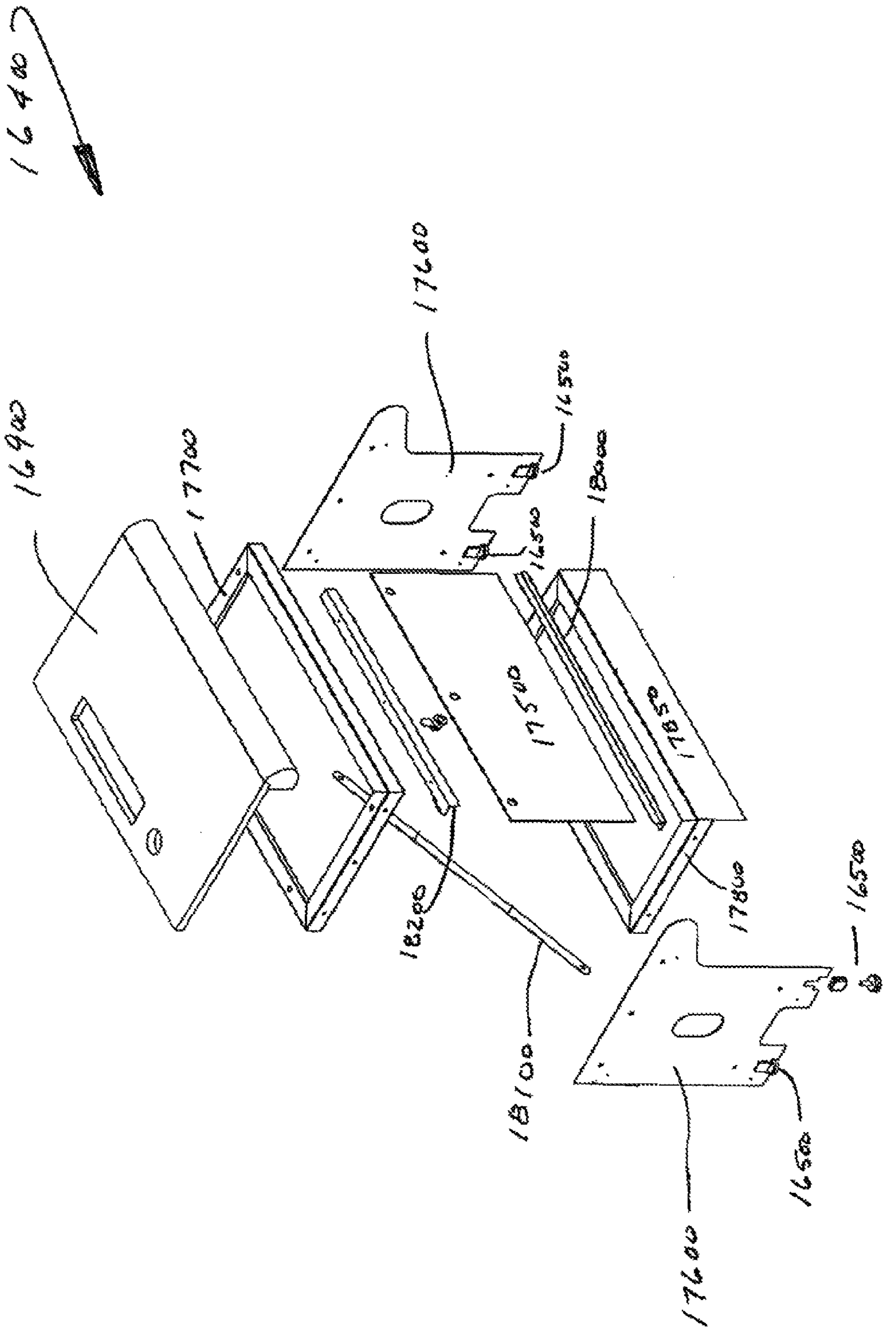

FIG. 170 depicts an exploded view of the base of FIG. 163.

FIG. 171 depicts a bottom view of the countertop of the base of FIG. 163.

FIG. 172 depicts a side view of the countertop of the base of FIG. 163.

FIG. 173 depicts a bottom view of the countertop of two bases of FIG. 163 arranged in a back-to-back configuration.

FIG. 174 depicts an end view of the countertop of two bases of FIG. 163 arranged in a back-to-back configuration.

Figure 175:
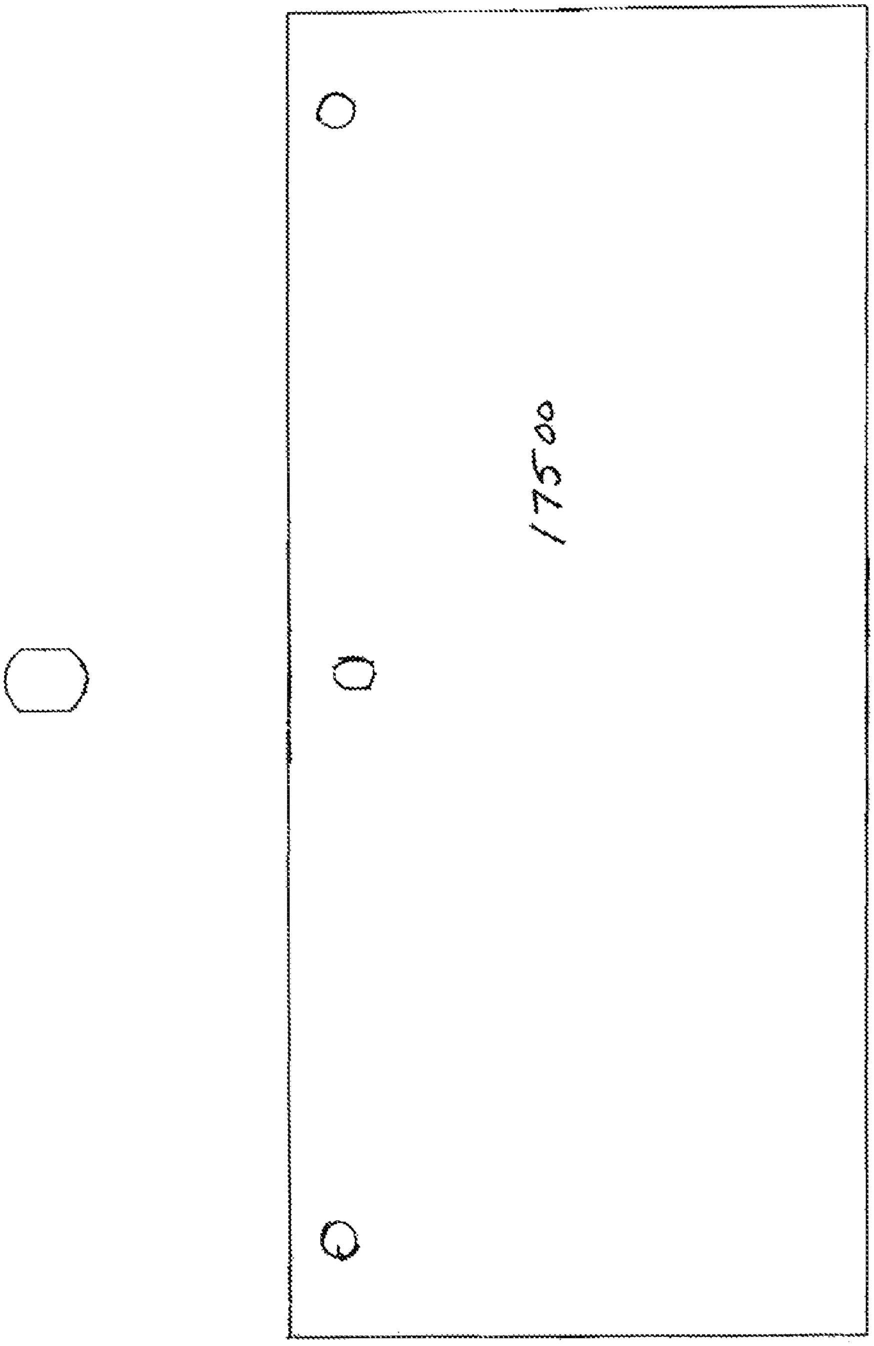

FIG. 175 depicts a front elevation view of the access door of the base of FIG. 163.

Figure 176:
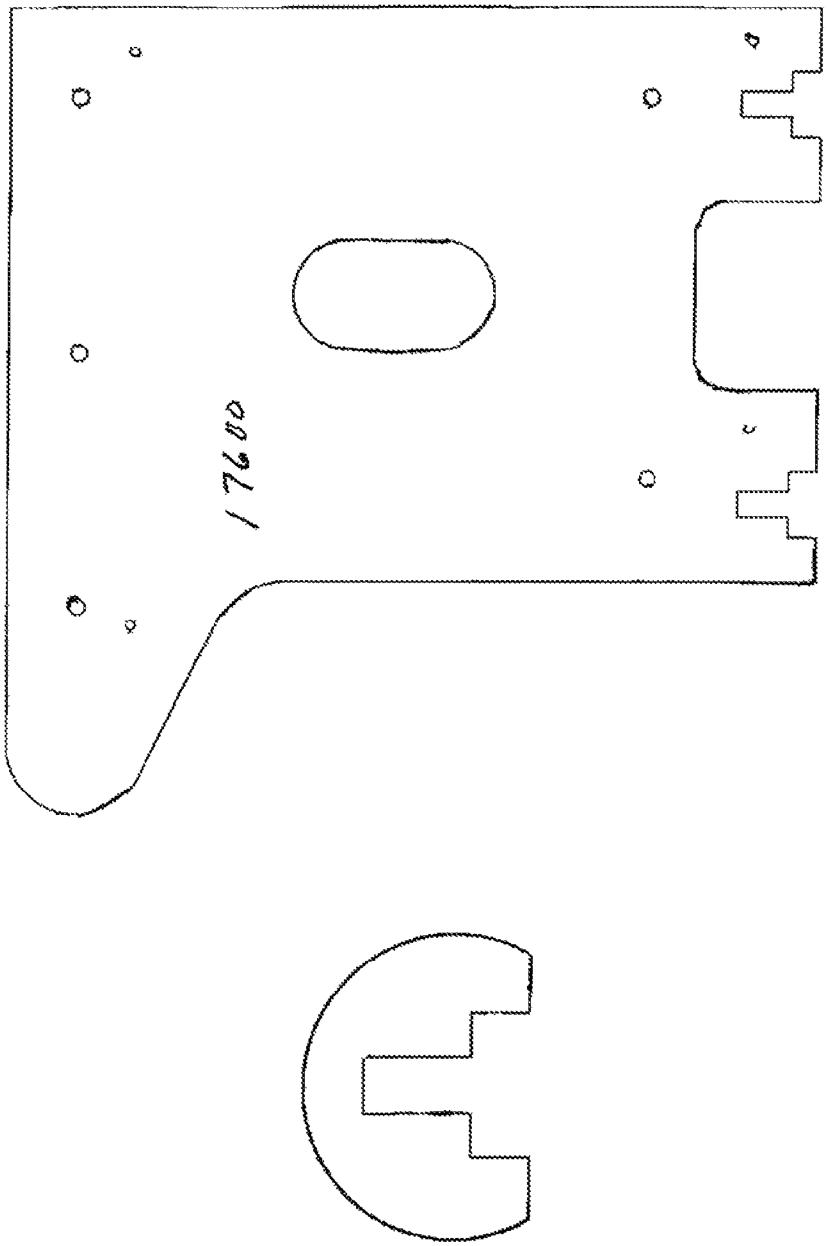
Figure 177B:
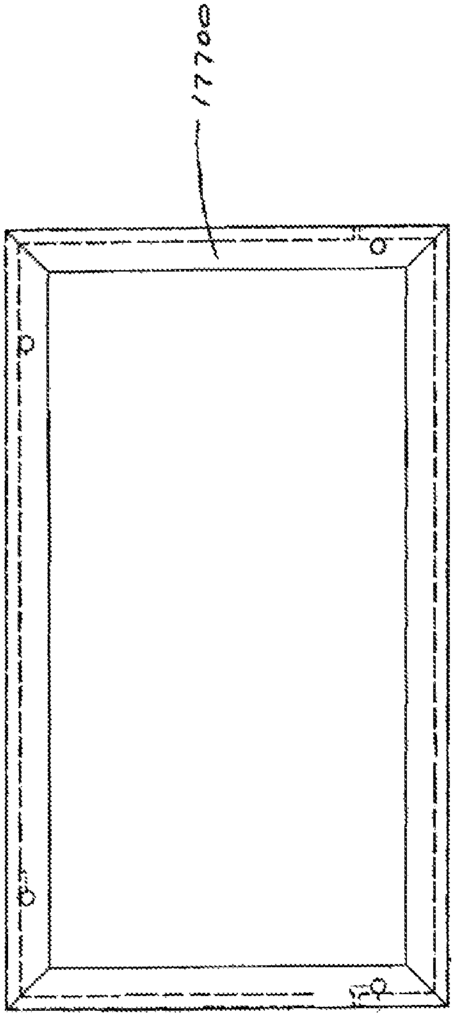
Figure 177C:
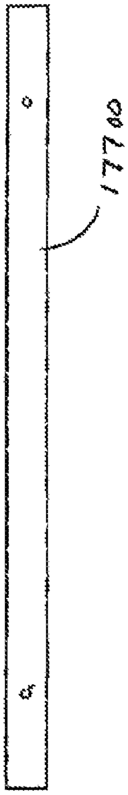
Figure 177A:
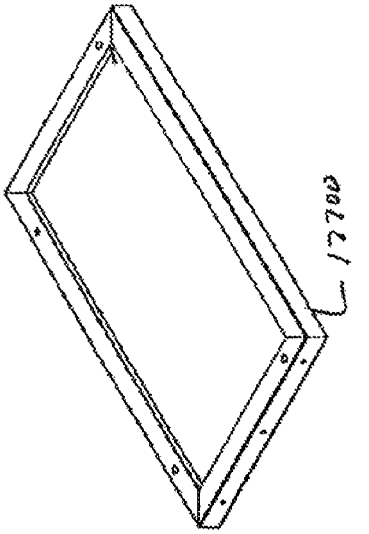
Figure 177D:
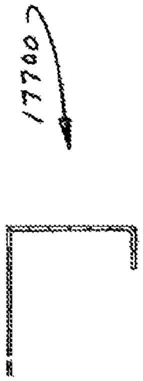
Figure 177E:
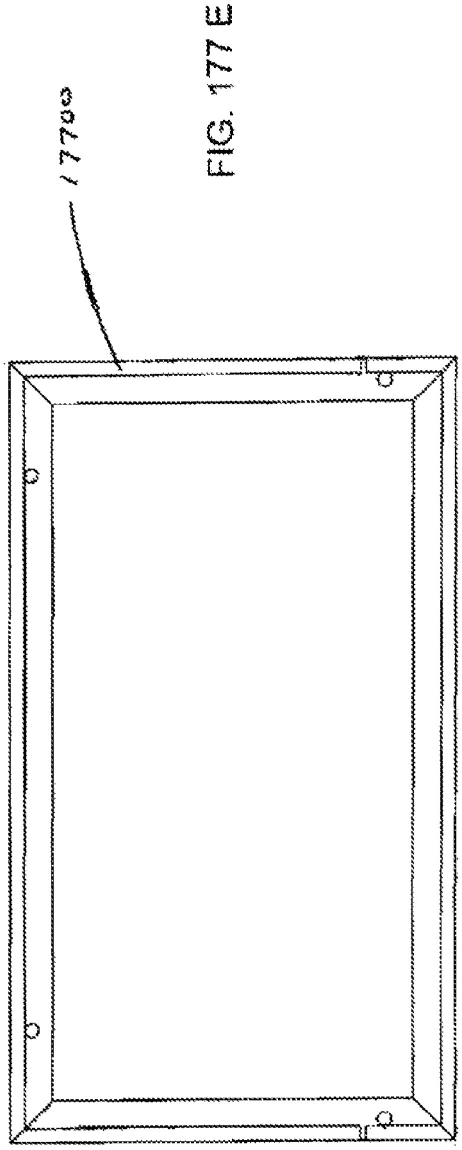
Figure 177F:
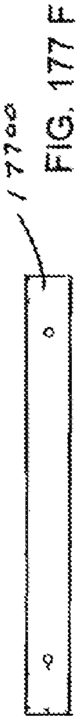
Figure 177G:
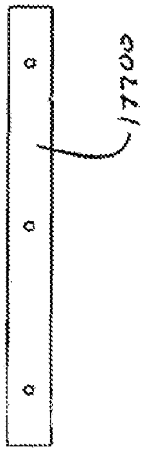
Figure 178B:
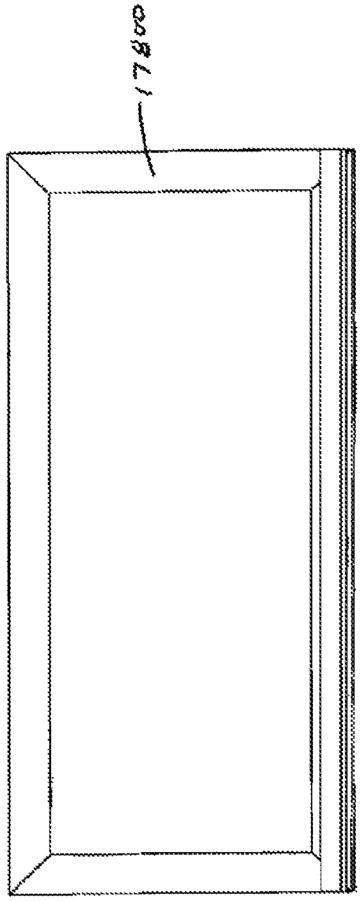
Figure 178C:
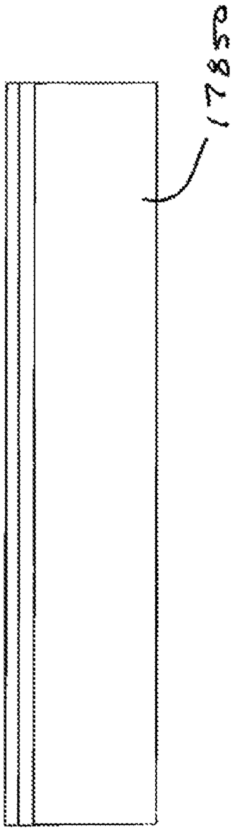
Figure 178A:
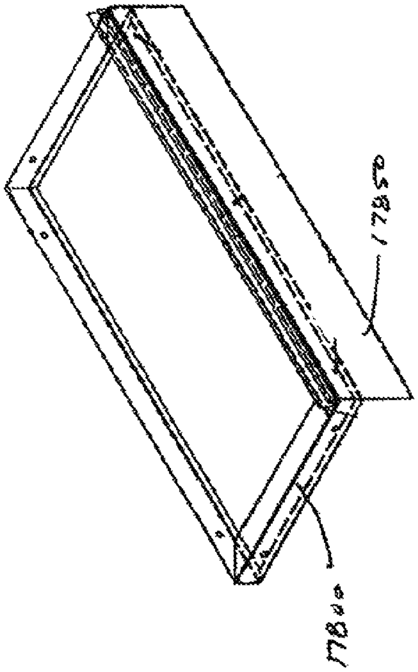
Figure 178D:
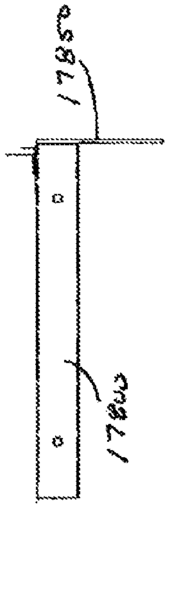
Figure 179B:
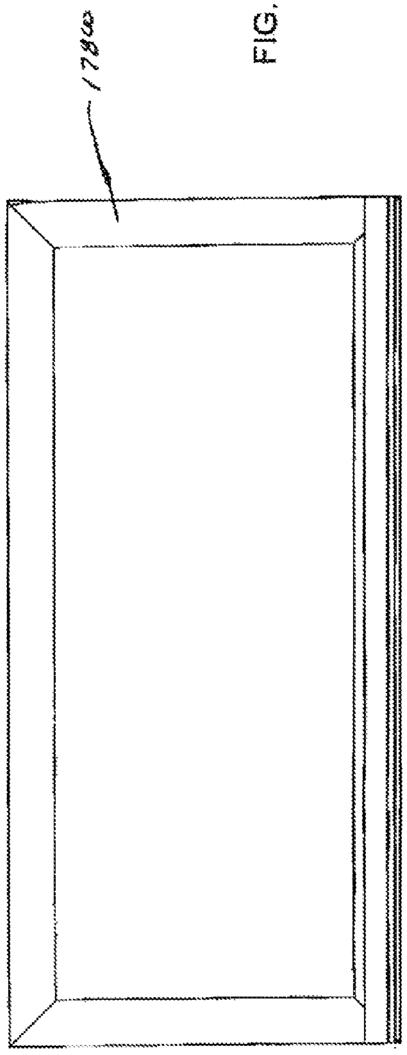
Figure 179C:
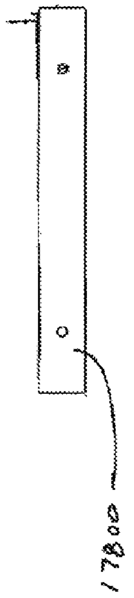
Figure 179D:
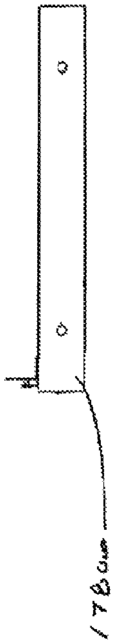
Figure 179E:
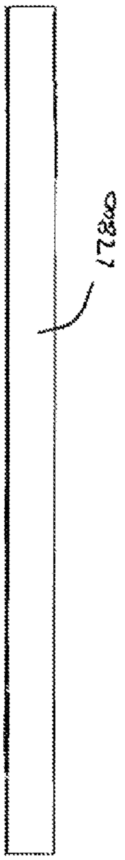
Figure 179A:
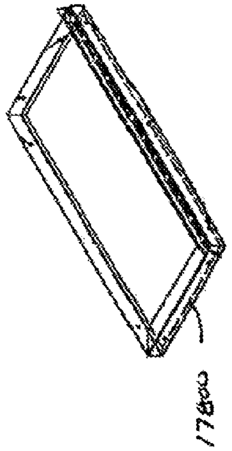
Figure 179F:
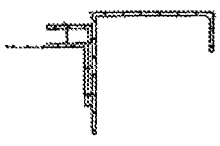
Figure 180B:
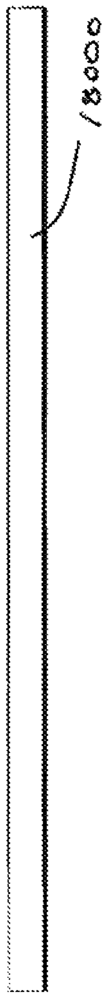
Figure 180C:
Figure 180A:
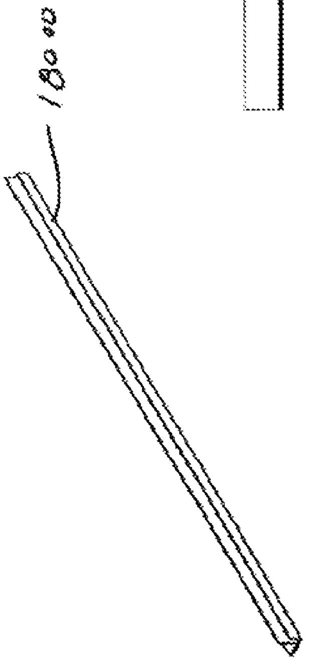
Figure 180D:
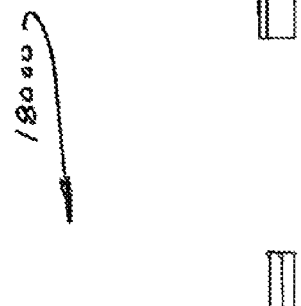

FIG. 176 depicts an elevation view of a side panel of the base of FIG. 163.

FIGS. 177A, 177B, 177C, 177D, 177E, 177F, and 177G depict front perspective, top, rear, Section 1-1, bottom, and side views, respectively, of the top web frame of the base of FIG. 163.

FIGS. 178A, 178B, 178C, and 178D depict front perspective, top, front, and end views, respectively, of the welded kick assembly of the base of FIG. 163.

FIGS. 179A, 179B, 179C, 179D, 179E, and 179F depict front perspective, top, sides, rear, and Section 1-1 views, respectively, of the bottom frame welded kick assembly of the base of FIG. 163.

FIGS. 180A, 180B, 180C, and 180D depict front perspective, rear, top, and end views, respectively, of the metal channel of the base of FIG. 163.

Figure 181:
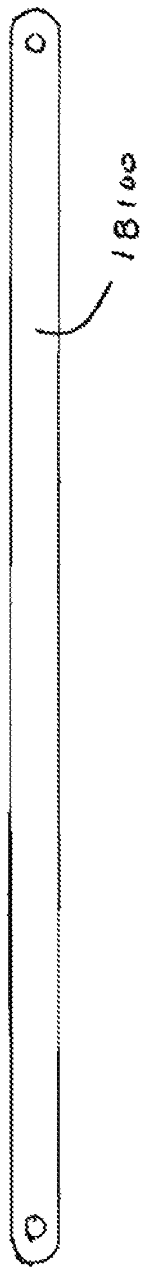

FIG. 181 depicts a front view of the support brace of the base of FIG. 163.

FIGS. 182A, 182B, and 182C depict top, front, and side views, respectively, of the door bracket of the base of FIG. 163.

Additional materials, attached hereto constitute additional teachings included in the present invention, including sheets A-1 through A-43 of Appendix A hereto which comprises photographs and other materials which depict various embodiments of the instant invention, and which are incorporated by reference in there entireties herewith.

DETAILED DESCRIPTION OF THE EMBODIMENTS

It is to be understood that the figures and descriptions of the present invention have been simplified to illustrate elements that are relevant for a clear understanding of the present invention, while eliminating, for the purposes of clarity, many other elements which may be found in the present invention. Those of ordinary skill in the pertinent art will recognize that other elements are desirable and/or required in order to implement the present invention. However, because such elements do not facilitate a better understanding of the present invention, a discussion of such elements is not provided herein.

In one embodiment of the invention, a base for supporting gaming and other entertainment machines and devices such as slot machines, video poker and blackjack, video games and other entertainment devices is provided.

Turning now to FIG. 1 through 21, there is shown an embodiment of base 100 on the instant invention. Base 100 comprises top surface 1000, opposing side panels 1200, and front panel 1100. Top surface 1000 may be removed to allow access to the area formed by side panels 1200 and front panel 1100. This area is where utilities such as electrical wiring, computer cable and other components and utilities which are associated with base 100, and the device supported by base 100, may be located.

Base 100 may further comprise top angle frame 1700 and bottom angle frame 2000 to which side panels 1200 may be affixed. Top channel or rail 1500 may be affixed to top angle frame 1700, and bottom channel or rail 1600 may be affixed to bottom angle frame 2000. Top channel 1500 and bottom channel 1600 may then support front cover panel 1100. Front cover panel 1100 may also be optionally removable to provide additional access to the utility area.

Figure 7B:
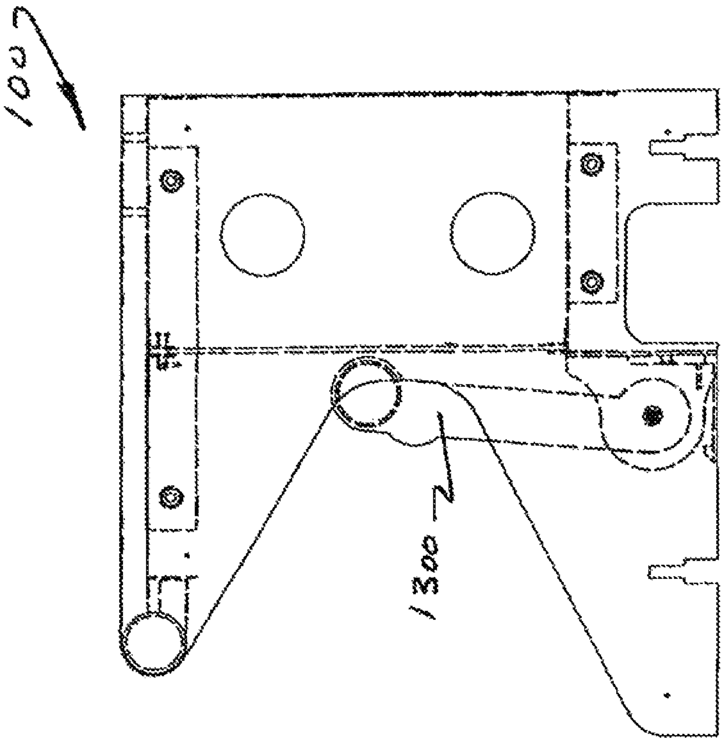
FIG. 7B depicts a side view of the base of FIG. 1 with the foot rest in the closed position.
Figure 7A:
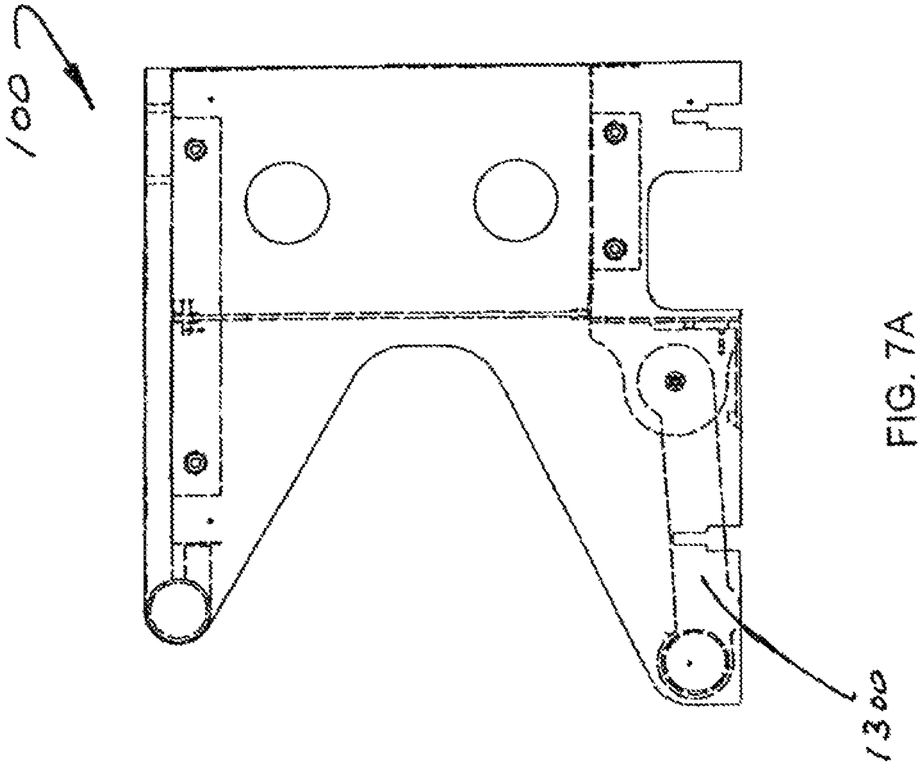
FIG. 7A depicts a side view of the base of FIG. 1 with the foot rest in the open position.
Figure 8:
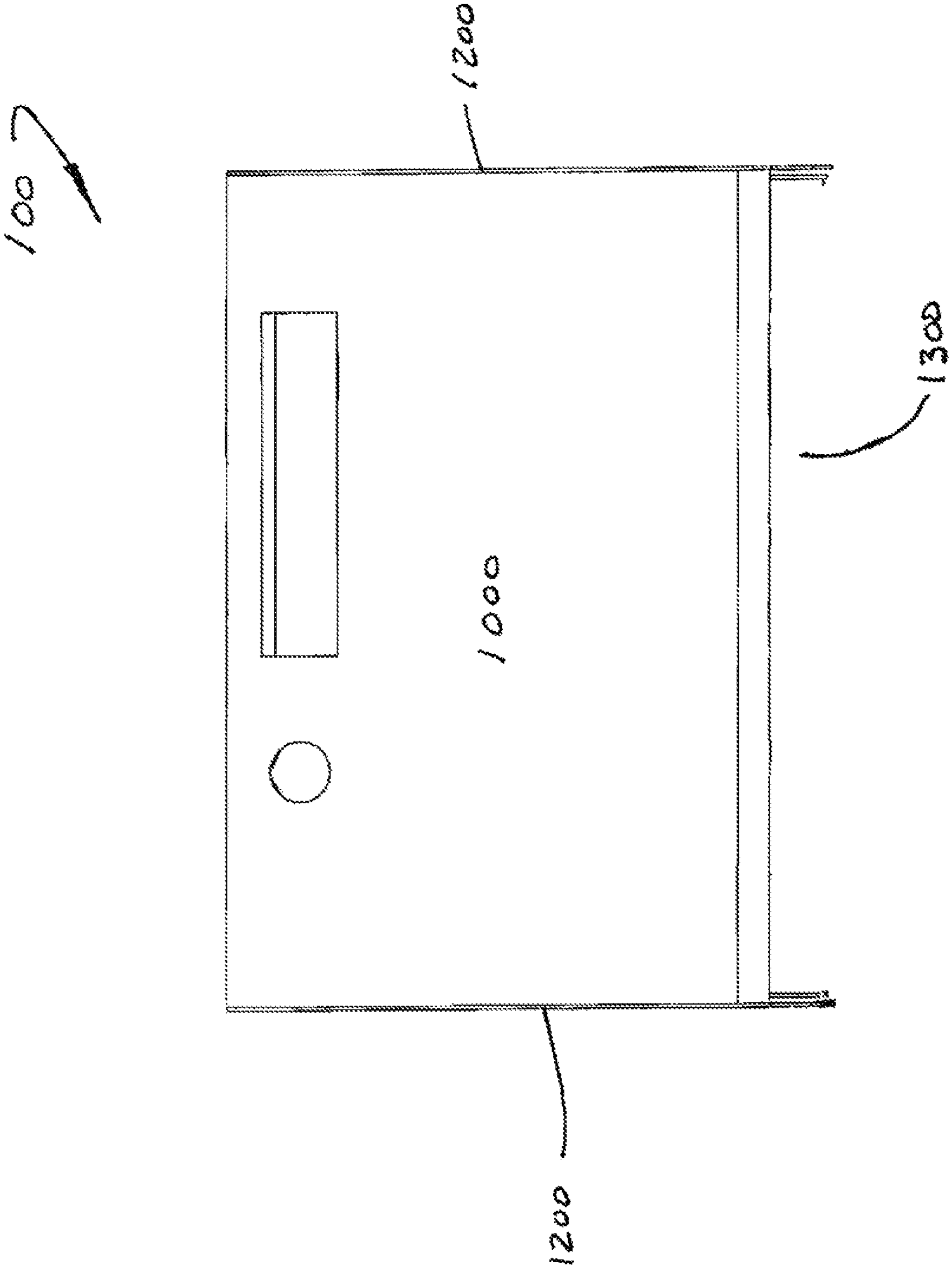
FIG. 8 depicts a plan view of the base of FIG. 1.
Figure 9:
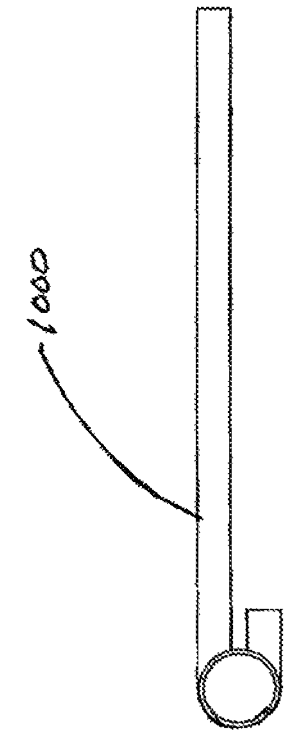
FIG. 9 depicts an end view of countertop of the base of FIG. 1.
Figure 10:
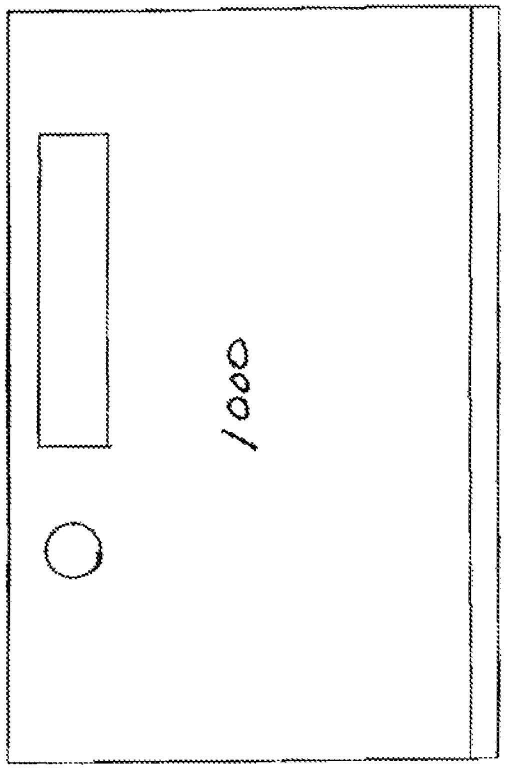
FIG. 10 depicts a top view of the countertop of the base of FIG. 1.
Figure 11:
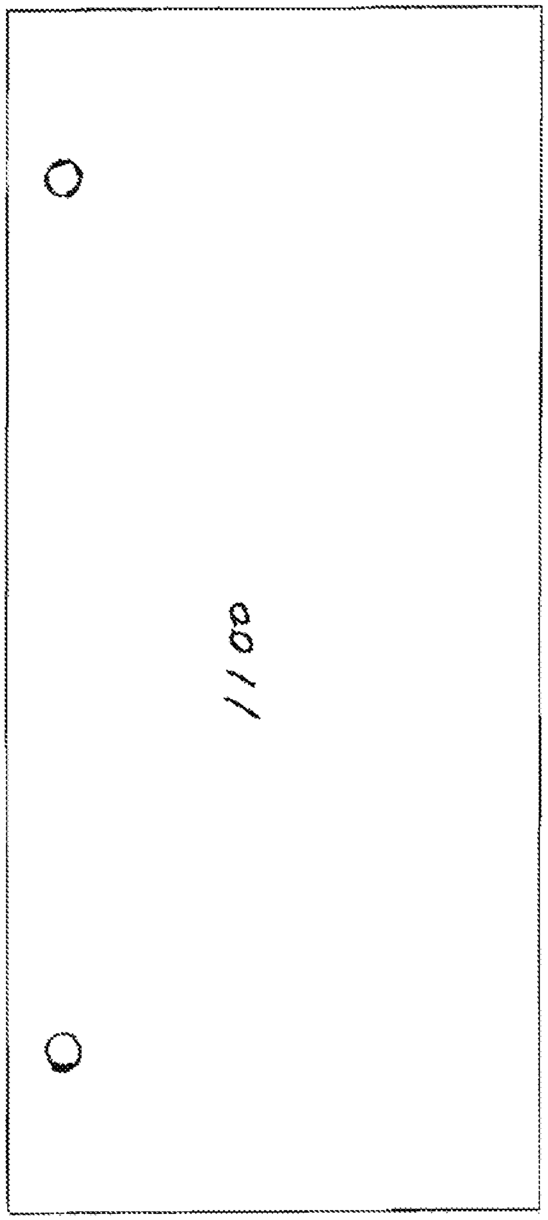
FIG. 11 depicts a front view of the access door of the base of FIG. 1.
Figure 12:
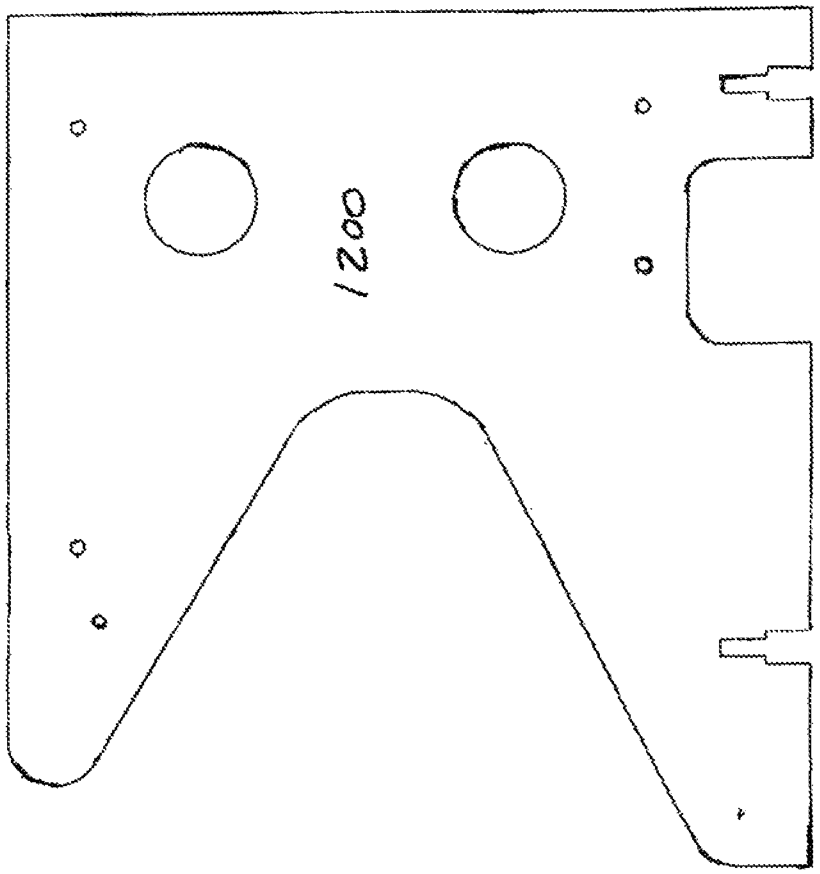
FIG. 12 depicts an elevation view of a side panel of the base of FIG. 1.
Figure 13C:
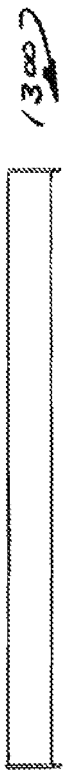
FIGS. 13A, 13B, 13C, and 13D depict rear perspective, front perspective, front and top views, respectively, of the foot rest of the base of FIG. 1.
Figure 13D:
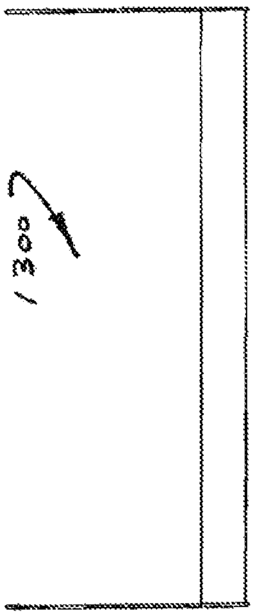
Figure 13A:
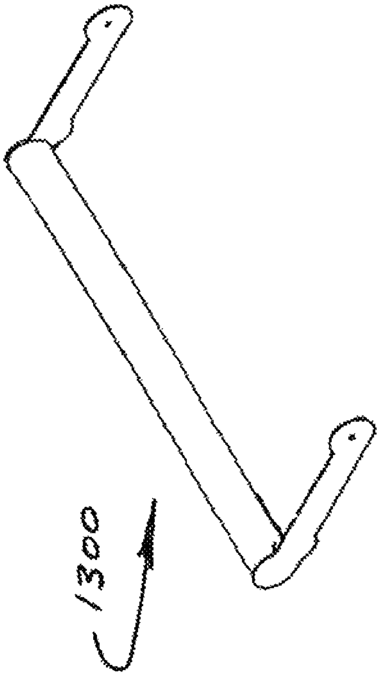
Figure 13B:
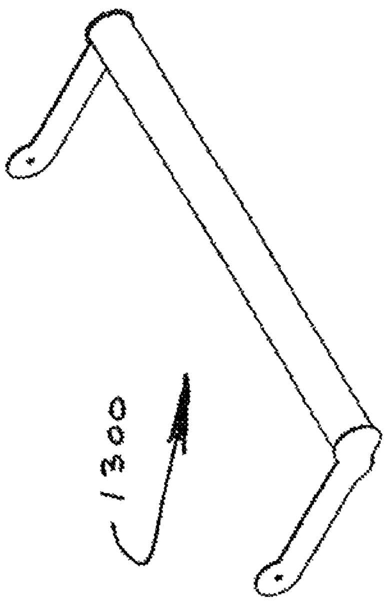
Figure 14:
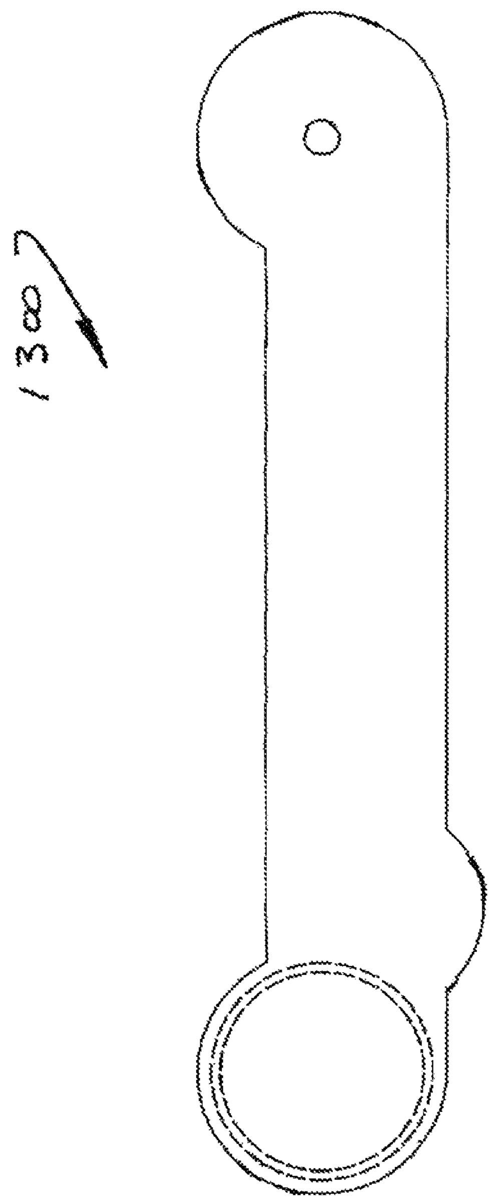
FIG. 14 depicts a side view of the foot rest of FIG. 1.
Figure 15A:
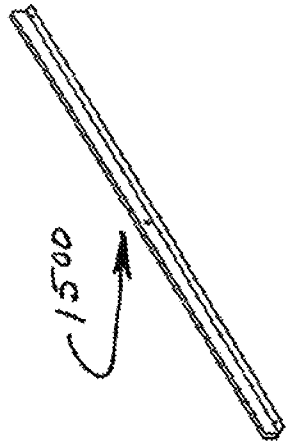
FIGS. 15A, 15B, 15C, and 15D depict perspective rear, cross sectional, front and bottom views, respectively, of the top channel or rail of the base of FIG. 1.
Figure 15B:
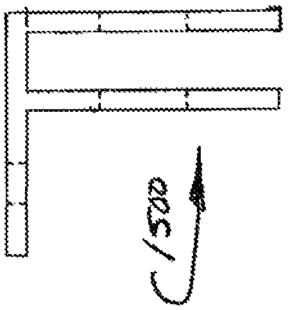
Figure 15C:
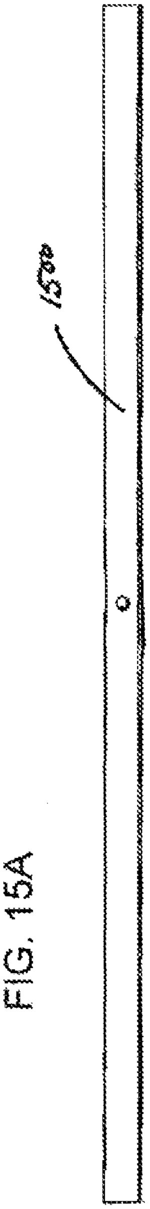
Figure 15D:
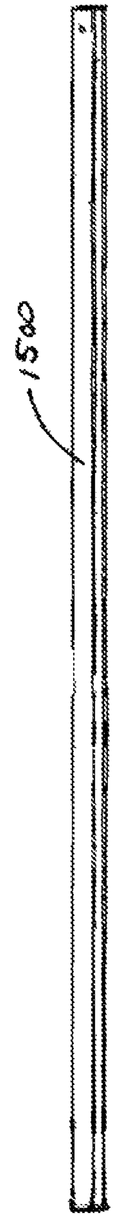
Figure 16A:
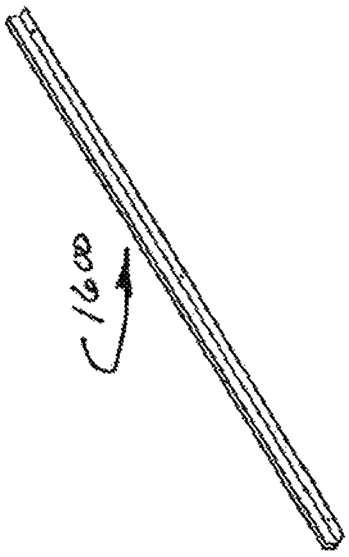
FIGS. 16A, 16B, 16C, and 16D depict perspective, cross sectional, front and top view, respectively, of the bottom channel or rail of the base of FIG. 1.
Figure 16B:
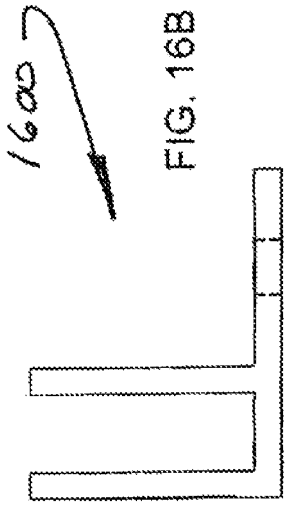
Figure 16C:
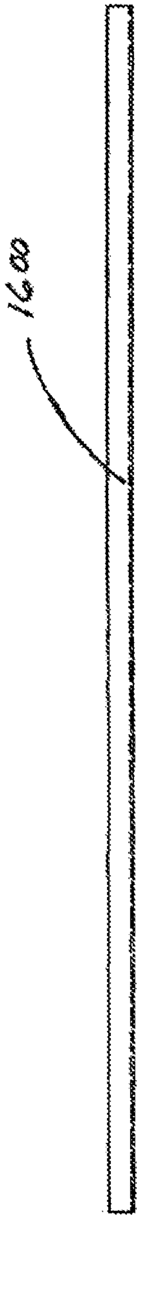
Figure 16D:
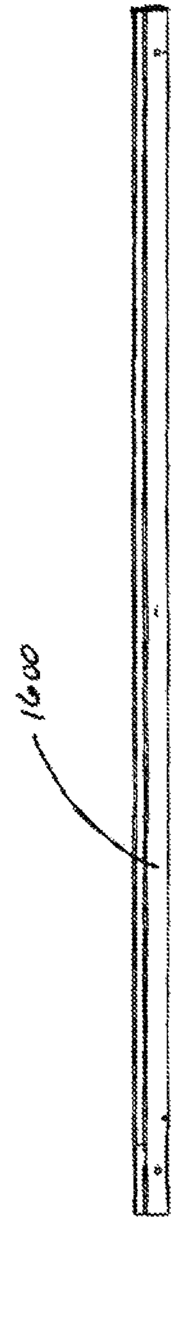
Figure 17C:
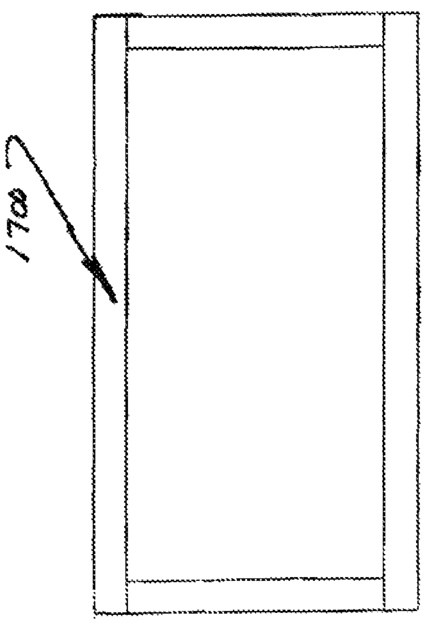
FIGS. 17A, 17B, 17C, 17D, and 17E depict perspective rear, perspective front, top, left end, and rear view, respectively, of the top angle frame of the base of FIG. 1.
Figure 17D:
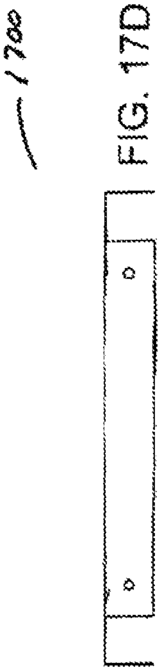
Figure 17E:
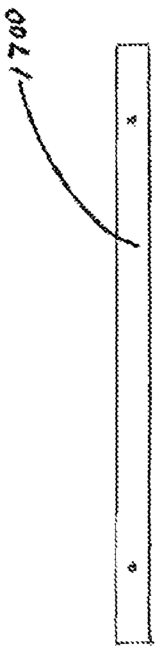
Figure 17A:
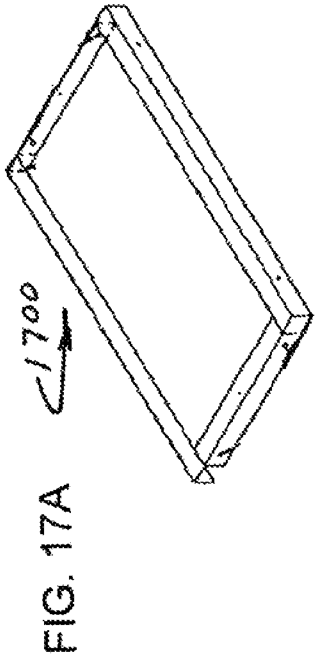
Figure 17B:
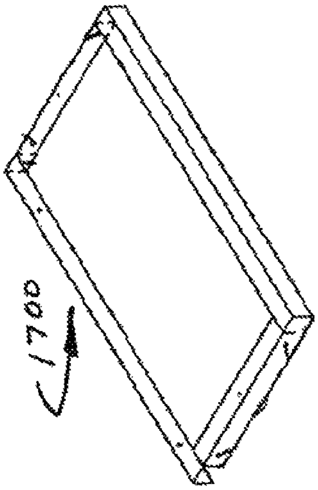
Figure 18A:
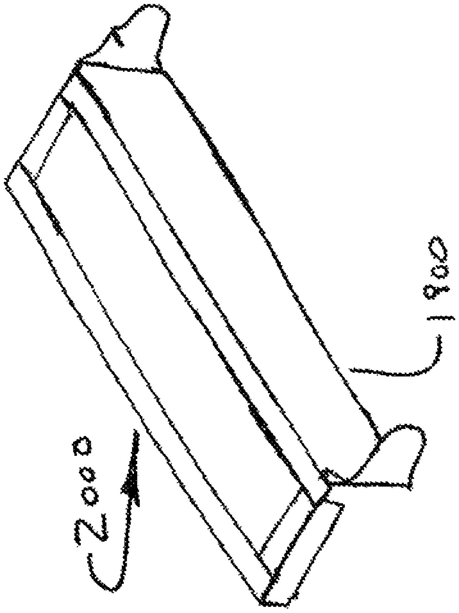
FIGS. 18A, 18B, and 18C depict perspective, front and top views, respectively, of the kick plate and frame assembly of the base of FIG. 1.
Figure 18B:
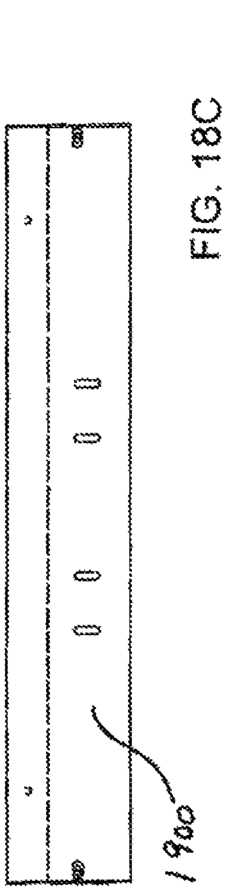
Figure 18C:
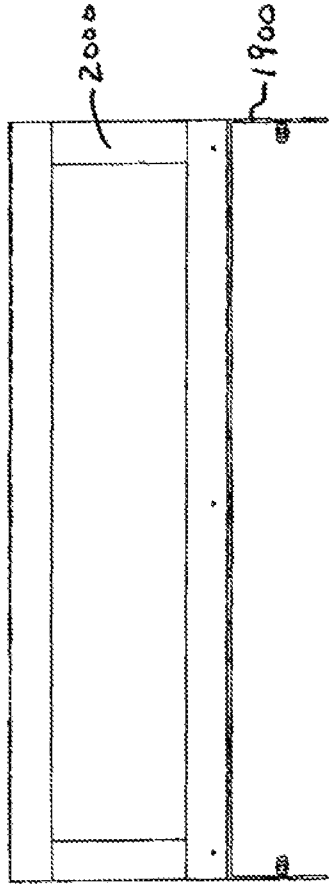
Figure 19C:
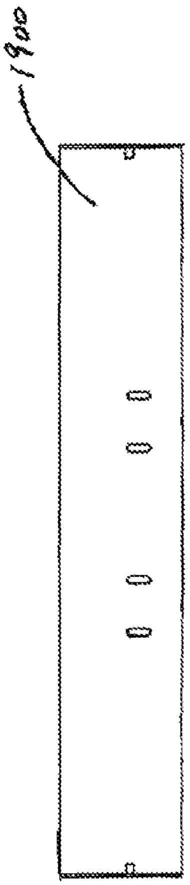
FIGS. 19A, 19B, 19C, 19D, and 19E depict perspective, end, front, detail, and top views, respectively, of the kick plate of the base of FIG. 1.
Figure 19D:
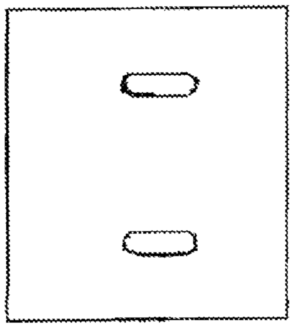
Figure 19E:
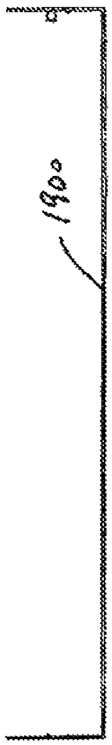
Figure 19A:
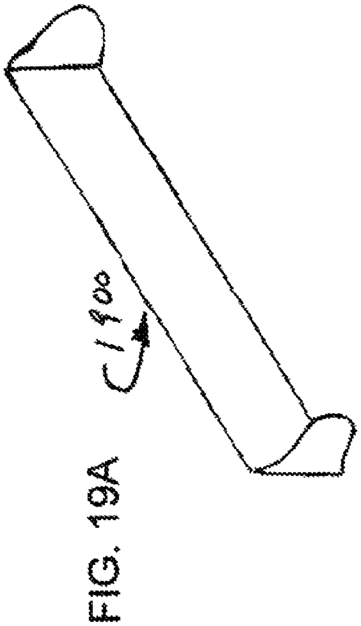
Figure 19B:
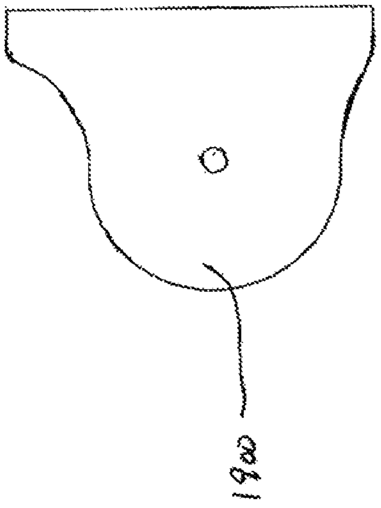
Figure 20C:
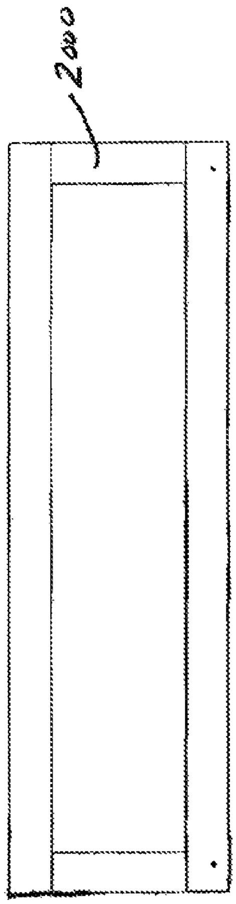
FIGS. 20A, 20B, 20C, 20D, and 20E depict rear perspective, front perspective, top, rear and left end views, respectively, of the bottom angle frame of the base of FIG. 1.
Figure 20D:
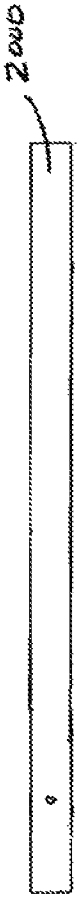
Figure 20E:
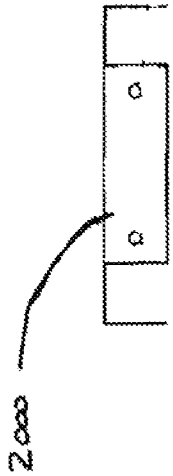
Figure 20A:
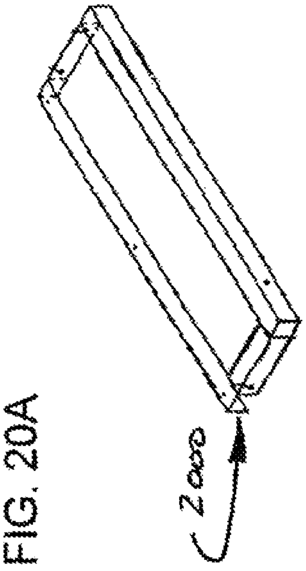
Figure 20B:
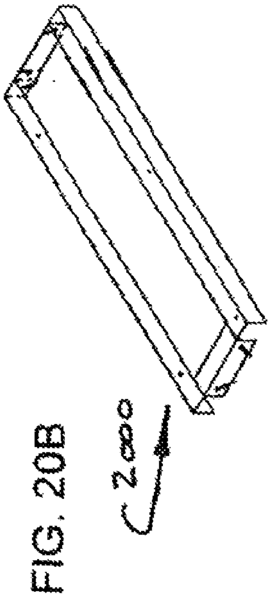
Figure 21:
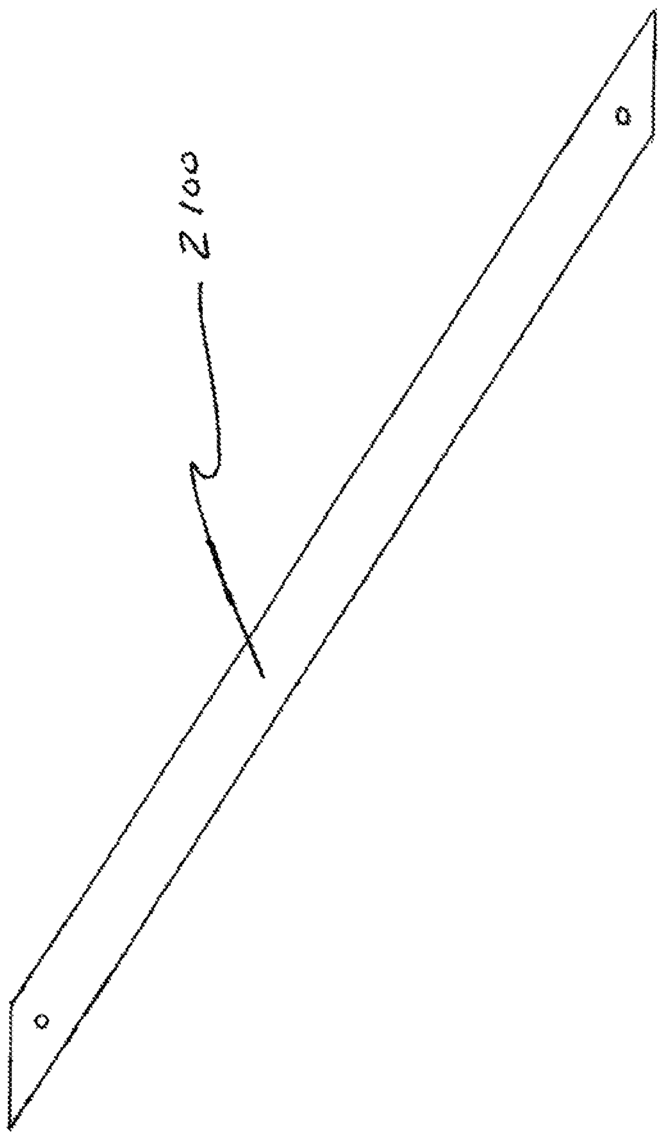
FIG. 21 depicts a front view of the rear support bracket of the base of FIG. 1.

Foot rest 1300 may also be provided. Foot rest 1300 may be rotatably attached to kick plate 1900. Kick plate 1900 may, in turn, be mounted to bottom angle frame 2000. This configuration permits foot rest 1300 to be rotated into an open position, as shown in FIG. 7A, or into a closed position, as shown in FIG. 7B.

Figure 2:
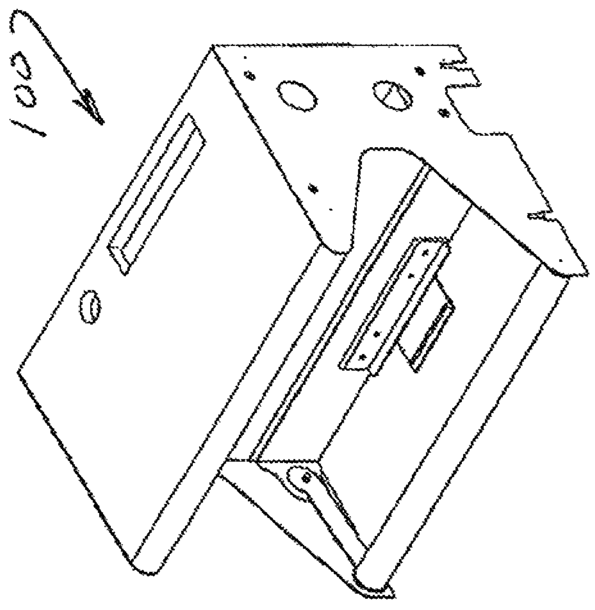
FIG. 2 depicts a front perspective view of the base of FIG. 1.
Figure 1:
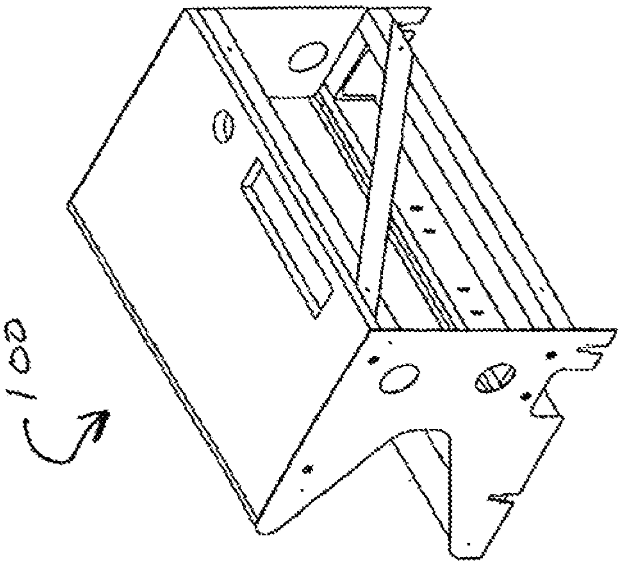
FIG. 1 depicts a rear perspective view of an embodiment of the base of the instant invention.
Figure 3:
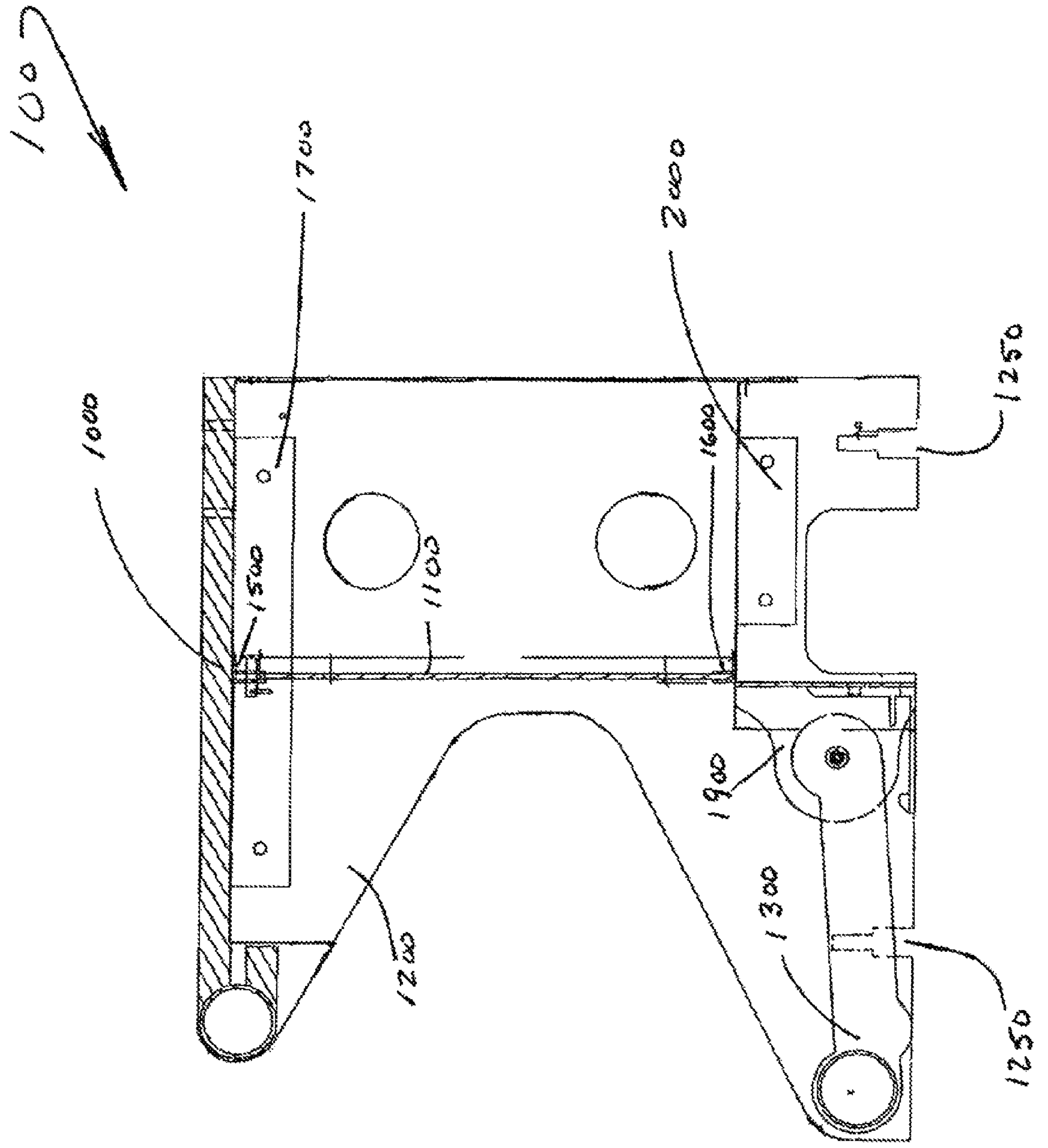
FIG. 3 depicts a cross-sectional end view of the base of FIG. 1.
Figure 5:
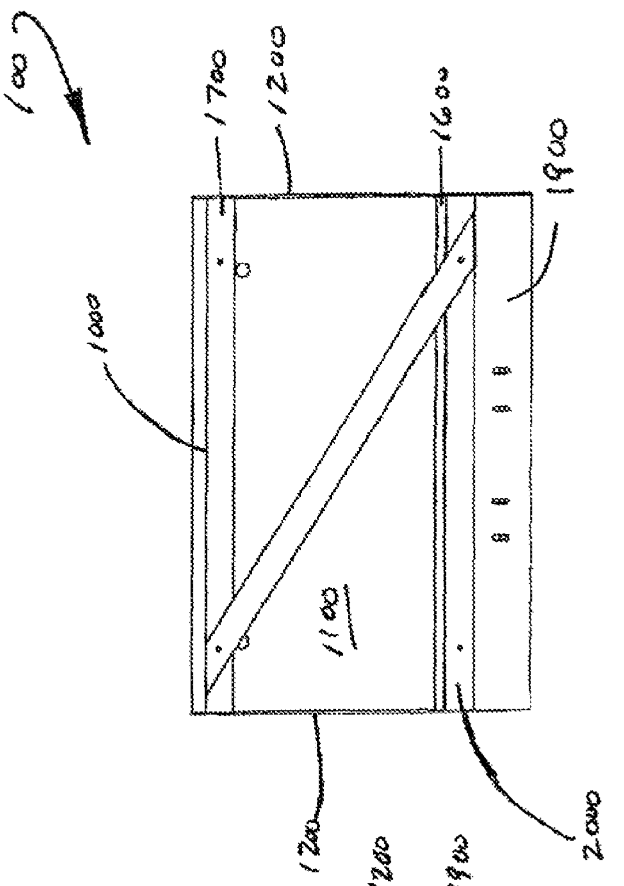
FIG. 5 depicts a rear view of the base of FIG. 1.
Figure 4:
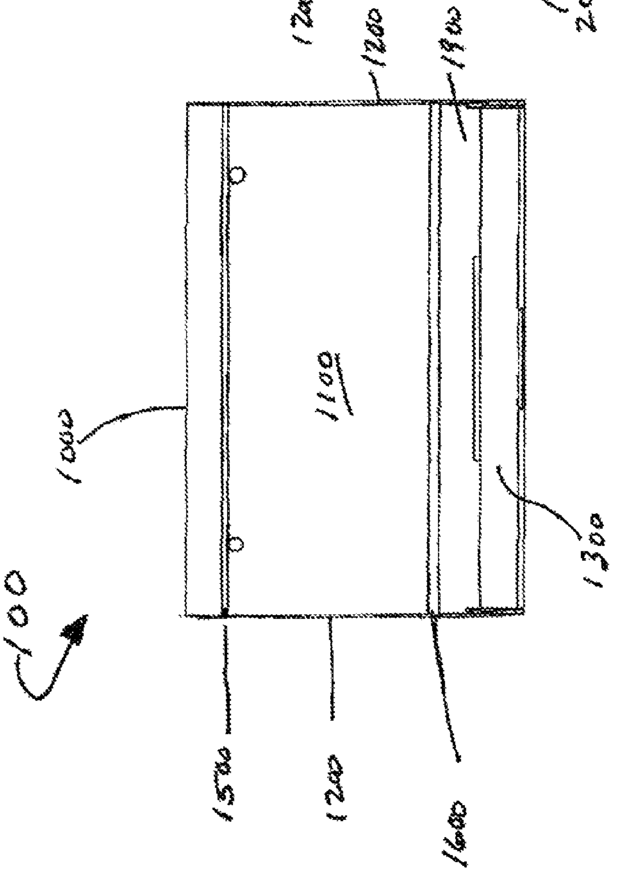
FIG. 4 depicts a front view of the base of FIG. 1.
Figures 6, 6A:
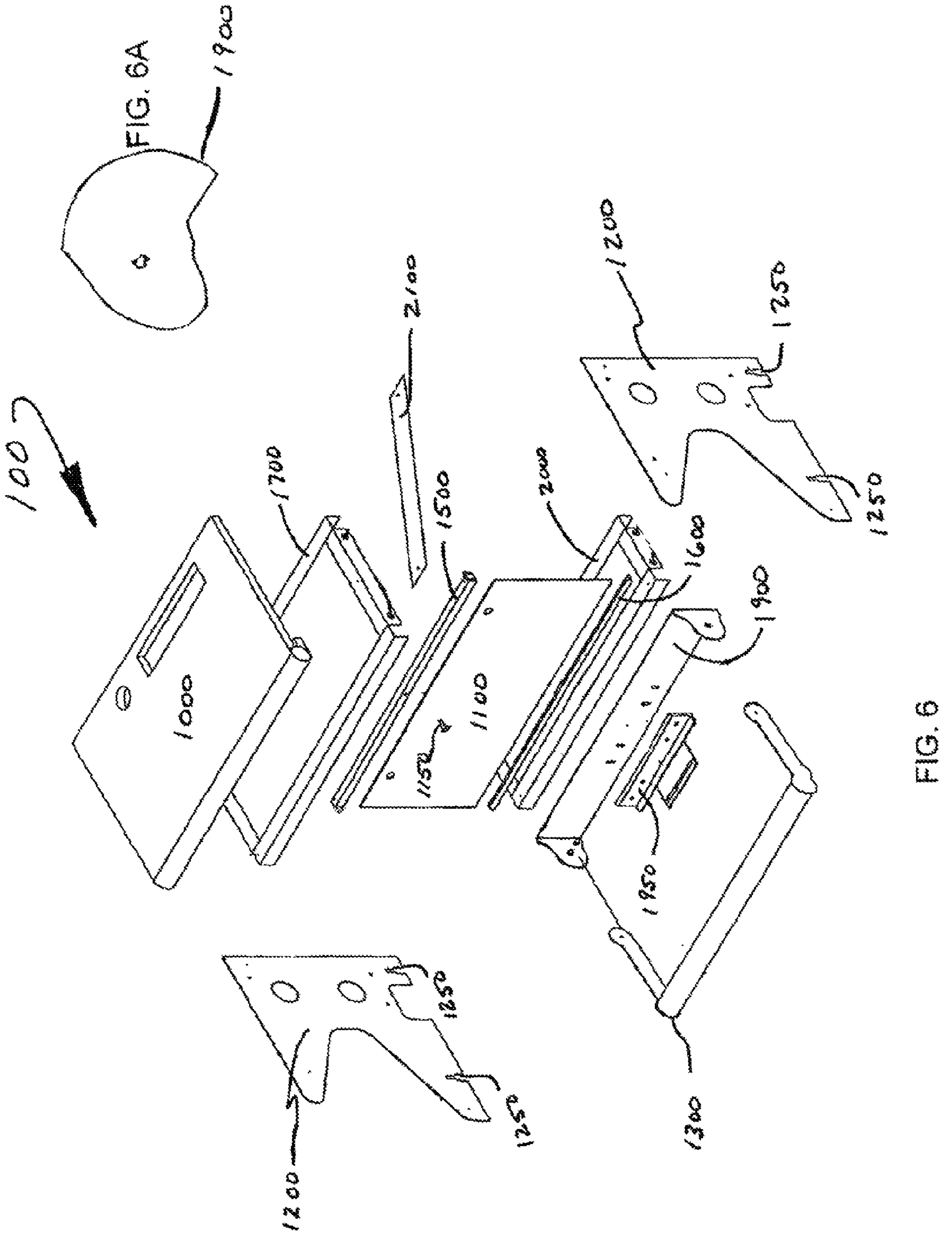
FIG. 6 depicts an exploded view of the base of FIG. 1.
FIG. 6A depicts a detailed view of the hinge area of the kick plate of the base of FIG. 1.

Optionally, and as shown in FIG. 6, sled bracket 1950 may be mounted to kick plate 1900. Sled bracket 1950 may be used to mount a user chair and bracket (not shown) to base 100 so that the chair orients the user to the device positioned on base 100 in an optimal or desirable fashion. This optional or desirable orientation preferably positions the user to a desired height and distance from the device being operated. Such orientation preferably allows the user to easily reach the device and/or provide the user with ample room for the user's legs. Such orientation also tends to increase the overall comfort of the user, and reduce the fatigue a user may experience during use of the device. Reduction of fatigue and increasing the comfort of the user should generally result in an increase in the usage of the device. Accordingly, profits realized from the device being operated should increase as a result of the prolonged usage of the device.

Base 100 may also be provided with leveling devices. Such leveling devices enable base 100, and particularly top surface 1000, to be leveled relative to the surface upon which base 100 is placed, such as, for example, the floor. Any suitable leveling device may be employed to level base 100, such as, for example, a bolt and nut assembly which permits base 100 to be raised and lowered by turning the bolt and nut assembly. In the embodiment shown in FIGS. 1 through 21, the leveling device may be accessed through openings 1250 in side panels 1200. See, for example, FIGS. 3 and 6.

Base 100 may also permit improved access to the utilities which are provided to the device supported by base 100. Such utilities may include, for example, electrical wiring, computer cabling, and other components. Top surface 1000 may be removed to allow access to the utility area which is bounded by side panels 1200 and cover panel 1100. Optionally, cover panel 1100 may also be removed for additional access to the utility area. Cover panel 1100 may be held in place by top channel 1500, bottom channel 1600 and clevis pin 1150, shown in FIG. 6.

Base 100 may also be constructed to be shipped or otherwise transported in an unassembled state and easily assembled on the location of base 100's installation. Simplified assembly also permits base 100 to be partially or completely disassembled so that base 100 and the device positioned on base 100 may be easily maintained, moved or placed in different configurations with other bases 100 before and after initial installation.

Figure 22:
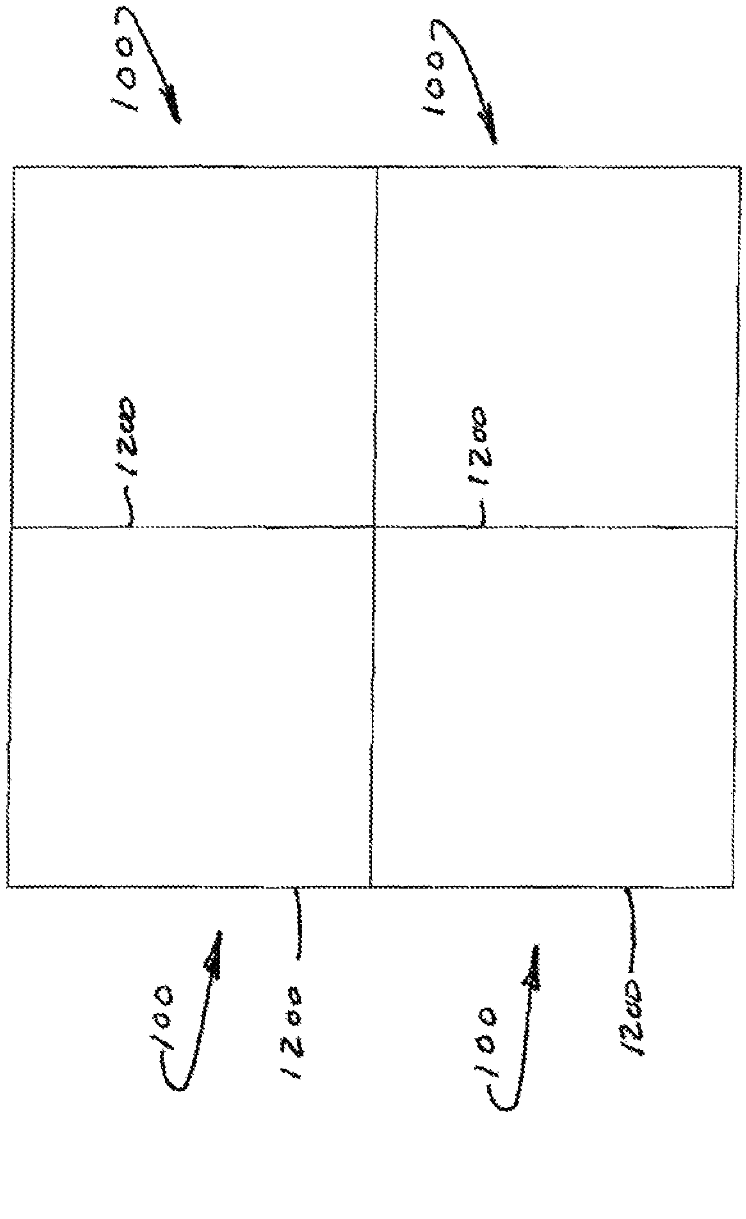
FIG. 22 depicts a plan view of a back-to-back and side-to-side configuration of multiple bases of FIG. 1.

The modularity of base 100 permits multiple bases 100 to be configured in many different ways. See, for example, the various configurations of bases 100 shown in FIGS. 22, 23, 24 and 25. FIG. 22 depicts four bases 100 configured in a manner which maximizes the utilization of establishment floor space. In the configuration shown, bases 100 are placed side-to-side and back-to-back. In addition, each pair of bases 100 may share a common side panel 1200, thereby reducing the amount of material and cost for each base 100.

Figure 23:
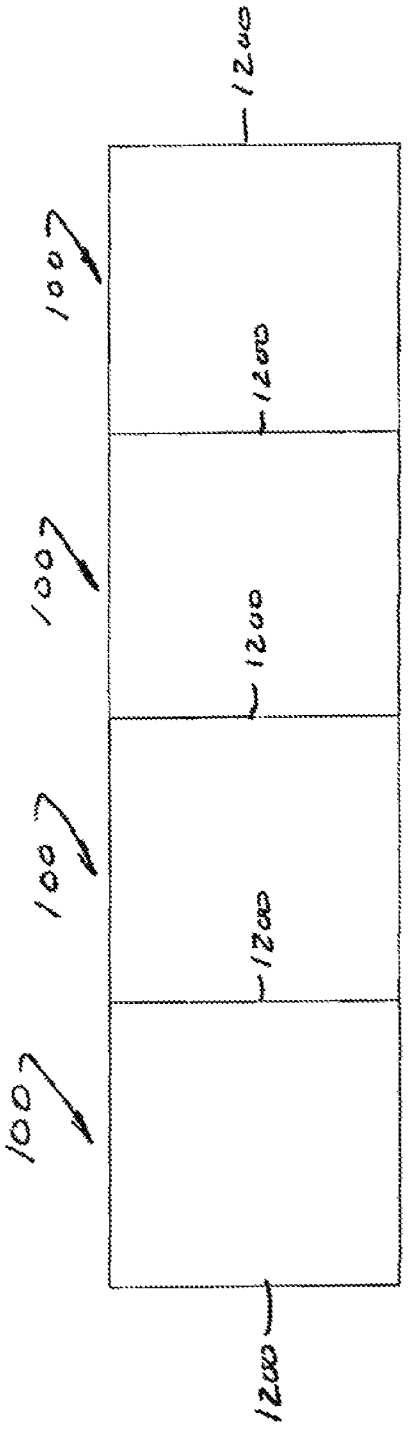
FIG. 23 depicts a plan view of a side-to-side configuration of multiple bases of FIG. 1.

FIG. 23 shows a side-by-side configuration of four bases 100. In the configuration shown, three side panels 1200 may be shared by four bases 100.

Figure 24:
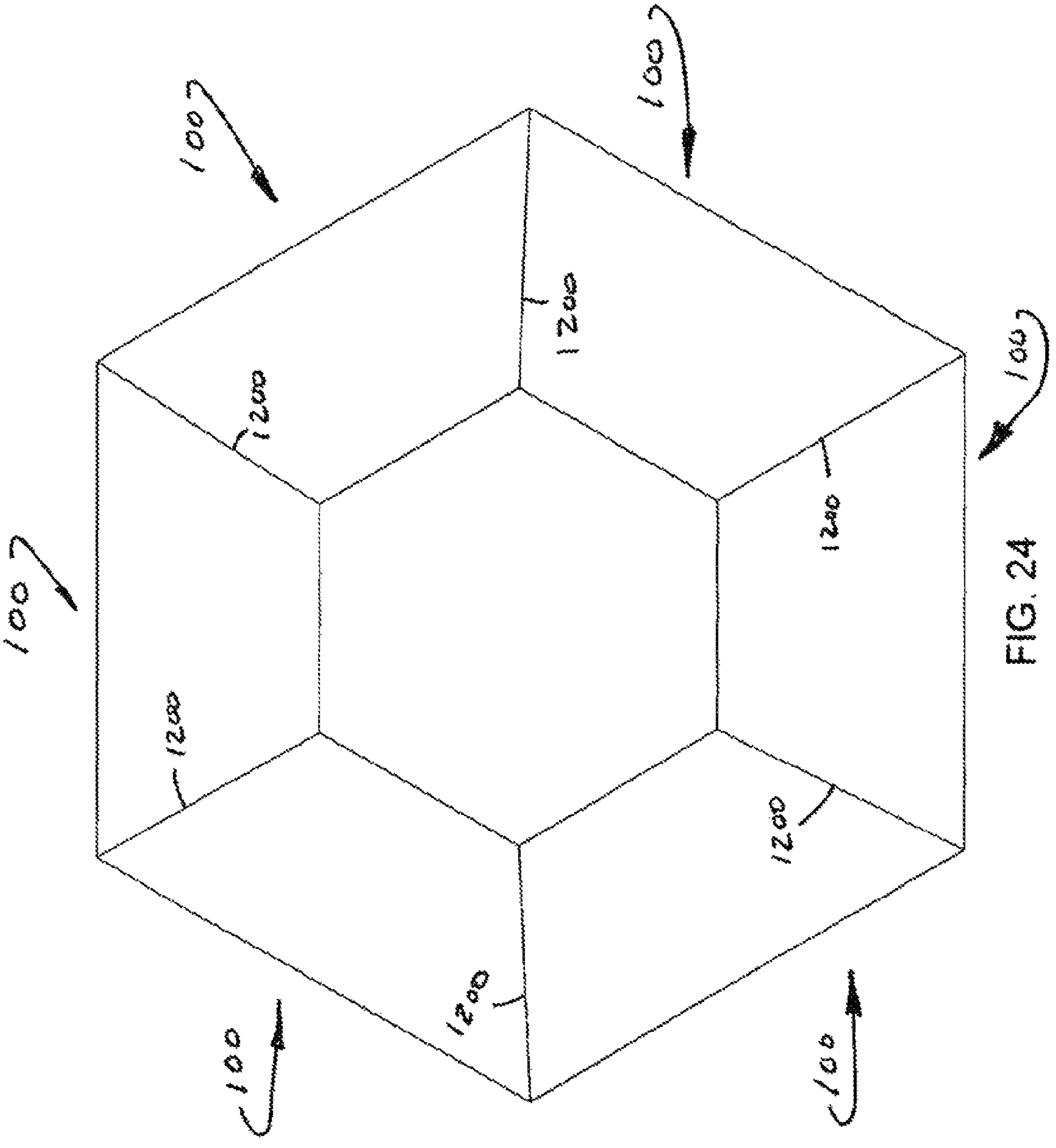
FIG. 24 depicts a plan view of a circular configuration of multiple bases of FIG. 1.

FIG. 24 shows a circular configuration of six bases 100. In this configuration, six side panels 1200 may be shared by six bases 100.

Figure 25:
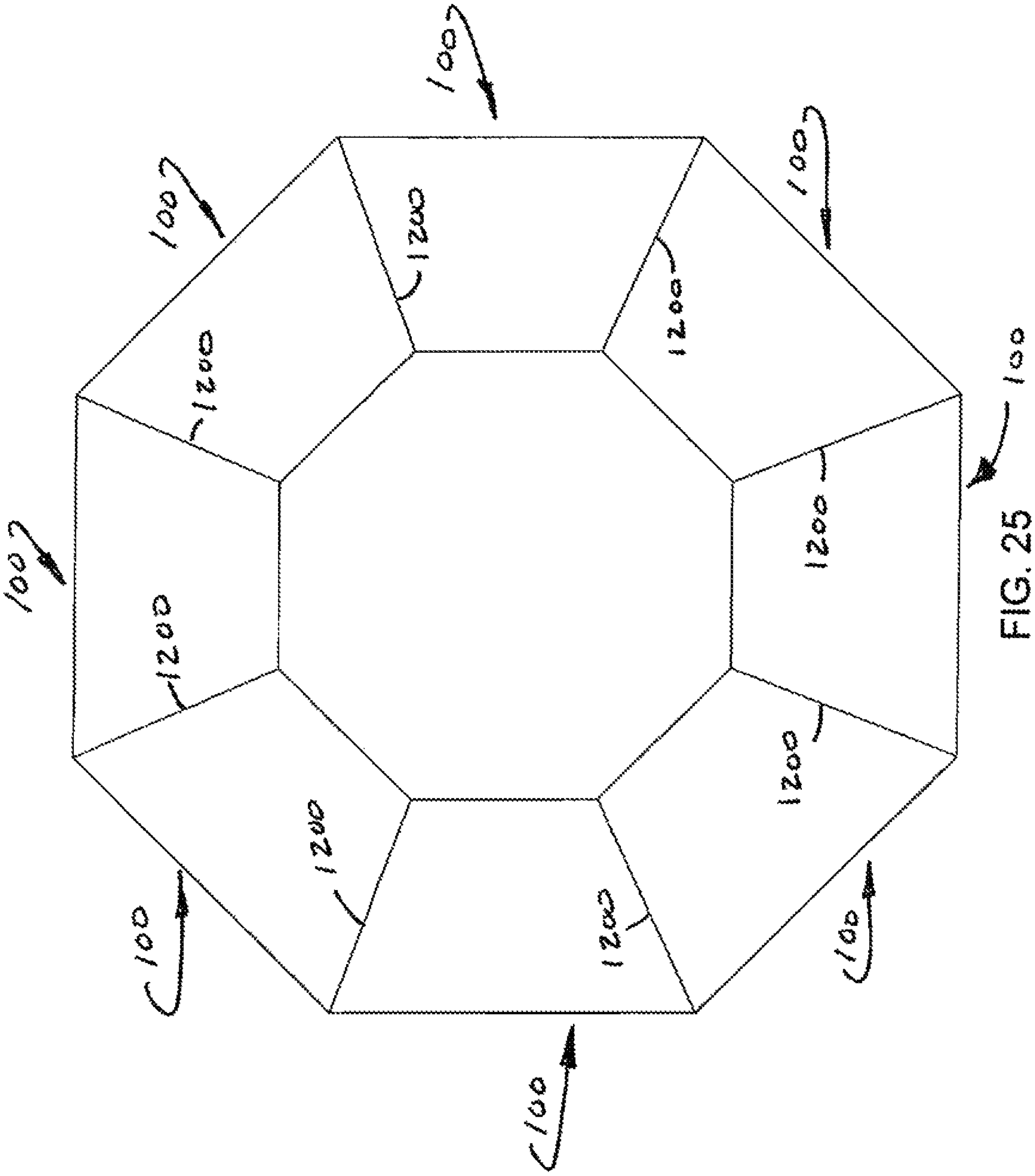
FIG. 25 depicts a plan view of another circular configuration of multiple bases of FIG. 1.
Figure 27:
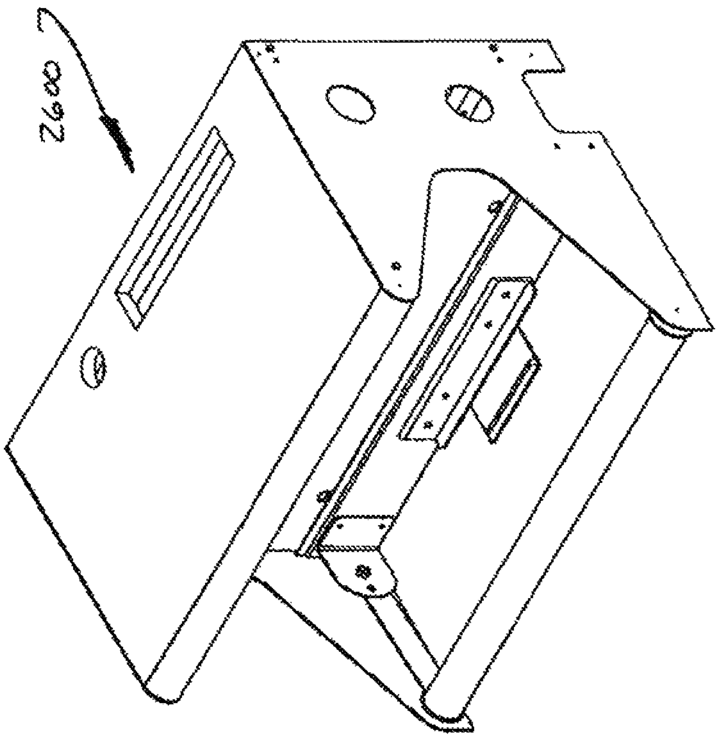
FIG. 27 depicts a front perspective view of the base of FIG. 26.
Figure 26:
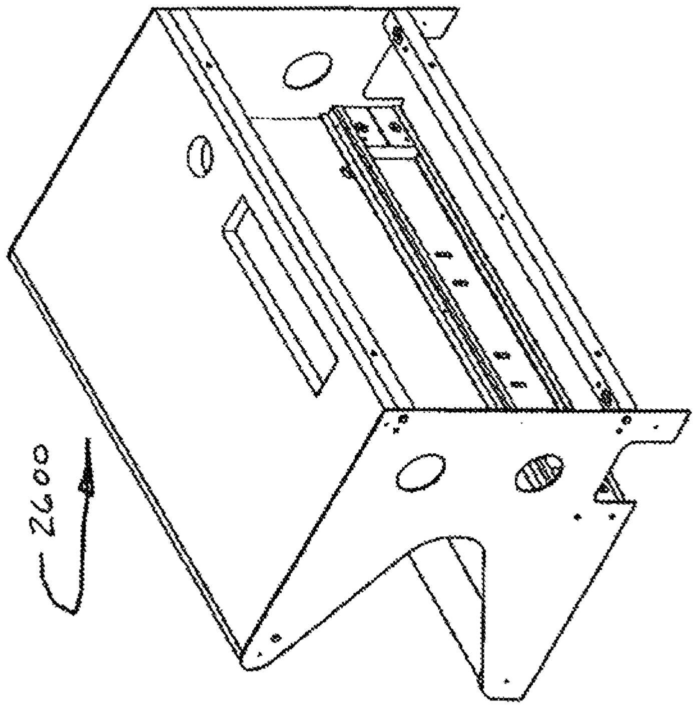
FIG. 26 depicts a rear perspective view of another embodiment of the base of the instant invention.
Figure 28:
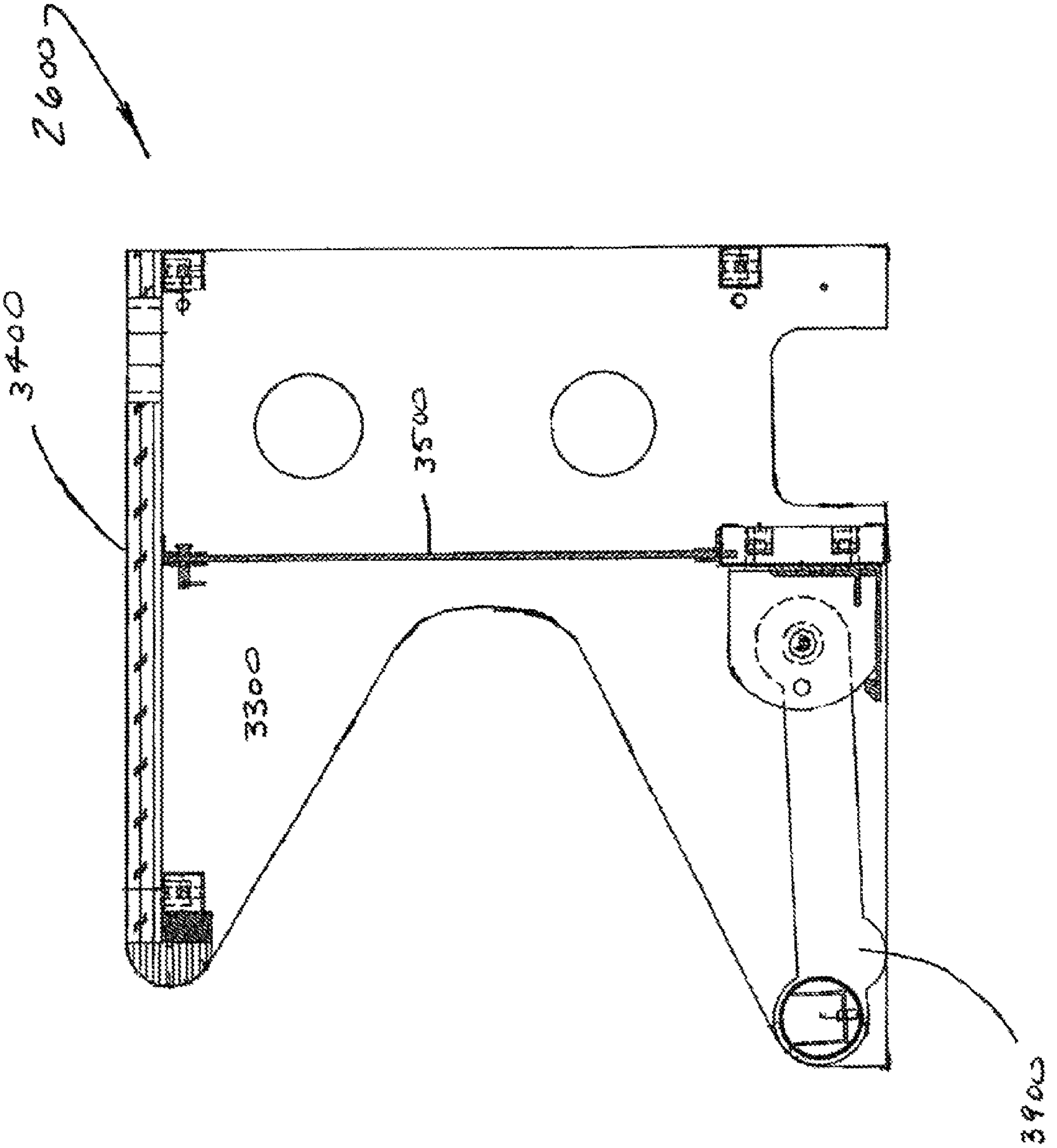
FIG. 28 depicts a cross-sectional end view of the base of FIG. 26.
Figure 29B:
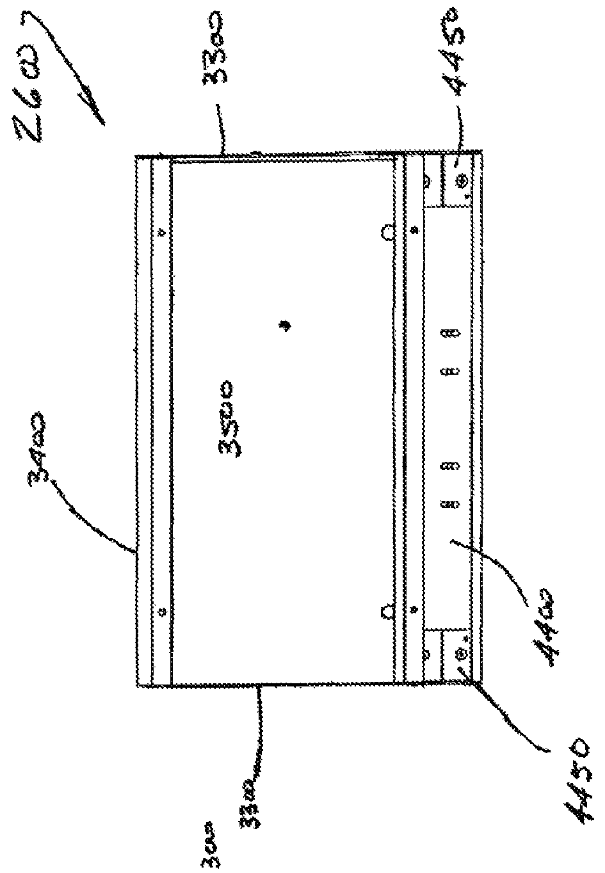
FIGS. 29A and 29B depict front and rear views, respectively, of the base of FIG. 26.
Figure 29A:
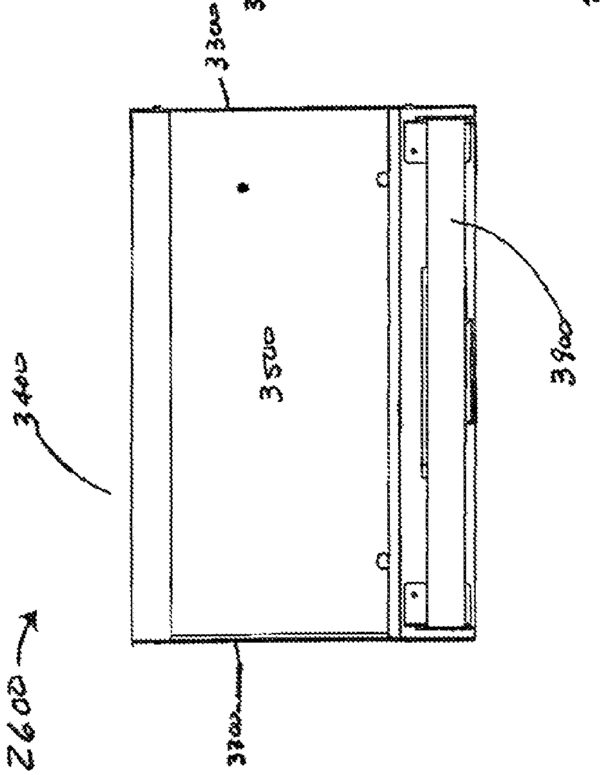
Figure 30:
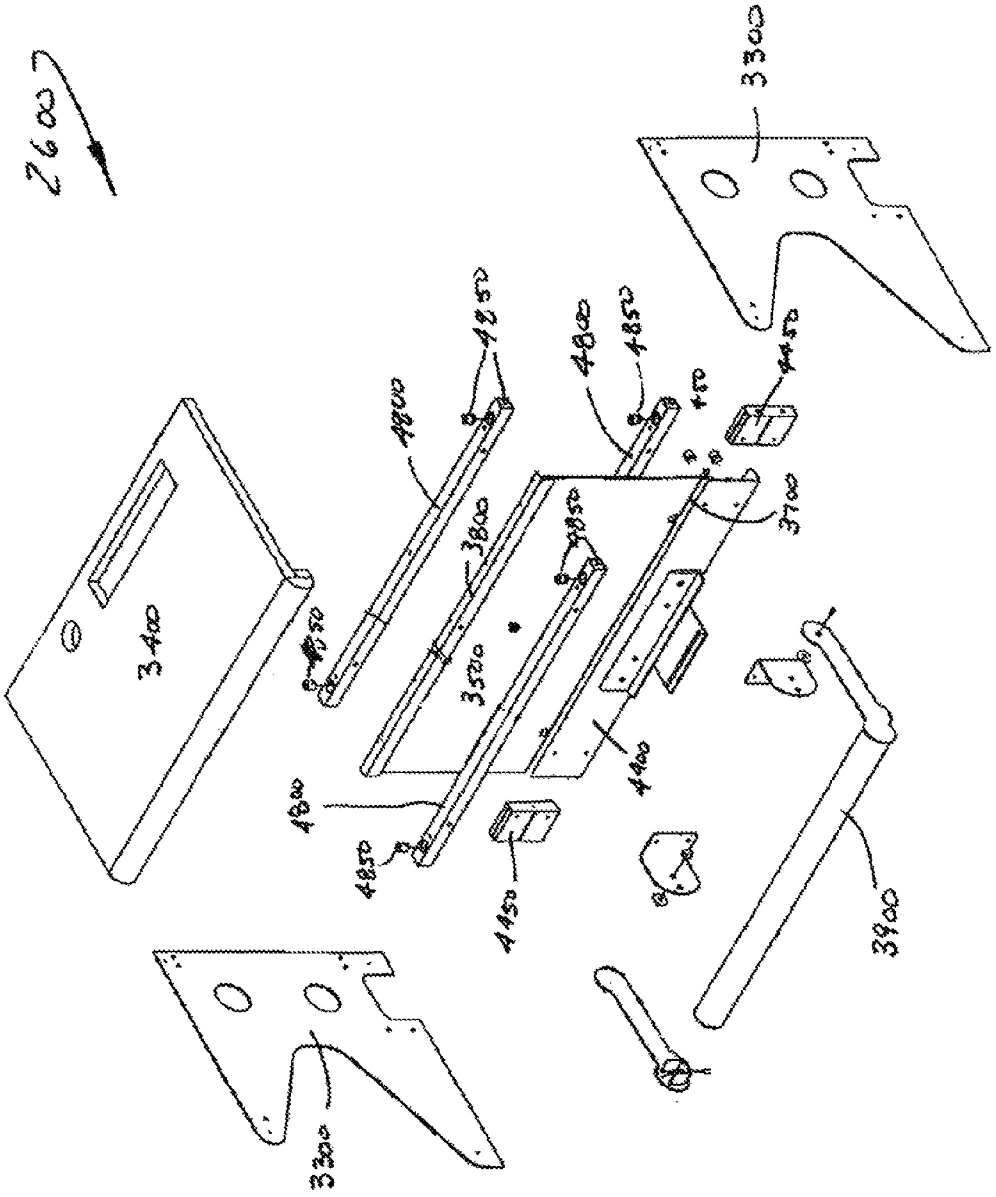
FIG. 30 depicts an exploded view of the base of FIG. 26.
Figure 31B:
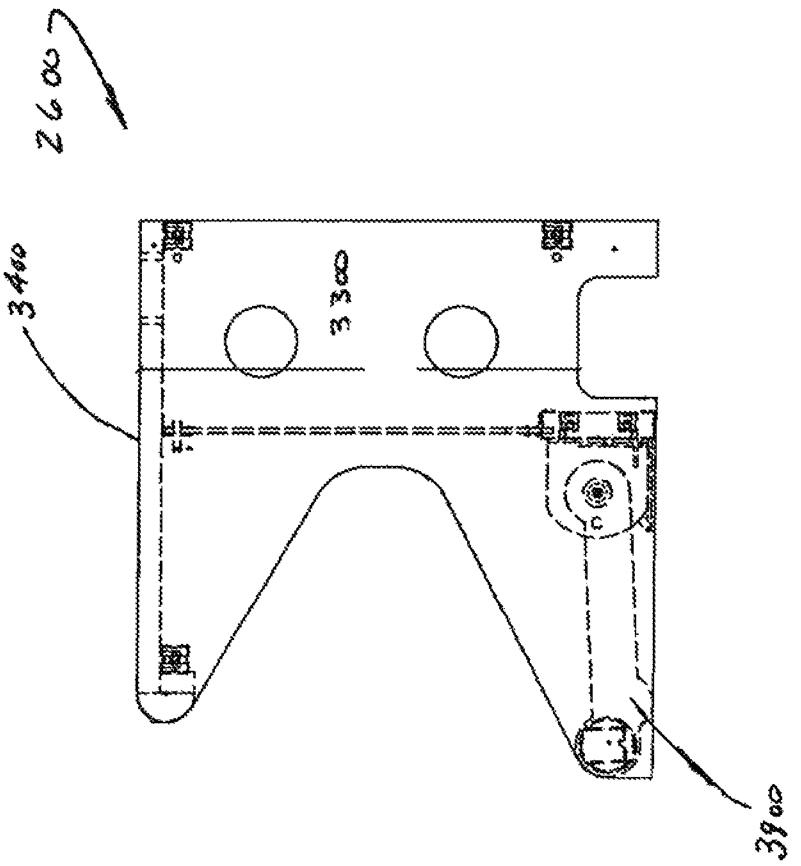
FIG. 31B depicts a side view of the base of FIG. 26 with the foot rest in the open position.
Figure 31A:
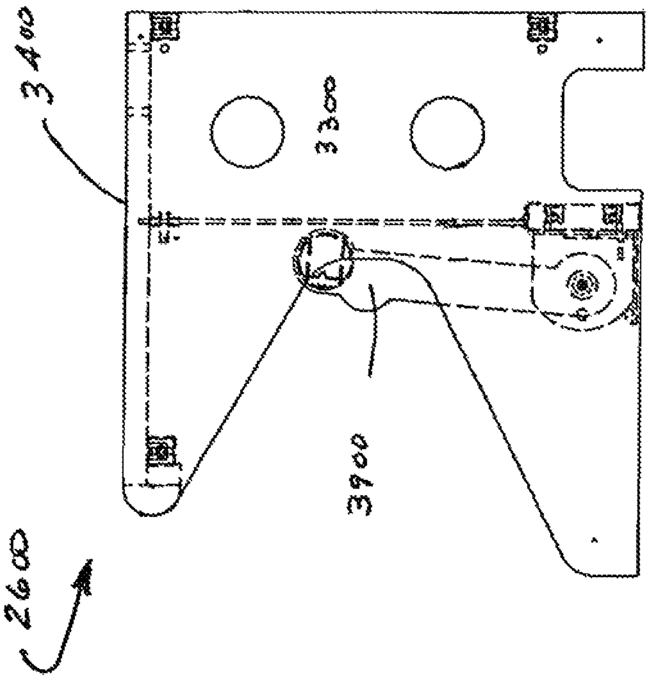
FIG. 31A depicts a side view of the base of FIG. 26 with the foot rest in the closed position.
Figure 32:
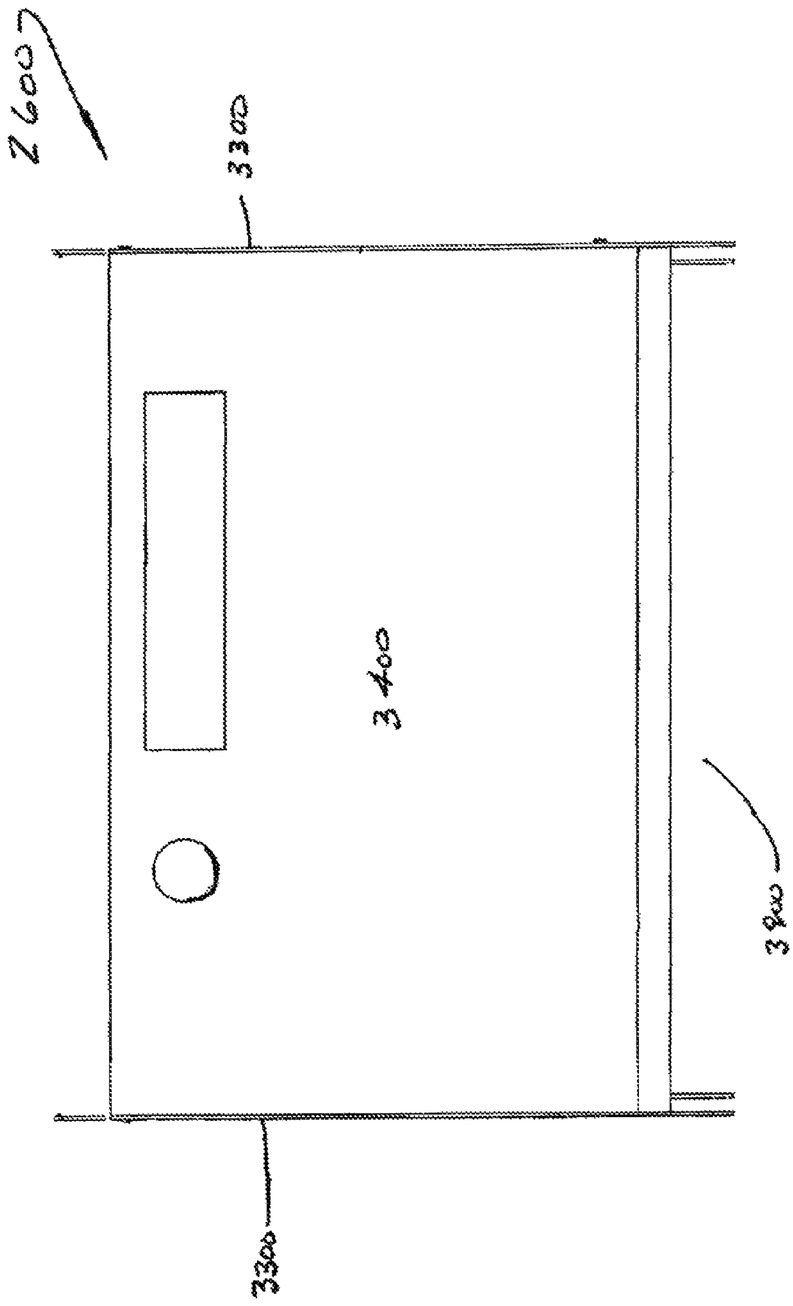
FIG. 32 depicts a plan view of the base of FIG. 26.
Figure 33:
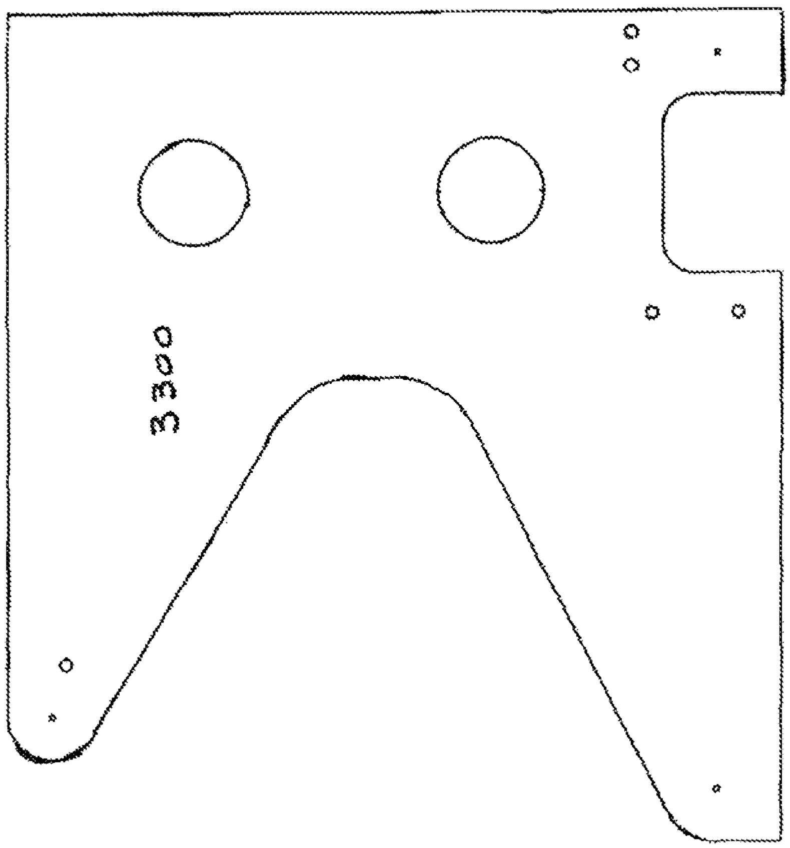
FIG. 33 depicts an elevation view of a side panel of the base of FIG. 26.
Figure 34A:
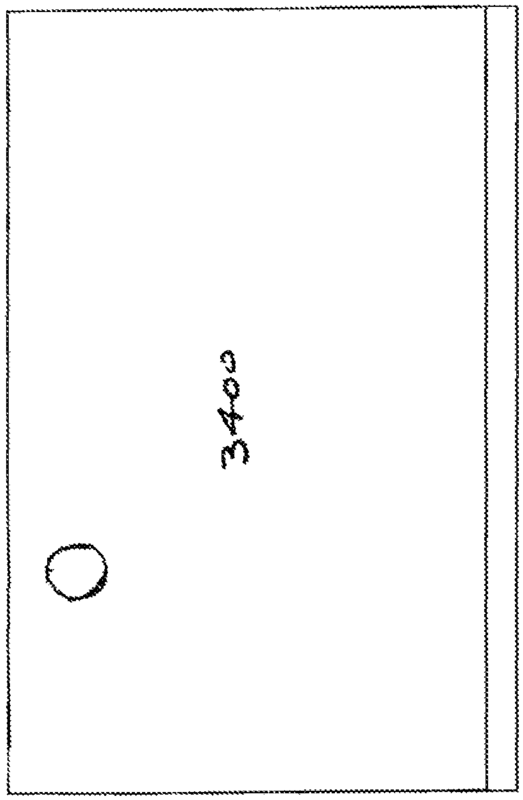
FIG. 34A depicts a top view of the countertop of the base of FIG. 26.
Figure 34B:
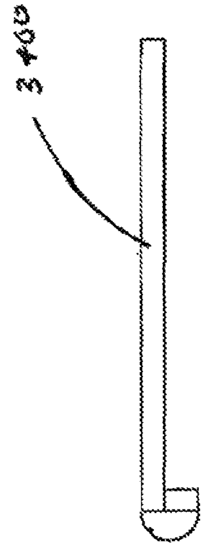
FIG. 34B depicts a side view of the countertop of the base of FIG. 26.
Figure 35:
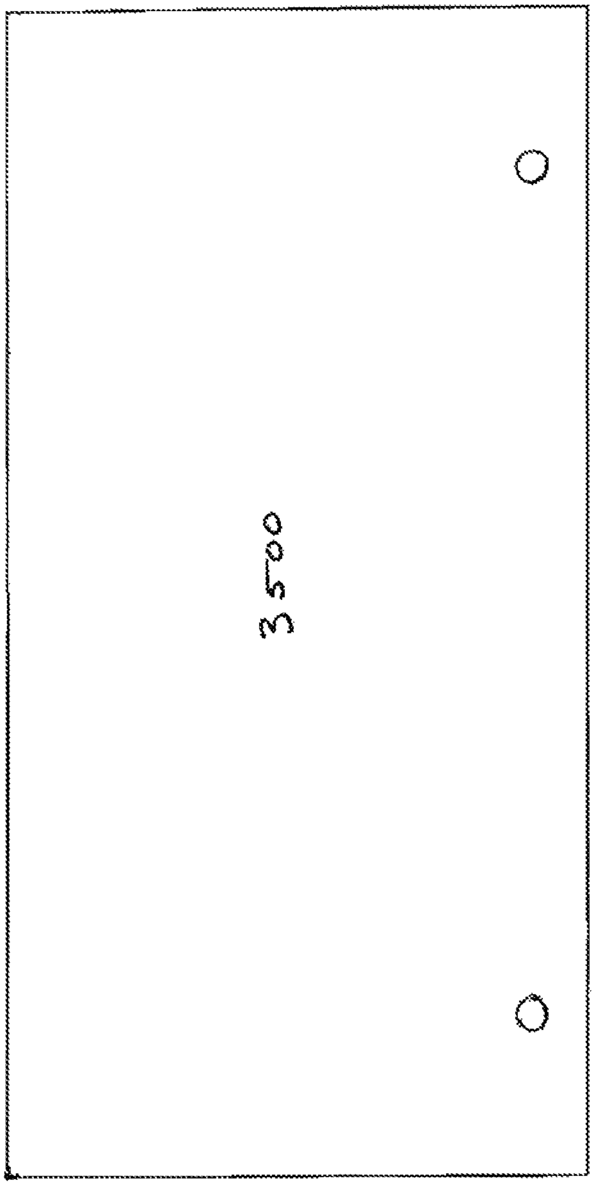
FIG. 35 depicts a front view of the access door of the base of FIG. 26.
Figure 36:
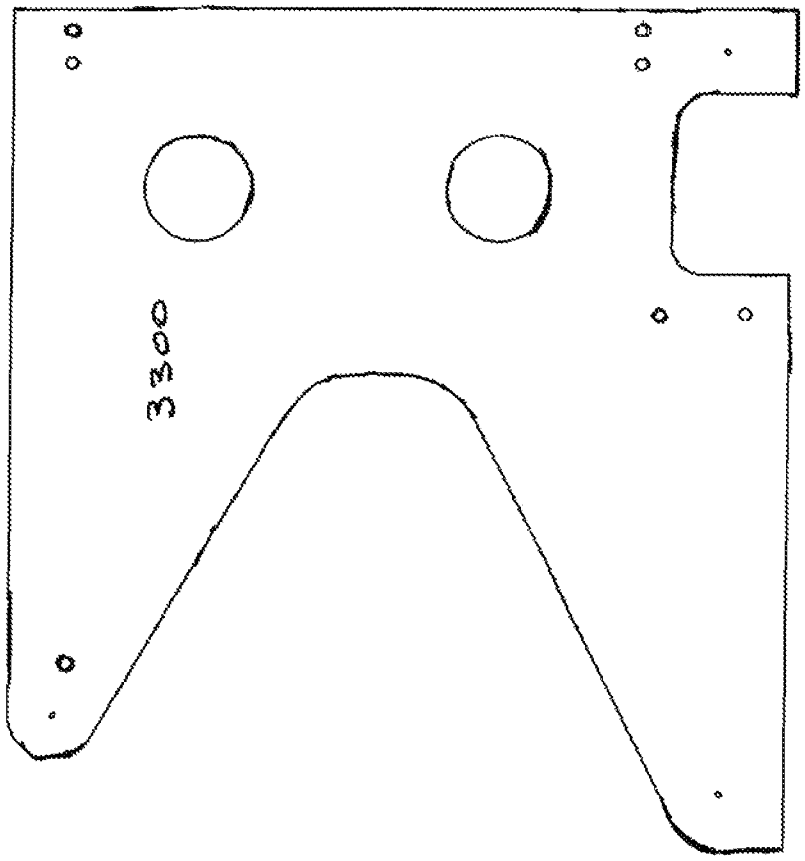
FIG. 36 depicts an elevation view of a side panel of the base of FIG. 26.
Figure 37B:
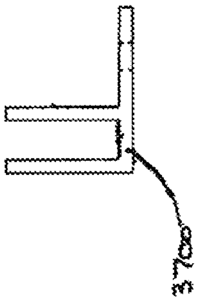
FIGS. 37A and 37B depict a top and end view, respectively, of the bottom channel of the base of FIG. 26.
Figure 37A:
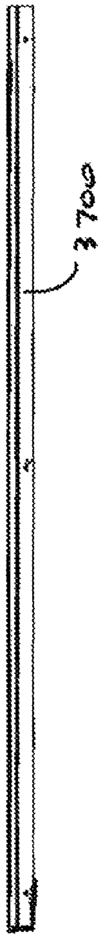
Figure 38B:
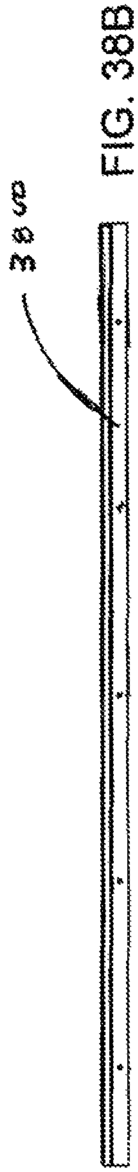
FIGS. 38A, 38B, and 38C depict the front, top, and end views, respectively, of the top channel of the base of FIG. 26.
Figure 38A:
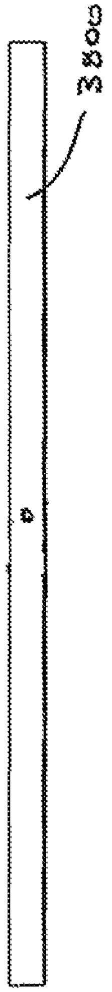
Figure 38C:
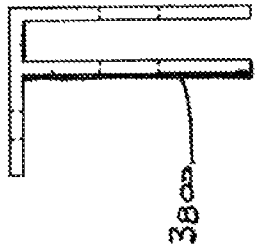
Figure 40A:
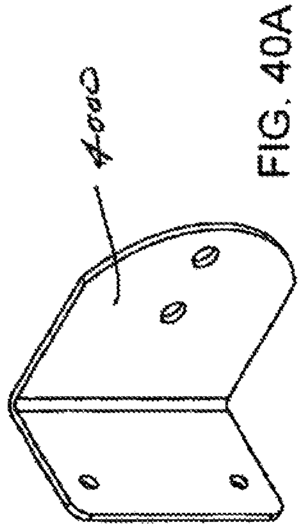
FIGS. 40A, 40B, 40C, and 40D depict perspective, plan, rear and side views, respectively, of the foot rest mounting bracket of the base of FIG. 26.
Figure 40D:
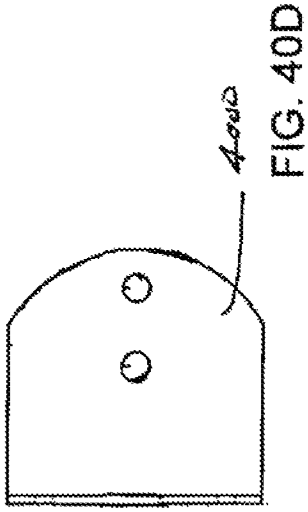
Figure 40B:
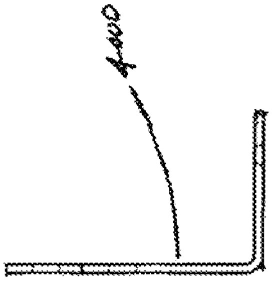
Figure 40C:
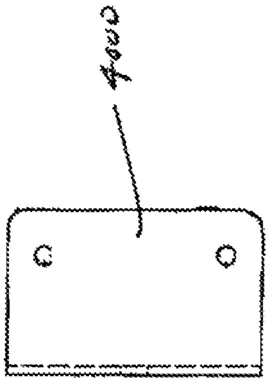
Figure 42A:
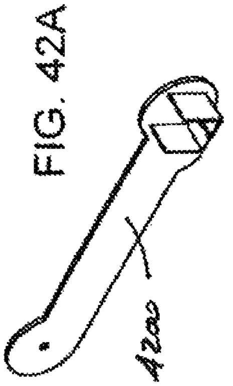
FIGS. 42A, 42B, 42C, and 42D depict inner side perspective, outer side perspective, elevation and bottom views, respectively, of the left hand arm of the foot rest of the base of FIG. 26.
Figure 42B:
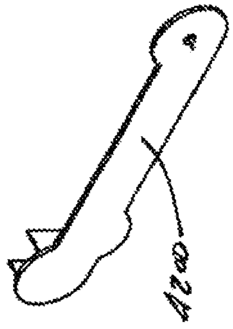
Figure 42C:
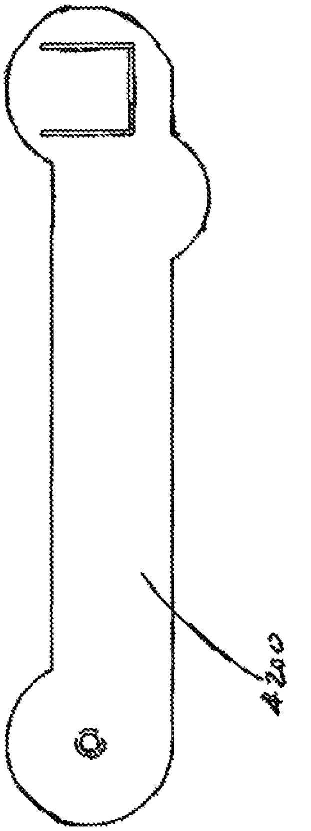
Figure 42D:
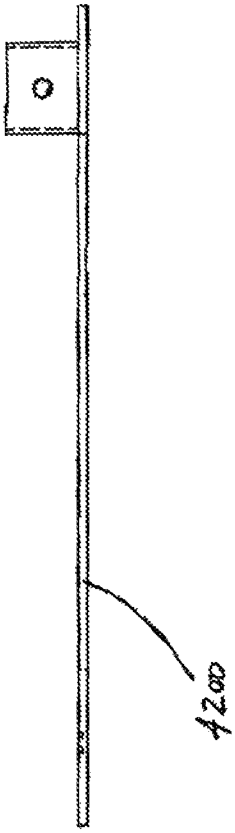
Figure 43A:
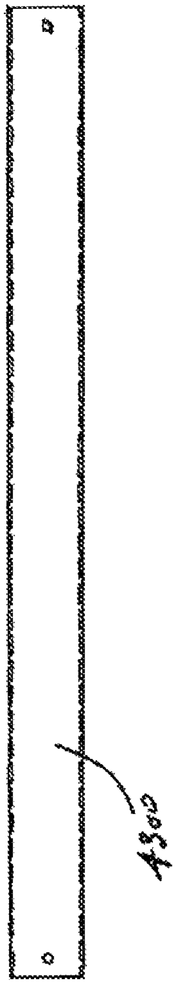
FIGS. 43A and 43B depict bottom and side views, respectively, of the foot rest tube of the foot rest of the base of FIG. 26.
Figure 43B:
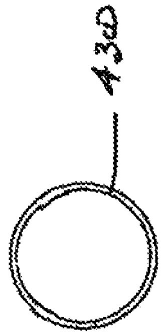
Figure 44A:
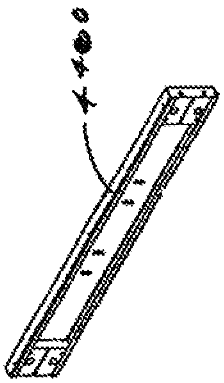
FIGS. 44A, 44B, 44C, and 44D depict perspective, plan, rear and cross-sectional A-A views of the kick plate channel of the base of FIG. 26 having mounting inserts inserted therein.
Figure 44D:
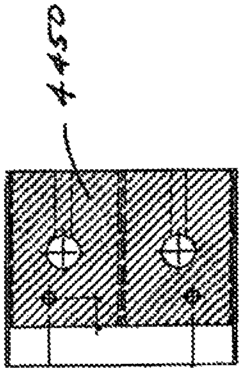
Figure 44B:
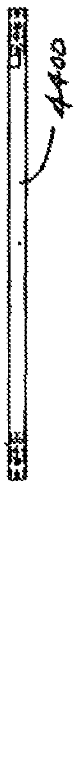
Figure 44C:
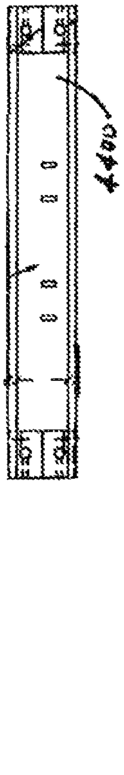
Figure 45A:
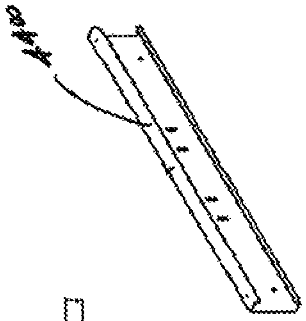
FIGS. 45A, 45B, 45C, 45D and 45E depict perspective, plan, front, detail and cross-sectional 1-1 views, respectively, of the kick plate channel of the base of FIG. 26.
Figure 45B:
Figure 45C:
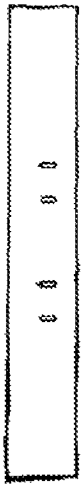
Figure 45D:
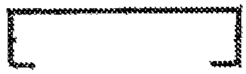
Figure 45E:
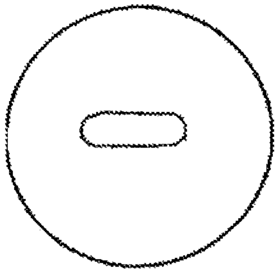
Figure 46A:
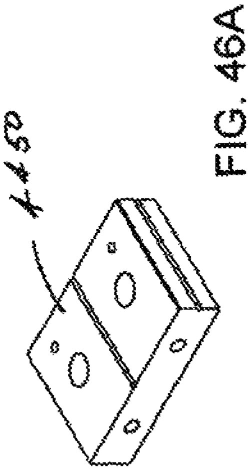
FIGS. 46A, 46B, 46C, and 46D depict perspective, plan, end and cross-sectional C-C views, respectively, of the kick plate mounting inserts of the base of FIG. 26.
Figure 46D:
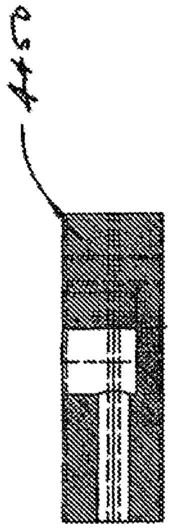
Figure 46B:
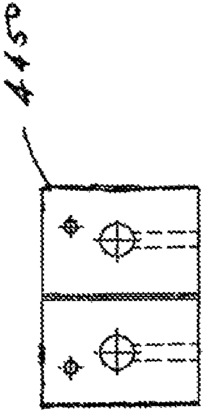
Figure 46C:
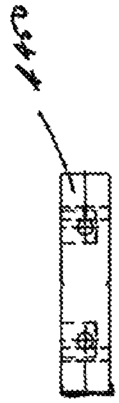
Figure 47A:
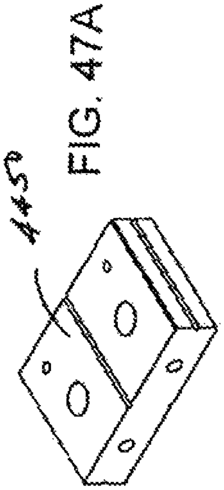
FIGS. 47A, 47B, 47C, and 47D depict perspective, plan, end and cross-sectional D-D views, respectively, of the kick plate mounting inserts of the base of FIG. 26.
Figure 47B:
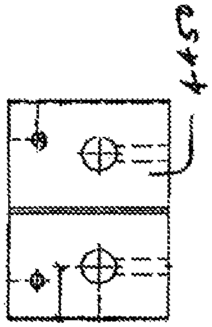
Figure 47C:
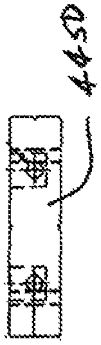
Figure 47D:
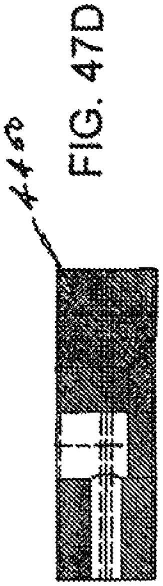
Figure 48A:
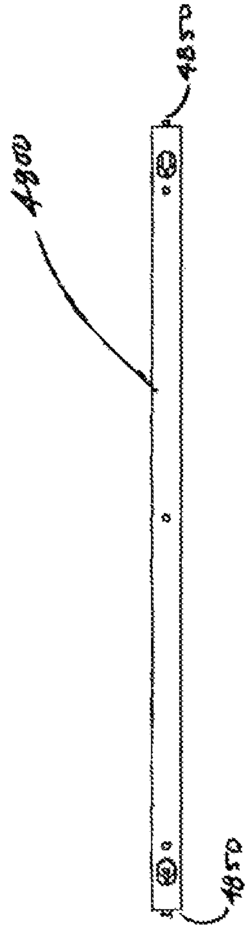
FIGS. 48A, 48B, and 48C depict plan and cross-sectional views A-A and B-B, respectively, of the tube assembly of the base of FIG. 26 having channel inserts inserted therein.
Figure 48B:
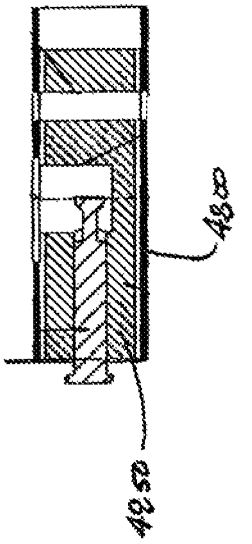
Figure 48C:
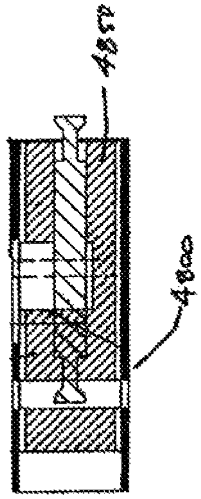
Figure 49A:
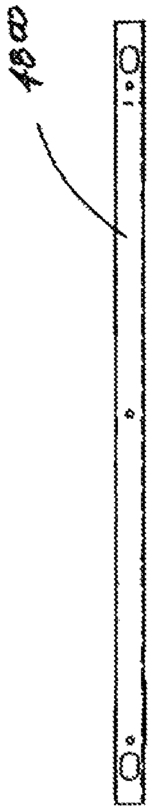
FIGS. 49A, 49B, 49C, and 49D depict plan, front and detail views A and B, respectively, of the tube assembly of the base of FIG. 26 before channel inserts are inserted therein.
Figure 49B:
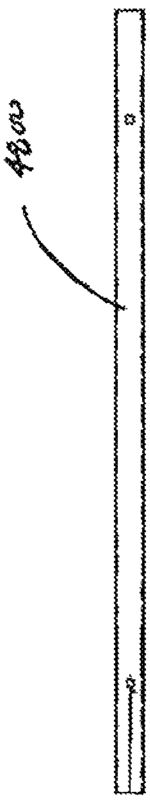
Figure 49D:
Figure 49C:
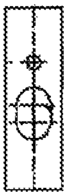
Figure 50A:
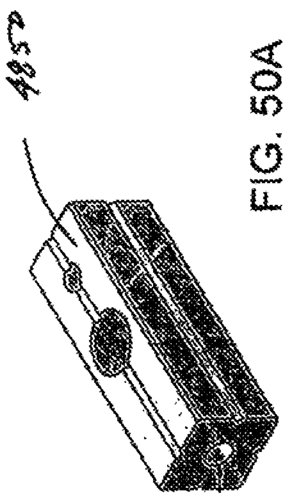
FIGS. 50A, 50B, 50C, and 50D depict perspective, plan, side and end views, respectively, of the channel insert of the base of FIG. 26.
Figure 50D:
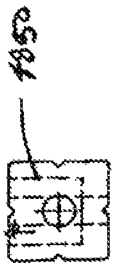
Figure 50B:
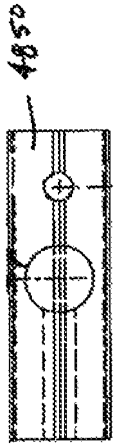
Figure 50C:
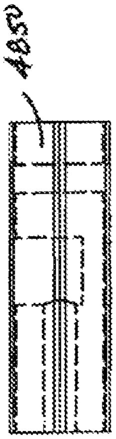
Figure 51A:
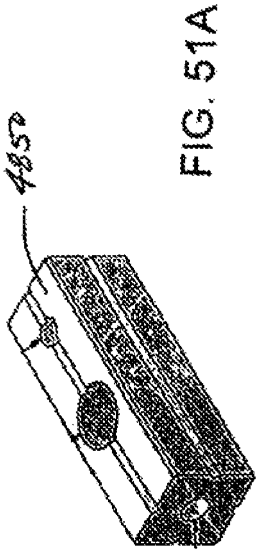
FIGS. 51A, 51B, 51C, and 51D depict perspective, plan, side and end views, respectively, of the channel insert of the base of FIG. 26.
Figure 51D:
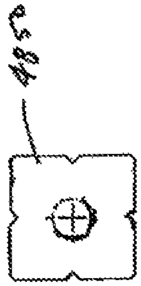
Figure 51B:
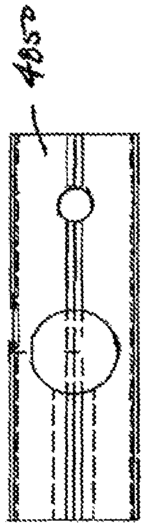
Figure 51C:
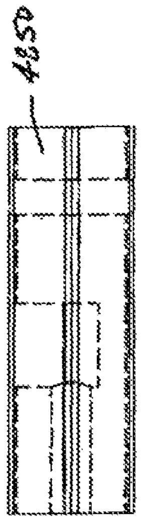
Figure 52:
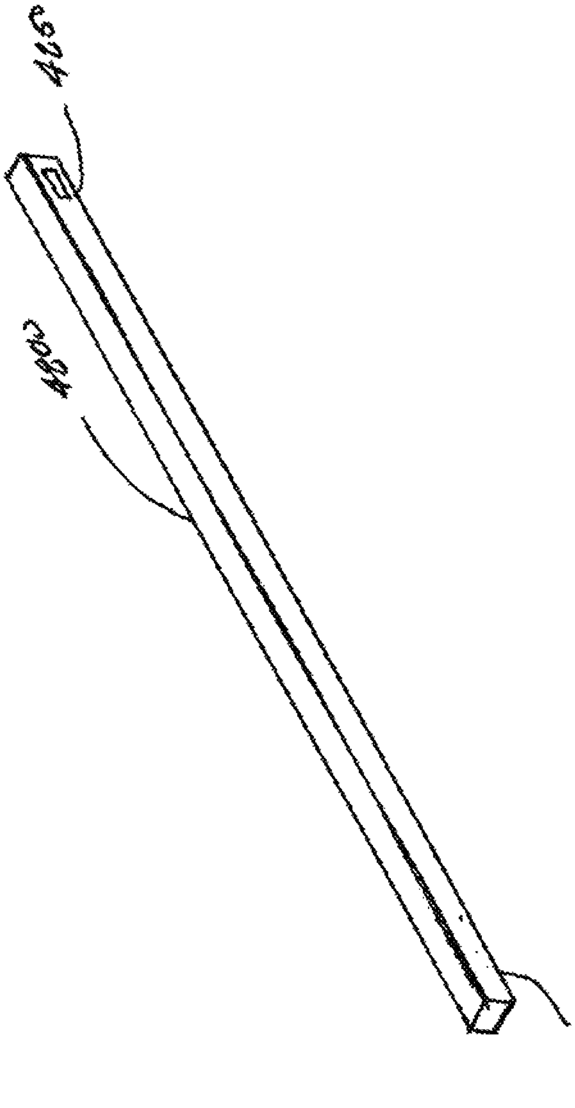
FIG. 52 depicts a perspective view of the tube assembly of the base of FIG. 26 having tube inserts mounted therein.
Figure 53:
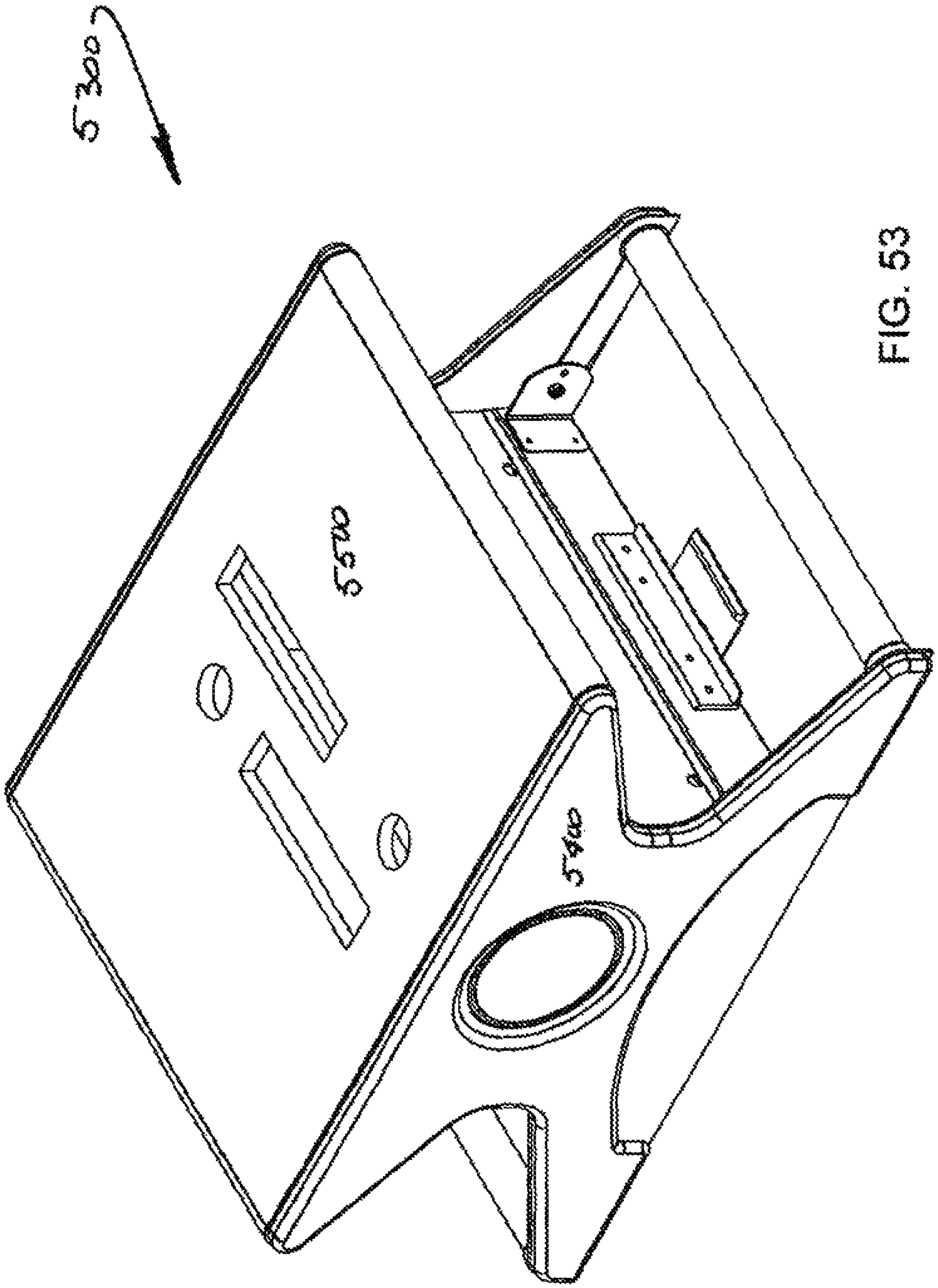
FIG. 53 depicts a perspective view of another embodiment of the base of the instant invention.
Figure 54:
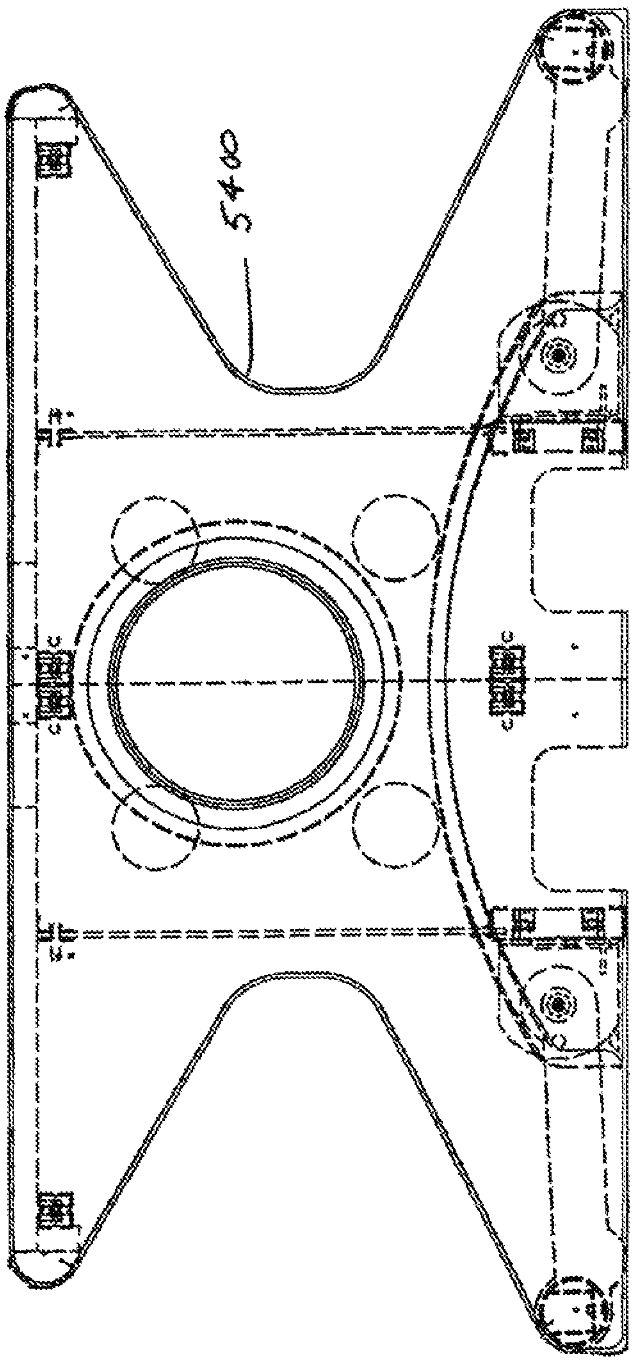
FIG. 54 depicts a side view of the base of FIG. 53.
Figures 55A, 55B:
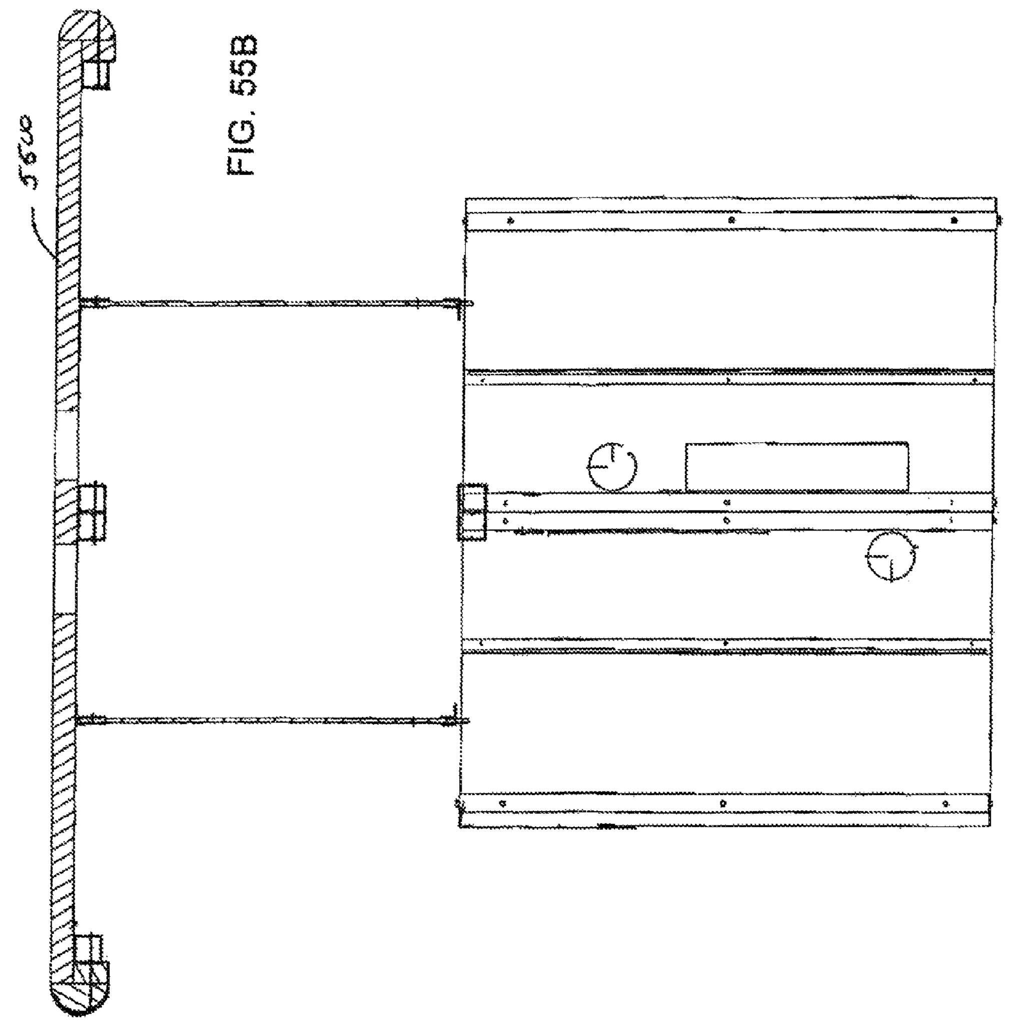
FIGS. 55A and 55B depict top and cross sectional views, respectively, of the base of FIG. 53.
Figure 56:
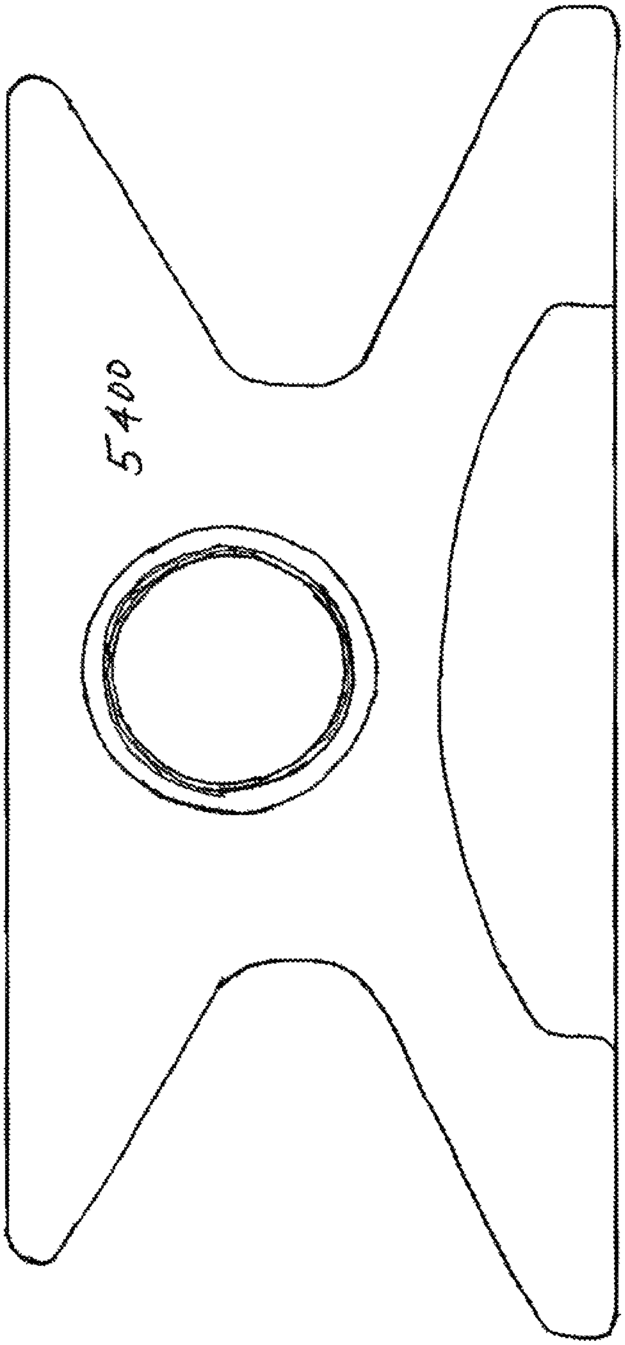
FIG. 56 depicts a front view of an end panel of the base of FIG. 53.
Figure 58:
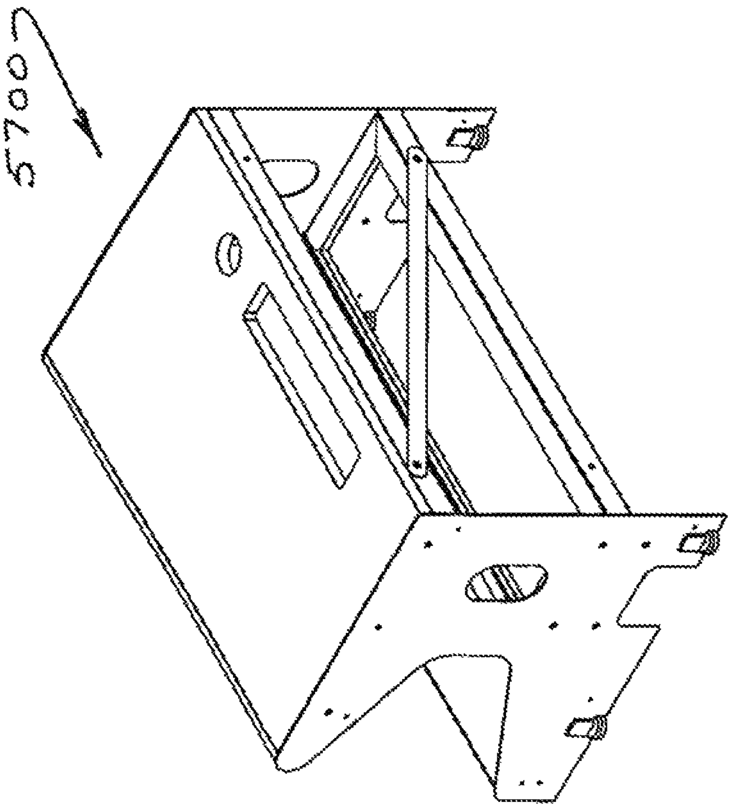
FIG. 58 depicts a rear perspective view of the base of FIG. 57.
Figure 57:
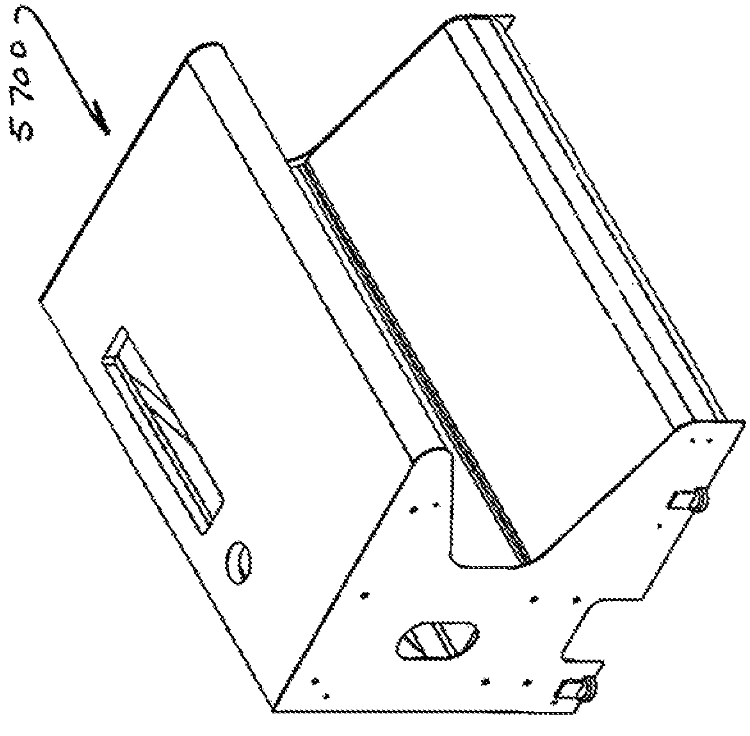
FIG. 57 depicts a front perspective view of another embodiment of the base of the instant invention.
Figure 59:
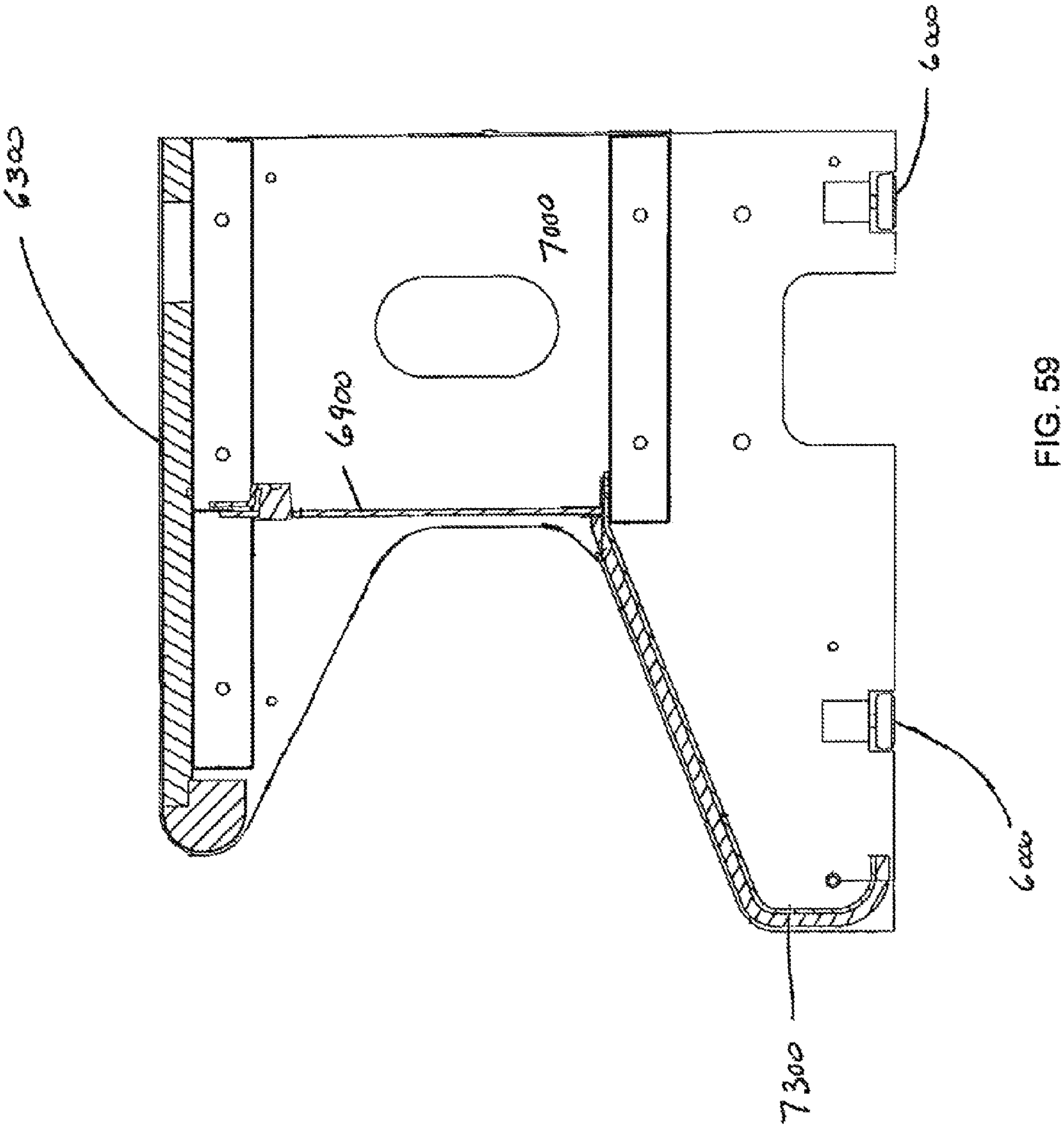
FIG. 59 depicts a cross-sectional end view of the base of FIG. 57.

FIG. 25 shows a circular configuration of eight bases 100. In this configuration, eight side panels 1200 may be shared by eight bases 100.

In each of the configurations shown in FIGS. 22, 23, 24 and 25, top surface 1000 of each of bases 100 may be removed to access the utility area bounded by side panels 1200 and front cover panel 1100. Front cover panel 1100 may also, optionally, be removed. Removal of top surface 1000 (and, optionally, cover panel 1100) permits simultaneous access to the utility areas of each of bases 100, allowing for ease in installation and maintenance of bases 100 and the devices supported by bases 100. Additional embodiments, arrangements and configurations of base 100 are shown at A-1 through A-43 of Appendix A.

FIGS. 26 through 52 depict another embodiment of the present invention. This embodiment utilizes an interlocking cam system for assembling the components of base 2600.

The interlocking cam system is shown in FIGS. 30, 44, 46, 47, 48, 50, 51, and 52. FIGS. 44, 46, and 47 depict cam system 4450 utilized with kick plate 4400. FIGS. 48, 50, 51, and 52 depict cam system 4850 utilized with tube assemblies 4800. These cam systems allow for the quick assembly and disassembly of base 2600. This cam system may also be adapted to any of the embodiments disclosed or contemplated based on the disclosure herein.

FIGS. 53 through 56 depict yet another embodiment of this invention, designated as base 5300. This embodiment is a partial unitary back-to-back configuration of two bases similar to base 100. In this arrangement or configuration (also shown in Exhibit A at A-1 through A-13, A-16 through A-19, A-23, A-24, A-28, and A-31 through A-43 attached hereto) removable top surface 5500 is unitary across the two bases similar to base 100. The two bases similar to base 100 are placed back-to-back and an end panel 5400 is placed over a side panel (not shown) similar to side panel 1200. In another embodiment, end panel 5400 may replace end side panels similar to side panel 1200.

FIGS. 57 through 76 depict yet another embodiment of the invention. This embodiment comprises a hybrid ergonomic base designated as base 5700. Base 5700 comprises top surface 6300, opposing side panels 7000, and front panel 6900. Foot rest 7300 may also be provided. Foot rest 7300 may be pitched to any angle but is preferably pitched at an angle with provides for optional ergonomic positioning so that the user of the device placed atop base 5700 experiences the least fatigue and the greatest comfort.

Figure 60:
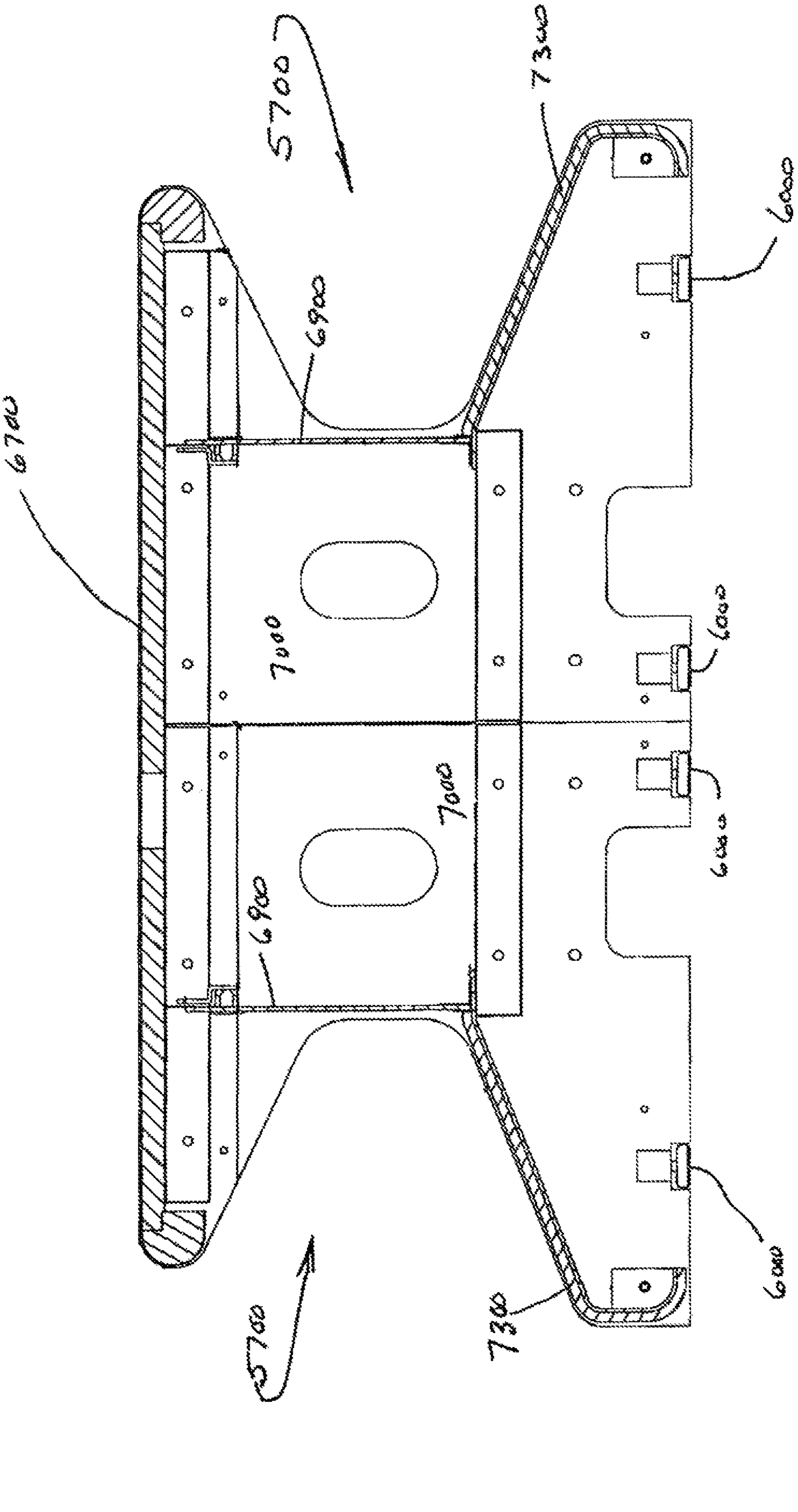
FIG. 60 depicts a cross-sectional end view of two bases of FIG. 57 arranged in a back-to-back configuration.
Figure 62:
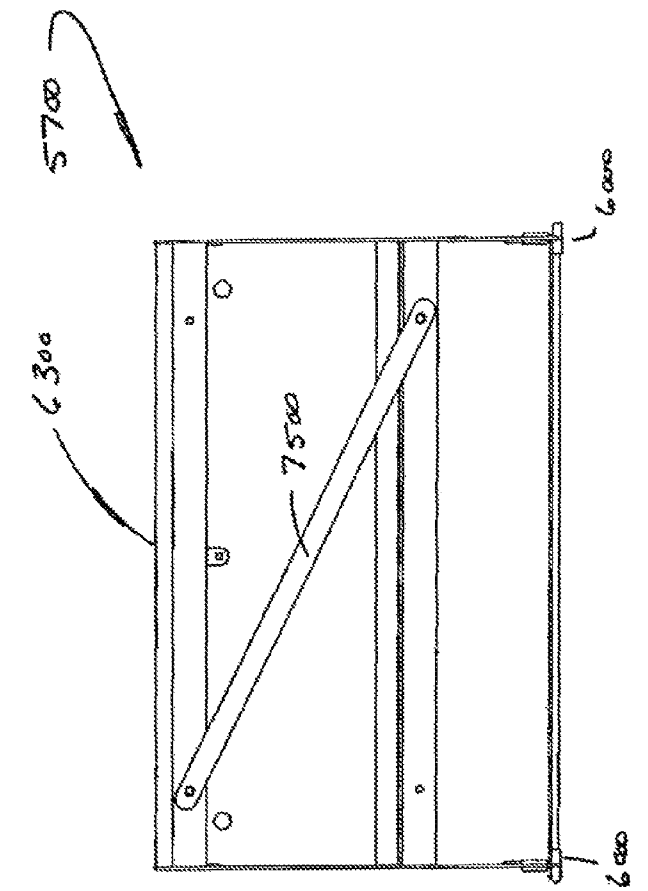
FIG. 62 depicts a rear elevation view of the base of FIG. 57.
Figure 61:
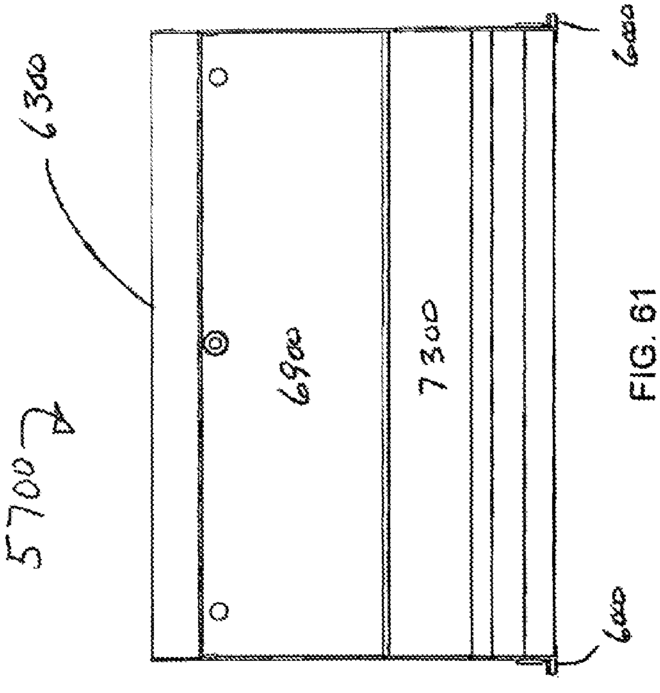
FIG. 61 depicts a front elevation view of the base of FIG. 57.
Figure 63:
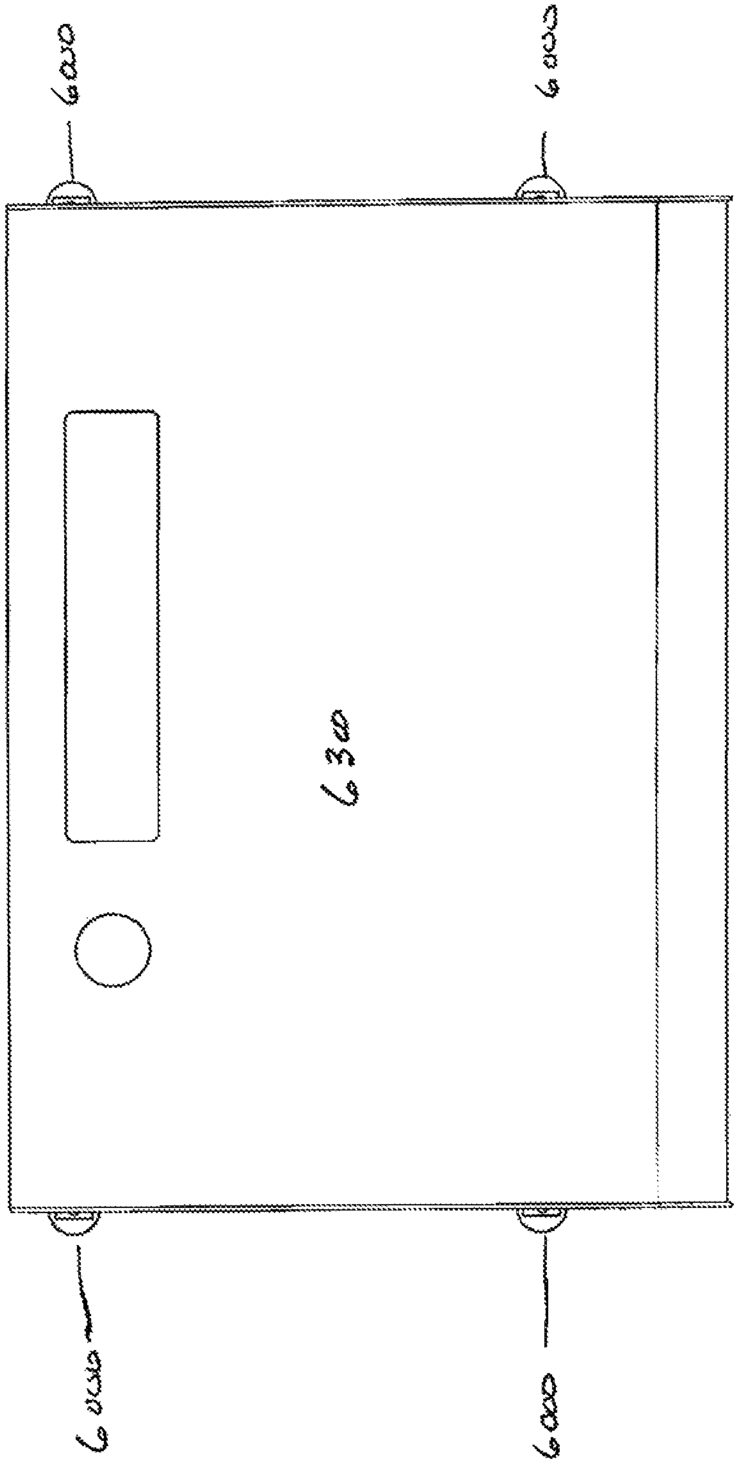
FIG. 63 depicts a plan view of the base of FIG. 57.
Figure 64:
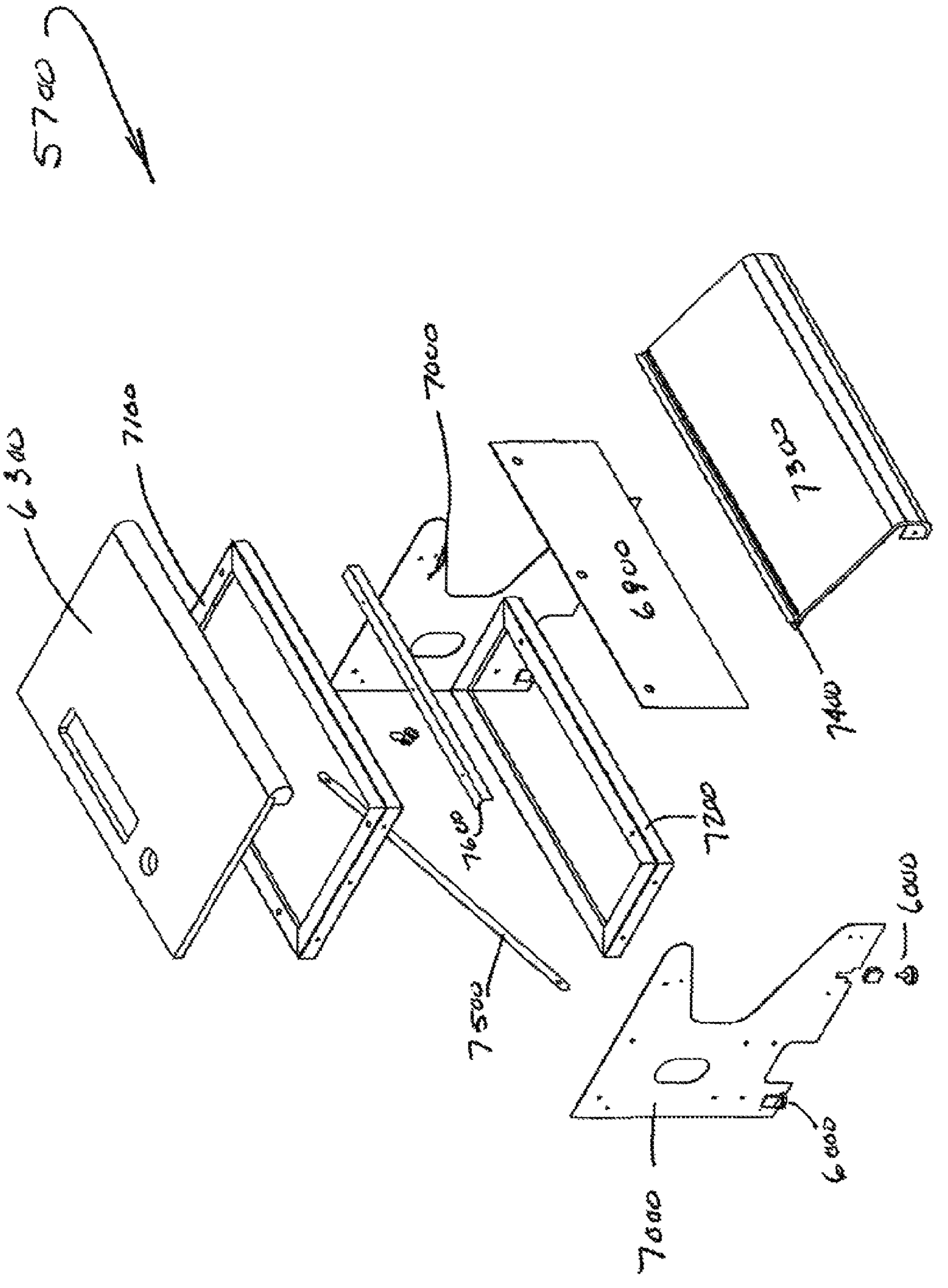
FIG. 64 depicts an exploded view of the base of FIG. 57.
Figure 66:
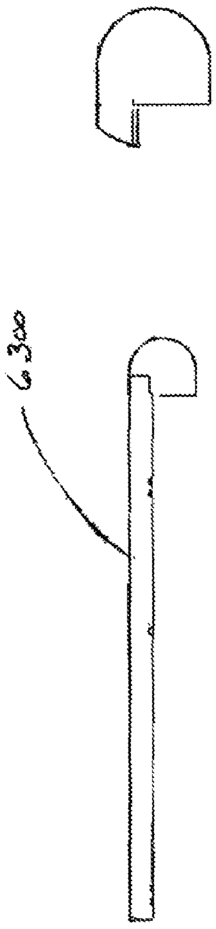
FIG. 66 depicts an end view of the countertop of the base of FIG. 57.
Figure 65:
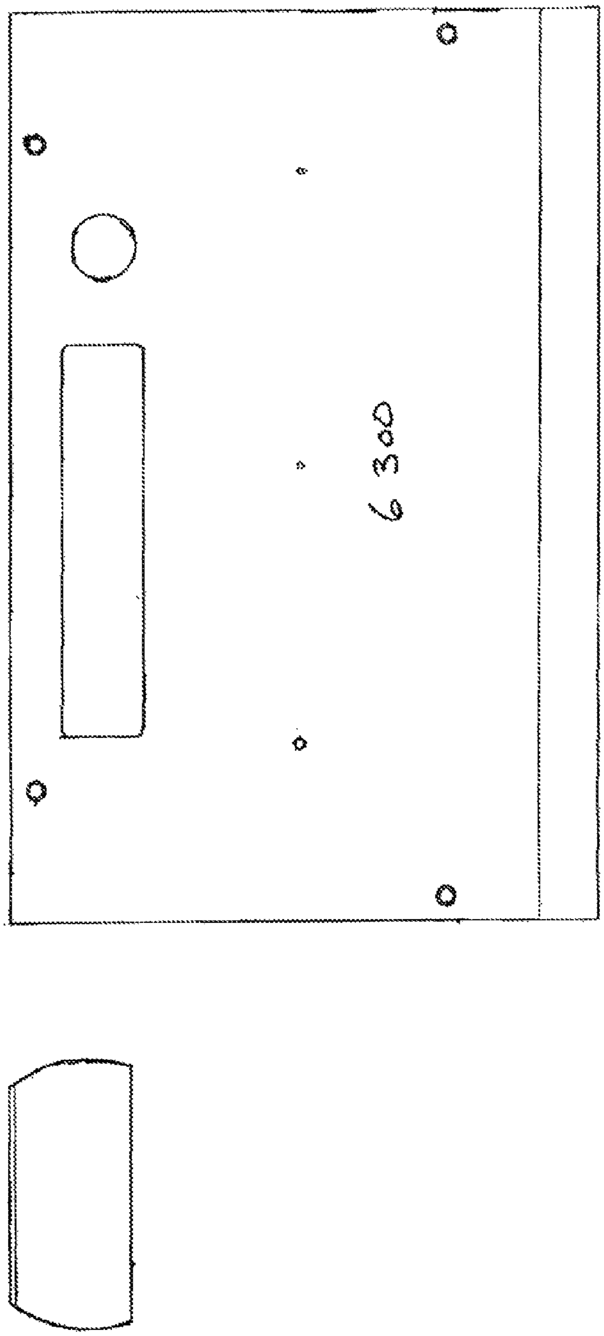
FIG. 65 depicts a bottom view of the countertop of the base of FIG. 57.
Figure 68:
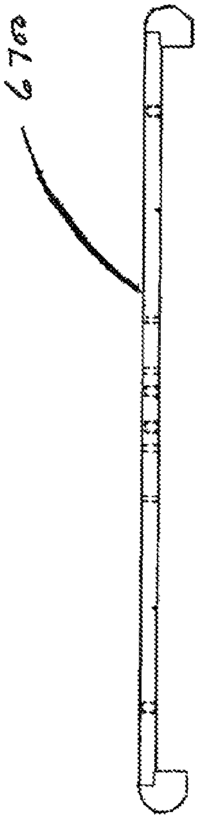
FIG. 68 depicts an end view of the countertop of two bases of FIG. 57 arranged in a back-to-back configuration.
Figure 68:
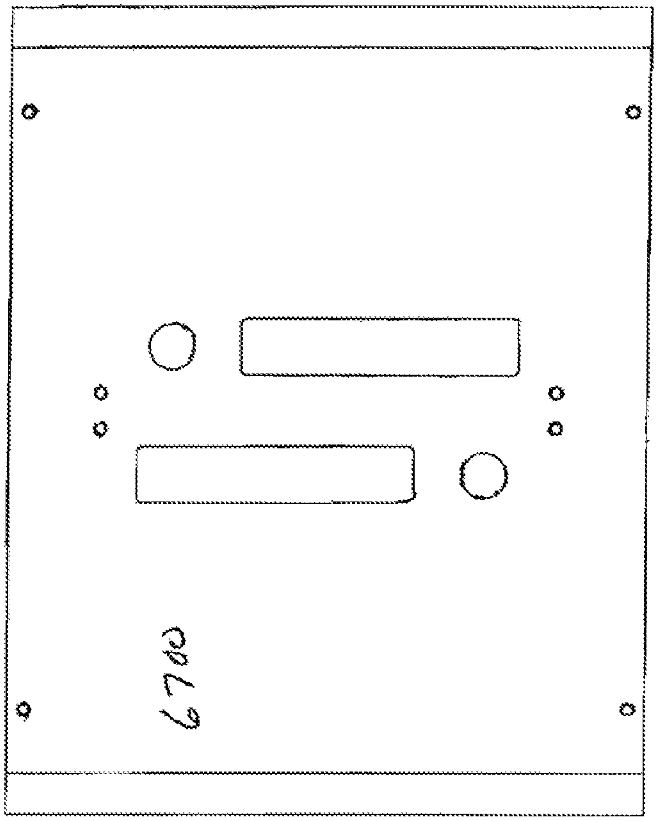
Figure 67:
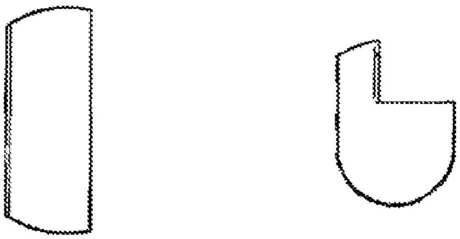
FIG. 67 depicts a bottom view of the countertop of two bases of FIG. 57 arranged in a back-to-back configuration.
Figure 69:
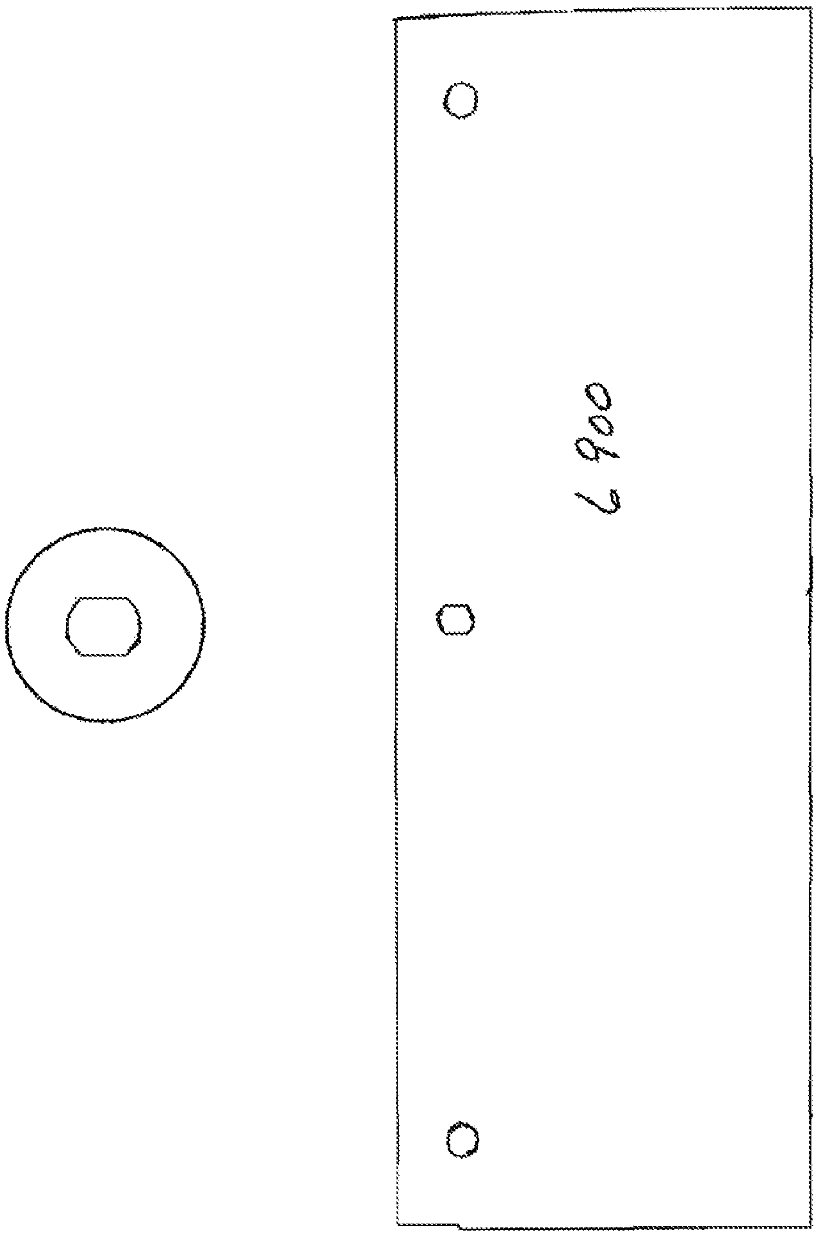
FIG. 69 depicts a front elevation view of the access door of the base of FIG. 57.
Figure 70:
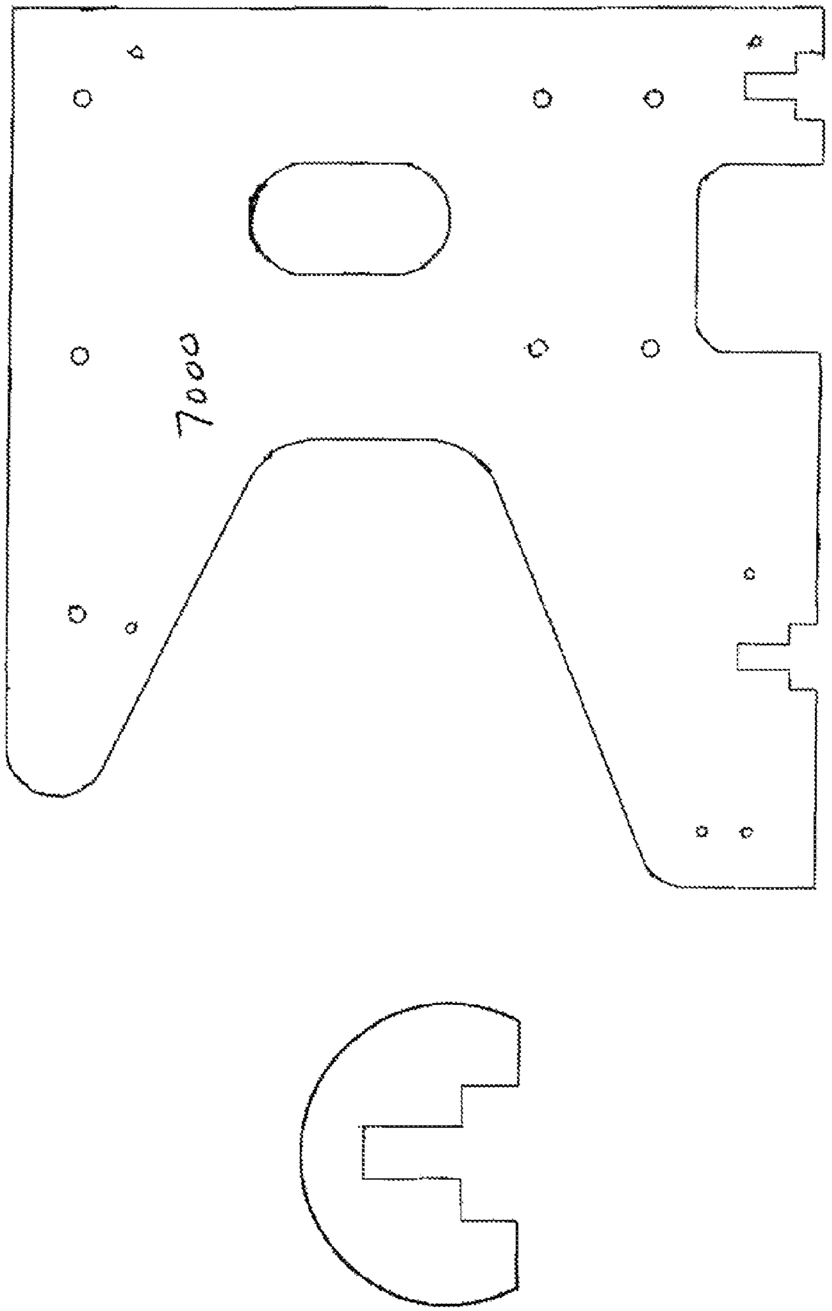
FIG. 70 depicts an elevation view of a side panel of the base of FIG. 57.
Figure 71B:
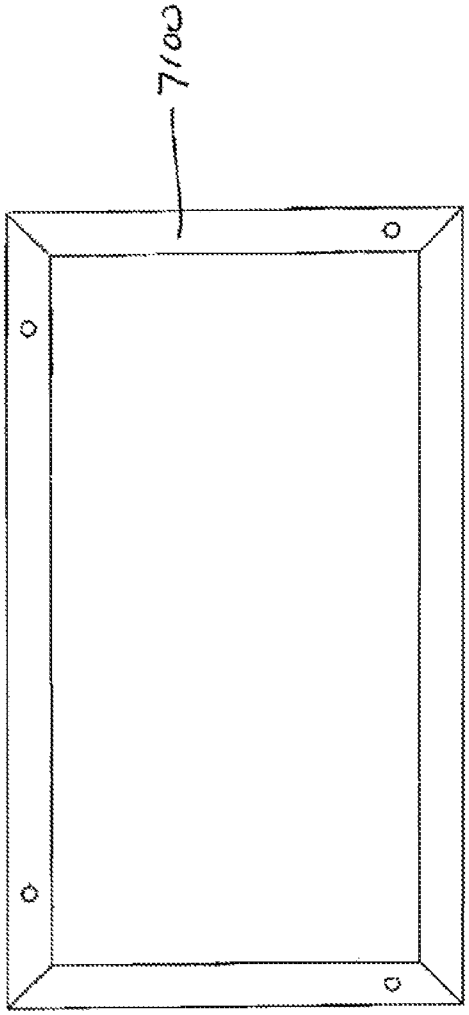
FIGS. 71A, 71B, 71C, 71D, 71E, 71F, and 71G depict front perspective, top, rear, Section 1-1, bottom, and side views, respectively, of the top web frame of the base of FIG. 57.
Figure 71C:
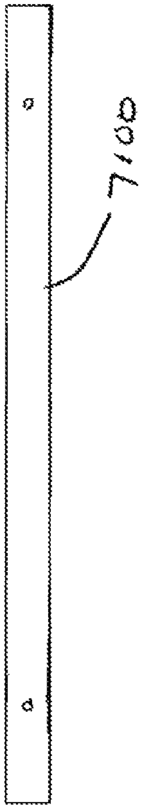
Figure 71A:
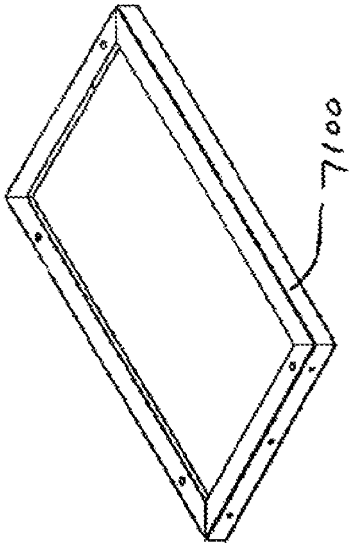
Figure 71D:
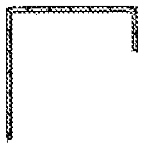
Figure 71E:
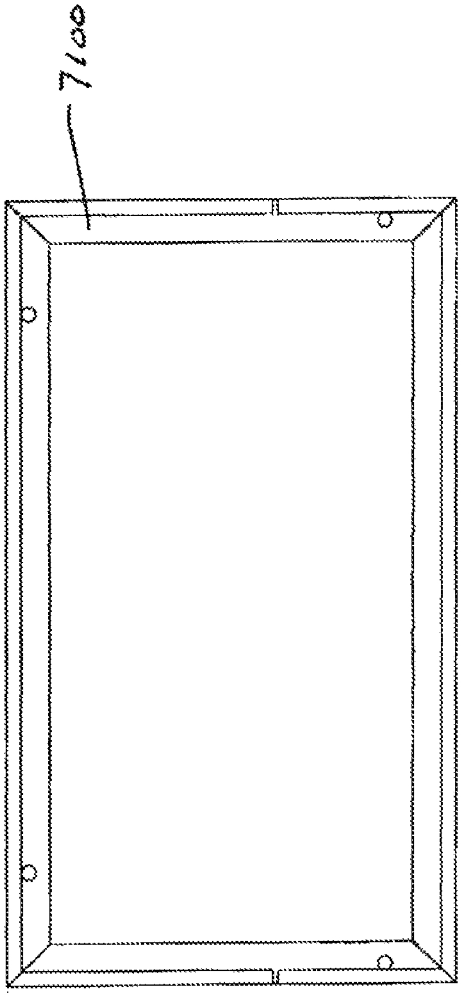
Figure 71F:
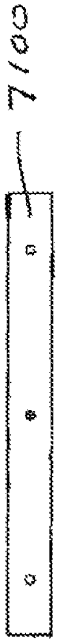
Figure 71G:
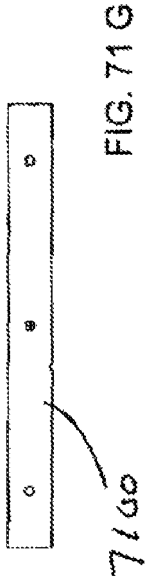
Figure 72B:
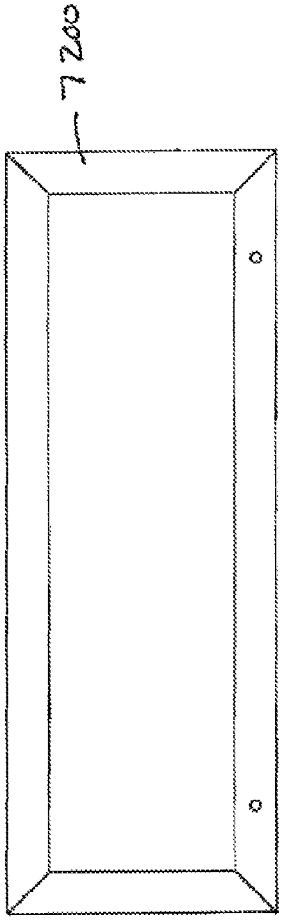
FIGS. 72A, 72B, 72C, 72D, and 72E depict front perspective, top, side, rear, and Section 1-1 views, respectively, of the bottom web frame of the base of FIG. 57.
Figure 72C:
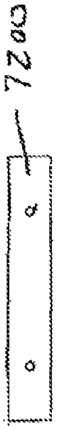
Figure 72D:
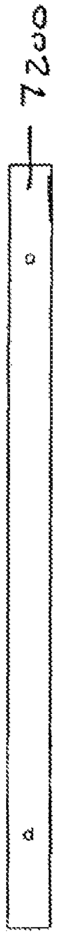
Figure 72A:
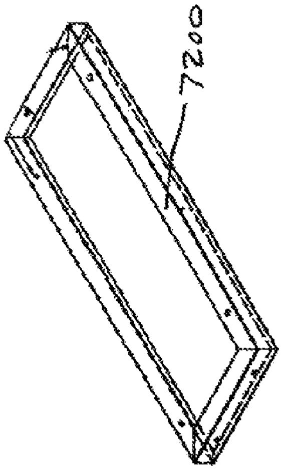
Figure 72E:
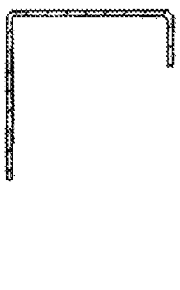
Figure 73B:
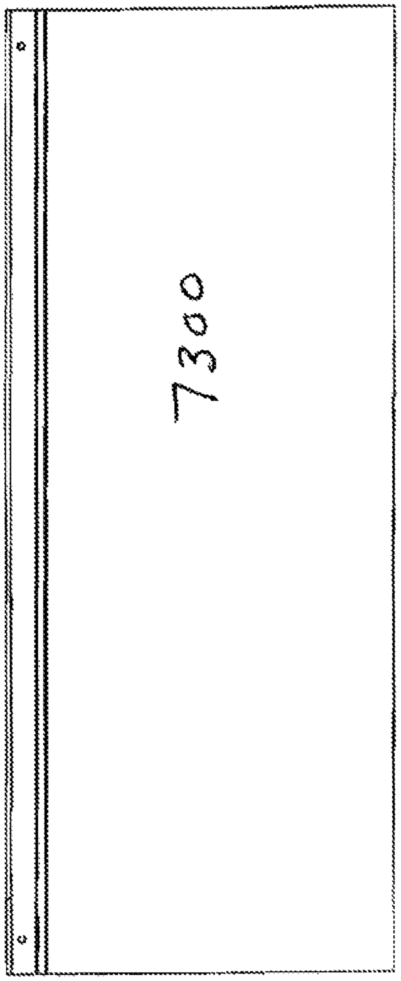
FIGS. 73A, 73B, and 73C depict front perspective, top and end views, respectively, of the foot rest of the base of FIG. 57.
Figure 73C:
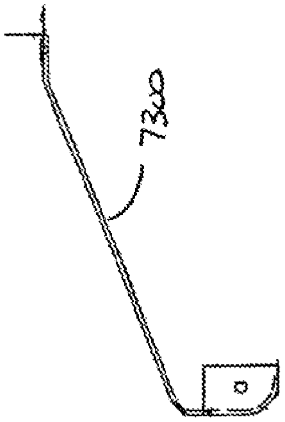
Figure 73A:
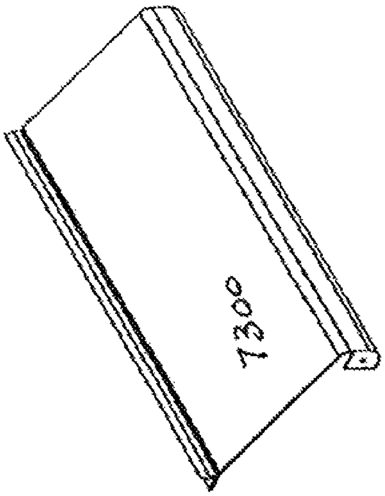
Figure 74A:
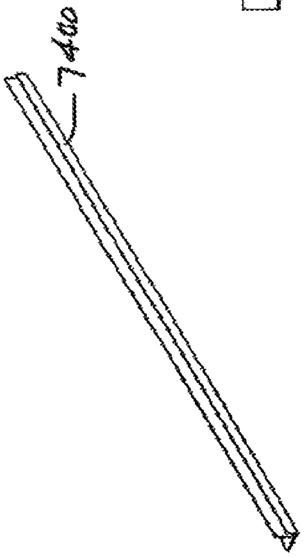
FIGS. 74A, 74B, 74C, and 74D depict front perspective, rear, top and end views, respectively, of the metal channel of the foot rest of the base of FIG. 57.
Figure 74B:
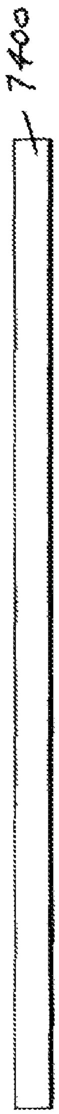
Figure 74C:
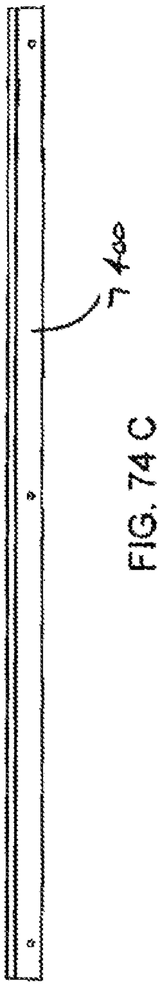
Figure 74D:
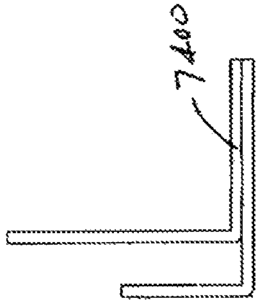
Figure 75:
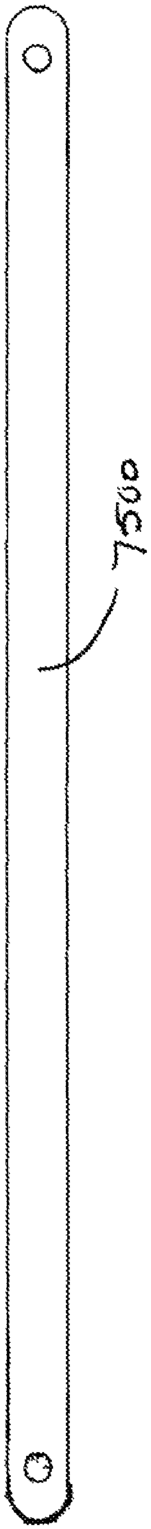
FIG. 75 depicts a front view of the support brace of the base of FIG. 57.
Figure 76A:
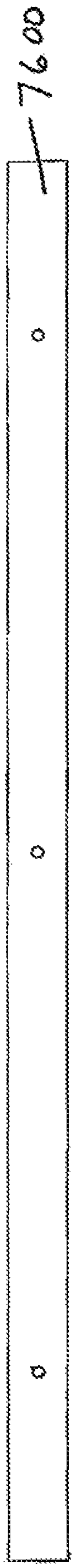
FIGS. 76A, 76B, and 76C depict top, front, and side views, respectively, of the door bracket of the base of FIG. 57.
Figure 76B:
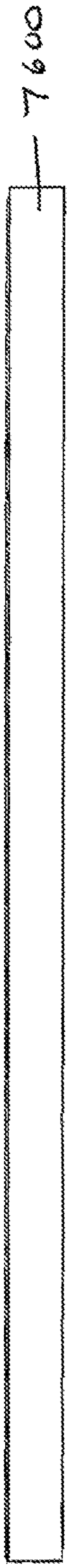
Figure 76C:
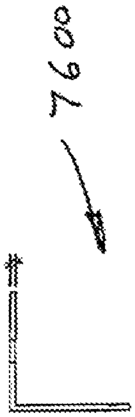
Figure 78:
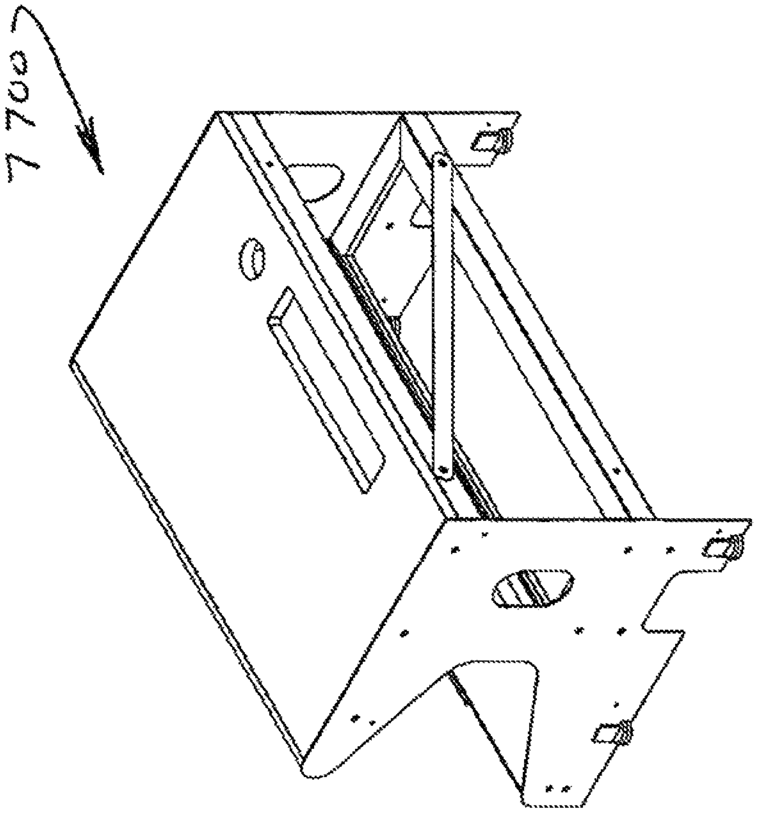
FIG. 78 depicts a rear perspective view of the base of FIG. 77.
Figure 77:
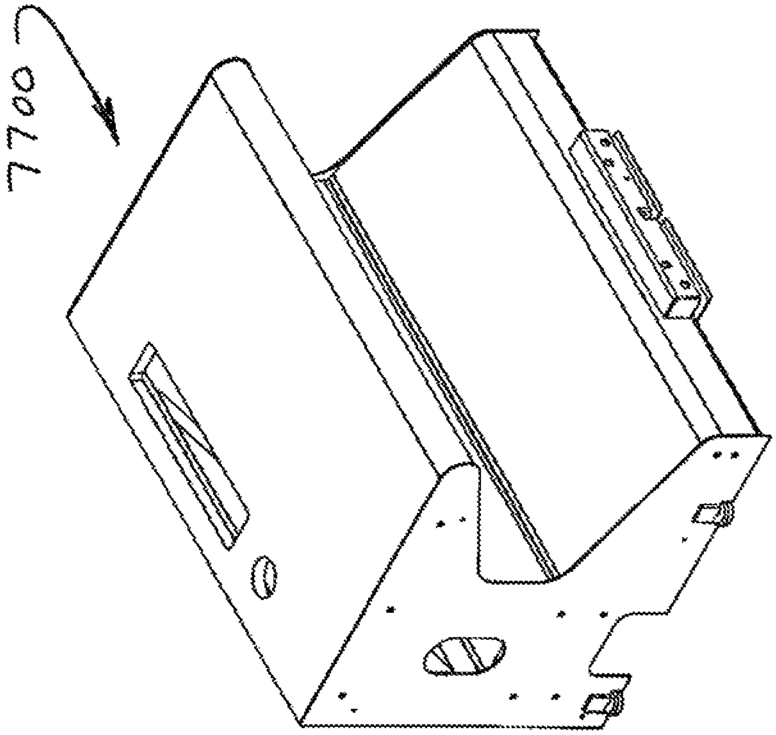
FIG. 77 depicts a front perspective view of another embodiment of the base of the instant invention.
Figure 79:
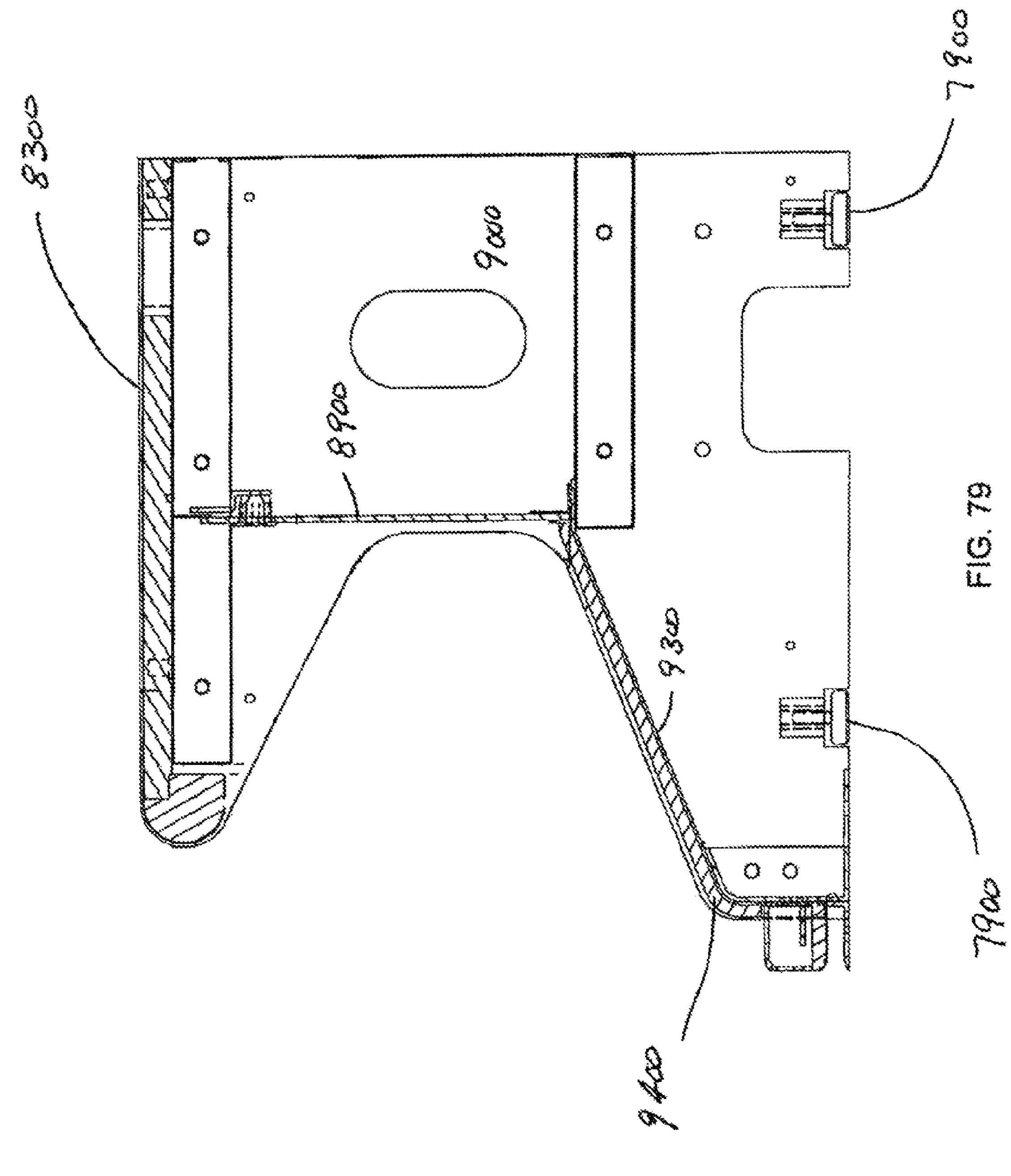
FIG. 79 depicts a cross-sectional end view of the base of FIG. 77.

FIG. 60 depicts a cross-sectional end view of two bases 5700 arranged in a back-to-back configuration. This embodiment utilizes unitary top surface 6700. Unitary top surface 6700 may be removed to allow access to the area formed by side panels 7000 and front panel 6900. This area is where utilities such as electrical wiring, computer cable and other components and utilities which are associated with bases 5700, and the device supported by base 5700, may be located. FIGS. 67 and 68 show additional features of top surface 6700.

Base 5700 may also be provided with leveling devices 6000 which may adjustably level base 5700, and removable top surface 6300. In addition, base 5700 may be easily and repeatedly assembled and disassembled for shipping, reconfiguration and/or relocation.

Other possible configurations of multiple bases 5700 are depicted in FIGS. 22, 23, 24 and 25, as well as in Appendix A.

FIGS. 77 through 98 set forth another embodiment of the present invention. This embodiment comprises a hybrid ergonomic base designated as base 7700. Base 7700 is similar in construction to base 5700 but also includes sled mounting feature 9500 in which may be used to mount a user chair (not shown) and bracket to base 7700 so that the chair orients the user to the device positioned on base 7700 in an optional or desired fashion similar to the orientation created by sled bracket 1950 of the embodiment shown in FIG. 6.

Base 7700 may comprise top surface 8300, opposing side panels 9000, and front panel 8900. The area formed by top surface 8300, opposing side panels 9000, and front panel 8900 is where utilities, such as electrical wiring, computer cable, and other components and utilities which are associated with base 7700, and the device supported by base 7700, may be located.

Base 7700 may also be provided with leveling devices 7900 which may adjustably level base 7700, and removable top surface 8300. In addition, base 7700 may be easily and repeatedly assembled and disassembled for shipping, reconfiguration and/or relocation.

Figure 80:
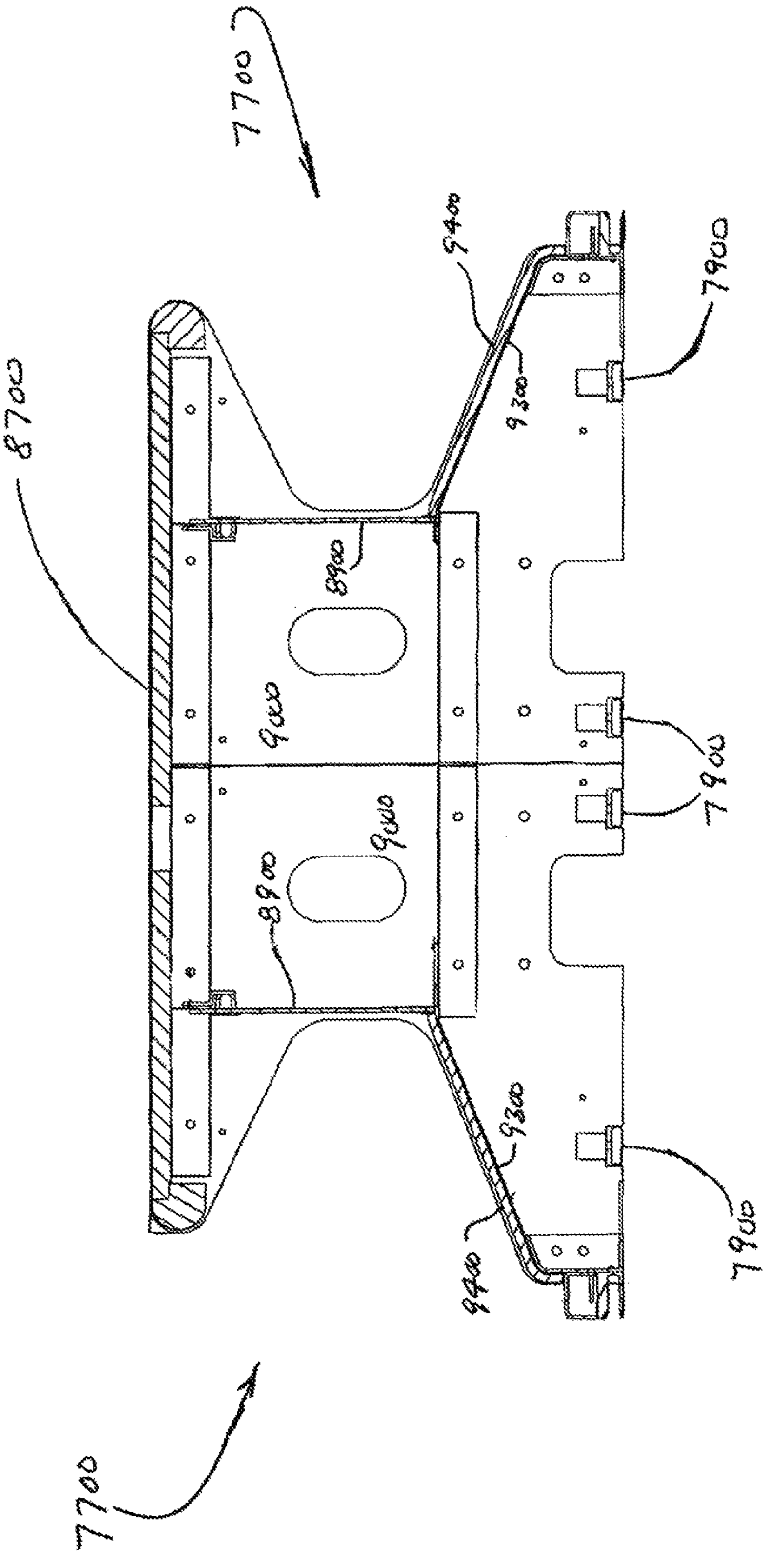
FIG. 80 depicts a cross-sectional end view of two bases of FIG. 77 arranged in a back-to-back configuration.
Figure 82:
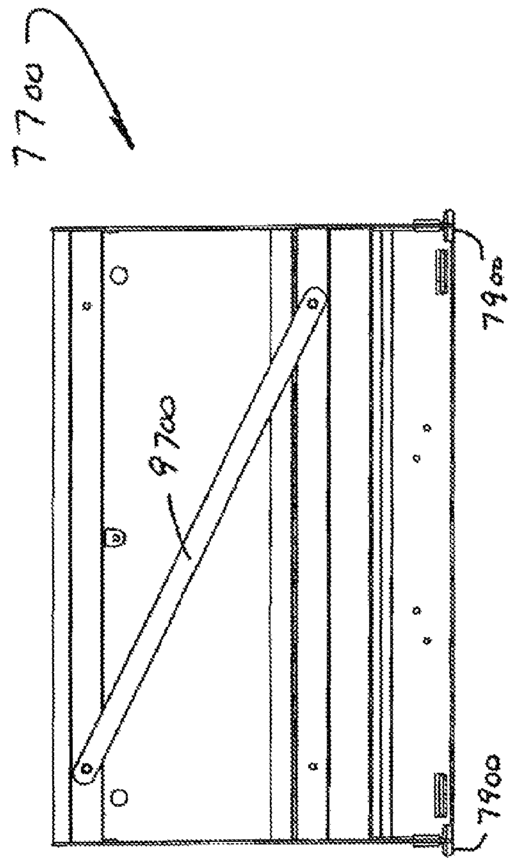
FIG. 82 depicts a rear elevation view of the base of FIG. 77.
Figure 81:
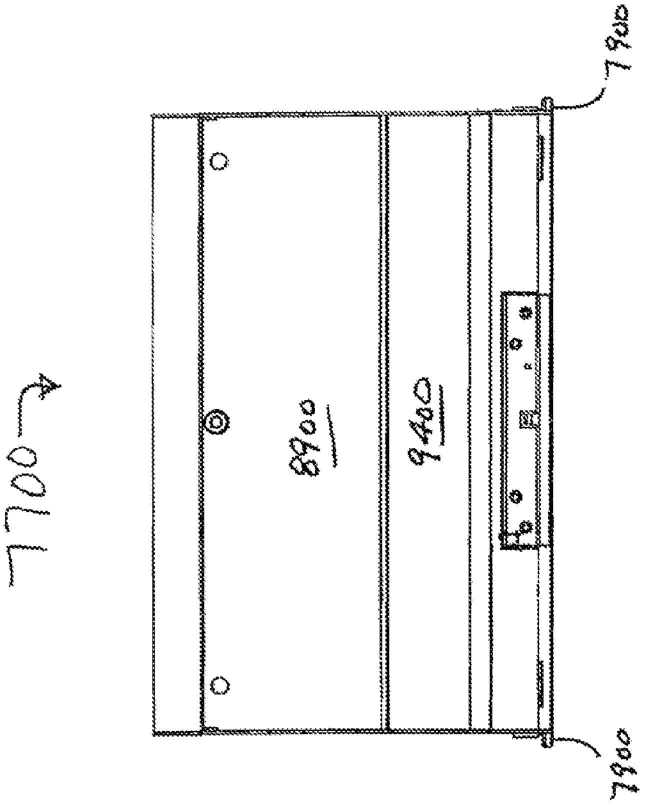
FIG. 81 depicts a front elevation view of the base of FIG. 77.
Figure 83:
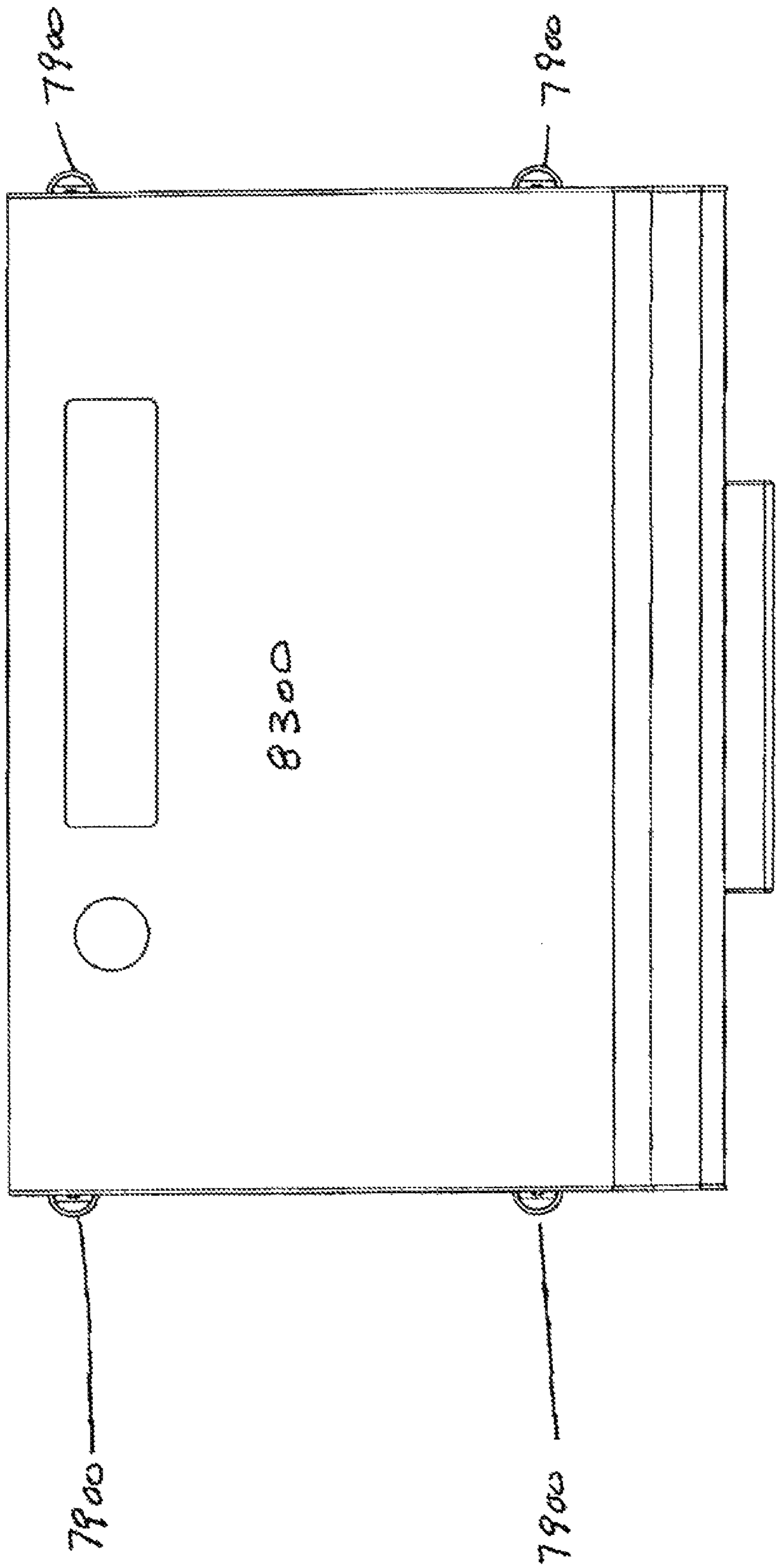
FIG. 83 depicts a plan view of the base of FIG. 77.
Figure 84:
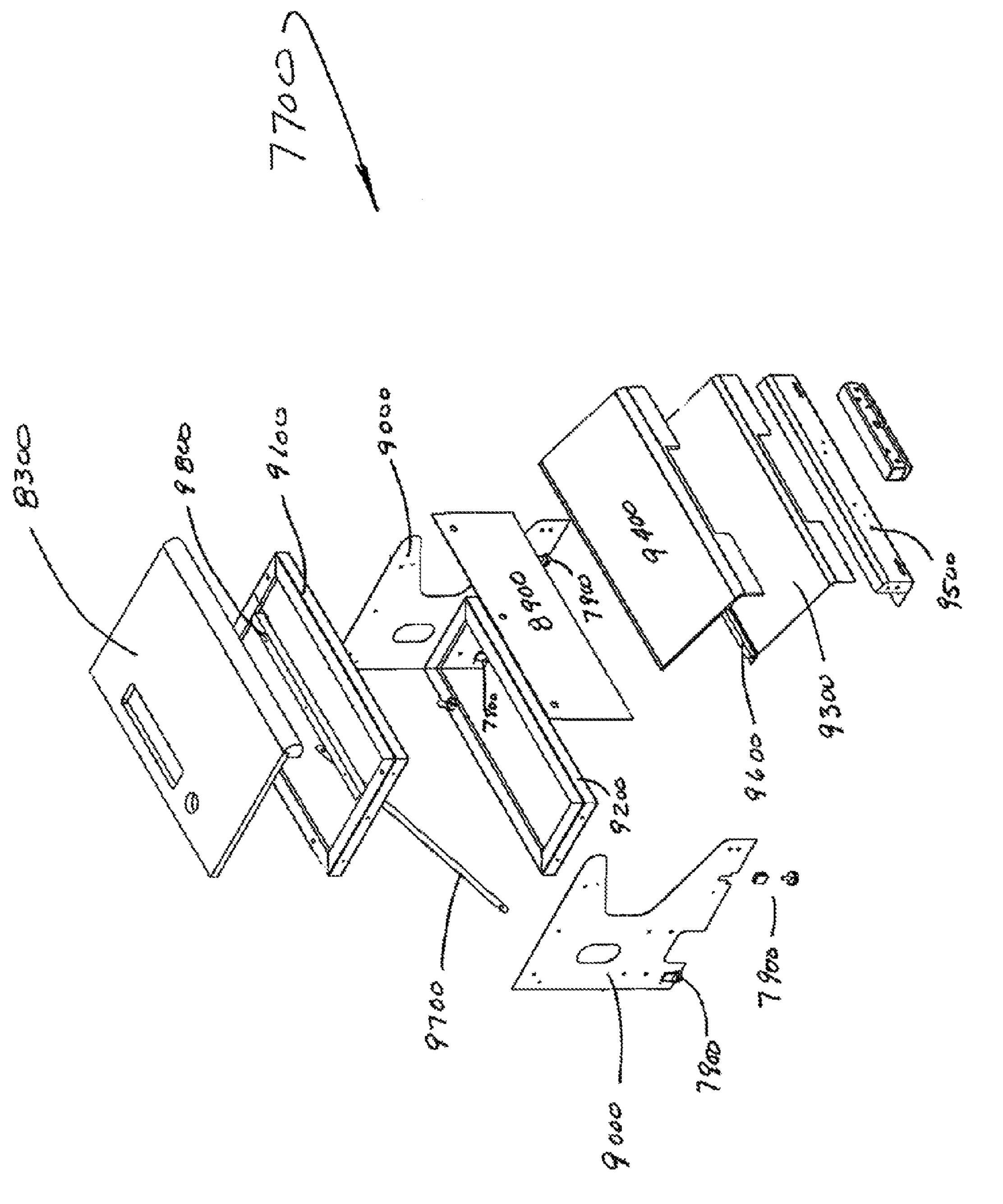
FIG. 84 depicts an exploded view of the base of FIG. 77.
Figure 88:
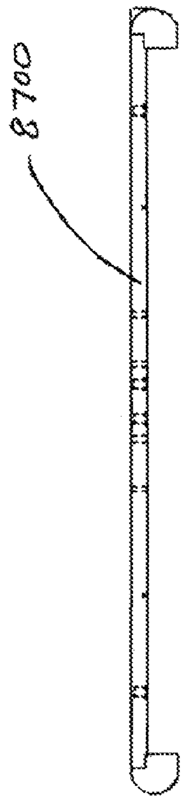
FIG. 88 depicts an end view of the countertop of two bases of FIG. 77 arranged in a back-to-back configuration.
Figure 88:
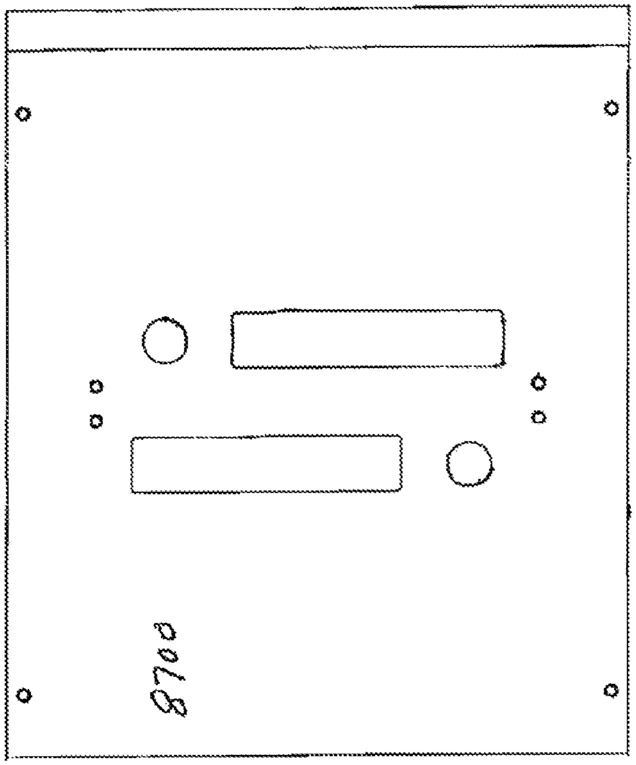
Figure 87:
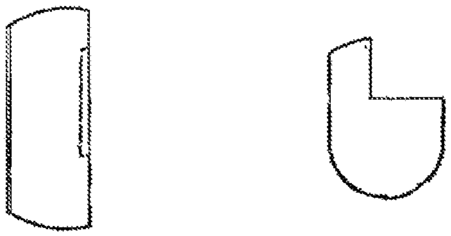
FIG. 87 depicts a bottom view of the countertop of two bases of FIG. 77 arranged in a back-to-back configuration.
Figure 89:
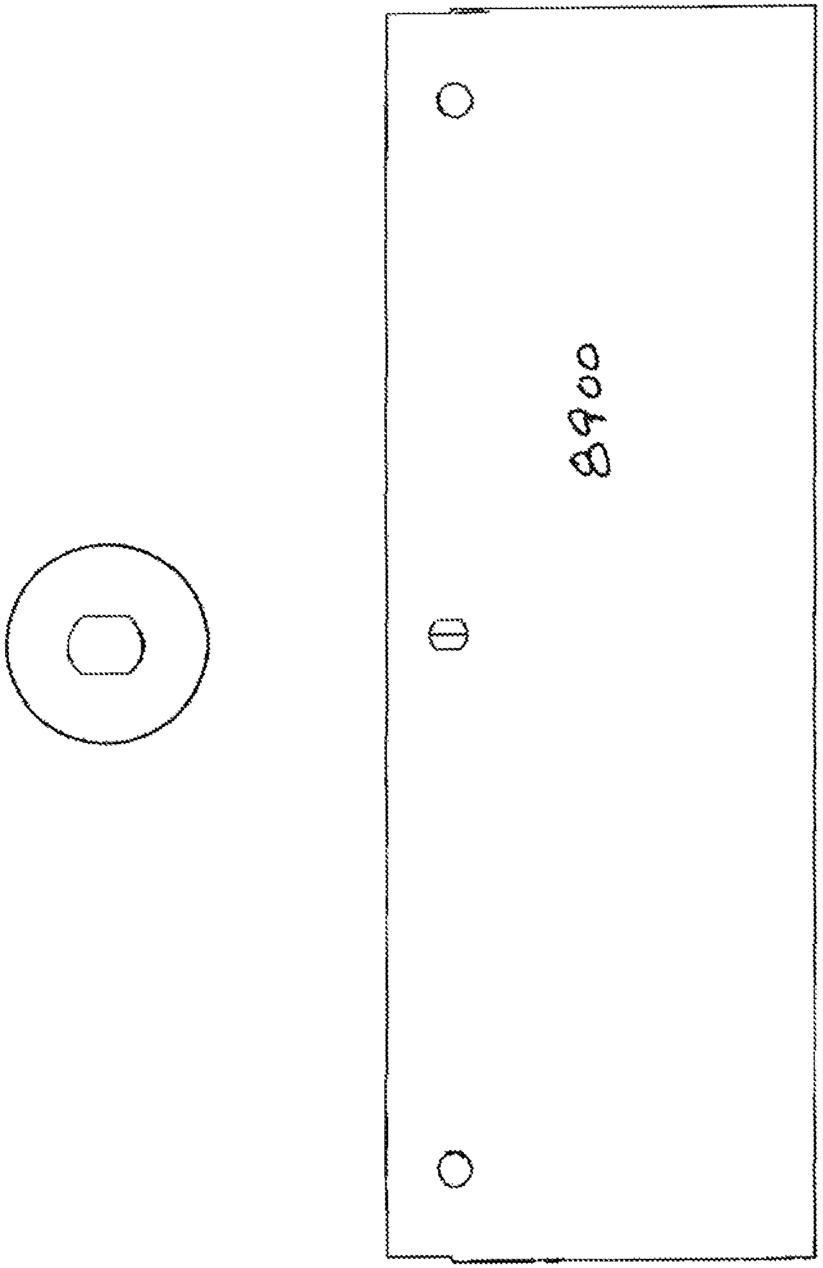
FIG. 89 depicts a front elevation view of the access door of the base of FIG. 77.
Figure 90:
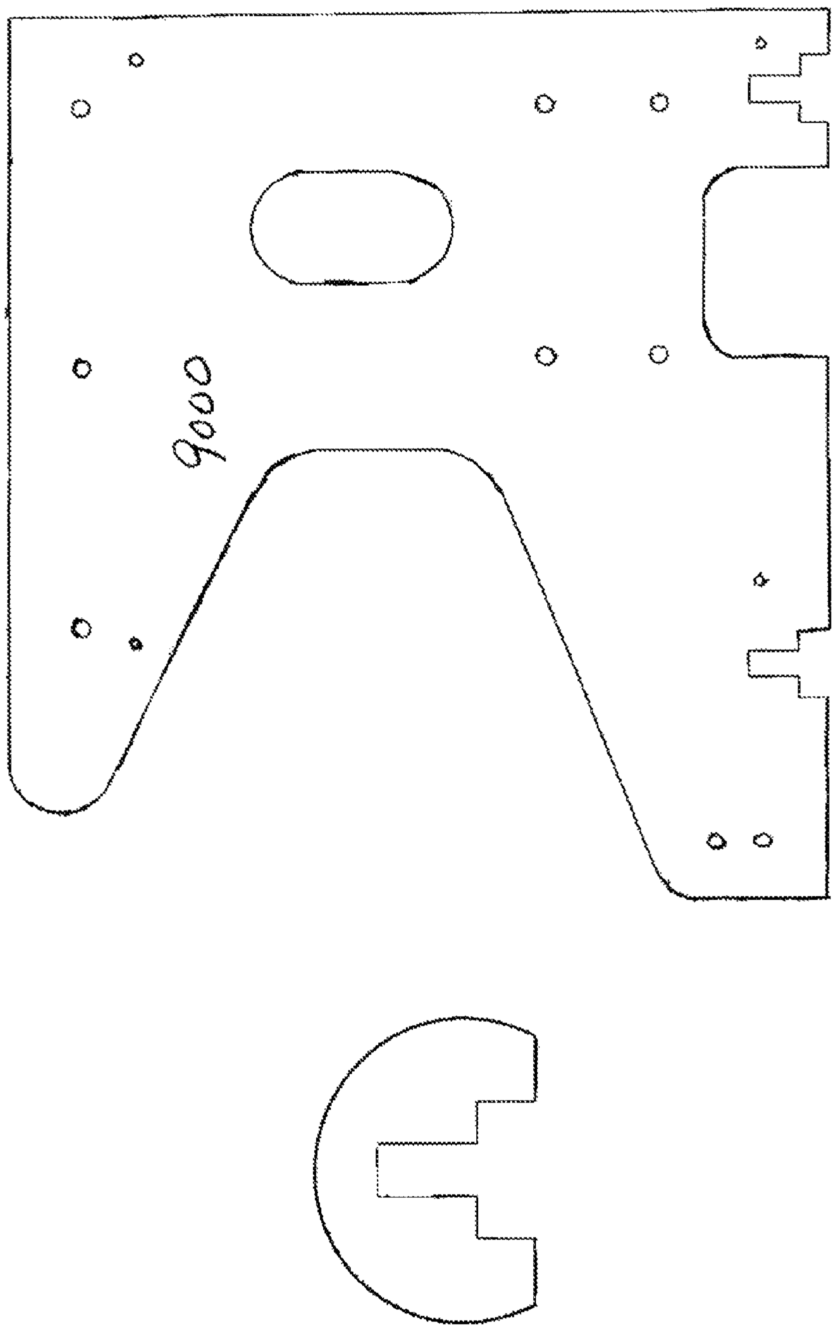
FIG. 90 depicts an elevation view of a side panel of the base of FIG. 77.
Figure 91B:
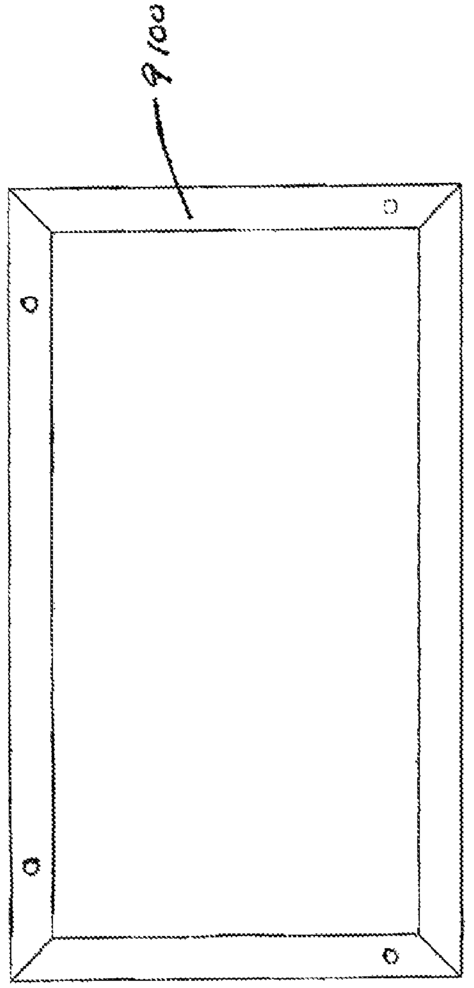
FIGS. 91A, 91B, 91C, 91D, 91E, 91F, and 91G depict front perspective, top, rear, Section 1-1, bottom, and side views, respectively, of the top web frame of the base of FIG. 77.
Figure 91C:
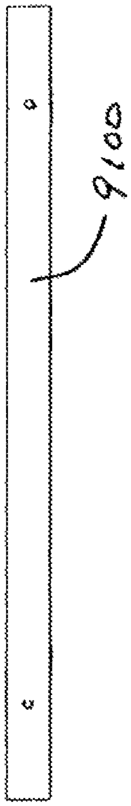
Figure 91A:
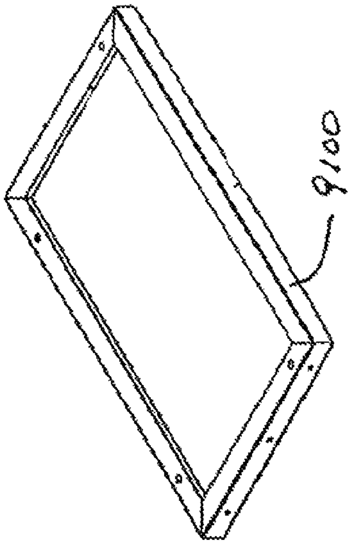
Figure 91D:
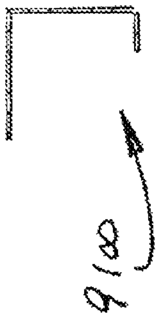
Figure 91E:
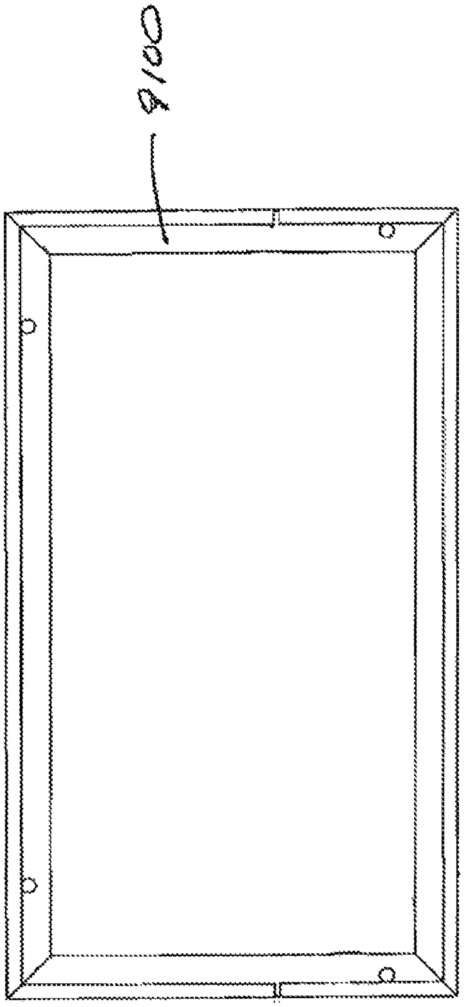
Figure 91F:
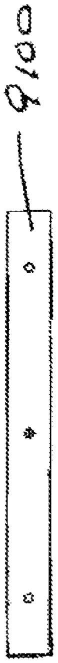
Figure 91G:
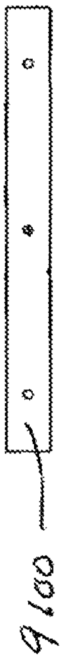
Figure 92B:
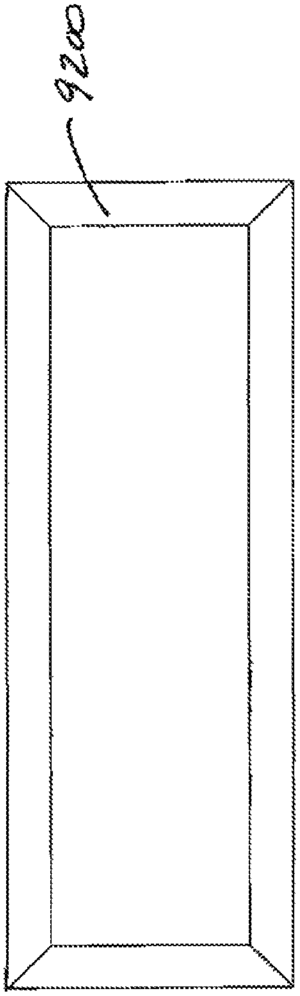
FIGS. 92A, 92B, 92C, 92D, and 92E depict front perspective, top, side, rear, and Section 1-1 views, respectively, of the bottom web frame of the base of FIG. 77.
Figure 92C:
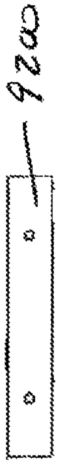
Figure 92D:
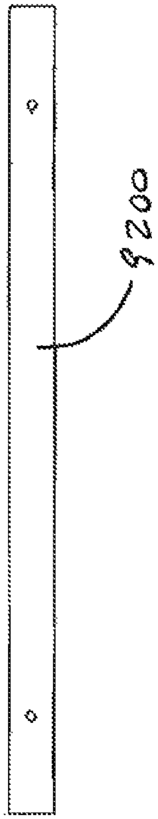
Figure 92A:
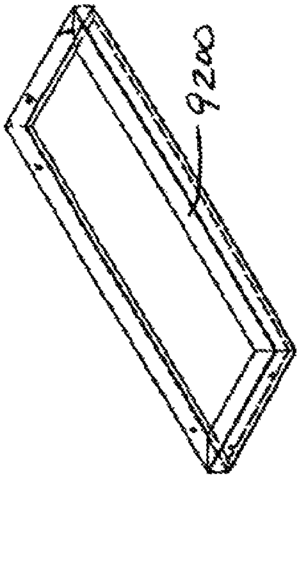
Figure 92E:
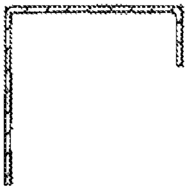
Figure 93A:
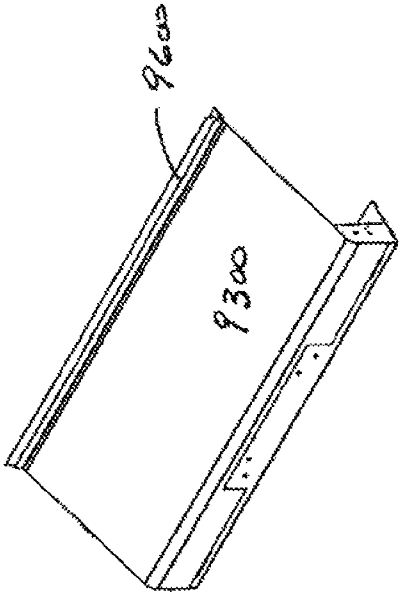
FIGS. 93A, 93B, 93C and 93D depict front perspective, top, end, and front views, respectively, of the foot rest of the base of FIG. 77.
Figure 93C:
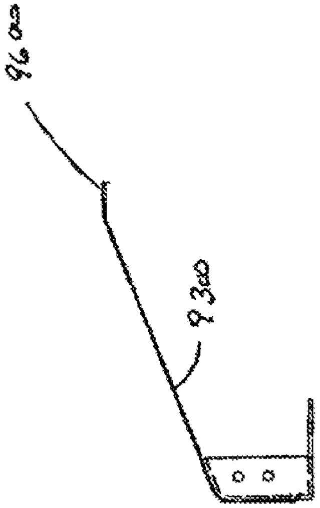
Figure 93B:
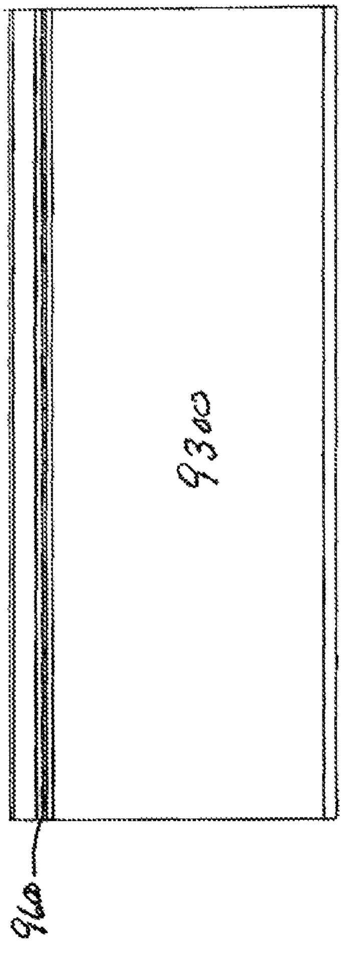
Figure 93D:
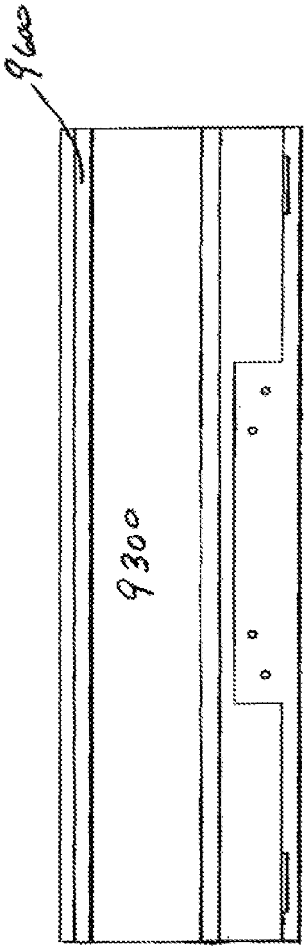
Figure 94A:
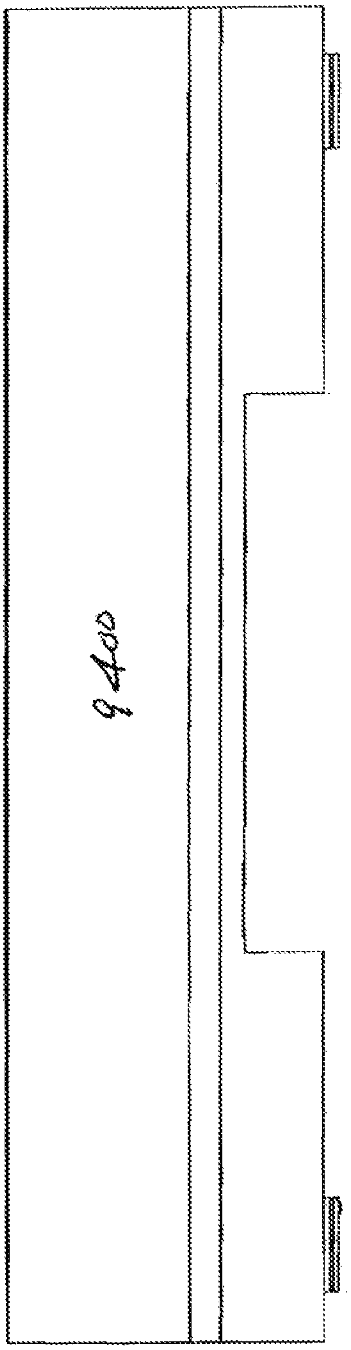
FIGS. 94A, 94B, and 94C depict front, end, and bottom views, respectively, of the foot rest cover of the base of FIG. 77.
Figure 94B:
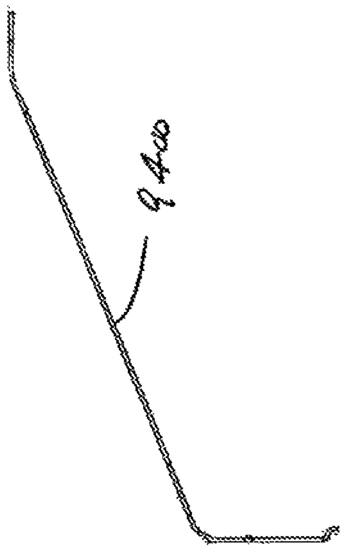
Figure 94C:
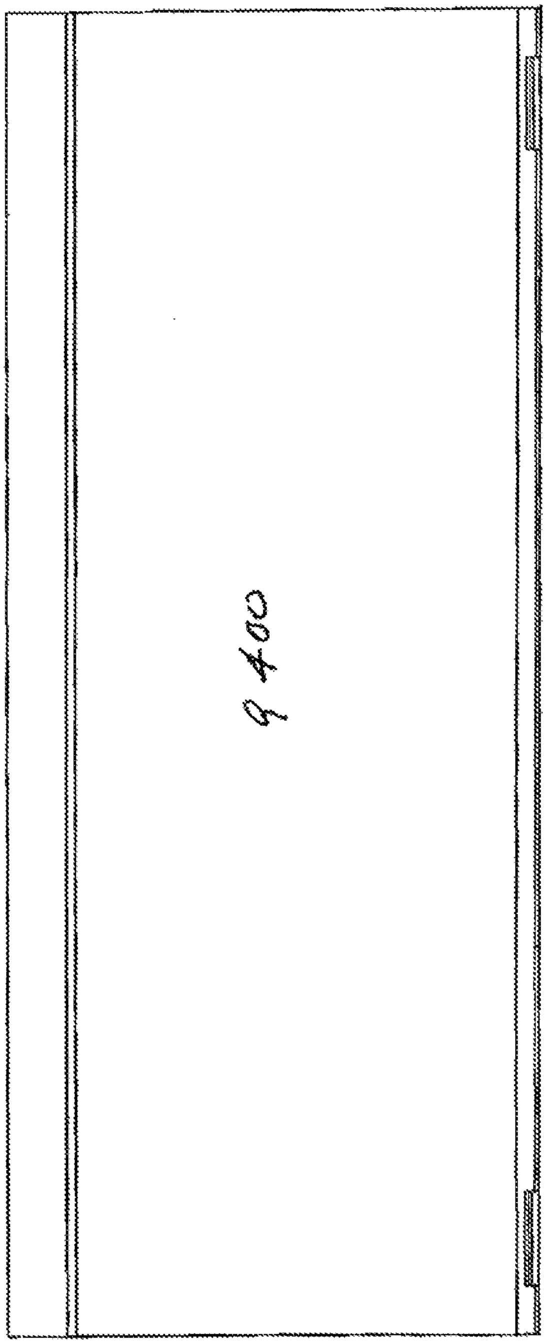
Figure 95A:
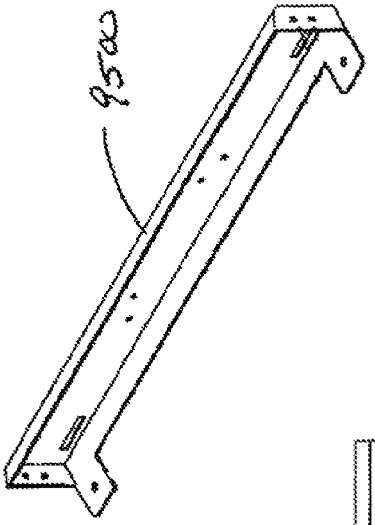
FIGS. 95A, 95B, 95C, and 95D depict rear perspective, front, bottom, and Section 1-1 views, respectively, of the sled mount of the base of FIG. 77.
Figure 95D:
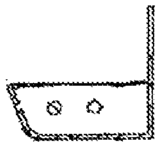
Figure 95B:
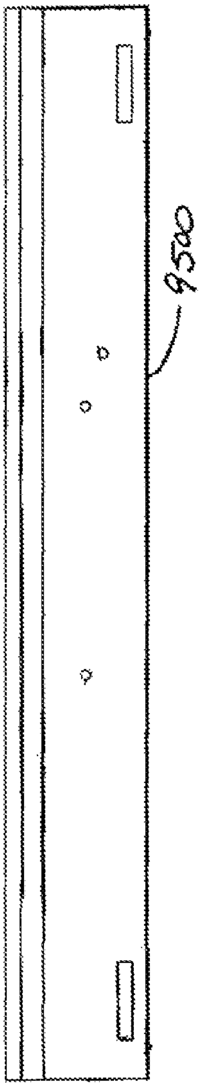
Figure 95C:
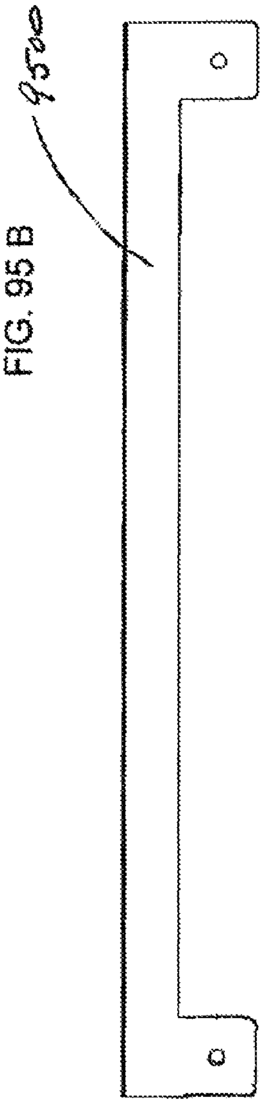
Figure 96B:
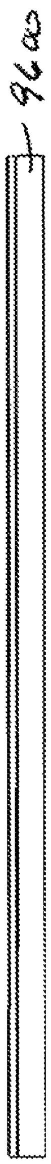
FIGS. 96A, 96B, 96C, and 96D depict front perspective, top, front, and end views, respectively, of the metal channel of the foot rest of the base of FIG. 77.
Figure 96C:
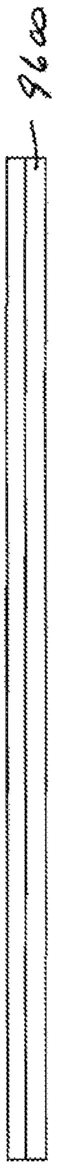
Figure 96A:
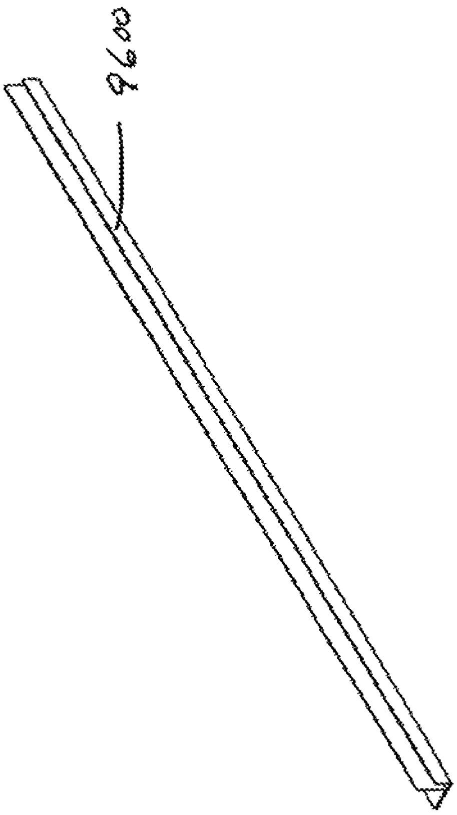
Figure 96D:
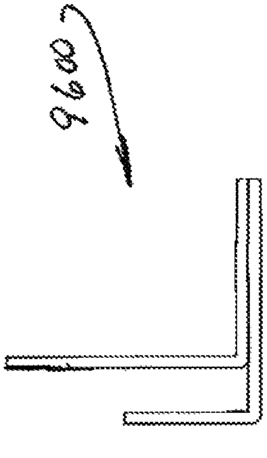
Figure 97:
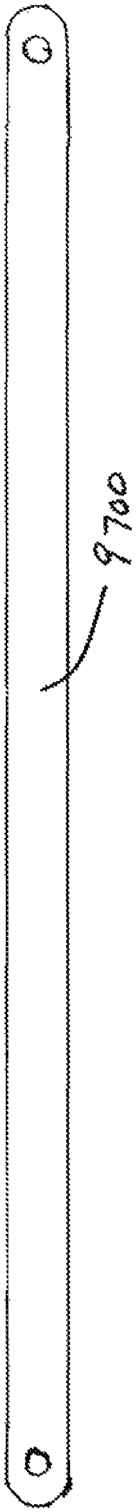
FIG. 97 depicts a front view of the support brace of the base of FIG. 77.
Figure 98A:
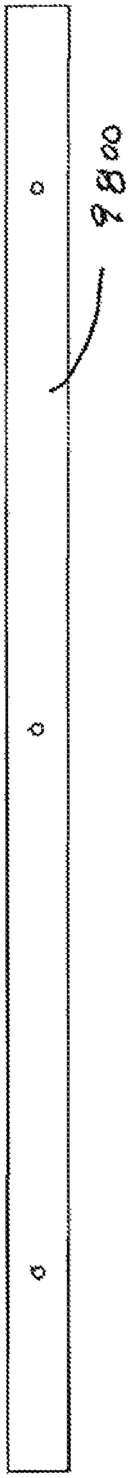
FIGS. 98A, 98B, and 98C depict top, front, and side views, respectively, of the door bracket of the base of FIG. 77.
Figure 98B:
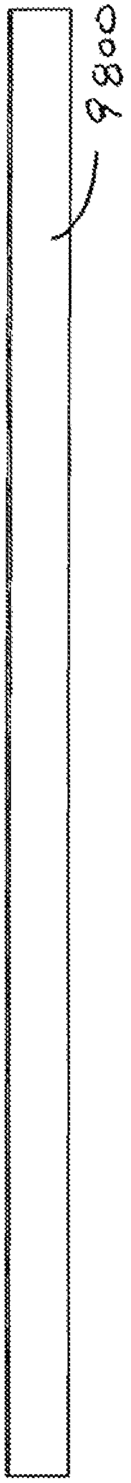
Figure 98C:
Figure 100:
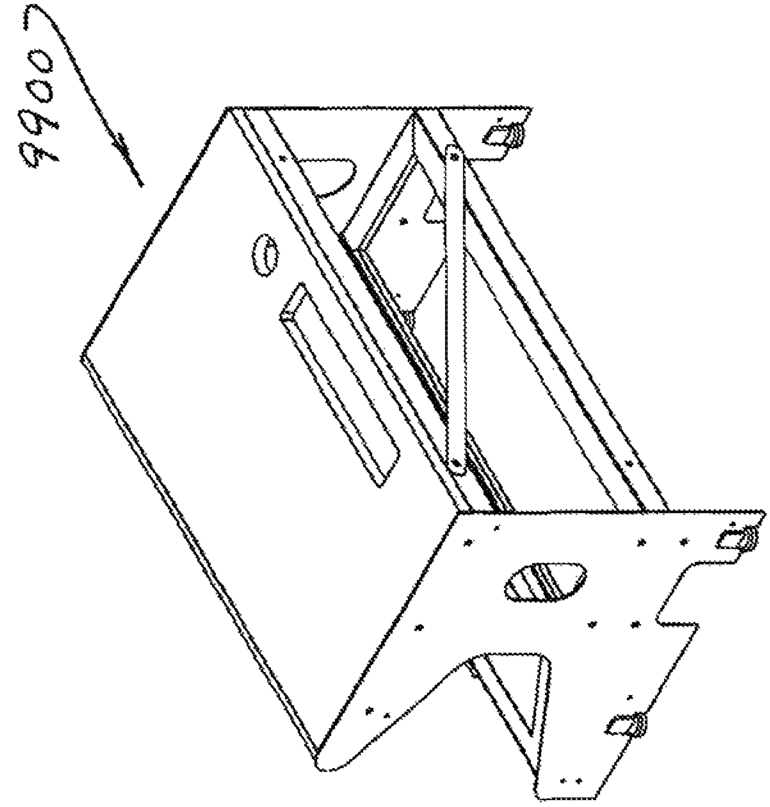
FIG. 100 depicts a rear perspective view of the base of FIG. 99.

Also, multiple bases 7700 may be configured in many different ways. FIG. 80 depicts one such configuration in cross-sectional view, in which two bases 7700 are configured back-to-back and share a common unitary top surface 8700. FIGS. 87 and 88 show additional features of top surface 8700. Top surface 8700 is also removable to allow access to the inside of bases 7700.

Other possible configurations of multiple bases 7700 are depicted in FIGS. 22, 23, 24 and 25, as well as in Appendix A.

Turning now to FIGS. 99 through 122 there is shown yet another embodiment of the present invention. This embodiment comprises a hybrid ergonomic base designated as base 9900. Base 9900 is similar in construction to bases 5700 and 7700, but also includes, in addition to sled mounting feature 11800, carpet holder 11700 in foot rest 11500. This configuration permits the carpet which is mounted to foot rest 11500 to be easily cleaned, repaired and/or replaced as necessary.

Base 9900 may comprise top surface 10500, opposing side panels 11200, and front panel 1100. The area formed by top surface 10500, opposing side panels 11200, and front panel 1100, is where utilities, such as electrical wiring, computer cable, and other components and utilities which are associated with base 9900, and the device supported by base 9900, may be located.

Base 9900 may also be provided with leveling devices 10100 which may adjustably level base 9900, and removable top surface 10500. In addition, base 10100 may be easily and repeatedly assembled and disassembled for shipping, reconfiguration and/or relocation.

Figure 102:
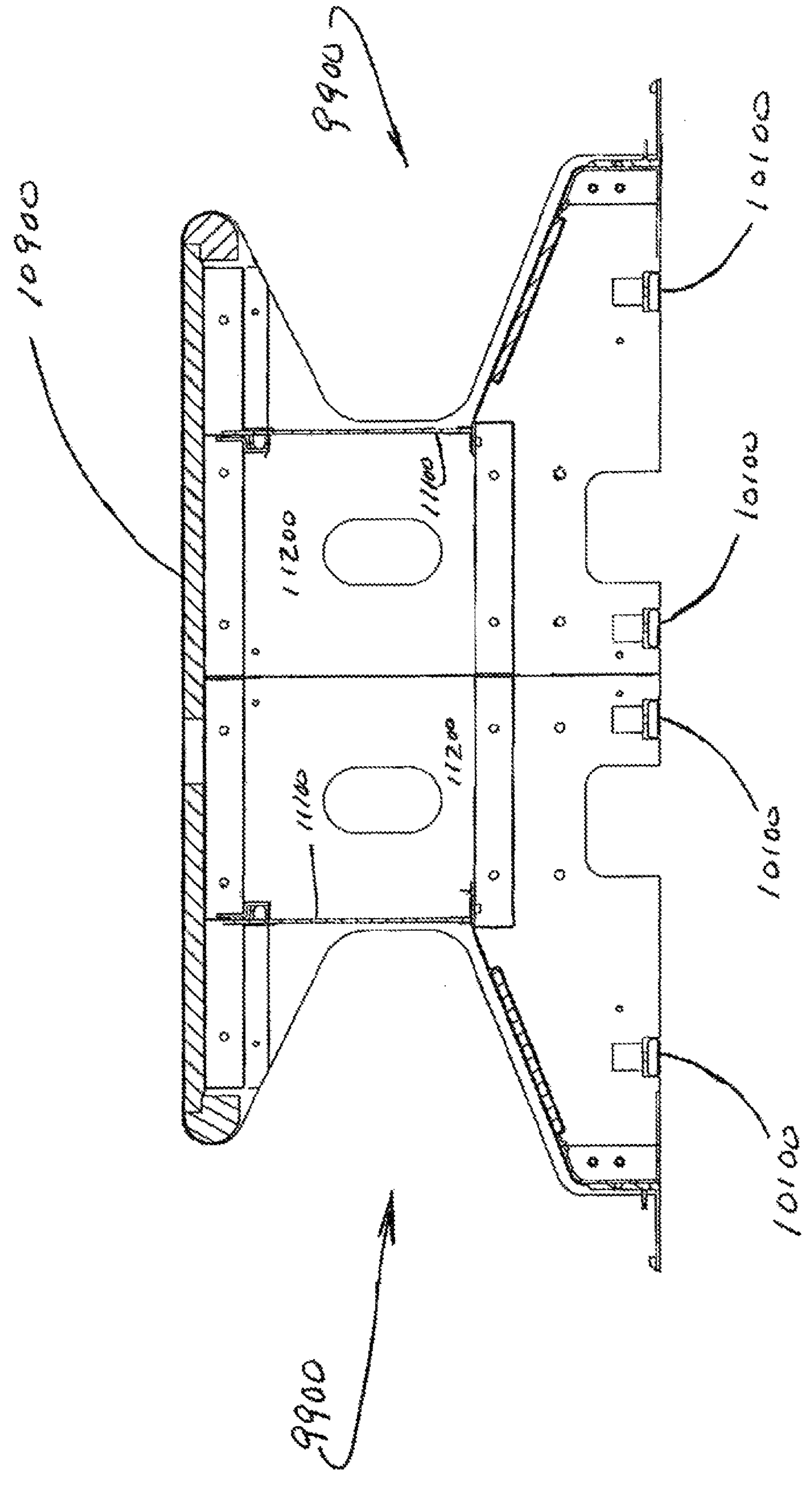
FIG. 102 depicts a cross-sectional end view of two bases of FIG. 99 arranged in a back-to-back configuration.
Figure 104:
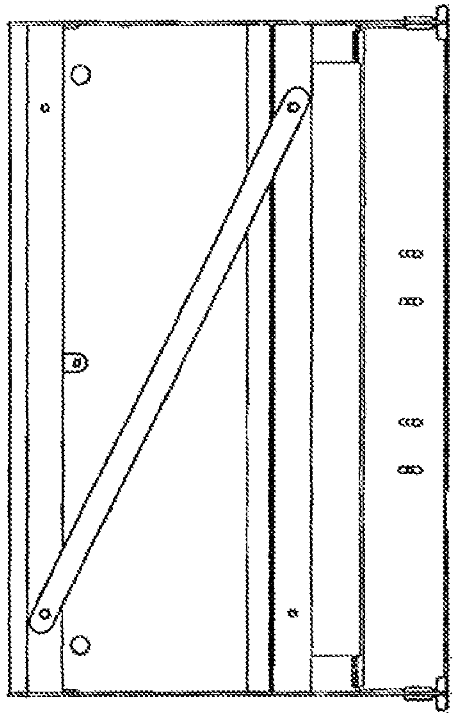
FIG. 104 depicts a rear elevation view of the base of FIG. 99.
Figure 103:
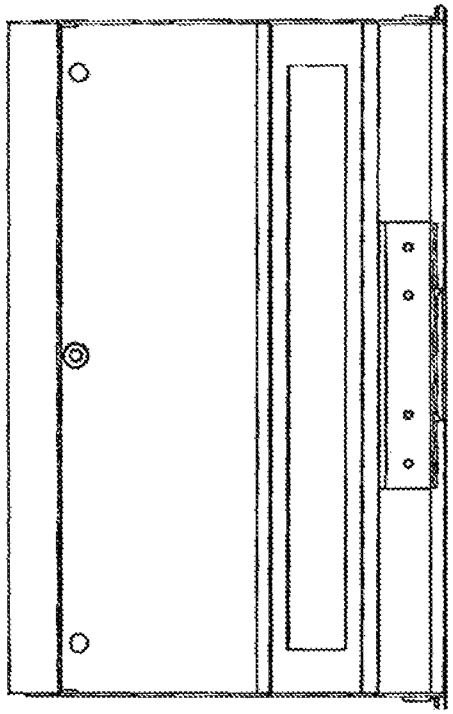
FIG. 103 depicts a front elevation view of the base of FIG. 99.
Figure 105:
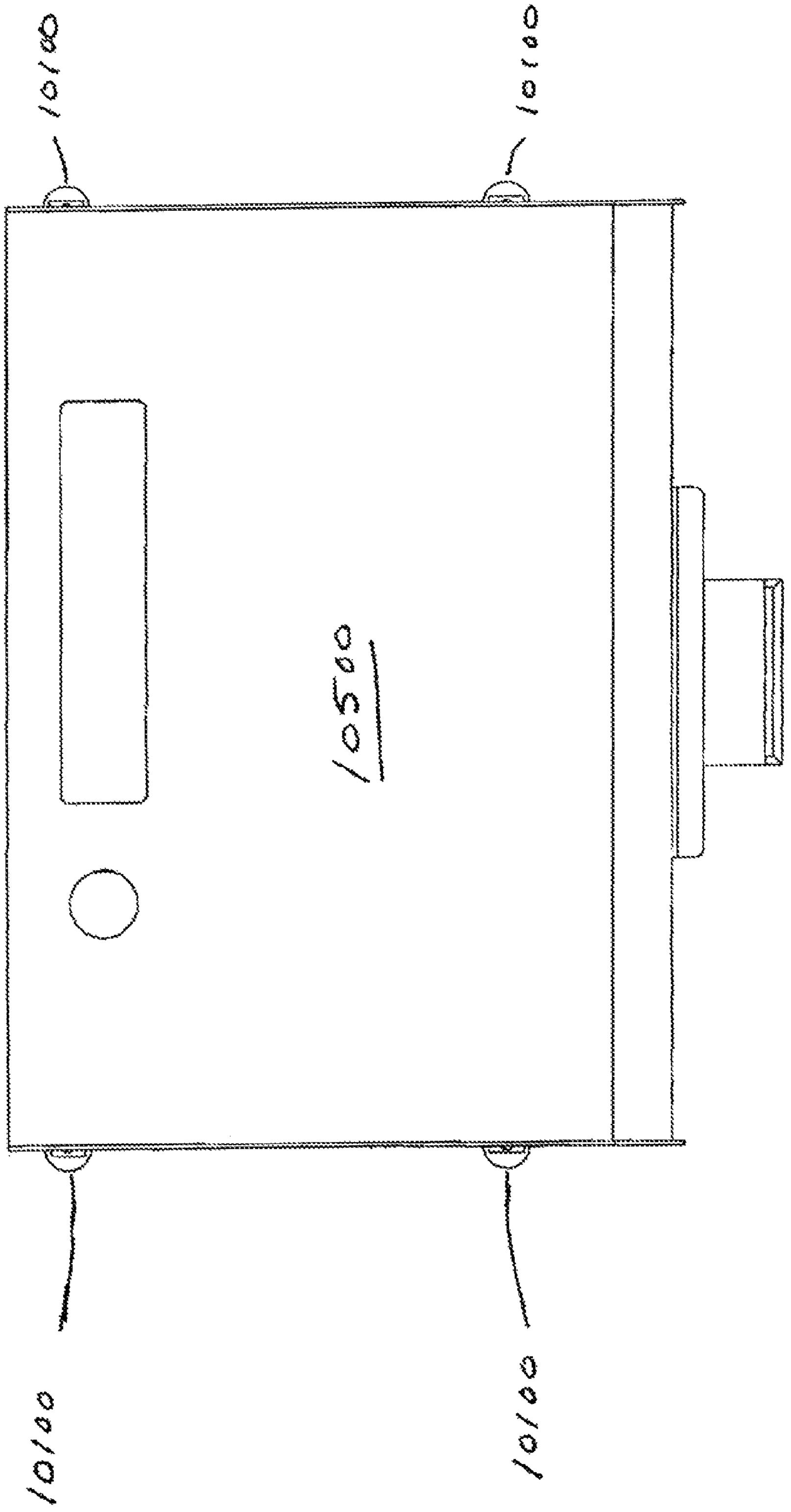
FIG. 105 depicts a plan view of the base of FIG. 99.
Figure 106:
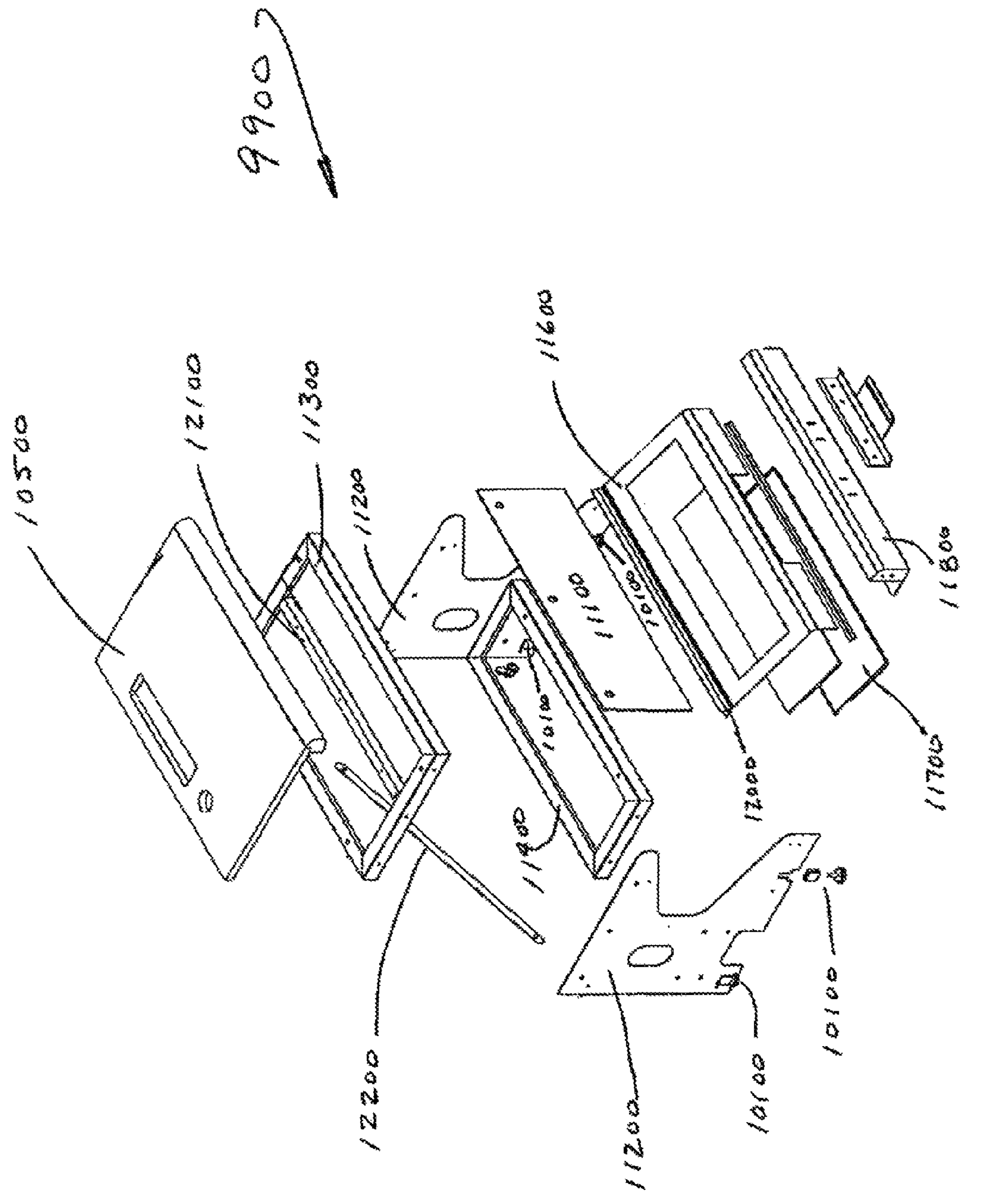
FIG. 106 depicts an exploded view of the base of FIG. 99.
Figure 108:
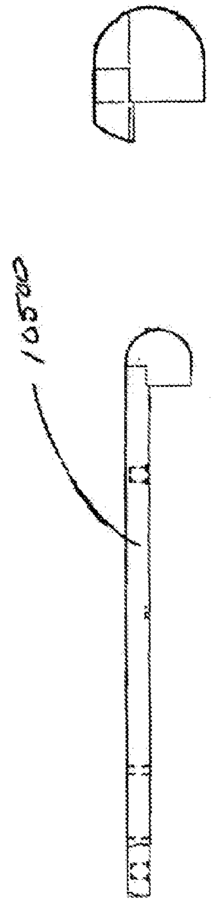
FIG. 108 depicts an end view of the countertop of the base of FIG. 99.
Figure 107:
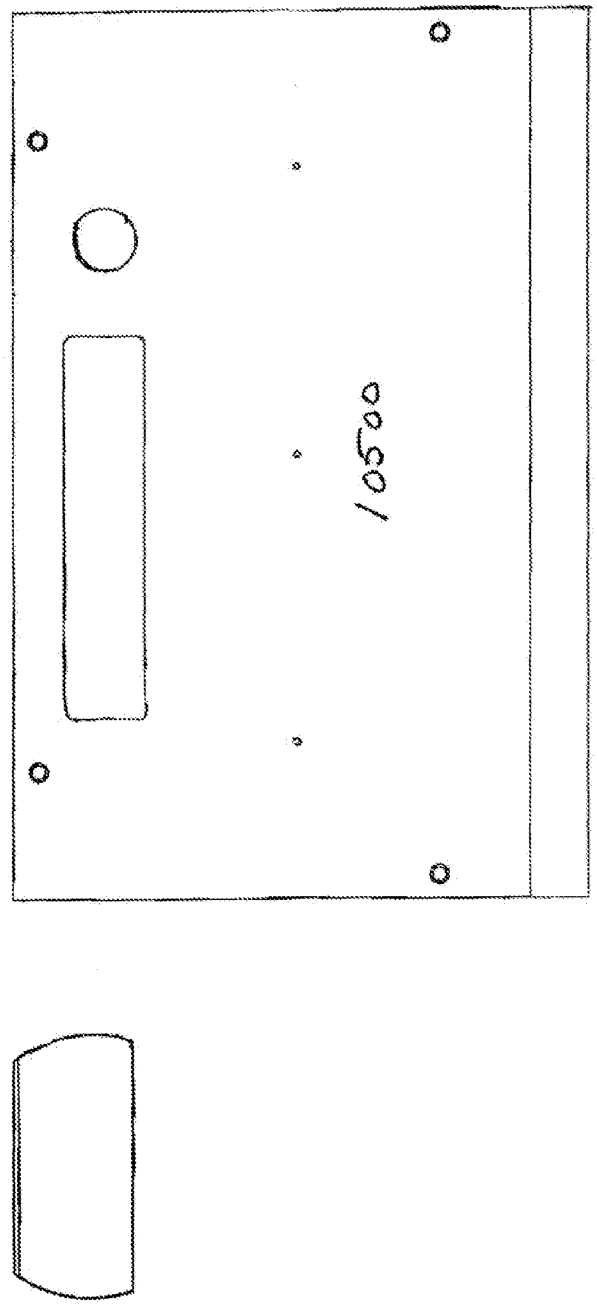
FIG. 107 depicts a bottom view of the countertop of the base of FIG. 99.
Figure 111:
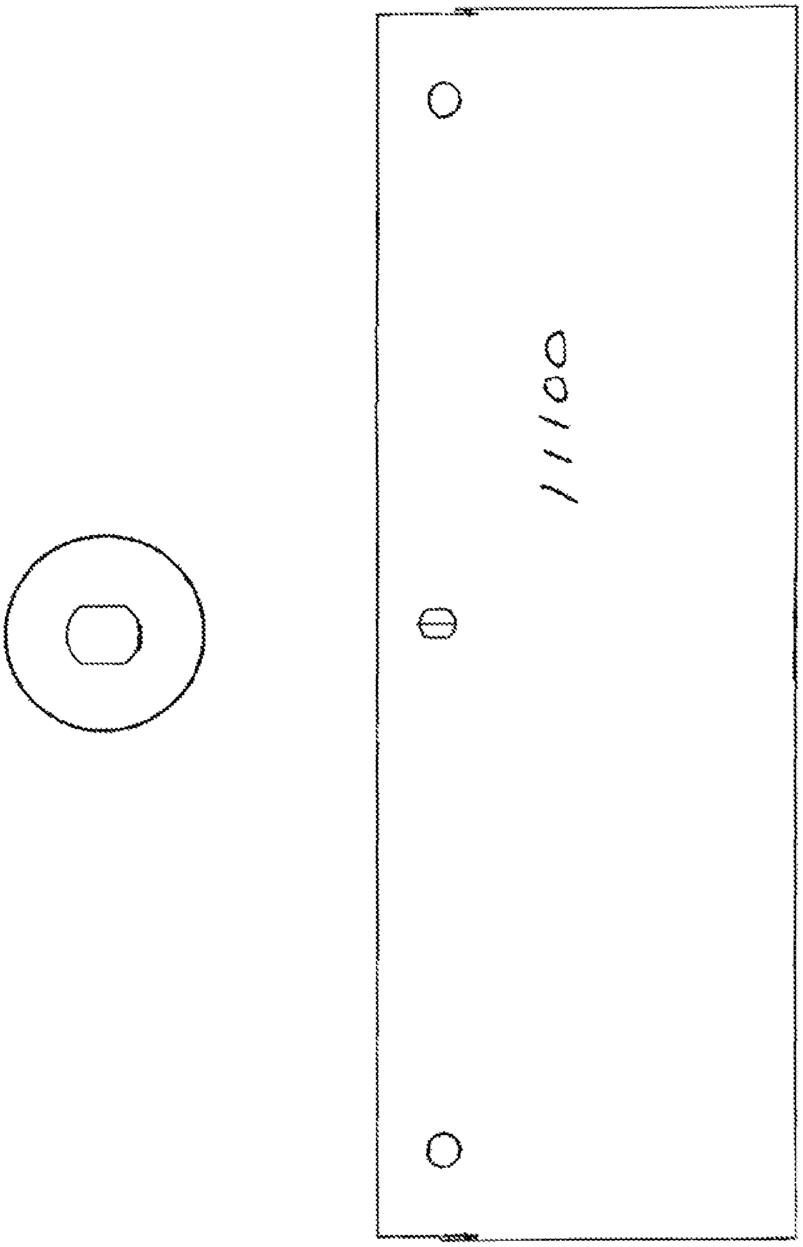
FIG. 111 depicts a front elevation view of the access door of the base of FIG. 99.
Figure 112:
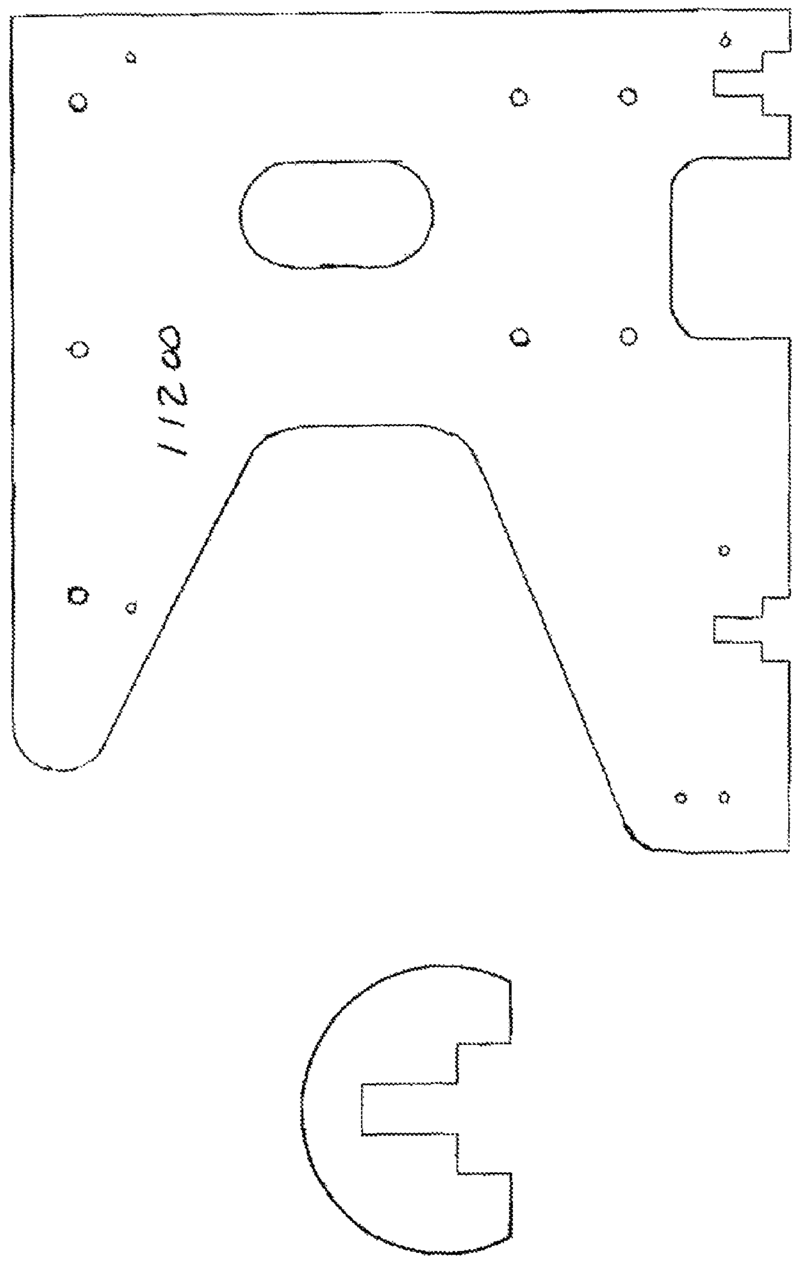
FIG. 112 depicts an elevation view of a side panel of the base of FIG. 99.
Figure 113B:
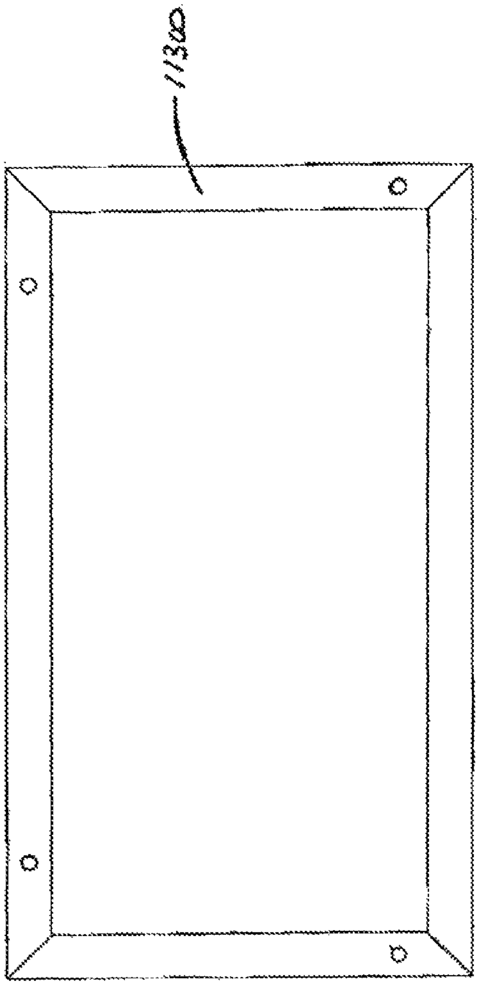
FIGS. 113A, 113B, 113C, 113D, 113E, 113F, and 113G depict front perspective, top, rear, Section 1-1, bottom, and side views, respectively, of the top web frame of the base of FIG. 99.
Figure 113C:
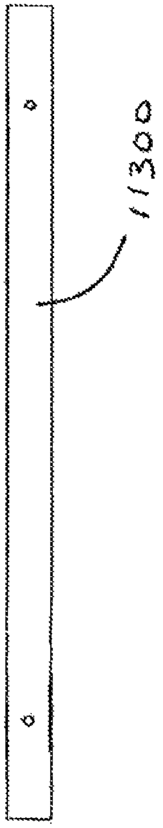
Figure 113A:
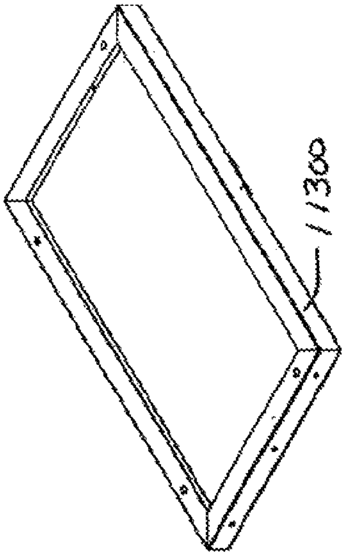
Figure 113D:
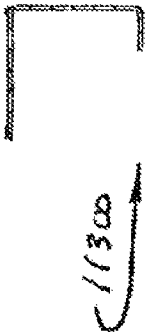
Figure 113E:
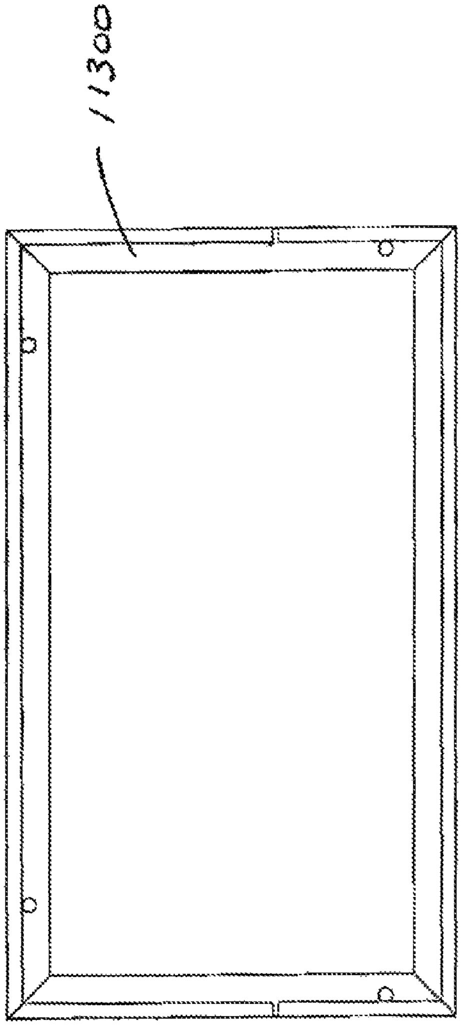
Figure 113F:
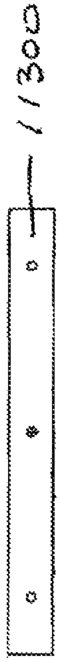
Figure 113G:
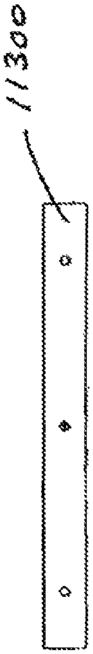
Figure 114B:
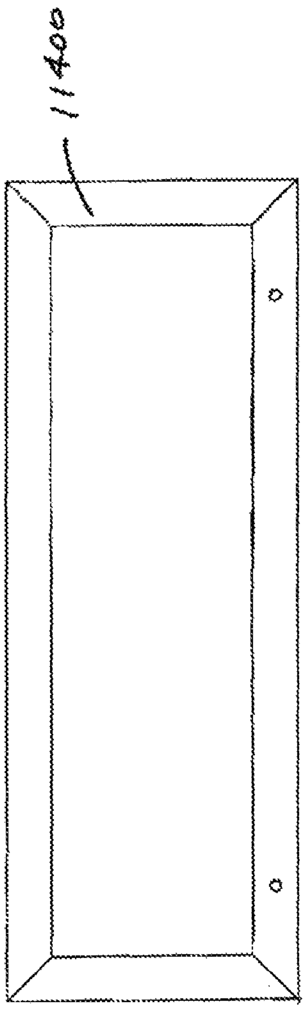
FIGS. 114A, 114B, 114C, 114D, and 114E depict front perspective, top, side, rear, and Section 1-1 views, respectively, of the bottom web frame of the base of FIG. 99.
Figure 114C:
Figure 114D:
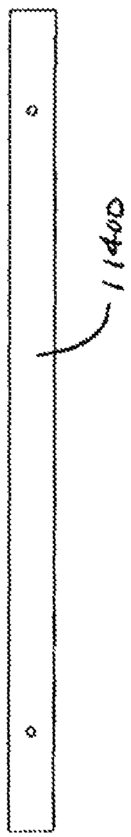
Figure 114A:
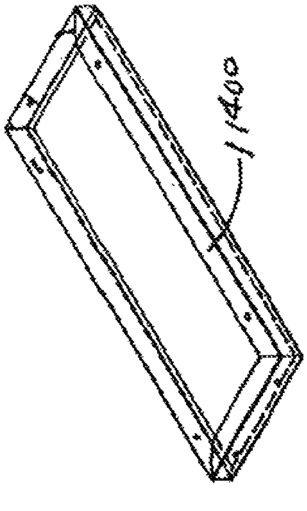
Figure 114E:
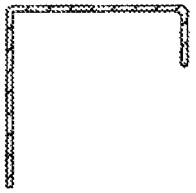

Also, multiple bases 9900 may be configured in many different ways. FIG. 102 depicts one such configuration in cross-sectional view, in which two bases 9900 are configured back-to-back and share a common unitary top surface 10900. FIGS. 109 and 110 show additional features of top surface 10900. Top surface 10900 is also removable to allow access to the inside of bases 9900.

Other possible configurations of multiple bases 9900 are depicted in FIGS. 22, 23, 24 and 25, as well as in Appendix A.

Because of the manner in which the bases of the instant invention are designed and constructed, each of the embodiments of the invention depicted herein is scalable to any size to accommodate the variations in the dimensions of the devices which are to be supported by the base of this invention.

For example, bases 12300, 14300, and 16400 depicted in FIGS. 123 through 142, FIGS. 143 through 162, and FIGS. 163 through 182, respectively, each comprise a table-type base. Each table-type base comprises top surfaces 12900, 14900 and 16900, opposing side panels 13600, 15600, and 17600, and front panels 13500, 15500 and 17500, respectively. However, none of the bases incorporate a foot rest.

The height of each of the bases of each embodiment shown varies with base 12300 being the shortest in height, base 14300 being of medium height, and base 16400 being the tallest. This change in height is essentially accomplished by varying the height of side panels 13600, 15600, and 17600, respectively, and front panels 13500, 15500, and 17500, respectively. Most other components may remain the same dimensions and are otherwise interchangeable with each base regardless of height.

The scalability of the base of the instant invention may be applied to almost any dimension or dimensions such that the base may accommodate the dimensions of any device with which the base is to be used, or to meet any other size or dimensional requirement desired.

It should also be noted that each of the individual features present in each of the embodiments of the invention disclosed herein (e.g. foot rests, sled mountings, carpet holders, leveling devices, and the like) may be individually or collectively incorporated into any embodiment of the instant invention.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A base for supporting an entertainment or gaming device, said base comprising:
- a top surface on which said device may be positioned;
- a first side panel positioned substantially perpendicularly to said top surface;
- a second side panel positioned substantially perpendicularly to said top surface and opposed to said first side panel;
- a front panel positioned substantially perpendicularly to said top surface and said first and second side panels;
- a kick plate adjacent the front panel, positioned substantially perpendicularly to said top surface and said first and second side panels, the kick plate including end pieces extending perpendicularly and forwardly therefrom, the end pieces each adapted with a respective pin or socket connector; and
- a foot rest located parallel to the kick plate, each end of the foot rest adapted with a respective other of the pin or socket connector, the foot rest being rotatably connected to the respective pin or socket connector of each end piece of the kick plate;
- wherein said base is modular and may be assembled, disassembled, and reassembled, and wherein said first and second side panels and said front panel define a utility area.

2. The base of claim 1, wherein said top surface and said front panel are removable allowing access to said utility area, wherein said front panel is attached by clevis pin to underlying support channels to provide easy removability.

3. The base of claim 2, further comprising a sled bracket mounted to, and aligned parallel to, the kick plate, the sled bracket adapted for mounting thereto a user chair and bracket providing that a user can orient the user chair a desired height and distance relative to the device supported on the base.

4. The base of claim 3, wherein said foot rest may be placed in an open or closed position via rotational connection by pin and socket connection to the kick plate, wherein the closed position facilitates user chair mounting to the sled bracket.

5. The base of claim 4, aligned with five additional bases in a hexagon configuration, wherein six respective side panels are shared by the six bases.

6. The base claim 1, further comprising a leveling device positioned adjacent the front and back of each the first and the second side panel, each leveling device being accessible via a respectively located opening in the first and the second side panel, wherein the leveling device is a nut and bolt assembly.

7. A method for supporting entertainment or gaming devices, said method comprising the steps of:
- receiving a base for supporting said device in component pieces, wherein said base is modular and may be assembled, disassembled, and reassembled; and
- assembling said component pieces to form said base, said base comprising:
  - a top surface on which said device may be positioned;
  - a first side panel positioned substantially perpendicularly to said top surface;
  - a second side panel positioned substantially perpendicularly to said top surface and opposed to said first side panel;
  - a front panel positioned substantially perpendicularly to said top surface and said first and second side panels;
  - a kick plate adjacent the front panel, positioned substantially perpendicularly to said top surface and said first and second side panels, the kick plate including end pieces extending perpendicularly and forwardly therefrom, the end pieces each adapted with a respective pin or socket connector;
  - a foot rest located parallel to the kick plate, each end of the foot rest adapted with a respective other of the pin or socket connector, the foot rest being rotatably connected to the respective pin or socket connector of each end piece of the kick plate; and
  - a sled bracket mounted to, and aligned parallel to, the kick plate, the sled bracket adapted for mounting thereto a user chair and bracket providing that a user can orient the user chair a desired height and distance relative to the device supported on the base, wherein said foot rest may be placed in an open or closed position via rotational connection by pin and socket connection to the kick plate, wherein the closed position facilitates user chair mounting to the sled bracket.

8. The method of claim 7, further comprising the step of placing said device on said base.

9. The method of claim 7, further comprising steps of:

assembling two or more bases; and positioning said two or more bases.

10. The method of claim 9, wherein said two or more bases are positioned substantially side-by-side.

11. The method of claim 9, wherein said two or more bases are positioned substantially back-to-back.

12. The method of claim 9, wherein said two or more bases are positioned substantially back-to-back and side-by-side.

13. The method of claim 9, wherein said two or more bases are positioned substantially in a circle.

14. The method of claim 9, wherein said two or more bases are positioned substantially in a partial circle.

* * * * *